United States Patent
Bremer et al.

(10) Patent No.: US 10,759,996 B2
(45) Date of Patent: Sep. 1, 2020

(54) LIQUID-CRYSTAL MEDIUM

(71) Applicant: MERCK PATENT GMBH, Darmstadt (DE)

(72) Inventors: Mathias Bremer, Darmstadt (DE); Patrick Suess, Laudenbach (DE); Nils Greinert, Seeheim-Jugenheim (DE); Melanie Klasen-Memmer, Heuchelheim (DE); Christian Schoenefeld, Babenhausen (DE)

(73) Assignee: MERCK PATENT GMBH, Darmstadt (DE)

( * ) Notice: Subject to any disclaimer, the term of this patent is extended or adjusted under 35 U.S.C. 154(b) by 155 days.

(21) Appl. No.: 15/771,590

(22) PCT Filed: Oct. 7, 2016

(86) PCT No.: PCT/EP2016/001669
§ 371 (c)(1),
(2) Date: Apr. 27, 2018

(87) PCT Pub. No.: WO2017/071793
PCT Pub. Date: May 4, 2017

(65) Prior Publication Data
US 2018/0312756 A1 Nov. 1, 2018

(30) Foreign Application Priority Data
Oct. 30, 2015 (EP) .................................. 15003123

(51) Int. Cl.
| | | |
|---|---|---|
| *G02F 1/1333* | (2006.01) | |
| *C09K 19/12* | (2006.01) | |
| *C09K 19/06* | (2006.01) | |
| *C09K 19/30* | (2006.01) | |
| *G02F 1/137* | (2006.01) | |
| *C09K 19/04* | (2006.01) | |
| *C08F 2/48* | (2006.01) | |

(52) U.S. Cl.
CPC ............ *C09K 19/12* (2013.01); *C09K 19/065* (2013.01); *C09K 19/30* (2013.01); *G02F 1/137* (2013.01); *C08F 2/48* (2013.01); *C09K 2019/0448* (2013.01); *G02F 1/133305* (2013.01); *G02F 2001/13706* (2013.01); *G02F 2001/13712* (2013.01)

(58) Field of Classification Search
CPC ...... C09K 19/12; C09K 19/065; C09K 19/30; C09K 2019/0448; G02F 1/137; G02F 1/1333; G02F 1/133305; G02F 2001/13706; G02F 2001/13712; C08F 2/48
USPC ..................................................... 252/299.66
See application file for complete search history.

(56) References Cited

U.S. PATENT DOCUMENTS

| | | | |
|---|---|---|---|
| 2013/0065179 A1 | 3/2013 | Maeda | |
| 2018/0312756 A1* | 11/2018 | Bremer | ................ C09K 19/065 |
| 2019/0241808 A1* | 8/2019 | Greinert | ................ C09K 19/42 |
| 2019/0264105 A1* | 8/2019 | Greinert | ............... C09K 19/066 |

FOREIGN PATENT DOCUMENTS

EP    2818534 A1    12/2014

OTHER PUBLICATIONS

International Search Report PCT/EP2016/001669 dated Jan. 13, 2017.

* cited by examiner

*Primary Examiner* — Geraldina Visconti
(74) *Attorney, Agent, or Firm* — Millen White Zelano & Branigan, PC; Brion P. Heaney

(57) ABSTRACT

The present invention relates to a liquid crystal (LC) medium comprising polymerisable compounds, to a process for its preparation, to its use for optical, electro-optical and electronic purposes, in particular in LC displays, and to LC displays comprising it.

36 Claims, 5 Drawing Sheets

(a) (b) (c)

(a) (b) (c)

(a) (b) (c)

(a) (b) (c)

(a) (b) (c)

(a) (b) (c)

(a) (b) (c)

LIQUID-CRYSTAL MEDIUM

The present invention relates to a liquid crystal (LC) medium comprising polymerisable compounds, to a process for its preparation, to its use for optical, electro-optical and electronic purposes, in particular in flexible LC displays, and to LC displays comprising it.

BACKGROUND OF THE INVENTION

Recently liquid crystal (LC) mixtures have been developed for the realization of flexible substrate based LC displays. These LC mixtures contain reactive polymer precursors that allow the formation of polymer walls in the display, which help to maintain the gap distance of the LC layer. This technology thus enables manufacturing of free form and robust displays by using LC materials.

Free form LC displays can either have a permanent shape other than a rigid flat panel displays, for example a curved shape, or can even be flexible. The simplest form of the first type are curved TVs that have been developed in the recent past and offer the viewer an enhanced viewing experience. Thereby it is possible to provide displays that are not only shaped in one, but two dimensions, and could be used for example as car dashboards or advertising screens.

Flexible displays, another type of free form displays, have also been developed, and have been proposed for example for use in mobile phones or smart watches utilizing the advantages of flexibility. Further potential applications are foldable or rollable mobile phones, as well as extra-large screens for presentations or home entertainment, which require due to their size to be rollable or foldable for being transported or stowed. Advantageously such devices are based on plastic substrates, instead of rigid glass substrates as used in conventional, unflexible LC displays.

Another display concept, 'unbreakable' displays, are also based on plastic substrates and refers to a display design featuring particular robustness, durability, and resistance against mechanical impact. One problem that should be solved is that mobile devices have an elevated risk of being dropped accidentally or becoming otherwise damaged during their normal use. In view of the high value of these devices, a solution to this problem would be highly desirable.

There is thus a great demand for free form or unbreakable LC displays.

One of the main technical challenges of LC displays with flexible substrates is that the LC layer thickness is critical for proper device operation. A proper combination of defined LC layer thickness and LC material properties ensures that the pixels can be switched between a black state and light transmitting state. In case of a varying layer thickness, unwanted interference with the gap distance between the substrates can result in visible optical defects. It should therefore be ensured that the LC layer thickness is not influenced by the bending or the lack of rigidity of flexible plastic substrates.

In conventional LC displays with rigid glass substrates, usually spacer particles are added to the LC layer in order to define and maintain a constant layer thickness. A possible solution for free form displays is to adapt this concept by incorporating supporting structures, like for example polymer walls, that can both resist compression and bind the two substrates together. A suitable manufacturing process is to prefabricate the polymer wall structures, spread the LC mixture on the substrate, and subsequently close the panel with the top substrate. Potential problems with this approach are for example that spreading of the LC mixture is obstructed by the support structures, and that bonding to the top substrate might not be sufficient.

An alternative solution is to create the polymer wall structures by means of a photolithographic process after the display has been assembled. This is schematically illustrated in FIG. 1 showing a polymer wall formation process. FIG. 1 (a) shows an LC mixture consisting of LC host molecules (rods), polymerisable monomer (dots), and photo-initiator (not shown). As shown in FIG. 1 (b) the LC mixture is filled into the display, or the LC mixture is spread on a first substrate and a second substrate applied on top, and UV radiation (indicated by the arrows) is applied through a photomask. Polymerization induced phase separation takes place, as a result of which polymer walls are formed in irradiated regions according to the mask pattern as shown in FIG. 1 (c), while the LC phase of the LC host molecules (rods) in the pixel area is restored.

The principle of creating polymer walls by this method for LC display applications is a known technique that has been described in the literature and has been suggested for use in a variety of display modes.

For example, U.S. Pat. No. 6,130,738 and EP2818534 A1 disclose an LC display that comprises polymer walls formed from one or two polymerisable monomers that are contained in the LC host mixture.

However, the currently used LC mixtures and monomers for use in flexible LC displays with polymer wall formation do still have several drawbacks and leave room for further improvement.

For example, it was observed that the polymerisable compounds and LC media used in prior art do often show insufficient phase separation between the polymer walls and the LC molecules of the LC host mixture. This leads on the one hand to the undesired inclusion of LC molecules in the polymer walls, and on the other hand to increased amounts of polymer molecules dissolved or dispersed in the LC host mixture, both of which can negatively influence the display performance.

Thus, LC molecules trapped in the polymer wall can lead to reduced transparency and contrast of the display, a deterioration of the electrooptical response due to formation of domains with different switching speed, and decreased adhesion of the polymer walls to the substrates. On the other hand, undesired amounts of polymer molecules in the LC host mixture can negatively affect the LC mixture properties.

Moreover, it was observed that the thickness of the polymer walls is often not constant but varying, which can lead to non-uniform pixel size. Besides the polymer walls do often still not show sufficient stability against mechanical pressure on the one hand and sufficient elasticity on the other hand. Also, the polymer walls are often too thick, which reduces transparency and contrast of the display.

It is therefore desirable to have available improved LC mixtures and monomers for use in flexible LC displays which can overcome the drawbacks of materials used in prior art as described above.

The present invention is based on the object of providing novel suitable materials, in particular LC host mixtures comprising polymerisable monomers, for use in flexible LC displays with polymer walls, which do not have the disadvantages indicated above or do so only to a reduced extent.

In particular, the invention is based on the object of providing LC media comprising polymerisable monomers, which enable the formation of polymer walls in a time- and cost-effective manner, and which are suitable for mass production. The formed polymer walls should show clear phase separation from the LC host mixture, without or with a reduced amount of defects or LC molecules trapped in the polymer wall, and without or with a reduced amount of polymer molecules dissolved in the LC host mixture. Also, the polymer walls should show constant thickness, high elasticity, high stability against mechanical pressure, and good adhesion to the substrates.

Another object of the invention is to provide improved LC host mixtures for flexible displays which should show high specific resistance values, high VHR values, high reliability, low threshold voltages, short response times, high birefringence, show good UV absorption especially at longer wavelengths, allow quick and complete polymerisation of the monomers contained therein, and reduce or prevent the occurrence of image sticking in the display.

Another object of the invention is to provide LC displays with polymer walls that show high transparency in the addressed state, good contrast, high switching speed and a large operating temperature range.

Another object of the present invention is to provide an improved technical solution for enabling LCD technology for free form and unbreakable plastic substrate based LC displays.

The above objects have been achieved in accordance with the present invention by materials and processes as described and claimed hereinafter.

Thus, it has surprisingly been found that at least some of the above-mentioned objects can be achieved by using an LC medium which comprises an LC host mixture and one or more polymerisable monomers as disclosed and claimed hereinafter, which contains a polymerisable compound having a polymerisable group and a cycloalkyl group to the LC medium. It was observed that, by using such an LC medium, it is possible to achieve polymer walls with a more constant thickness and better phase separation between the polymer walls and the LC host mixture.

It has also been surprisingly found that the polymerisable compounds contained in the LC medium can also be used to form spacers to maintain a constant cell gap between the substrates of the LC display. This can support or even replace the spacer materials that are normally used in prior art.

SUMMARY OF THE INVENTION

The invention relates to a liquid crystal (LC) medium comprising a polymerisable component A) which comprises, and preferably consists of, one or more polymerisable compounds, and a liquid-crystalline component B), hereinafter also referred to as "LC host mixture", which comprises, and preferably consists of, one or more mesogenic or liquid-crystalline compounds, wherein the polymerisable component A) comprises one or more first polymerisable compounds comprising a monocyclic hydrocarbon group having from 8 to 24 ring atoms and attached thereto (exactly) one polymerisable group, optionally one or more second polymerisable compounds comprising a straight-chain or branched hydrocarbon group having from 1 to 30 C atoms, or a monocyclic hydrocarbon group having from 3 to 7 ring atoms, or a bi- or polycyclic hydrocarbon group having from 4 to 30 ring atoms, and attached thereto (exactly) one polymerisable group, optionally one or more third polymerisable compounds comprising a straight-chain, branched or cyclic hydrocarbon group having from 1 to 30 C atoms, and attached thereto two or more polymerisable groups, and optionally one or more fourth polymerisable compounds comprising a ring system containing one or more aromatic or heteroaromatic rings or condensed aromatic or heteroaromatic rings, and attached thereto two polymerisable groups that are preferably different from each other.

The liquid-crystalline component B) of an LC medium according to the present invention is hereinafter also referred to as "LC host mixture", and preferably contains LC compounds that are selected only from low-molecular-weight compounds which are unpolymerisable, and optionally contains further additives like photoinitiators, stabilisers or chiral dopants.

The invention furthermore relates to an LC medium or LC display as described above and below, wherein the polymerisable compounds, or the compounds of component A), are polymerised.

The invention furthermore relates to a process for preparing an LC medium as described above and below, comprising the steps of mixing an LC host mixture or LC component B) as described above and below, with one or more polymerisable compounds as described above and below, and optionally with further LC compounds and/or additives.

The invention further relates to the use of LC medium in LC displays, preferably in flexible LC displays.

The invention furthermore relates to an LC display comprising an LC medium as described above and below.

The invention furthermore relates to an LC display comprising polymer walls obtainable by polymerisation of one or more polymerisable compounds or a polymerisable component A) as described above and below, or comprising an LC medium as described above and below.

The invention furthermore relates to an LC display comprising spacers obtainable by polymerisation of one or more polymerisable compounds or a polymerisable component A) as described above and below, or comprising an LC medium as described above and below.

The LC display according to the present invention is preferably a flexible LC display, and preferably a TN, OCB, IPS, FFS, posi-VA, VA or UB-FFS display.

The invention furthermore relates to an LC display comprising two substrates, at least one which is transparent to light, an electrode provided on each substrate or two electrodes provided on only one of the substrates, and located between the substrates a layer of an LC medium as described above and below, wherein the polymerisable compounds are polymerised between the substrates of the display.

The invention furthermore relates to a process for manufacturing an LC display as described above and below, comprising the steps of filling or otherwise providing an LC medium as described above and below between the substrates of the display, and polymerising the polymerisable compounds.

The displays according to the invention have two electrodes, preferably in the form of transparent layers, which are applied to one or both of the substrates. In some displays, for example in TN, OCB or VA displays, one electrode is applied to each of the two substrates. In other displays, for example in IPS, FFS or UB-FFS displays, both electrodes are applied to only one of the two substrates.

The polymerisable compounds of the polymerisable component are preferably polymerised by photopolymerisation, very preferably by UV photopolymerisation.

DETAILED DESCRIPTION OF THE INVENTION

Figure 1:
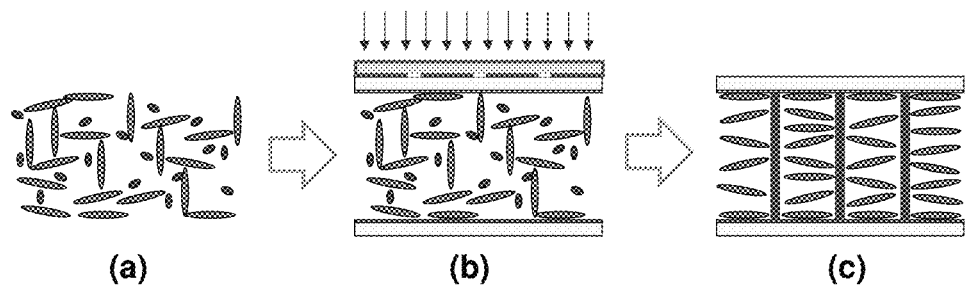
FIG. 1 schematically illustrates the polymer wall formation process in displays according to prior art and according to the present invention.
Figure 2:
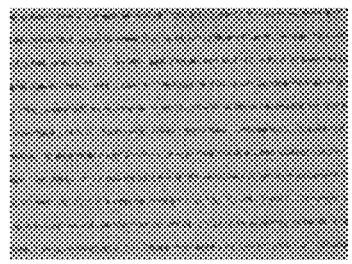
FIG. 2-9 show polarization microscope images of test cells containing polymerisable mixtures 1-8 according to Use Examples 1-8, respectively, after polymerization.
Figure 3:
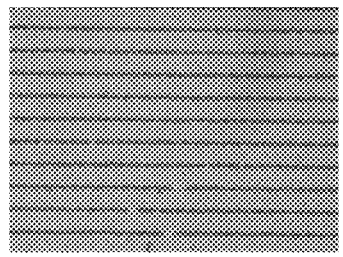
Figure 4:
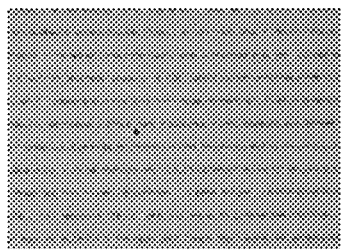
Figure 5:
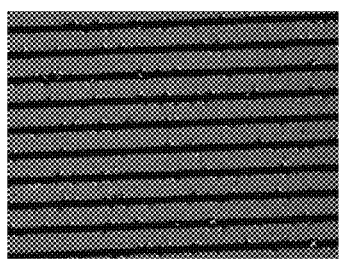
Figure 6:
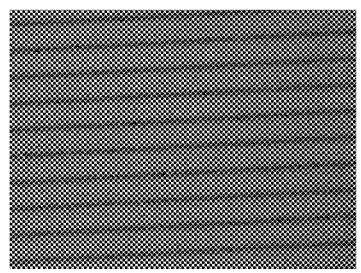
Figure 7:
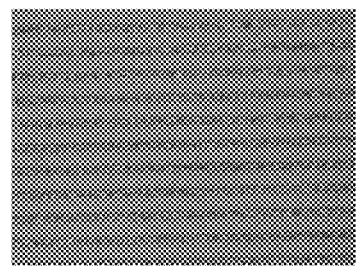
Figure 8:
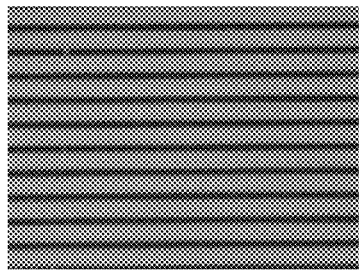
Figure 9:
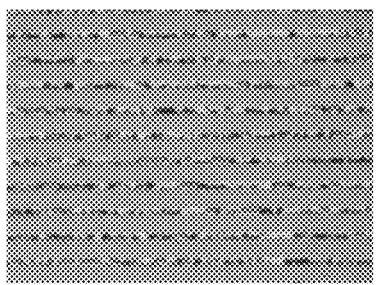
Figure 10:
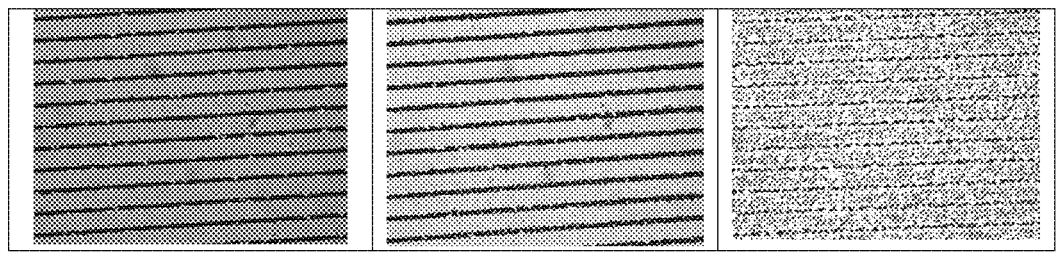
FIG. 10-18 show polarization microscope images of test cells containing polymerisable mixtures 9-17 according to Use Examples 9-17, respectively, after polymerization (a), after mechanical stress test (b) and after thermal stress test (c).
Figure 11:
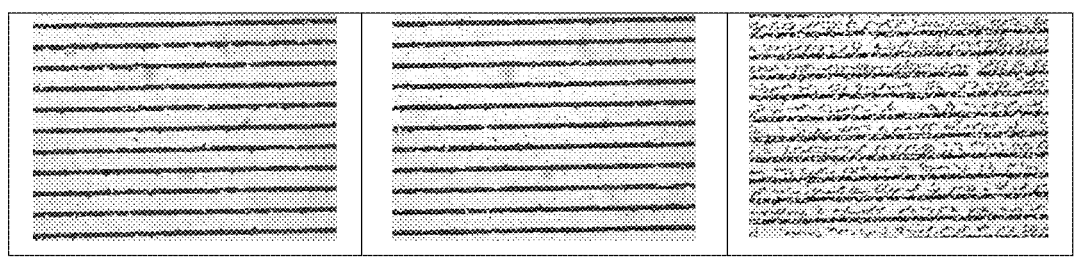
Figure 12:
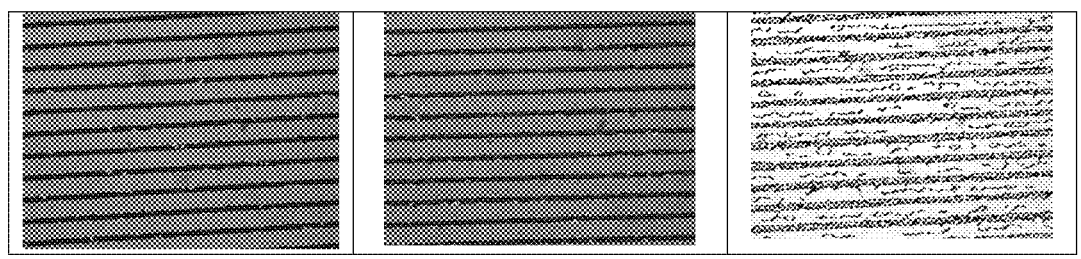
Figure 13:
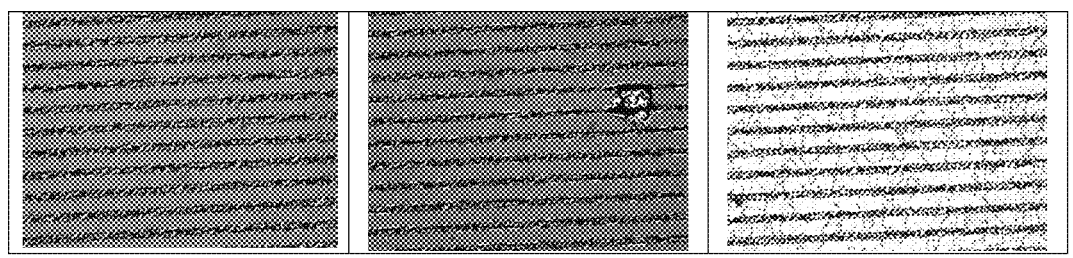
Figure 14:
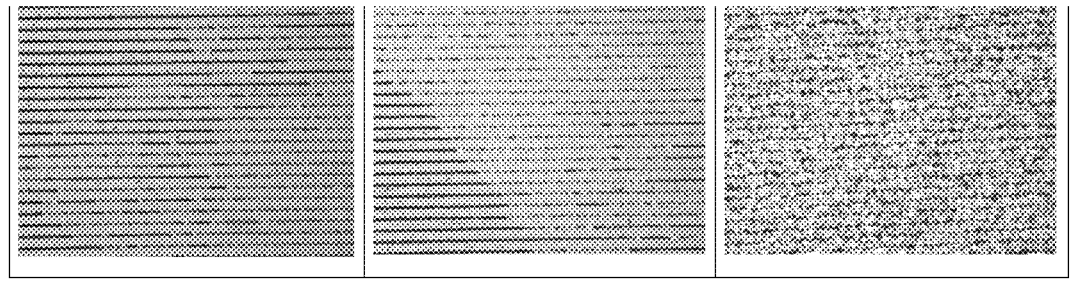
Figure 15:
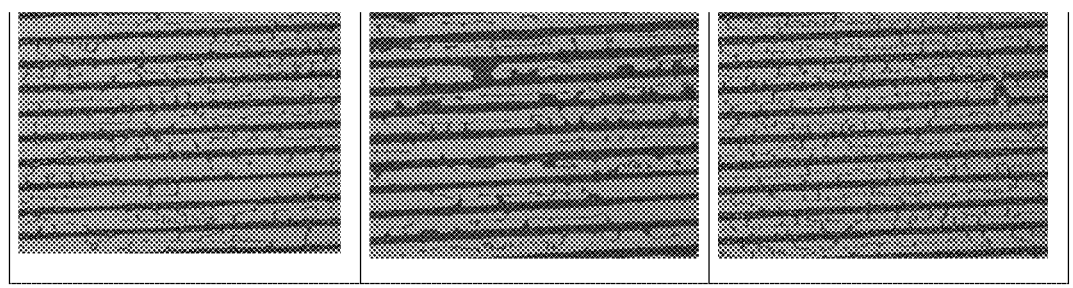
Figure 16:
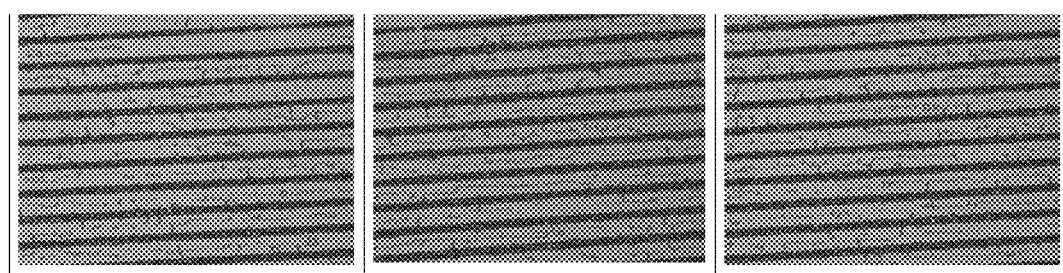
Figure 17:
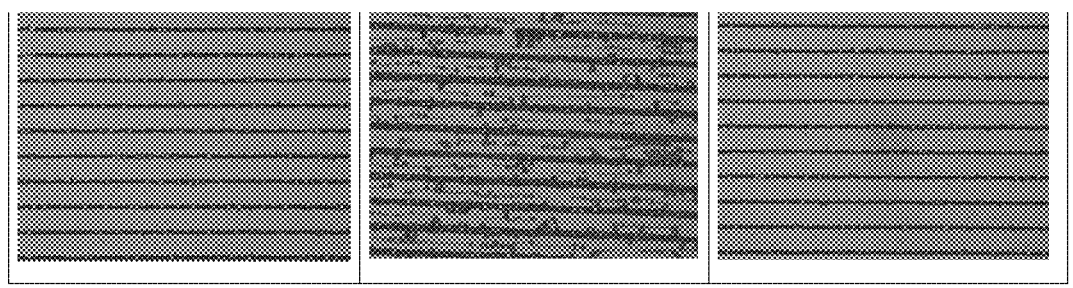
Figure 18:
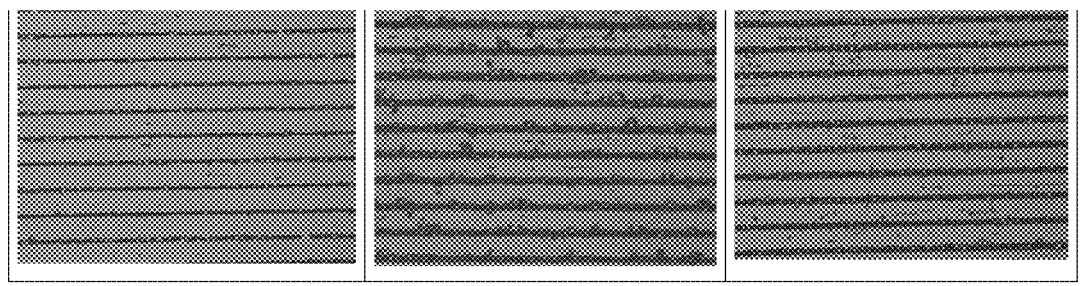

Above and below, the term "free form display" will be understood to mean a display that has either a permanent shape other than a plane-parallel shape, like for example a curved shape, or a flexible display. The term "flexible display" will be understood to mean a display which is bendable without breaking, like for example a display having flexible plastic substrates instead of rigid glass substrates and not comprising any other rigid layers. The term "curved display" will be understood to mean a display which has top and bottom substrates that are not plane-parallel but curved.

Above and below, the term "flat display with reduced touch Mura sensitivity" will be understood to mean a display wherein irregular luminosity variation defects, which are caused by touching the front screen of a display, are reduced.

Above and below, the term "bi- or polycyclic group" will be understood to mean a group that consists of two or more fused rings, i.e. rings that share at last one common atom (in contrast to rings that are connected via covalent bonds between atoms belonging to different rings), wherein fusion of the rings occurs
a) across a sequence of atoms (bridgehead), like for example in bicyclo[2.2.1]heptane (norbornane) or tricyclo [3.3.3.1]decane (adamantane), hereinafter also referred to as "bridged bi- or polycyclic groups",
b) across a bond between two atoms, like for example in bicyclo[4.4.0]decane (decalin), hereinafter also referred to as "fused bi- or polycyclic groups"
c) at a single atom (spiro atom), like for example in spiro[4.5]decane, hereinafter also referred to as "spirocyclic groups".

Unless indicated otherwise, the abbreviation "RM" is used above and below when referring to a reactive mesogen.

Above and below, polymerisable compounds or RMs with one polymerisable reactive group are also referred to as "monoreactive", polymerisable compounds or RMs with two polymerisable reactive groups are also referred to as "direactive", and polymerisable compounds or RMs with three polymerisable reactive groups are also referred to as "trireactive".

Unless indicated otherwise, the expression "LC mixture" is used when referring to the LC host mixture (i.e. without the RMs or polymerisable compounds), while the expression "LC medium" is used when referring to the LC host mixture plus the RM(s) or polymerisable compounds.

Unless stated otherwise, the polymerisable compounds and RMs are preferably selected from achiral compounds.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "reactive mesogen" and "RM" will be understood to mean a compound containing a mesogenic or liquid crystalline skeleton, and one or more functional groups attached thereto which are suitable for polymerisation and are also referred to as "polymerisable group" or "P".

Unless stated otherwise, the term "polymerisable compound" as used herein will be understood to mean a polymerisable monomeric compound.

As used herein, the term "low-molecular-weight compound" will be understood to mean to a compound that is monomeric and/or is not prepared by a polymerisation reaction, as opposed to a "polymeric compound" or a "polymer".

As used herein, the term "unpolymerisable compound" will be understood to mean a compound that does not contain a functional group that is suitable for polymerisation under the conditions usually applied for the polymerisation of the RMs or polymerizable compounds.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

The term "spacer group", hereinafter also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerisable group(s) in a polymerisable mesogenic compound.

Above and below,

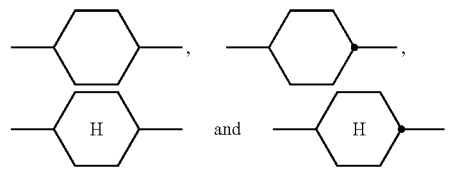

denote a trans-1,4-cyclohexylene ring, and

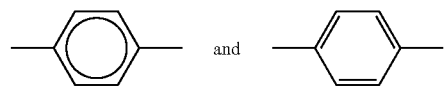

denote a 1,4-phenylene ring.

Above and below "organic group" denotes a carbon or hydrocarbon group.

"Carbon group" denotes a mono- or polyvalent organic group containing at least one carbon atom, where this either contains no further atoms (such as, for example, —C≡C—) or optionally contains one or more further atoms, such as, for example, N, O, S, B, P, Si, Se, As, Te or Ge (for example carbonyl, etc.). The term "hydrocarbon group" denotes a carbon group which additionally contains one or more H atoms and optionally one or more heteroatoms, such as, for example, N, O, S, B, P, Si, Se, As, Te or Ge.

"Halogen" denotes F, Cl, Br or I.

—CO—, —C(=O)— and —C(O)— denote a carbonyl group, i.e.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms, preferably selected from N, O, S, Se, Te, Si and Ge.

Preferred carbon and hydrocarbon groups are optionally substituted, straight-chain, branched or cyclic, alkyl, alkenyl, alkynyl, alkoxy, alkylcarbonyl, alkoxycarbonyl, alkylcarbonyloxy and alkoxycarbonyloxy having 1 to 40, preferably 1 to 20, very preferably 1 to 12, C atoms, optionally substituted aryl or aryloxy having 5 to 30, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 5 to 30, preferably 6 to 25, C atoms, wherein one or more C atoms may also be replaced by hetero atoms, preferably selected from N, O, S, Se, Te, Si and Ge.

Further preferred carbon and hydrocarbon groups are $C_1$-$C_{20}$ alkyl, $C_2$-$C_{20}$ alkenyl, $C_2$-$C_{20}$ alkynyl, $C_3$-$C_{20}$ allyl, $C_4$-$C_{20}$ alkylidenyl, $C_4$-$C_{20}$ polyenyl, $C_6$-$C_{20}$ cycloalkyl, $C_4$-$C_{15}$ cycloalkenyl, $C_6$-$C_{30}$ aryl, $C_6$-$C_{30}$ alkylaryl, $C_6$-$C_{30}$ arylalkyl, $C_6$-$C_{30}$ alkylaryloxy, $C_6$-$C_{30}$ arylalkyloxy, $C_2$-$C_{30}$ heteroaryl, $C_2$-$C_{30}$ heteroaryloxy.

Particular preference is given to $C_1$-$C_{12}$ alkyl, $C_2$-$C_{12}$ alkenyl, $C_2$-$C_{12}$ alkynyl, $C_6$-$C_{25}$ aryl and $C_2$-$C_{25}$ heteroaryl.

Further preferred carbon and hydrocarbon groups are straight-chain, branched or cyclic alkyl having 1 to 20, preferably 1 to 12, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another, and $R^x$ denotes H, F, Cl, CN, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by F or Cl, or denotes an optionally substituted aryl or aryloxy group with 6 to 30 C atoms, or an optionally substituted heteroaryl or heteroaryloxy group with 2 to 30 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, hereinafter also referred to as $L^S$, are, for example, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or Cl, optionally substituted silyl having 1 to 20 Si atoms, or optionally substituted aryl having 6 to 25, preferably 6 to 15, C atoms, wherein $R^x$ denotes H, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl, P- or P-Sp-, and $Y^1$ denotes halogen.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, wherein $R^0$ denotes H or alkyl with 1 to 20 C atoms.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

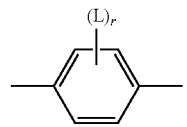

is preferably

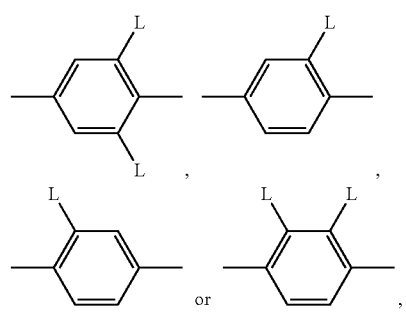

in which L has one of the meanings indicated above.

The polymerisable group P or $P^{1,2}$ is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P and $P^{1,2}$ are selected from the group consisting of $CH_2$=$CW^1$—CO—O—, $CH_2$=$CW^1$—CO—,

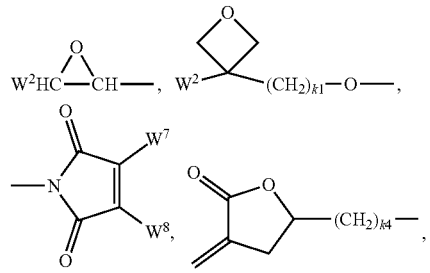

$CH_2$=$CW^2$—(O)$_{k3}$—, $CW^1$=CH—CO—(O)$_{k3}$—, $CW^1$=CH—CO—NH—, $CH_2$=$CW^1$—CO—NH—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HO—$CW^2W^3$—, HS—$CW^2W^3$—, $HW^2$N—, HO—$CW^2W^3$—NH—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl, $CH_3$ or $C_2H_5$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P and $P^{1,2}$ are selected from the group consisting of $CH_2=CW^1-CO-O-$, $CH_2=CW^1-CO-$,

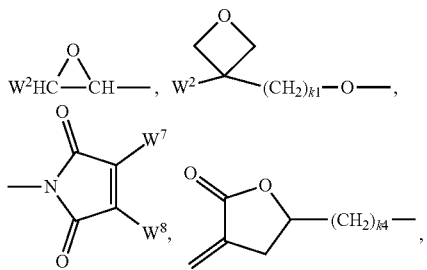

$CH_2=CW^2-O-$, $CH_2=CW^2-$, $CW^1=CH-CO-(O)_{k3}-$, $CW^1=CH-CO-NH-$, $CH_2=CW^1-CO-NH-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $CH_2=CW^1-CO-NH-$, $CH_2=CH-(COO)_{k1}$-Phe-$(O)_{k2}-$, $CH_2=CH-(CO)_{k1}$-Phe-$(O)_{1,2}-$, Phe-CH=CH— and $W^4W^5W^6Si-$, in which $W^1$ denotes H, F, Cl, CN, $CF_3$, phenyl or alkyl having 1 to 5 C atoms, in particular H, F, Cl, $CH_3$ or $C_2H_5$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P and $P^{1,2}$ are selected from the group consisting of $CH_2=CW^1-CO-O-$, in particular $CH_2=CH-CO-O-$, $CH_2=C(CH_3)-CO-O-$ and $CH_2=CF-CO-O-$, furthermore $CH_2=CH-O-$, $(CH_2=CH)_2CH-O-CO-$, $(CH_2=CH)_2CH-O-$,

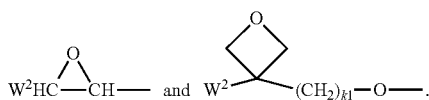

Further preferred polymerisable groups P and $P^{1,2}$ are selected from the group consisting of vinyloxy, acrylate, methacrylate, ethacrylate, fluoroacrylate, chloroacrylate, oxetane and epoxide, most preferably from acrylate and methacrylate.

If Sp or $Sp^{1,2}$ is different from a single bond, it is preferably selected of the formula Sp"-X", so that the respective radical P-Sp- conforms to the formula P-Sp"-X"—, wherein Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N(R$^0$)—, —Si(R$^0$R$^{00}$)—, —CO—, —CO—O—, —O—CO—, —O—CO—O—, —S—CO—, —CO—S—, —N(R$^{00}$)—CO—O—, —O—CO—N(R$^0$)—, —N(R$^0$)—CO—N(R$^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N(R$^0$)—, —N(R$^0$)—CO—, —N(R$^0$)—CO—N(R$^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond, R$^0$ and R$^{00}$ each, independently of one another, denote H or alkyl having 1 to 20 C atoms, and Y$^2$ and Y$^3$ each, independently of one another, denote H, F, Cl or CN.

X" is preferably —O—, —S—, —CO—, —COO—, —OCO—, —O—COO—, —CO—NR$^0$—, —NR$^0$—CO—, —NR$^0$—CO—NR$^{00}$— or a single bond.

Typical spacer groups Sp, $Sp^{1,2}$ and -Sp"-X"— are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^0$R$^{00}$—O)$_{p1}$—, in which p1 is an integer from 1 to 12, q1 is an integer from 1 to 3, and R$^0$ and R$^{00}$ have the meanings indicated above.

Particularly preferred groups Sp, $Sp^{1,2}$ and -Sp"-X"— are —(CH$_2$)$_{p1}$—, —(CH$_2$)$_{p1}$—O—, —(CH$_2$)$_{p1}$—O—CO—, —(CH$_2$)$_{p1}$—CO—O—, —(CH$_2$)$_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methylimino-ethylene, 1-methylalkylene, ethenylene, propenylene and butenylene.

The LC medium according to the present invention contains a polymerisable component A) comprising one or more first polymerisable compounds with a polymerisable group and a ≥8-membered monocyclic hydrocarbon group, one or more second polymerisable compounds comprising a polymerisable group and a straight-chain, branched or <8-membered monocyclic hydrocarbon group, and one or more third polymerisable compounds comprising two or more polymerisable groups and a straight-chain, branched or monocyclic hydrocarbon group.

The hydrocarbon group contained in the first, second and third polymerisable compounds is preferably a non-aromatic group.

Preferably the monocyclic hydrocarbon group in the first polymerisable compound is a cycloalkyl group having from 8 to 24 ring atoms, preferably having from 8 to 18 ring atoms, that is optionally substituted by one or more groups L as defined in formula I, and wherein one or more $CH_2$-groups are optionally replaced by —O— and/or —CO— such that O-atoms are not directly adjacent to one another.

Preferably component A) of the LC medium comprises one or more first polymerisable compounds selected of formula I P-Sp-G$^1$    I wherein P is a polymerisable group, Sp is a spacer group or a single bond, $G^1$ is a monocyclic hydrocarbon group having 8 to 24 ring atoms, preferably 8 to 18 ring atoms, which is optionally substituted by one or more groups L, L is F, Cl, —CN, —$NO_2$, —NCO, —NCS, —OCN, —SCN, —C(=O)N($R^x$)$_2$, —C(=O)$Y^1$, —C(=O)$R^x$, —N($R^x$)$_2$, optionally substituted silyl, optionally substituted aryl or heteroaryl having 5 to 20 ring atoms, or straight-chain or branched alkyl having 1 to 25, particularly preferably 1 to 10, C atoms, in which, in addition, one or more non-adjacent $CH_2$ groups may each be replaced, independently of one another, by —C($R^0$)=C($R^{00}$)—, —C≡C—, —N($R^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, —CN, $R^x$ is H, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F or Cl, $R^0$, $R^{00}$ are H or alkyl having 1 to 20 C atoms, $Y^1$ is halogen, preferably F or Cl.

P is preferably acrylate, methacrylate or oxetane, very preferably acrylate or methacrylate.

Sp is preferably of the formula Sp"-X", so that the respective radical P-Sp-conforms to the formula P-Sp"-X"—, wherein Sp" and X" are as defined above.

Sp is very preferably —($CH_2$)$_{p1}$—, —($CH_2$)$_{p1}$—O—, —($CH_2$)$_{p1}$—O—CO—, —($CH_2$)$_{p1}$—CO—O—, —($CH_2$)$_{p1}$—O—CO—O—, in which p1 is an integer from 1 to 12.

L is preferably selected from F, Cl, —CN and straight-chain or branched alkyl having 1 to 25, particularly preferably 1 to 10, C atoms, in which, in addition, one or more non-adjacent $CH_2$ groups may each be replaced, independently of one another, by —C($R^0$)=C($R^{00}$)—, —C≡C—, —N($R^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I or CN.

L is very preferably selected from F, —CN, and alkyl or alkoxy with 1 to 6 C atoms that is optionally fluorinated, preferably F, Cl, CN, $CH_3$, $OCH_3$, $OCF_3$, $OCF_2H$ or $OCFH_2$, very preferably F.

$G^1$ is preferably selected the group consisting of cyclooctyl, cyclononyl, cyclodecyl, cycloundecyl, cyclododecyl, cyclotridecyl, cyclotetradecyl, cylcopentadecyl, cyclohexadecyl, cycloheptadecyl and cyclooctadecyl, all of which are optionally substituted by one or more groups L.

Preferred compounds of formula I are selected from the following formulae

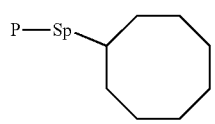
I1

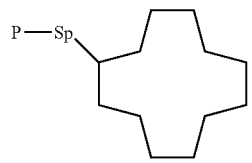
I2

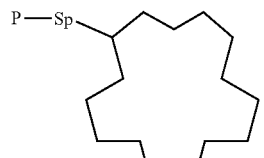
I3

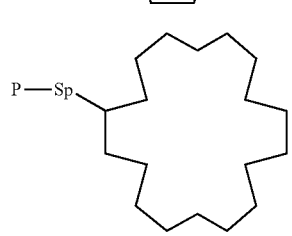
I4 wherein P and Sp have the meanings given in formula I or one of the preferred meanings given above and below.

Very preferred compounds of formula I are selected from the following formulae

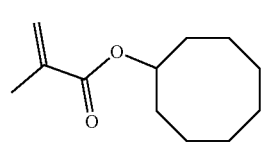
I1a

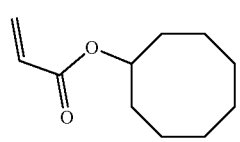
I1b

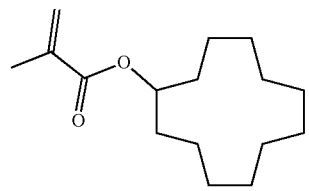
I2a

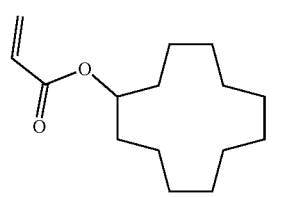
I2b

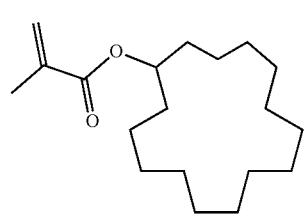
I3a

-continued

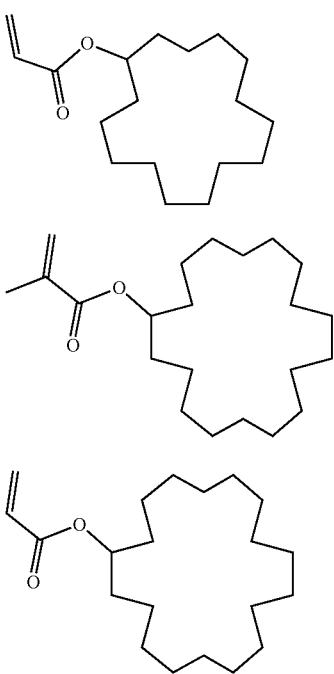

Preferably component A) of the LC medium comprises one or more second polymerisable compounds selected of formula II P-Sp-G²      II wherein
P and Sp have the meanings given in formula I or one of the preferred meanings given above and below for formula I, and
G² is a straight-chain or branched alkyl group with 1 to 20 C atoms, or a monocyclic alkyl group with 3 to 7 C atoms, that is optionally mono-, poly- or perfluorinated and is optionally substituted by one or more groups L as defined in formula I, and wherein one or more CH₂-groups are optionally replaced by —O—, —CO—, —O—CO— or —CO—O— such that O-atoms are not directly adjacent to one another.

Preferred compounds of formula II are selected from the following formulae

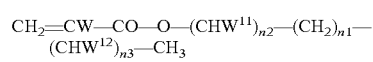      II1

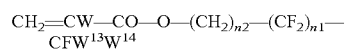      II2

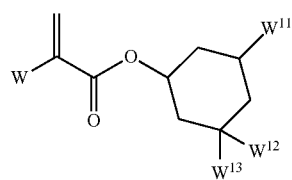      II3

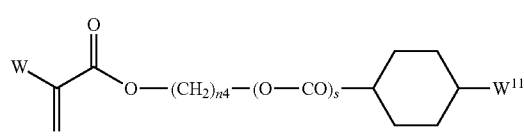      II4 wherein the individual radicals, independently of each other and on each occurrence identically or differently, have the following meanings
P, Sp have the meanings given in formula I or one of the preferred meanings given above and below,
$W^{11}$, $W^{12}$ are H, F or straight-chain or branched $C_1$-$C_{12}$-alkyl,
$W^{13}$, $W^{14}$ are H or F,
n1 is an integer from 2 to 15,
n2, n3 are 0 or an integer from 1 to 3, Very preferred compounds of formula II are selected from the following formulae $CH_2{=}CW{-}CO{-}O{-}(CHW^{11})_{n2}{-}(CH_2)_{n1}{-}(CHW^{12})_{n3}{-}CH_3$      II1a $CH_2{=}CW{-}CO{-}O{-}(CH_2)_{n2}{-}(CF_2)_{n1}{-}CFW^{13}W^{14}$      II2a

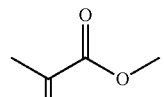      II3a

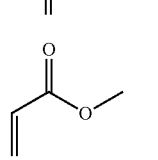      II4a wherein W is H, $CH_3$ or $C_2H_5$, and $W^{11}$, $W^{12}$, $W^{13}$, $W^{14}$, n1, n2 and n3 are as defined in formula II1 and II2, n4 is 0 or an integer from 1 to 15, s is 0 or 1, and if s is 1 then n4 is not 0.

Further preferred compounds of formula II are selected from the following formulae

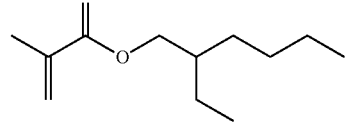      II1a1

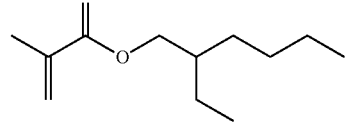      II1a2

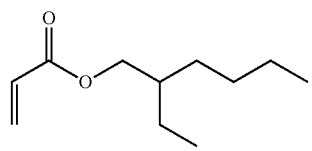      II1a3

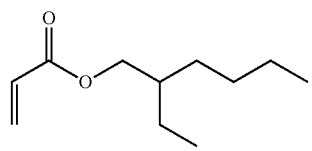      II1a4

-continued
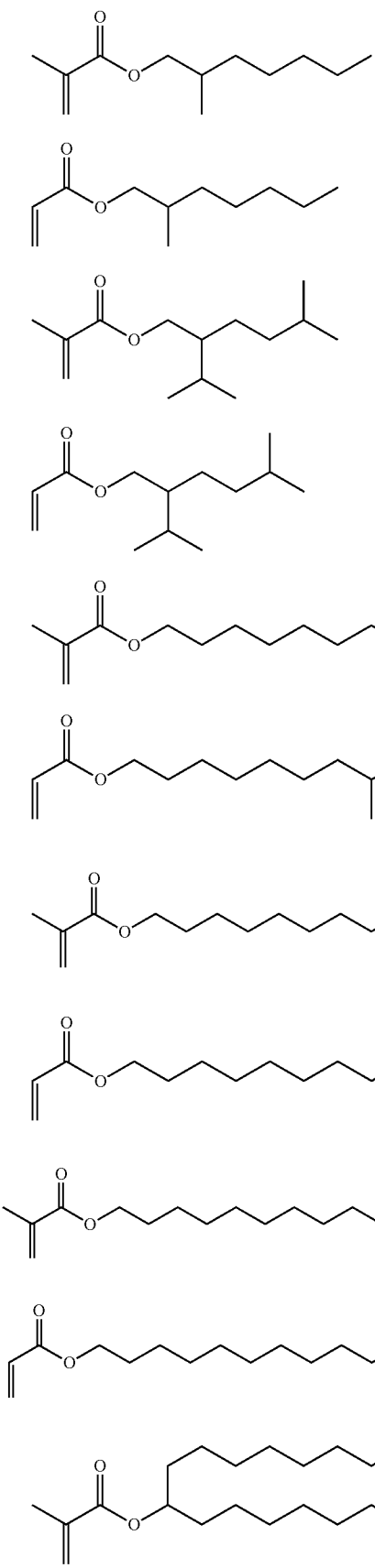
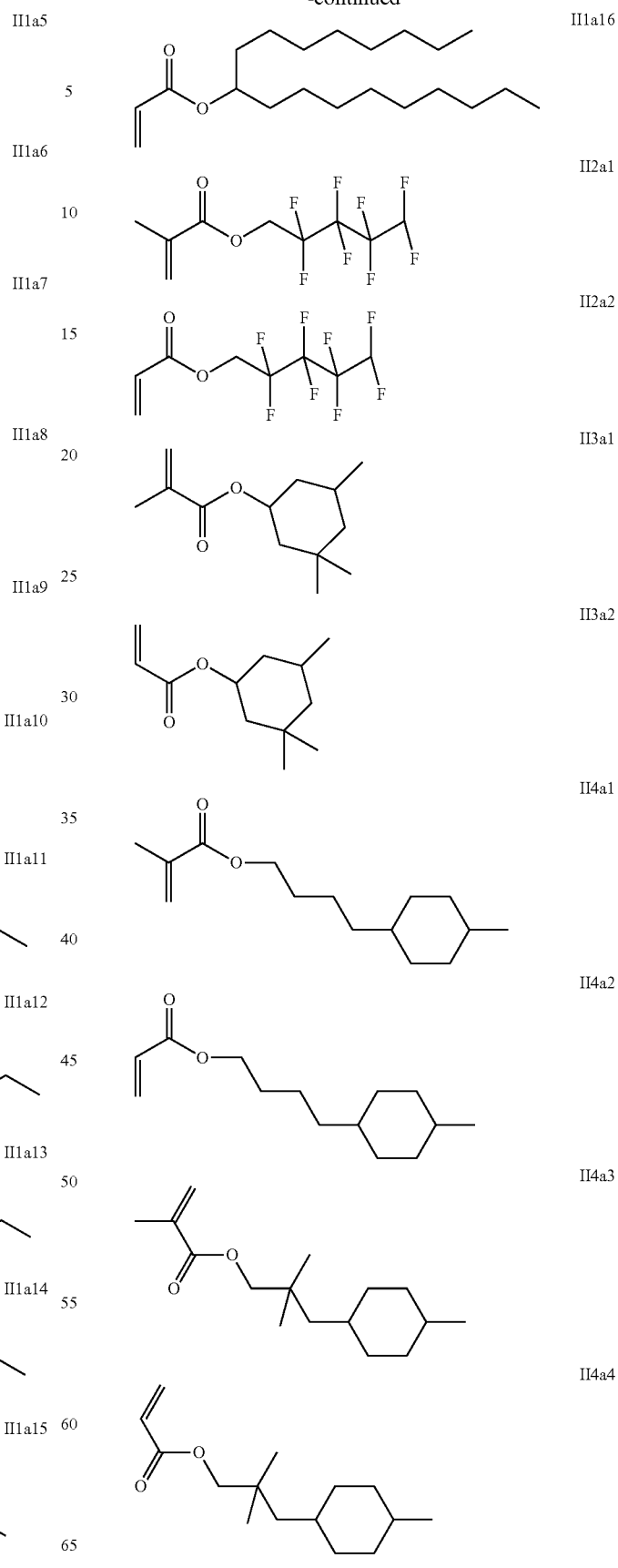

In another preferred embodiment of the present invention component A) of the LC medium comprises one or more second polymerisable compounds comprising a polymerisable group and a bi- or polycyclic hydrocarbon group having from 4 to 30 ring atoms, preferably from 6 to 25 ring atoms, which is preferably a non-aromatic hydrocarbon group.

Preferably component A) of the LC medium according to this preferred embodiment comprises, in addition or alternatively to the compounds of formula II, one or more second polymerisable compounds selected of formula IIA P-Sp-G$^{2A}$     IIA wherein P and Sp have the meanings given in formula I or one of the preferred meanings given above and below for formula I, and G$^{2A}$ is a bi- or polycyclic hydrocarbon group, preferably a bridged or fused bi- or polycyclic alkyl group, having 4 to 30 ring atoms, preferably 6 to 25 ring atoms, which is optionally substituted by one or more groups L.

Preferably the bi- or polycyclic hydrocarbon group or group G$^{2A}$ is a bi-, tri- or tetracyclic group.

Preferably the bi- or polycyclic hydrocarbon group or group G$^{2A}$ is a bridged bi- or polycyclic hydrocarbon group, i.e. which consists of fused hydrocarbon rings, preferably fused cycloalkyl rings, where fusion occurs across a sequence of atoms (bridgehead), preferably a bipodal bridge, like in bicyclo[2.2.1]heptane (norbornane), bicyclo[2.2.2]octane or tricyclo[3.3.3.1]decane (adamantane).

In another preferred embodiment the present invention the bi- or polycyclic hydrocarbon group or group G$^{2A}$ is a fused bi- or polycyclic hydrocarbon group, i.e. which consists of fused hydrocarbon rings, preferably fused cycloalkyl rings, where fusion occurs across a bond between two atoms, like in bicyclo[3.2.0]heptane or bicyclo[4.4.0]decane (decalin).

In yet another preferred embodiment the present invention the bi- or polycyclic hydrocarbon group or group G$^{2A}$ is a spirocyclic group, i.e. which consists of fused hydrocarbon rings, preferably fused cycloalkyl rings, where fusion occurs at a single atom (spiro atom), like in spiro[3.3]heptane or spiro[4.5]decane.

The bi- or polycyclic group or group G$^{2A}$ is optionally substituted by one or more substituents, preferably selected from the group L as defined above and below.

Preferably the bi- or polycyclic group or group G$^{2A}$ is selected from the group consisting of bicyclo[1.1.1]pentyl, bicyclo[2.1.1]hexyl, bicyclo[2.2.1]heptyl (norbornyl), bicyclo[3.2.1]octyl, bicyclo[2.2.2]octyl, bicyclo[3.2.2]nonyl, bicyclo[3.3.1]nonyl, bicyclo[3.3.2]decyl, bicyclo[3.3.3]undecyl, tricyclo[3.3.3.1]decyl (adamantyl), tricyclo[5.2.1.0]decyl (tetrahydrodicyclopentadiyl), bicyclo[2.1.0]pentyl, bicyclo[2.2.0]hexyl, bicyclo[3.2.0]heptyl, bicyclo[4.2.0]octyl, bicyclo[3.3.0]octyl, bicyclo[4.3.0]nonyl, bicyclo[4.4.0]decyl (decalin), spiro[2.2]pentyl, spiro[3.2]hexyl, spiro[3.3]heptyl, spiro[4.3]octyl, spiro[4.4]nonyl, spiro[4.5]decyl, all of which are optionally substituted by one or more groups L as defined above and below.

Very preferably the bi- or polycyclic group or group G$^{2A}$ is selected from the group consisting of bicyclo[1.1.1]pentyl, bicyclo[2.1.1]hexyl, bicyclo[2.2.1]heptyl (norbornyl), bicyclo[3.2.1]octyl, bicyclo[2.2.2]octyl, bicyclo[3.2.2]nonyl, bicyclo[3.3.1]nonyl, bicyclo[3.3.2]decyl, bicyclo[3.3.3]undecyl, tricyclo[3.3.3.1]decyl (adamantyl), all of which are optionally substituted by one or more groups L as defined above and below.

Most preferably the bi- or polycyclic group or group G$^{2A}$ is selected from the group consisting of bicyclo[2.2.1]heptyl (norbornyl), bicyclo[2.2.2]octyl, tricyclo[3.3.3.1]decyl (adamantyl), all of which are optionally substituted by one or more groups L as defined above and below.

Preferred compounds of formula IIA are selected from the following formulae

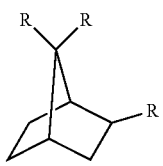

IIAA

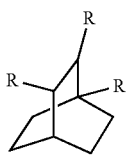

IIAB

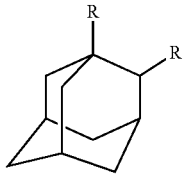

IIAC wherein R on each occurrence identically or differently denotes P-Sp- or has one of the meanings given for R$^x$ above, and at least one of the groups R in each of formulae IIAA-IIAC denotes P-Sp-.

Further preferred compounds of formula IIA are selected from the following formulae

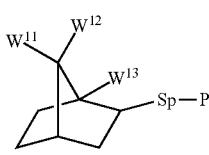

IIA1

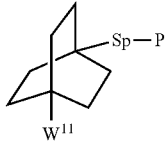

IIA2

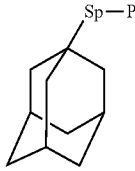

IIA3

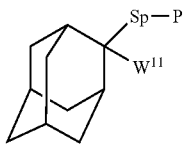

IIA4 wherein P and Sp have the meanings given in formula IIA or one of the preferred meanings given above, W$^{11}$, W$^{12}$ and W$^{13}$ are independently of each other H, F or C$_1$-C$_{12}$-alkyl, preferably methyl, and the cycloalkyl groups are optionally substituted with one or more groups L as defined above.

Very preferred compounds of formula IIA are selected from the following formulae

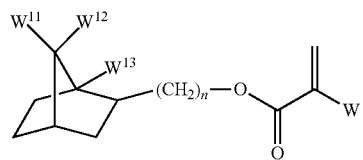
IIA1a

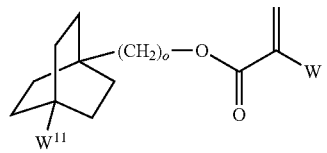
IIA2a

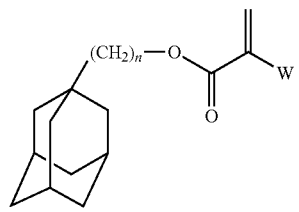
IIA3a

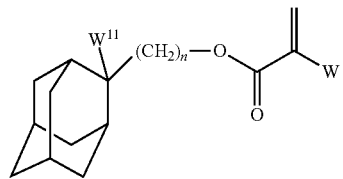
IIA4a wherein n is 0 or an integer from 1 to 8, W is H, $CH_3$ or $C_2H_5$ and $W^{11}$, $W^{12}$ and $W^{13}$ are H, F or $C_1$-$C_{12}$-alkyl, preferably methyl.

Further preferred compounds of formula IIA are selected from the following formulae

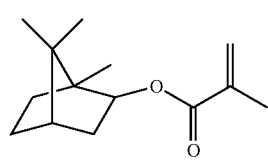
IIA1a1

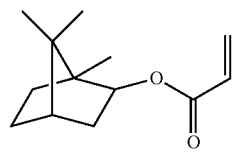
IIA1a2

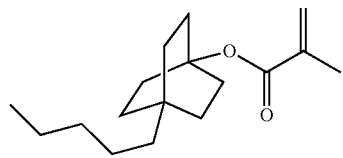
IIA2a1

IIA2a2

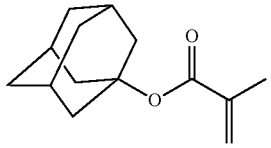
IIA3a1

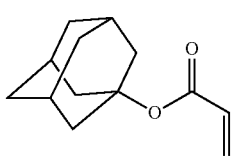
IIA3a2

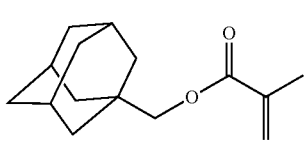
IIA3a3

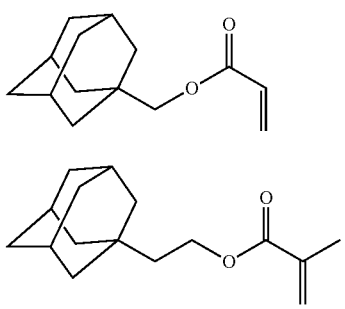
IIA3a4

IIA3a5

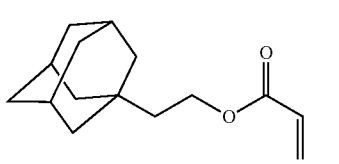
IIA3a6

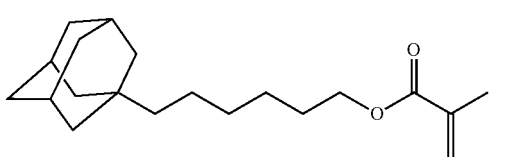
IIA3a7

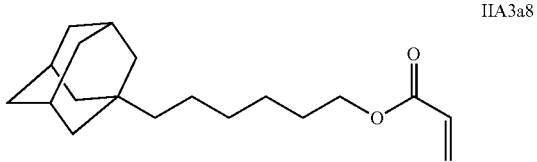
IIA3a8

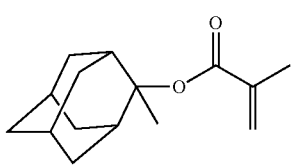
IIA4a1

-continued

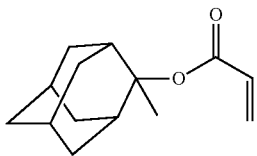
IIA4a2

Preferably component A) of the LC medium comprises one or more third polymerisable compounds selected of formula III $$P^1\text{-}Sp^1\text{-}G^3\text{-}Sp^2\text{-}P^2 \quad\quad\quad III$$

wherein
$P^1$ and $P^2$ independently of each other independently of each other, and on each occurrence identically or differently, denote a polymerisable group,
$Sp^1$, $Sp^2$ denote independently of each other identical or different spacer groups or a single bond,
$G^3$ is a straight-chain, branched or cyclic alkyl group with 1 to 20 C atoms that is optionally mono-, poly- or perfluorinated and is optionally substituted by one or more groups P-Sp- or L as defined in formula I, and wherein one or more $CH_2$-groups are optionally replaced by —O—, —CO—, —O—CO— or —CO—O— such that O-atoms are not directly adjacent to one another.
$P^1$ and $P^2$ are preferably selected from acrylate, methacrylate, ethacrylate, and vinyloxy groups.
Further preferably one of $P^1$ and $P^2$ in formula III is vinyloxy and the other is acrylate, methacrylate or ethacrylate, most preferably methacrylate.
$Sp^1$ and $Sp^2$ in formula III preferably denote a single bond.

If the hydrocarbon group or group $G^3$ in the third polymerisable compounds is a cyclic group, it is preferably a monocyclic cycloalkyl group, which preferably has from 5 to 7 ring atoms and is optionally substituted by one or more groups L as defined above and below.

In another preferred embodiment of the present invention the hydrocarbon group or group $G^3$ in the third polymerisable compounds is a bi-, tri- or tetracyclic group, and preferably has from 4 to 30 C atoms, which is optionally substituted by one or more groups L as defined above and below. Preferred bi-, tri- or tetracyclic groups or groups $G^3$ in the third polymerisable compound are those having one of the meanings of group $G^{24}$ in formula IIA or its preferred meanings given above.

Preferred compounds of formula III are selected from the following formulae $$P^1\text{-}Sp^1\text{-}(CHW^{11})_{n2}\text{—}(CH_2)_{n1}\text{—}(CHW^{12})_{n3}\text{-}Sp^2\text{-}P^2 \quad\quad III1$$

III2

$$P^1\text{—}(CH_2)_{n2}\text{—}(CF_2)_{n1}\text{—}(CH_2)_{n3}\text{—}P^2 \quad\quad III3$$

$$(P^1\text{-}Sp^1\text{-}(CH_2)_{n4})_{n5}CH_{4\text{-}n5} \quad\quad III4$$

wherein $P^1$, $P^2$, $Sp^1$, $Sp^2$ are as defined in formula III,
$W^{11}$ is, on each occurrence identically or differently, H, F or $C_1$-$C_{12}$-alkyl,
n1 is an integer from 2 to 15, n2, n3 are independently of each other 0 or an integer from 1 to 3,
n4 is 0 or an integer from 1 to 15,
n5 is 3 or 4,
and the cyclohexylene ring in formula III2 is optionally substituted by one or more identical or different groups $W^{11}$.

In a preferred embodiment of the present invention the component A) of the LC medium comprises one or more compounds of formula III or its subformulae wherein $P^1$ and $P^2$ are different polymerisable groups.

In another preferred embodiment of the present invention the component A) of the LC medium comprises one or more compounds of formula III or its subformulae wherein $P^1$ and $P^2$ are identical polymerisable groups.

In the third polymerisable compounds, the polymerisable groups are preferably selected from acrylate, methacrylate, ethacrylate and vinyloxy groups. Very preferably one of the polymerisable groups is vinyloxy and the other is acrylate or methacrylate, most preferably methacrylate.

Very preferred compounds of formula III are selected from the following formulae

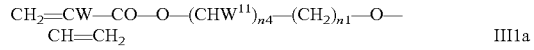
IIIa

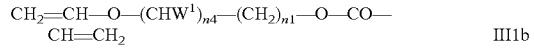
IIIb

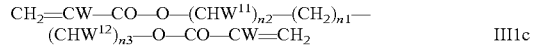
IIIc

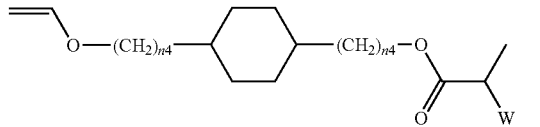
III2a

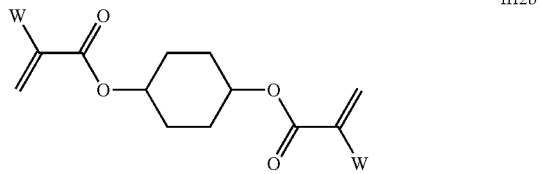
III2b

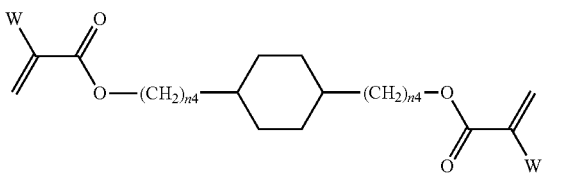
III2c

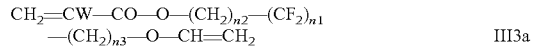
III3a

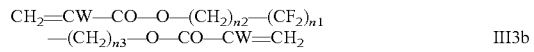
III3b

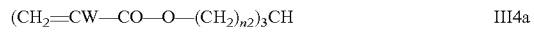
III4a

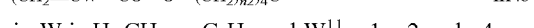
III4b wherein W is H, $CH_3$ or $C_2H_5$ and $W^{11}$, n1, n2 and n4 are as defined in formula III1-III4, and the cyclohexylene ring in formula III2a-c is optionally substituted by one or more identical or different groups $W^{11}$.

Further preferred compounds of formula III are selected from the following formulae
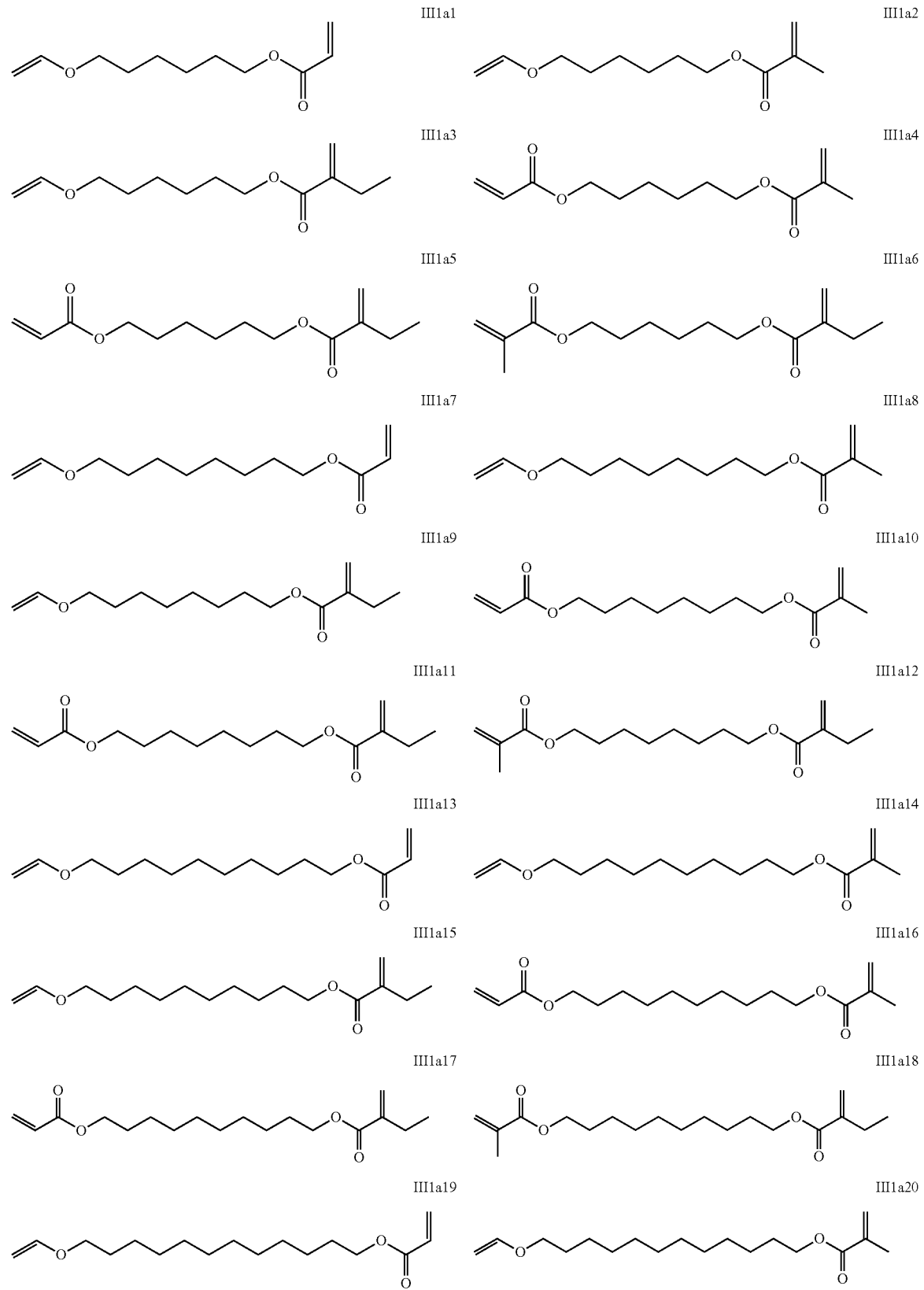

-continued
III1a21
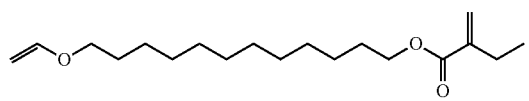
III1a22
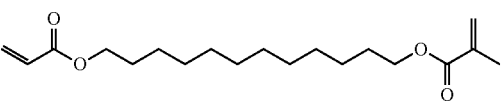
III1a23
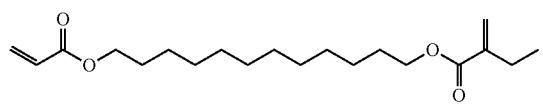
III1a24
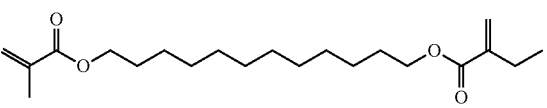
III2a1
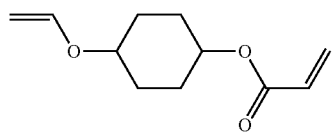
III2a2
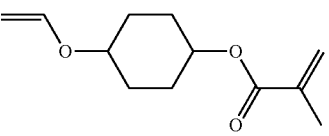
III2a3
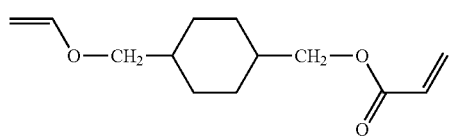
III2a4
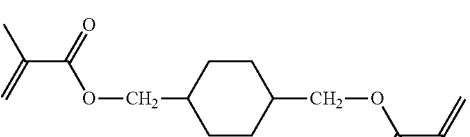
III3a1
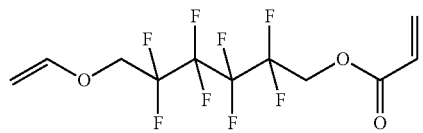
III3a2
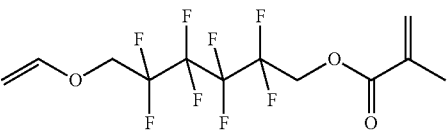
Further preferred compounds of formula III are selected from the following formulae
III1b1
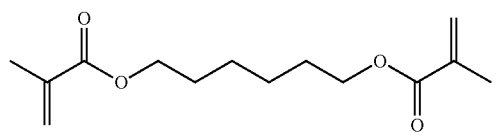
III1b2
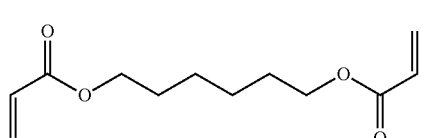
III1b3
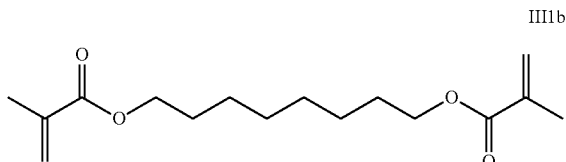
III1b4
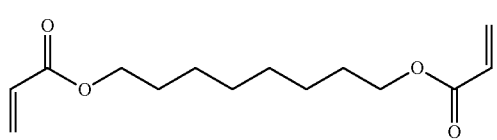
-continued
III1b5
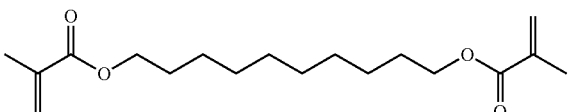
III1b6
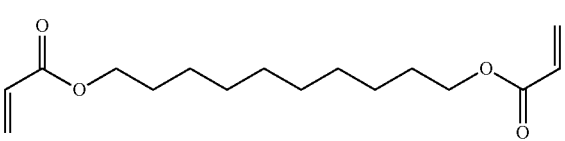
III2b1
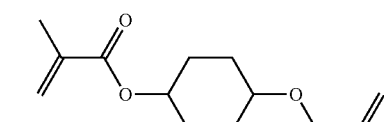
III2b2
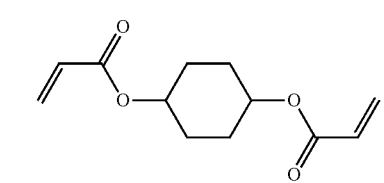

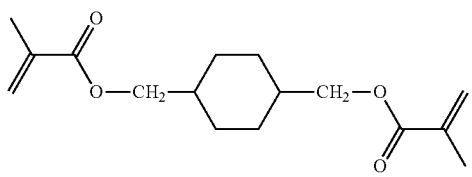

III2c1

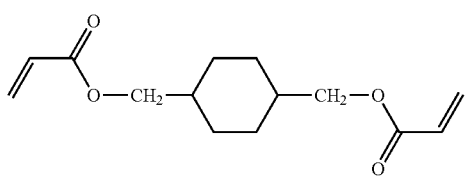

III2c2

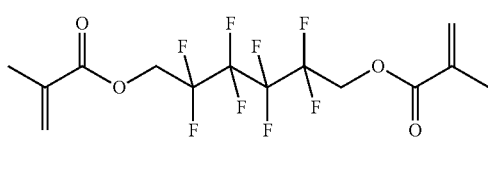

III3b1

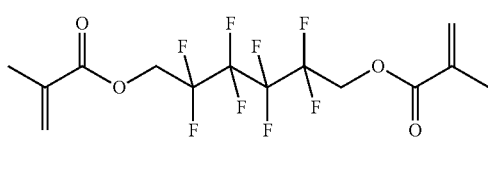

III3b2

Further preferred compounds of formula III are selected from the following formulae

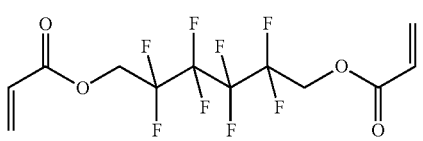

III4a1

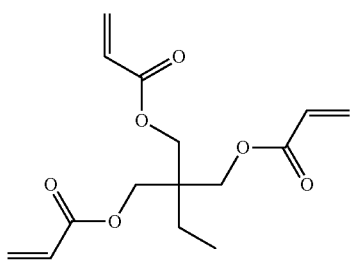

III4a2

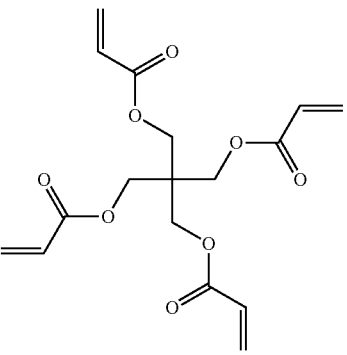

III4b1

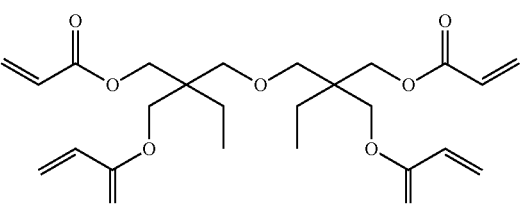

III5a1

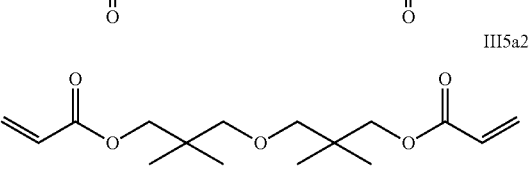

III5a2

In another preferred embodiment of the present invention component A) of the LC medium additionally comprises, in addition or alternatively to the third polymerisable compounds, one or more fourth polymerisable compounds comprising a ring system containing one or more aromatic or heteroaromatic rings or condensed aromatic or heteroaromatic rings, and attached thereto two polymerisable groups that are preferably different from each other.

These compounds are preferably selected from formula IV $$P^1\text{—}Sp^1\text{—}B^1\text{—}(Z^b\text{—}B^2)_m\text{-}Sp^2\text{-}P^2 \qquad \text{IV}$$

in which $P^1$, $P^2$, $Sp^1$, $Sp^2$ are as defined in formula III, $B^1$ and $B^2$ are independently of each other, and on each occurrence identically or differently, an aromatic, heteroaromatic, alicyclic or heterocyclic group, preferably having 4 to 25 ring atoms, which may also contain fused rings, and which is unsubstituted, or mono- or polysubstituted by L as defined in formula I, wherein at least one of $B^1$ and $B^2$ denotes an aromatic or heteroaromatic group, $Z^b$ is, on each occurrence identically or differently, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n11}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^0$R$^{00}$ or a single bond, $R^0$ and $R^{00}$ each, independently of one another, denote H or alkyl having 1 to 12 C atoms, m denotes 0, 1, 2, 3 or 4, n11 denotes 1, 2, 3 or 4, Particularly preferred compounds of formula IV are those in which $B^1$ and $B^2$ each, independently of one another, denote 1,4-phenylene, 1,3-phenylene, naphthalene-1,4-diyl, naphthalene-2,6-diyl, phenanthrene-2,7-diyl, 9,10-dihydrophenanthrene-2,7-diyl, anthracene-2,7-diyl, fluorene-2,7- diyl, coumarine, flavone, where, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L as defined above.

Very particularly preferred compounds of formula IV are those in which B$^1$ and B$^2$ each, independently of one another, denote 1,4-phenylene, 1,3-phenylene, naphthalene-1,4-diyl or naphthalene-2,6-diyl.

Further preferred compounds of formula IV are selected from the group consisting of the following formulae:

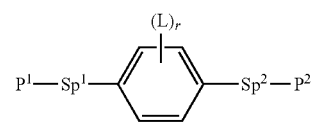
IV1

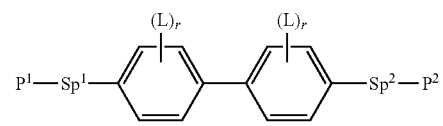
IV2

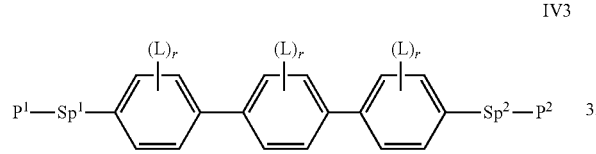
IV3

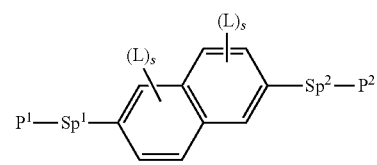
IV4

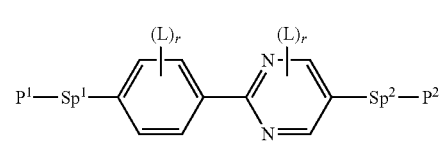
IV5

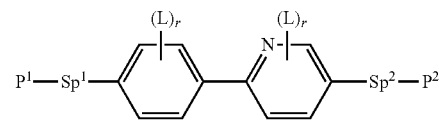
IV6

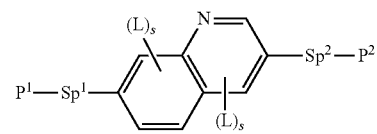
IV7

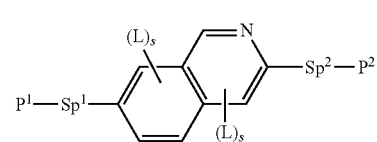
IV8

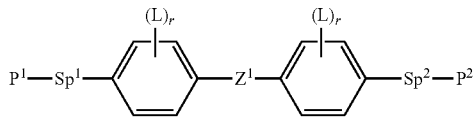
IV9

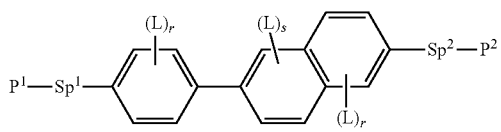
IV10

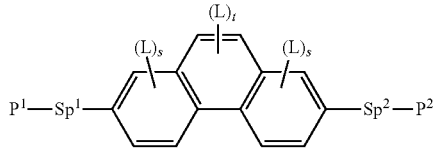
IV11

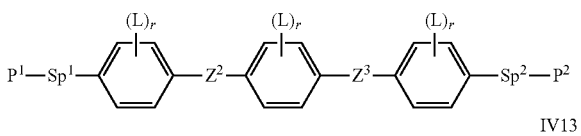
IV12

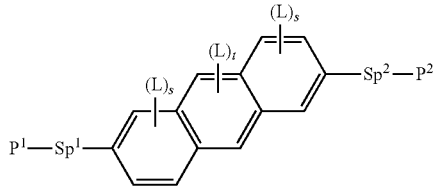
IV13 in which P$^1$, P$^2$, Sp$^1$, Sp$^2$ and L are as defined in formula IV,
Z$^1$ is —O—, —CO—, —C(R$^y$R$^z$)— or —CF$_2$CF$_2$—,
Z$^2$, Z$^3$ are independently of each other —CO—O—, —O—CO—, —CH$_2$O—, —OCH$_2$—, —CF$_2$O—, —OCF$_2$— or —(CH$_2$)$_{n11}$—, where n11 is 2, 3 or 4,
r is 0, 1, 2, 3 or 4,
s is 0, 1, 2 or 3,
t is 0, 1 or 2.

Especially preferred are direactive compounds of formula IV2 and IV3.

In the compounds of formulae IV1 to IV13 the group

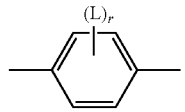

is preferably

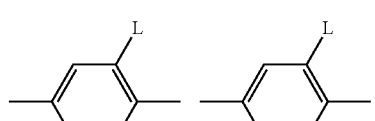

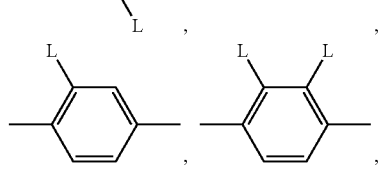

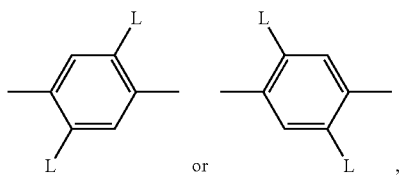

or wherein L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$, more preferably F, Cl, $CH_3$, $OCH_3$, $COCH_3$, $CF_3$ over $OCF_3$, especially F or $CH_3$.

Preferred compounds of formulae IV1 to IV13 are those wherein one of $P^1$ and $P^2$ denotes a vinyloxy group and the other denotes an acrylate, methacrylate or ethacrylate group, very preferably a methacrylate group.

Further preferred compounds of formulae IV1 to IV13 are those wherein $Sp^1$ and $Sp^2$ are a single bond.

Further preferred compounds of formulae IV1 to IV13 are those wherein one of $Sp^1$ and $Sp^2$ is a single bond and the other is different from a single bond.

Further preferred compounds of formulae IV1 to IV13 are those wherein the group $Sp^1$ and $Sp^3$ that is different from a single bond is —$(CH_2)_{s1}$—X"—, wherein s1 is an integer from 1 to 6, preferably 2, 3, 4 or 5, and X" is X" is the linkage to the benzene ring and is —O—, —O—CO—, —CO—O, —O—CO—O— or a single bond.

Very preferred compounds of formula IV are selected from the group consisting of the following formulae:

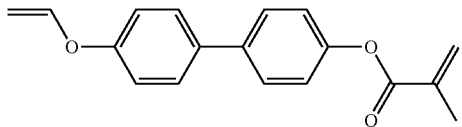
IV2a

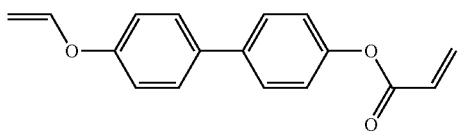
IV2b

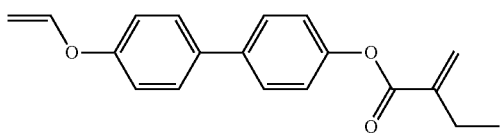
IV2c

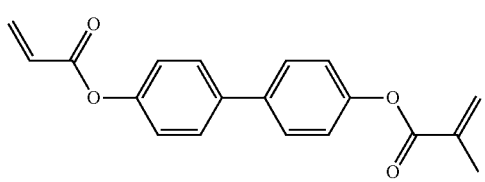
IV2d

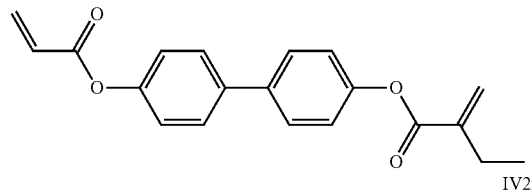
IV2e

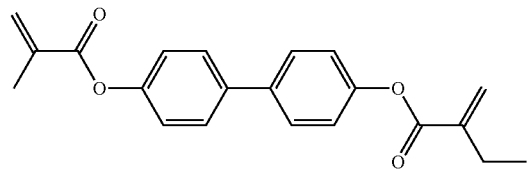
IV2f

The concentration of the first polymerisable compounds, especially those of formula I, in the LC medium is preferably from 0.5 to 20%, very preferably from 1 to 18%, most preferably from 2 to 15%.

The concentration of the second polymerisable compounds, especially those of formula II, in the LC medium is preferably from 0.5 to 15%, very preferably from 1 to 12%, most preferably from 2 to 10%.

The concentration of the third polymerisable compounds, especially those of formula III, in the LC medium is preferably from 0.05 to 5%, very preferably from 0.1 to 3%, most preferably from 0.2 to 2%.

The concentration of the fourth polymerisable compounds, especially those of formula IV, in the LC medium is preferably from 0.05 to 5%, very preferably from 0.1 to 3%, most preferably from 0.2 to 2%.

The total concentration of the first, second, third and fourth polymerisable compounds, especially those of formula I, II, III and IV, in the LC medium is preferably from 1 to 30% by weight, very preferably from 1 to 25% by weight.

In a first preferred embodiment of the present invention, the total concentration of the first, second, third and fourth polymerisable compounds, especially those of formula I, II, III and IV, in the LC medium is from 10 to 20% by weight.

In a second preferred embodiment of the present invention, the total concentration of the first, second, third and fourth polymerisable compounds, especially those of formula I, II, III and IV, in the LC medium is from 5 to 10% by weight.

In a third preferred embodiment of the present invention, the total concentration of the first, second, third and fourth polymerisable compounds, especially those of formula I, II, III and IV, in the LC medium is from 1 to 5% by weight.

The ratio of first polymerisable compounds or compounds of formula I, and second polymerisable compounds or compounds of formula II, in the LC medium is preferably from 50:1 to 1:50, very preferably from 10:1 to 1:10, most preferably from 4:1 to 1:4.

The total concentration of first and second polymerisable compounds with (exactly) one polymerisable group, or compounds of formula I and II, in the LC medium is preferably from 5 to 30% by weight.

The total concentration of third and fifth polymerisable compounds with (exactly) two polymerisable groups, or compounds of formula III and IV, in the LC medium is preferably from 0.1 to 10%, very preferably from 0.1 to 5%, most preferably from 0.1 to 2% by weight.

Particular preference is given to LC media wherein the polymerisable component A) comprises one, two or three first polymerisable compounds, preferably of formula I, one, two or three second polymerisable compounds, preferably of formula II, one, two or three third polymerisable compounds, preferably of formula III, and optionally one, two or three fourth polymerisable compounds, preferably of formula IV.

Besides the polymerisable component A) as described above, the LC medium according to the present invention comprises an LC component B), or LC host mixture, comprising one or more, preferably two or more LC compounds which are selected from low-molecular-weight compounds that are unpolymerisable. These LC compounds are selected such that they stable and/or unreactive to a polymerisation reaction under the conditions applied to the polymerisation of the polymerisable compounds.

Preference is given to LC media in which the LC component B), or the LC host mixture, has a nematic LC phase, and preferably has no chiral liquid crystal phase. The LC component B), or LC host mixture, is preferably a nematic LC mixture.

Preference is furthermore given to achiral polymerisable compounds, and to LC media in which the compounds of component A) and/or B) are selected exclusively from the group consisting of achiral compounds.

Preferably the proportion of the LC component B) in the LC medium is from 70 to 95% by weight.

The LC media and LC host mixtures of the present invention preferably have a nematic phase range ≥80 K, very preferably ≥100 K, and preferably a rotational viscosity ≤250 mPa·s, very preferably ≤200 mPa·s, at 20° C.

The birefringence Δn of LC media and LC host mixtures according to the invention is preferably from 0.07 to 0.15, particularly preferably from 0.08 to 0.15.

In a first preferred embodiment of the present invention, the LC medium contains an component B) or LC host mixture having a positive dielectric anisotropy Δε.

Such LC media are especially suitable for use in TN, OCB-, Posi-VA-, IPS- or FFS-displays or related modes using LC-materials with Δε>0.

The LC media and LC host mixtures according to this first preferred embodiment preferably have a positive dielectric anisotropy Δε from +2 to +30, particularly preferably from +3 to +20, at 20° C. and 1 kHz.

Particularly preferred is an LC medium of this first preferred embodiment, wherein the liquid-crystalline component B) or LC host mixture comprises one or more compounds selected from formula A and B

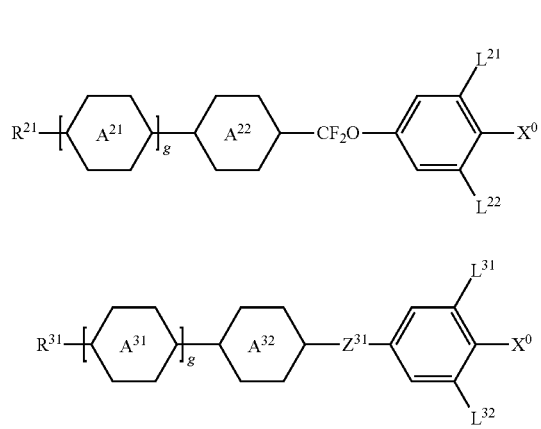

in which the individual radicals have, independently of each other and on each occurrence identically or differently, the following meanings:

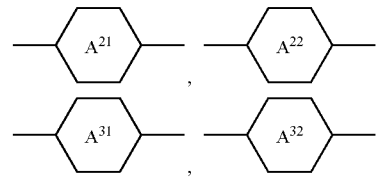

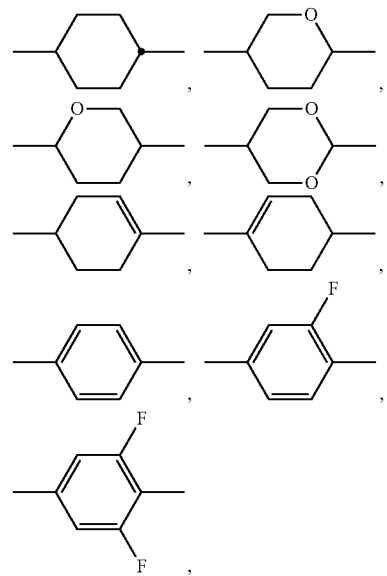

each, independently of one another, and on each occurrence, identically or differently $R^{21}$, $R^{31}$ each, independently of one another, alkyl, alkoxy, oxaalkyl or alkoxyalkyl having 1 to 9 C atoms or alkenyl or alkenyloxy having 2 to 9 C atoms, all of which are optionally fluorinated, $X^0$ F, Cl, halogenated alkyl or alkoxy having 1 to 6 C atoms or halogenated alkenyl or alkenyloxy having 2 to 6 C atoms, $Z^{31}$ —$CH_2CH_2$—, —$CF_2CF_2$—, —COO—, trans-CH=CH—, trans-CF=CF—, —$CH_2O$— or a single bond, preferably —$CH_2CH_2$—, —COO—, trans-CH=CH— or a single bond, particularly preferably —COO—, trans-CH=CH— or a single bond, $L^{21}$, $L^{22}$, $L^{31}$, $L^{32}$ each, independently of one another, H or F, g 0, 1, 2 or 3.

In the compounds of formula A and B, $X^0$ is preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or CH=$CF_2$, very preferably F or $OCF_3$, most preferably F.

In the compounds of formula A and B, $R^{21}$ and $R^{31}$ are preferably selected from straight-chain alkyl or alkoxy with 1, 2, 3, 4, 5 or 6 C atoms, and straight-chain alkenyl with 2, 3, 4, 5, 6 or 7 C atoms.

In the compounds of formula A and B, g is preferably 1 or 2.

In the compounds of formula B, $Z^{31}$ is preferably COO, trans-CH=CH or a single bond, very preferably COO or a single bond.

Preferably component B) of the LC medium comprises one or more compounds of formula A selected from the group consisting of the following formulae:

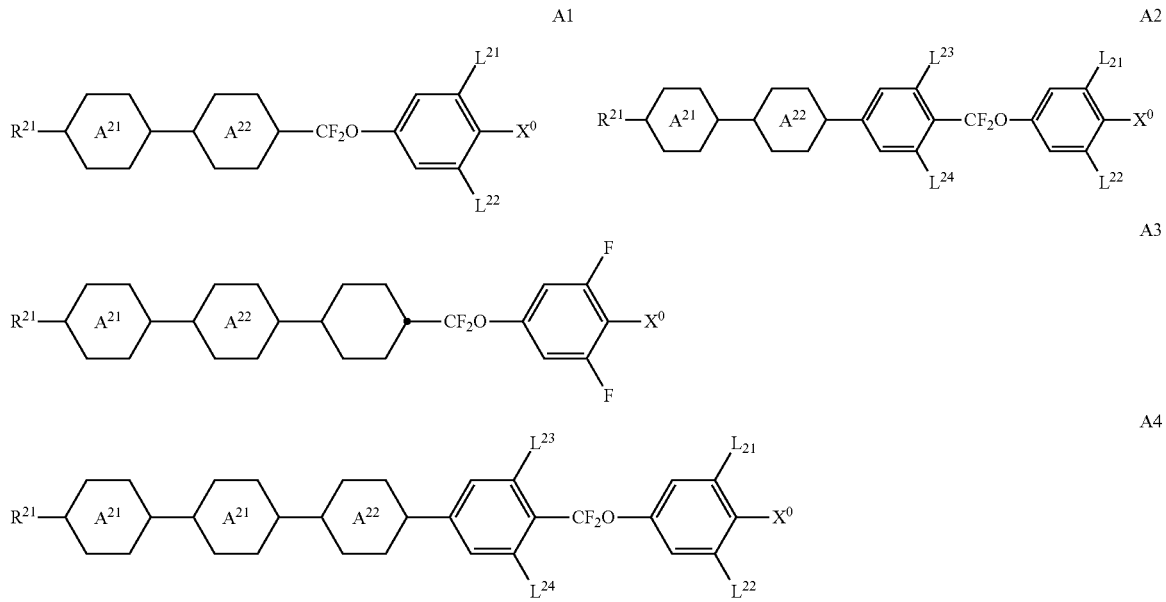

in which $A^{21}$, $R^{21}$, $X^0$, $L^{21}$ and $L^{22}$ have the meanings given in formula A, $L^{23}$ and $L^{24}$ each, independently of one another, are H or F, and $X^0$ is preferably F. Particularly preferred are compounds of formulae A1 and A2.

Particularly preferred compounds of formula A1 are selected from the group consisting of the following subformulae:

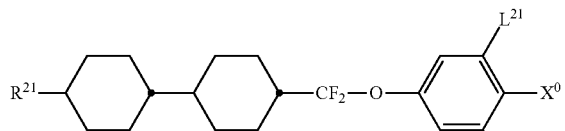

A1a

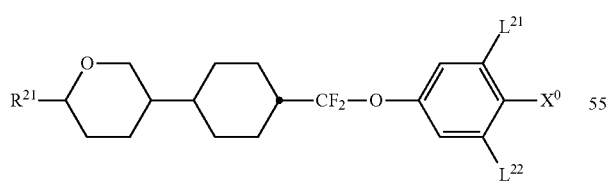

A1b

A1c

-continued

A1d

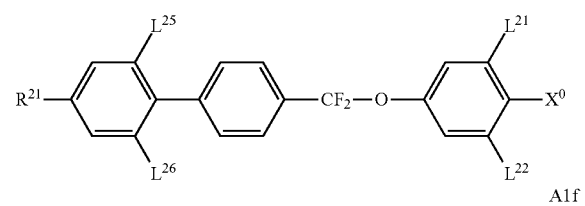

A1e

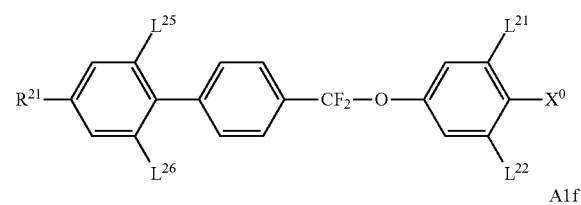

A1f

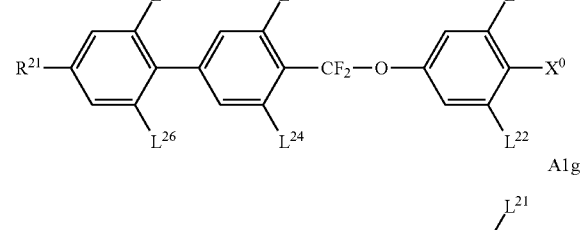

A1g

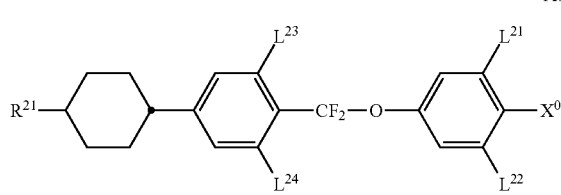

in which $R^{21}$, $X^0$, $L^{21}$ and $L^{22}$ have the meaning given in formula A1, $L^{23}$, $L^{24}$, $L^{25}$ and $L^{26}$ are each, independently of one another, H or F, and $X^0$ is preferably F.

Very particularly preferred compounds of formula A1 are selected from the group consisting of the following subformulae:
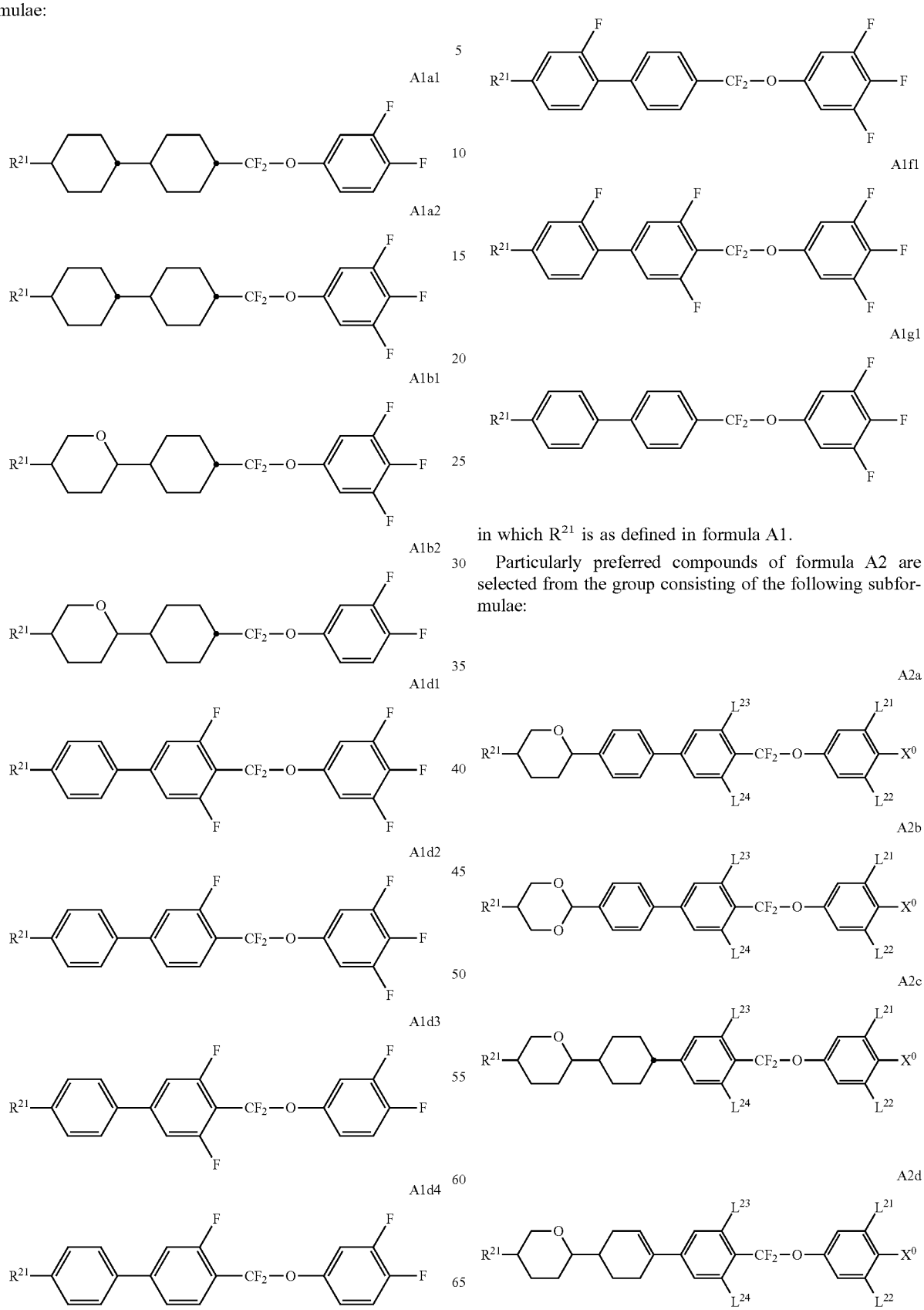
in which $R^{21}$ is as defined in formula A1.
Particularly preferred compounds of formula A2 are selected from the group consisting of the following subformulae:

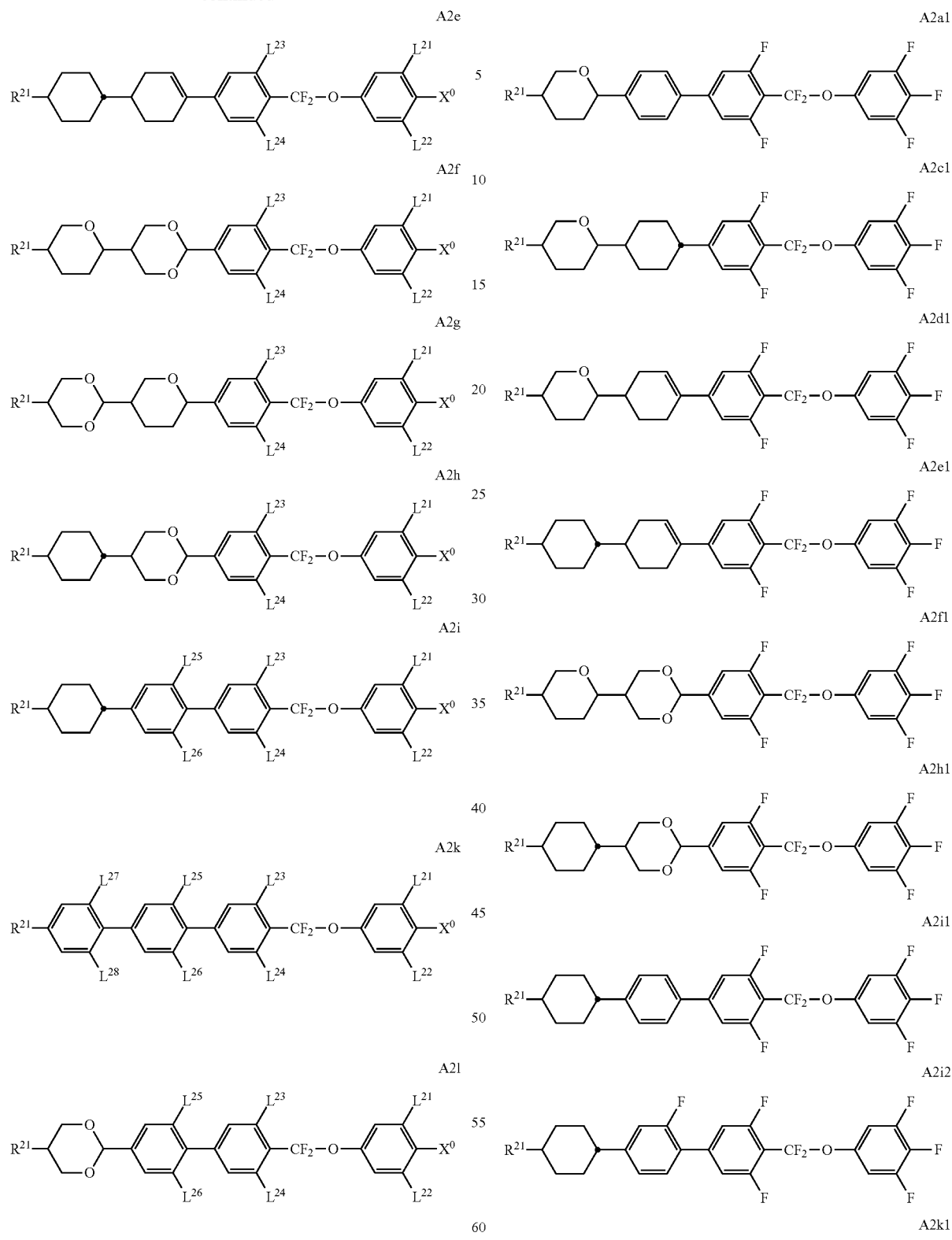
in which $R^{21}$, $X^0$, $L^{21}$ and $L^{22}$ have the meaning given in formula A2, $L^{23}$, $L^{24}$, $L^{25}$ and $L^{26}$ each, independently of one another, are H or F, and $X^0$ is preferably F.
Very particularly preferred compounds of formula A2 are selected from the group consisting of the following subformulae:

A2k2

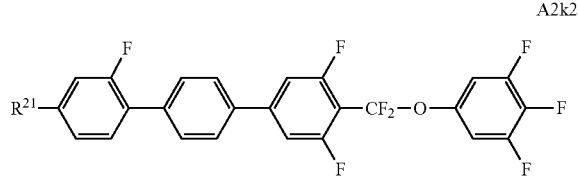

in which $R^{21}$, $X^0$, $L^{21}$ and $L^{22}$ have the meaning given in formula A3, and $X^0$ is preferably F.

Particularly preferred compounds of formula A4 are selected from the group consisting of the following subformulae:

A4a

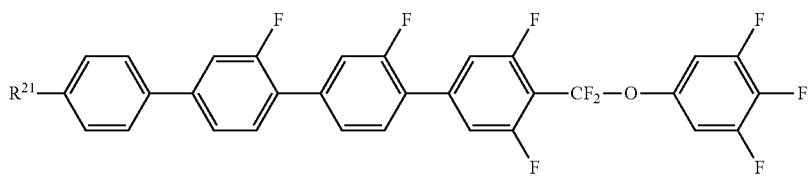

in which $R^{21}$ is as defined in formula A4.

Preferably component B) of the LC medium comprises one or more compounds of formula B selected from the group consisting of the following formulae:

-continued

A2l1

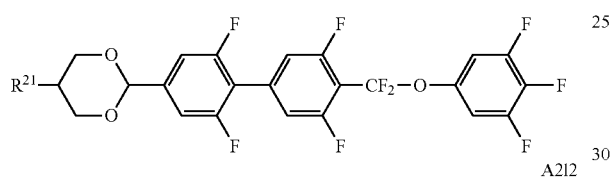

A2l2

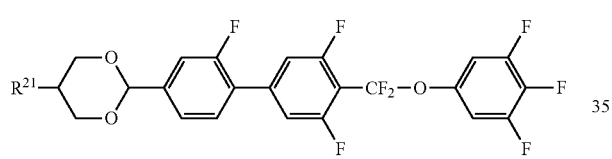

in which $R^{21}$ and $X^0$ are as defined in formula A2.

Particularly preferred compounds of formula A3 are selected from the group consisting of the following subformulae:

A3a

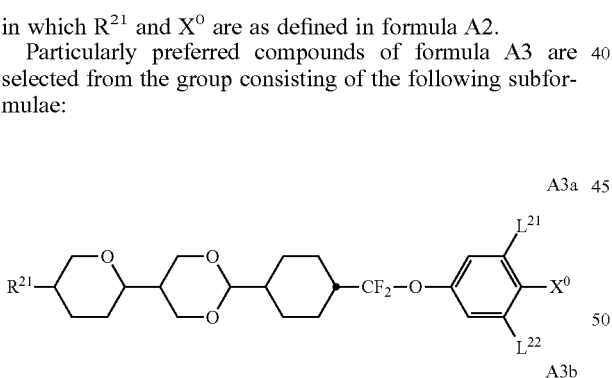

A3b

A3c

B1

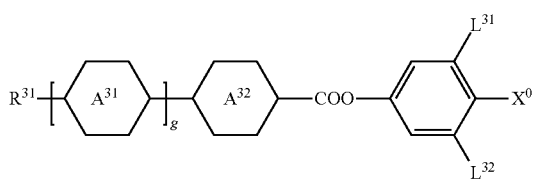

B2

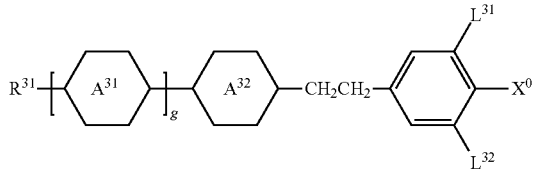

B3

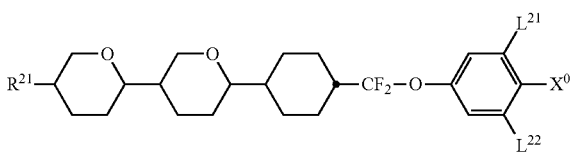

in which g, $A^{31}$, $A^{32}$, $R^{31}$, $X^0$, $L^{31}$ and $L^{32}$ have the meanings given in formula B, and $X^0$ is preferably F. Particularly preferred are compounds of formulae B1 and B2.

Particularly preferred compounds of formula B1 are selected from the group consisting of the following subformulae:

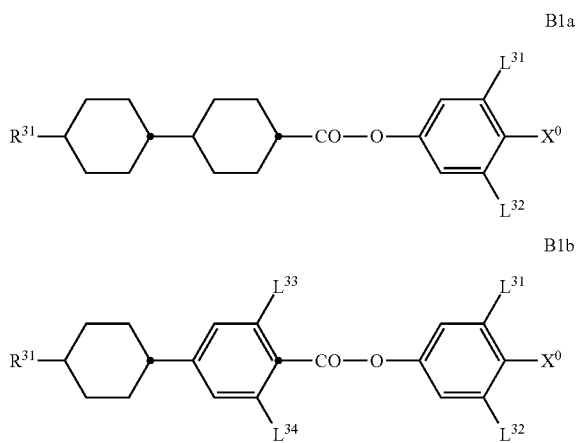

B1a

B1b in which $R^{31}$, $X^0$, $L^{31}$ and $L^{32}$ have the meaning given in formula B1, and $X^0$ is preferably F.

Very particularly preferred compounds of formula B1a are selected from the group consisting of the following subformulae:

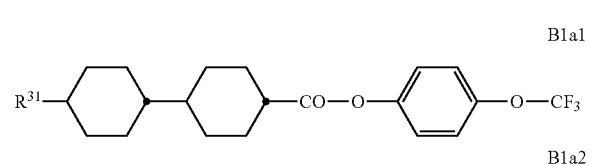

B1a1

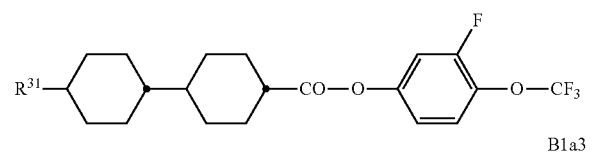

B1a2

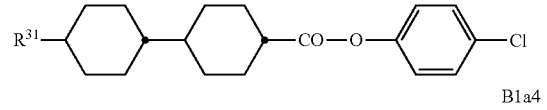

B1a3

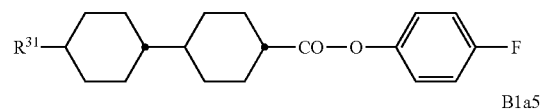

B1a4

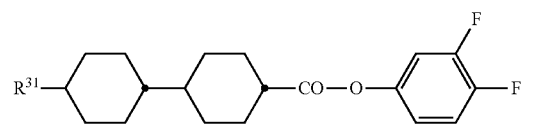

B1a5

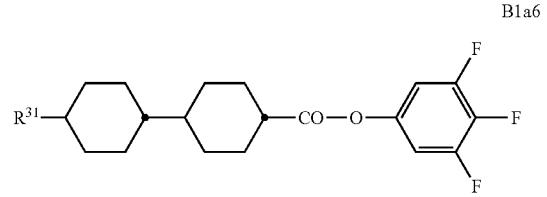

B1a6 in which $R^{31}$ is as defined in formula B1.

Very particularly preferred compounds of formula B1b are selected from the group consisting of the following subformulae:

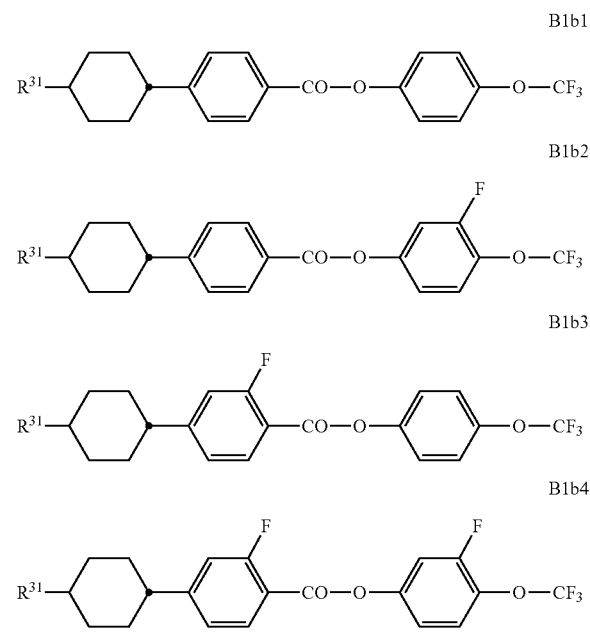

B1b1

B1b2

B1b3

B1b4 in which $R^{31}$ is as defined in formula B1.

Particularly preferred compounds of formula B2 are selected from the group consisting of the following subformulae:

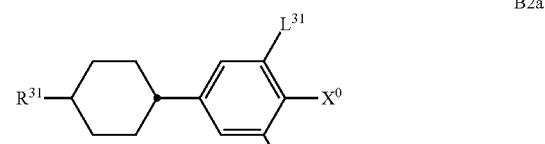

B2a

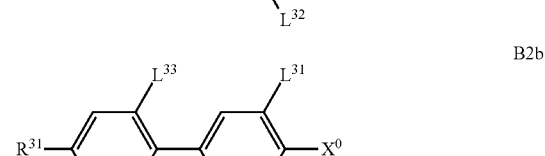

B2b

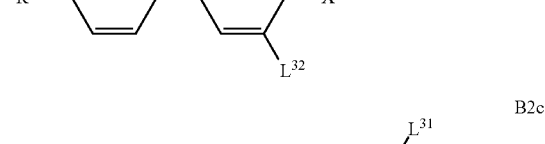

B2c

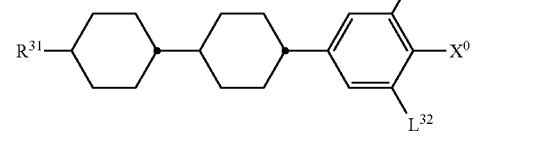

B2d

-continued

B2e: [structure with dioxane-cyclohexane-phenyl, R³¹, L³¹, L³², X⁰]

B2f: [structure with cyclohexane-biphenyl, R³¹, L³¹, L³², L³³, L³⁴, X⁰]

B2g: [structure with cyclohexane-terphenyl, R³¹, L³¹–L³⁶, X⁰]

B2h: [structure with bicyclohexane-biphenyl, R³¹, L³¹–L³⁴, X⁰]

B2i: [structure with cyclohexane-terphenyl, R³¹, L³¹–L³⁶, X⁰]

B2k: [structure with tetraphenyl, R³¹, L³¹–L³⁶, X⁰]

B2l: [structure with dioxane-terphenyl, R³¹, L³¹–L³⁶, X⁰]

in which $R^{31}$, $X^0$, $L^{31}$ and $L^{32}$ have the meaning given in formula B2, $L^{33}$, $L^{34}$, $L^{35}$ and $L^{36}$ are each, independently of one another, H or F, and $X^0$ is preferably F.

Very particularly preferred compounds of formula B2 are selected from the group consisting of the following subformulae:

B2a1: R³¹—cyclohexyl—phenyl—F

B2a2: R³¹—cyclohexyl—phenyl(3,4-diF)

B2a3: R³¹—cyclohexyl—phenyl(3,4,5-triF)

B2a4: R³¹—cyclohexyl—phenyl—Cl

B2a5: R³¹—cyclohexyl—phenyl(3-F, 4-Cl)

in which $R^{31}$ is as defined in formula B2.

Very particularly preferred compounds of formula B2b are selected from the group consisting of the following subformulae B2b1: R³¹—phenyl—phenyl—F B2b2: R³¹—phenyl—phenyl(2'-F)—F B2b3: R³¹—phenyl—phenyl—Cl B2b4: R³¹—phenyl—phenyl(2'-F)—Cl in which $R^{31}$ is as defined in formula B2.

Very particularly preferred compounds of formula B2c are selected from the group consisting of the following subformulae:

B2c1: R³¹—cyclohexyl—cyclohexyl—phenyl—O—CF₃

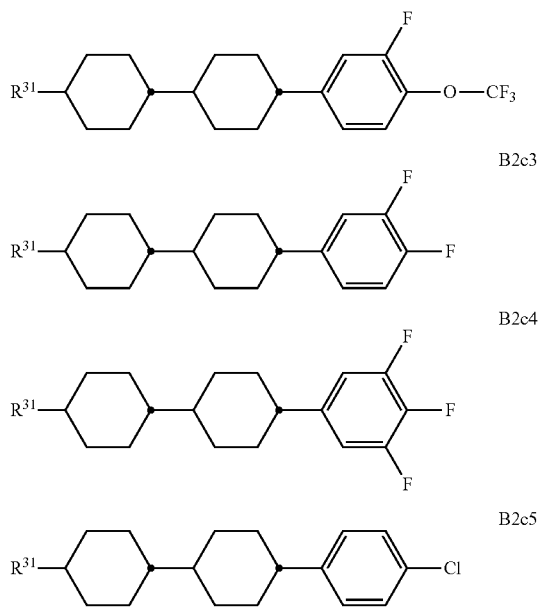

B2c2
B2c3
B2c4
B2c5 in which $R^{31}$ is as defined in formula B2.

Very particularly preferred compounds of formula B2d and B2e are selected from the group consisting of the following subformulae:

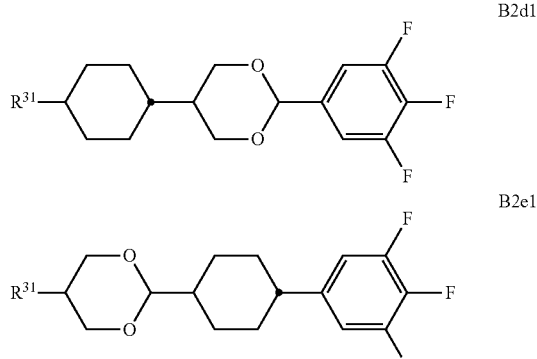

B2d1
B2e1 in which $R^{31}$ is as defined in formula B2.

Very particularly preferred compounds of formula B2f are selected from the group consisting of the following subformulae:

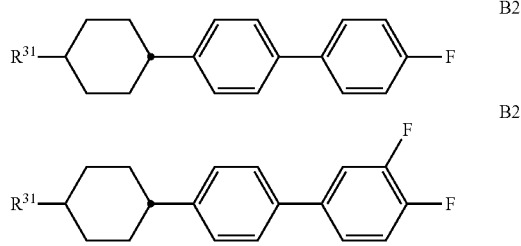

B2f1
B2f2

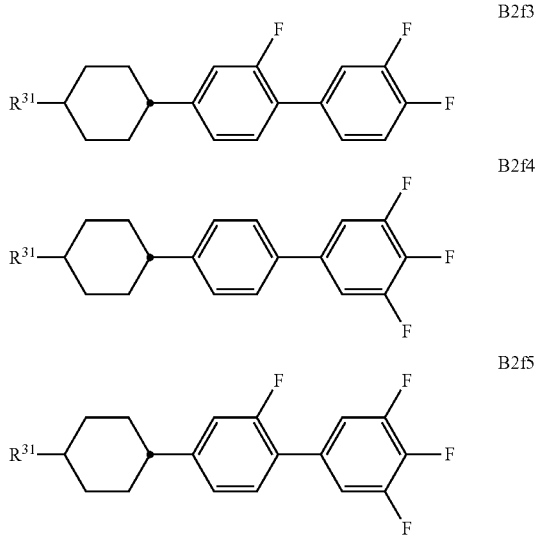

B2f3
B2f4
B2f5 in which $R^{31}$ is as defined in formula B2.

Very particularly preferred compounds of formula B2g are selected from the group consisting of the following subformulae:

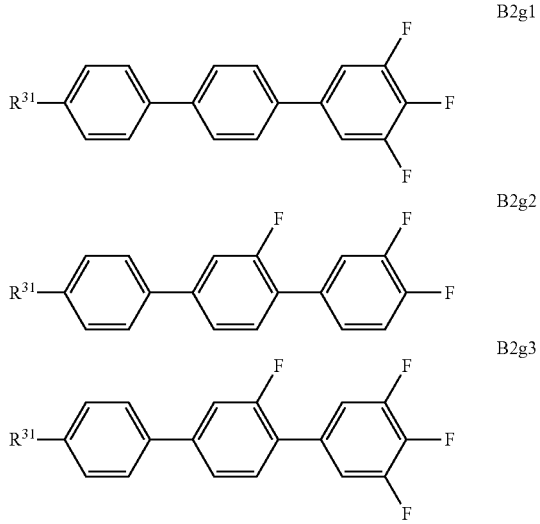

B2g1
B2g2
B2g3

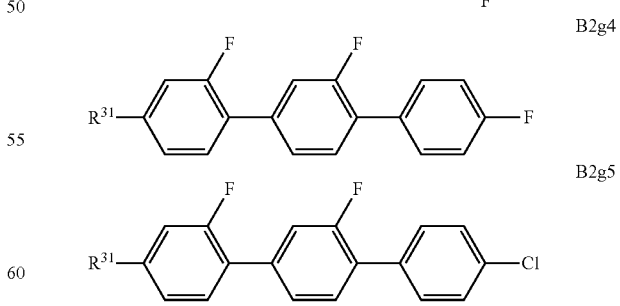

B2g4
B2g5 in which $R^{31}$ is as defined in formula B2.

Very particularly preferred compounds of formula B2h are selected from the group consisting of the following subformulae:

B2h1
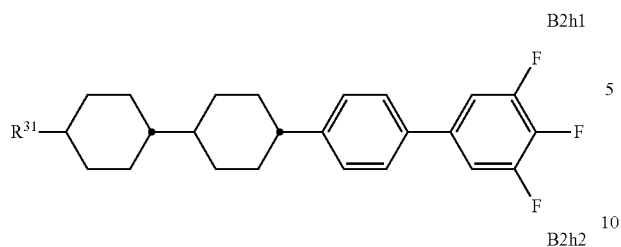

B2h2
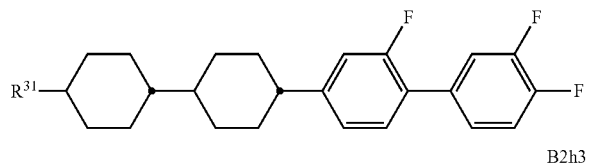

B2h3
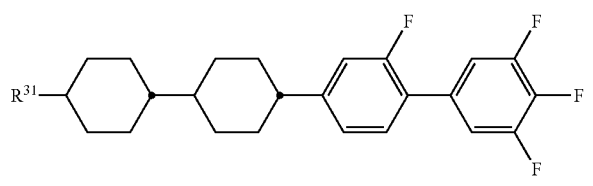

in which $R^{31}$ is as defined in formula B2.

Very particularly preferred compounds of formula B2i are selected from the group consisting of the following subformulae:

B2i1
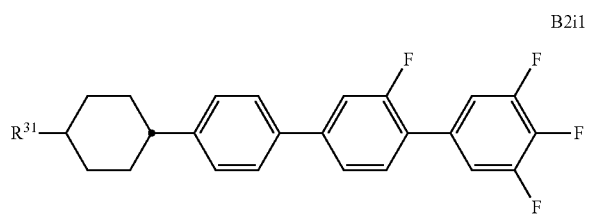

B2i2
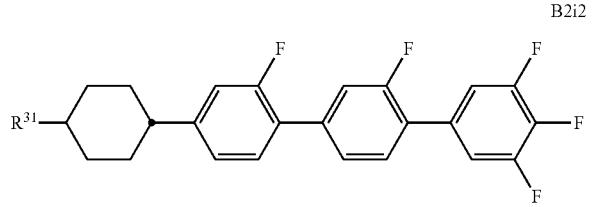

in which $R^{31}$ is as defined in formula B2.

Very particularly preferred compounds of formula B2k are selected from the group consisting of the following subformulae:

B2k1
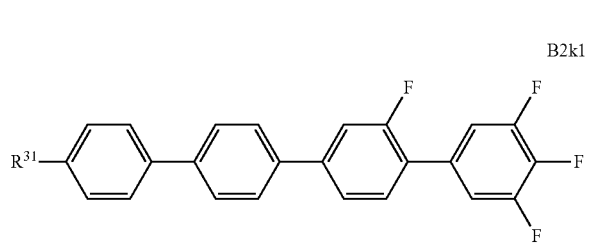

B2k2
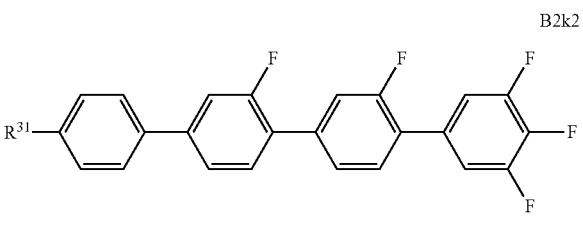

in which $R^{31}$ is as defined in formula B2.

Very particularly preferred compounds of formula B2l are selected from the group consisting of the following subformulae:

B2l1
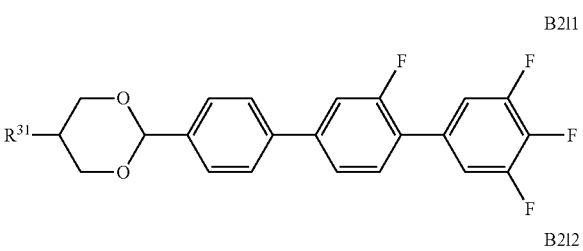

B2l2
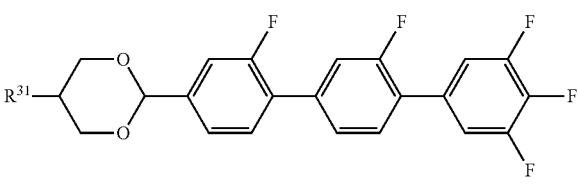

in which $R^{31}$ is as defined in formula B2.

Alternatively to, or in addition to, the compounds of formula B1 and/or B2 component B) of the LC medium may also comprise one or more compounds of formula B3 as defined above.

Particularly preferred compounds of formula B3 are selected from the group consisting of the following subformulae:

B3a
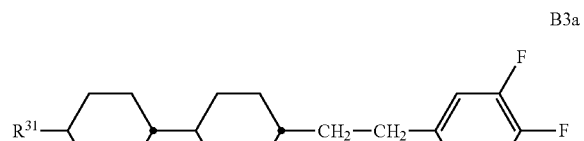

B3b
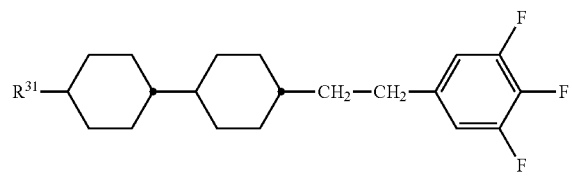

in which $R^{31}$ is as defined in formula B3.

Preferably component B) of the LC medium comprises, in addition to the compounds of formula A and/or B, one or more compounds of formula C

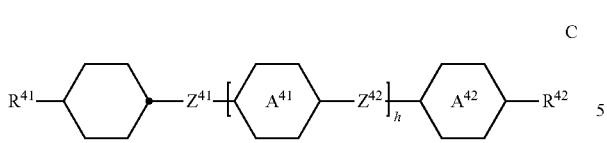

C in which the individual radicals have the following meanings:

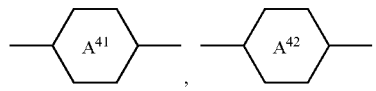

each, independently of one another, and on each occurrence, identically or differently

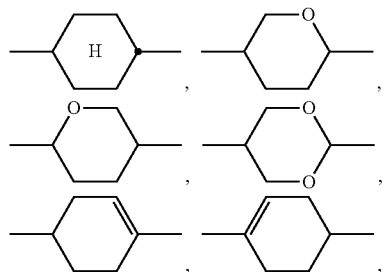

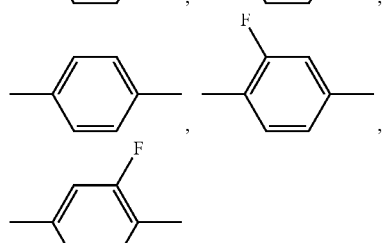

$R^{41}$, $R^{42}$ each, independently of one another, alkyl, alkoxy, oxaalkyl or alkoxyalkyl having 1 to 9 C atoms or alkenyl or alkenyloxy having 2 to 9 C atoms, all of which are optionally fluorinated, $Z^{41}$, $Z^{42}$ each, independently of one another, —CH$_2$CH$_2$—, —COO—, trans-CH=CH—, trans-CF=CF—, —CH$_2$O—, —CF$_2$O—, —C≡C— or a single bond, preferably a single bond, h 0, 1, 2 or 3.

In the compounds of formula C, $R^{41}$ and $R^{42}$ are preferably selected from straight-chain alkyl or alkoxy with 1, 2, 3, 4, 5 or 6 C atoms, and straight-chain alkenyl with 2, 3, 4, 5, 6 or 7 C atoms.

In the compounds of formula C, h is preferably 0, 1 or 2.

In the compounds of formula C, $Z^{41}$ and $Z^{42}$ are preferably selected from COO, trans-CH=CH and a single bond, very preferably from COO and a single bond.

Preferred compounds of formula C are selected from the group consisting of the following subformulae:

C1

C2

C3

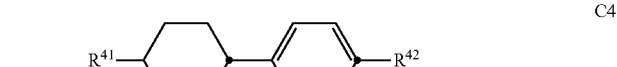

C4

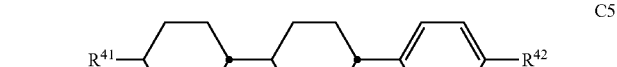

C5

C6

C7

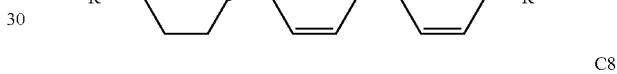

C8

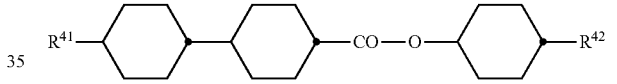

C9

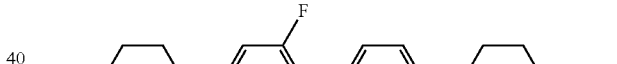

C10

C11

C12

C13

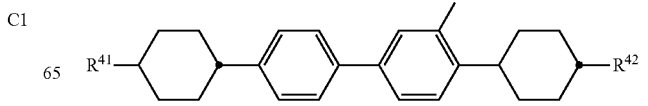

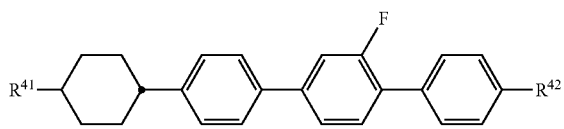
C14 wherein $R^{41}$ and $R^{42}$ have the meanings given in formula C, and preferably denote each, independently of one another, alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms.

In another preferred embodiment of the present invention component B) of the LC medium comprises, in addition to the compounds of formula A and/or B, one or more compounds of formula D

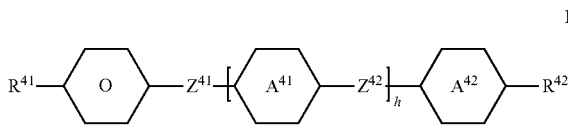
D in which A41, $A^{42}$, $Z^{41}$, $Z^{42}$, $R^{41}$, $R^{42}$ and h have the meanings given in formula C or one of the preferred meanings given above.

Preferred compounds of formula D are selected from the group consisting of the following subformulae:

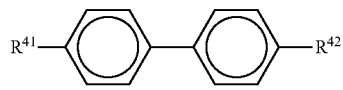
D1

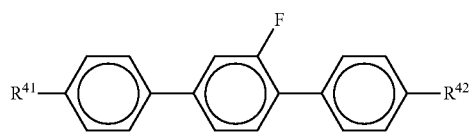
D2 in which $R^{41}$ and $R^{42}$ have the meanings given in formula D and $R^{41}$ preferably denotes alkyl bedeutet, and in formula D1 $R^{42}$ preferably denotes alkenyl, particularly preferably —(CH$_2$)$_2$—CH=CH—CH$_3$, and in formula D2 $R^{42}$ preferably denotes alkyl, —(CH$_2$)$_2$—CH=CH$_2$ or —(CH$_2$)$_2$—CH=CH—CH$_3$.

In another preferred embodiment of the present invention component B) of the LC medium comprises, in addition to the compounds of formula A and/or B, one or more compounds of formula E containing an alkenyl group

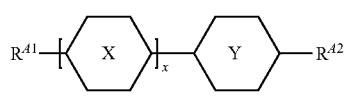
E in which the individual radicals, on each occurrence identically or differently, each, independently of one another, have the following meaning:

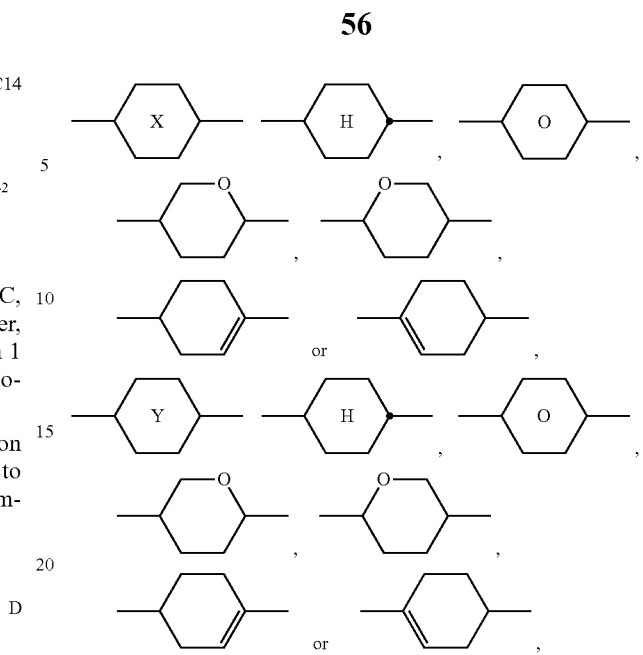

$R^{A1}$ alkenyl having 2 to 9 C atoms or, if at least one of the rings X, Y and Z denotes cyclohexenyl, also one of the meanings of $R^{A2}$, $R^{A2}$ alkyl having 1 to 12 C atoms, in which, in addition, one or two non-adjacent CH$_2$ groups may be replaced by —O—, —CH=CH—, —CO—, —OCO— or —COO— in such a way that O atoms are not linked directly to one another, x 1 or 2.

$R^{A2}$ is preferably straight-chain alkyl or alkoxy having 1 to 8 C atoms or straight-chain alkenyl having 2 to 7 C atoms.

Preferred compounds of formula E are selected from the following sub-formulae:

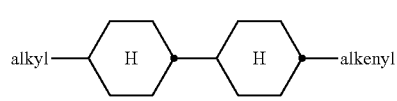
E1

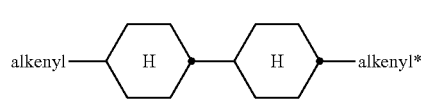
E2

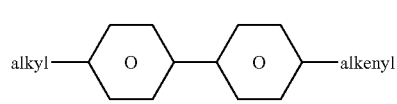
E3

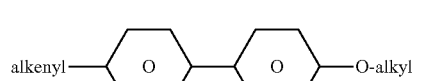
E4

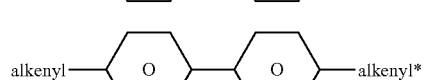
E5

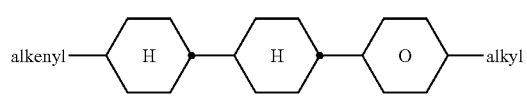
E6

-continued

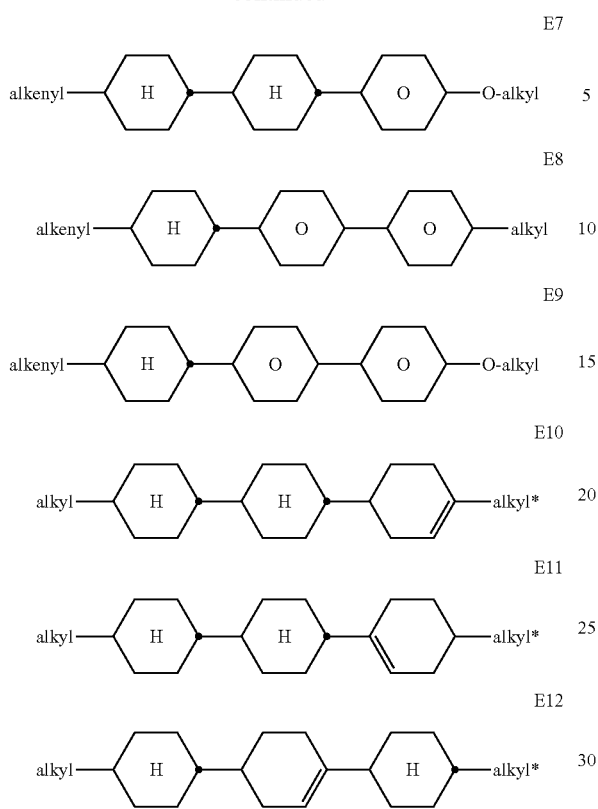

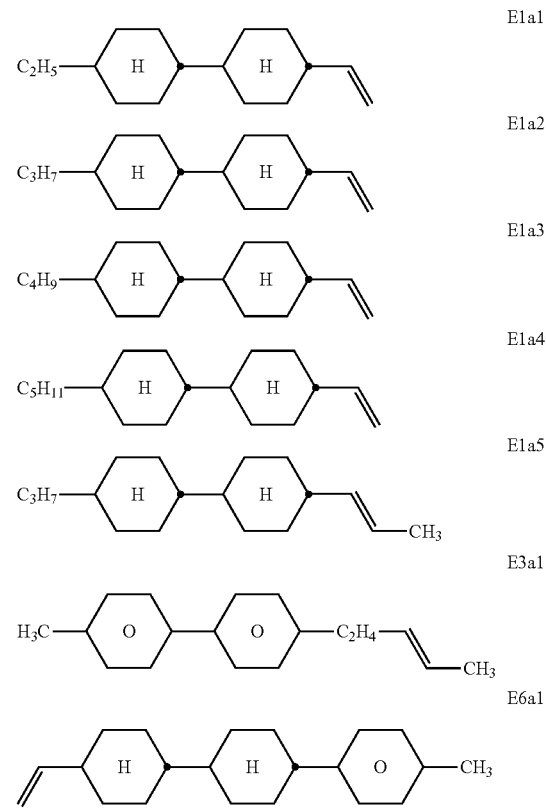

in which alkyl and alkyl* each, independently of one another, denote a straight-chain alkyl radical having 1-6 C atoms, and alkenyl and alkenyl* each, independently of one another, denote a straight-chain alkenyl radical having 2-7 C atoms. Alkenyl and alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Very preferred compounds of the formula E are selected from the following sub-formulae:

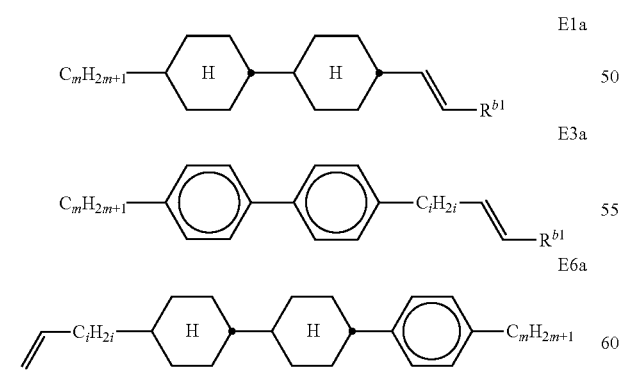

in which m denotes 1, 2, 3, 4, 5 or 6, i denotes 0, 1, 2 or 3, and R$^{b1}$ denotes H, CH$_3$ or C$_2$H$_5$.

Very particularly preferred compounds of the formula E are selected from the following sub-formulae:

Most preferred are compounds of formula E1a2, E1a5, E3a1 and E6a1.

In another preferred embodiment of the present invention component B) of the LC medium comprises, in addition to the compounds of formula A and/or B, one or more compounds of formula F

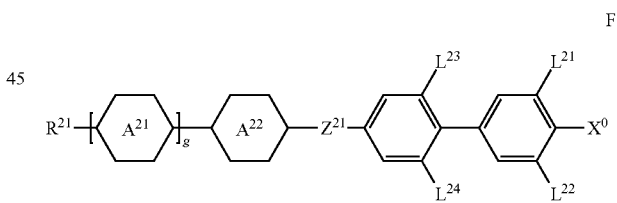

in which the individual radicals have, independently of each other and on each occurrence identically or differently, the following meanings:

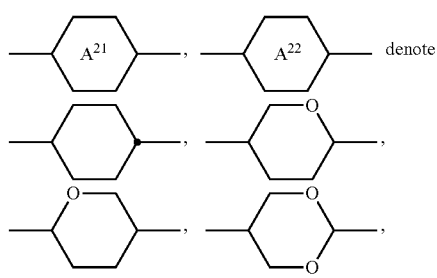

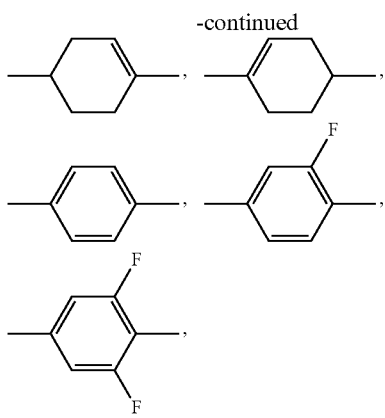

R$^{21}$, R$^{31}$ each, independently of one another, alkyl, alkoxy, oxaalkyl or alkoxyalkyl having 1 to 9 C atoms or alkenyl or alkenyloxy having 2 to 9 C atoms, all of which are optionally fluorinated, X$^0$ F, Cl, halogenated alkyl or alkoxy having 1 to 6 C atoms or halogenated alkenyl or alkenyloxy having 2 to 6 C atoms, Z$^{21}$ —CH$_2$CH$_2$—, —CF$_2$CF$_2$—, —COO—, trans-CH=CH—, trans-CF=CF—, —CH$_2$O—, —CF$_2$O—, —C≡C— or a single bond, preferably —CF$_2$O—, L$^{21}$, L$^{22}$, L$^{23}$, L$^{24}$ each, independently of one another, H or F, g 0, 1, 2 or 3.

Particularly preferred compounds of formula F are selected from the group consisting of the following formulae:

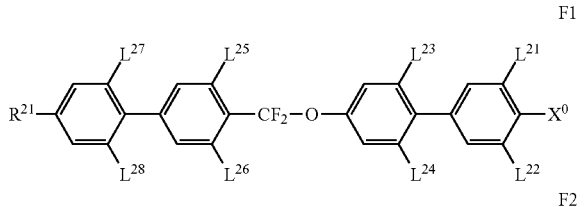

in which R$^{21}$, X$^0$, L$^{21}$ and L$^{22}$ have the meaning given in formula F, L$^{25}$ and L$^{26}$ are each, independently of one another, H or F, and X$^0$ is preferably F.

Very particularly preferred compounds of formula F1-F3 are selected from the group consisting of the following subformulae:

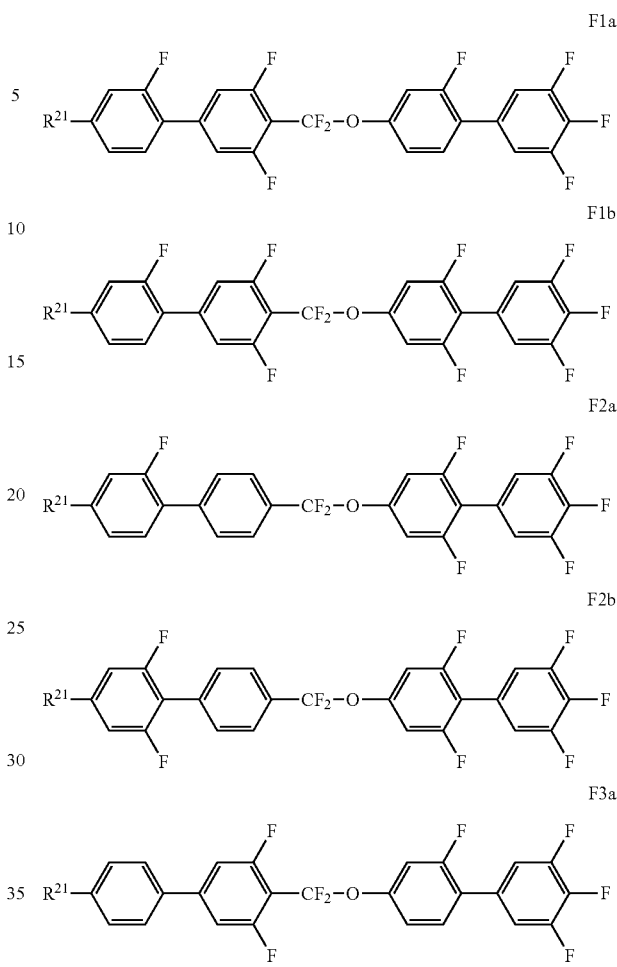

in which R$^{21}$ is as defined in formula F1.

In another preferred embodiment of the present invention component B) of the LC medium comprises, in addition to the compounds of formula A and/or B, one or more compounds of formula G containing a cyano group.

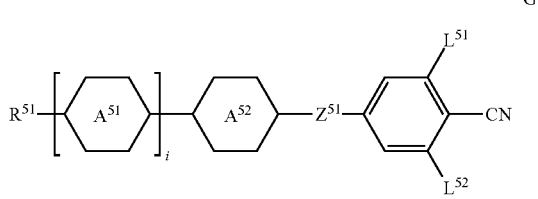

in which the individual radicals have the following meanings:

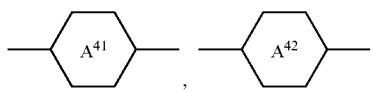

each, independently of one another, and on each occurrence, identically or differently

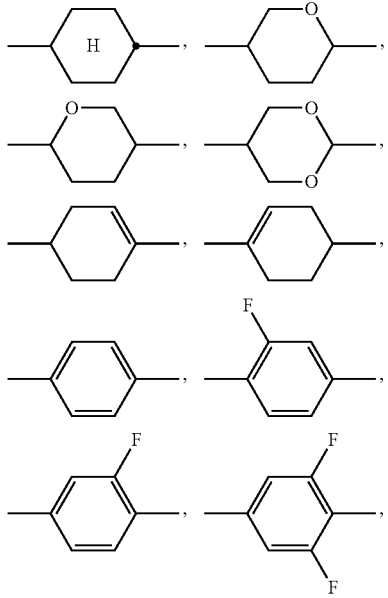

$R^{51}$, $R^{52}$ each, independently of one another, alkyl, alkoxy, oxaalkyl or alkoxyalkyl having 1 to 9 C atoms or alkenyl or alkenyloxy having 2 to 9 C atoms, all of which are optionally fluorinated, $Z^{51}$, $Z^{42}$ —$CH_2CH_2$—, —COO—, trans-CH=CH—, trans-CF=CF—, —$CH_2O$—, —$CF_2O$—, —C≡C— or a single bond, preferably a single bond, $L^{51}$, $L^{52}$ each, independently of one another, H or F, i 0, 1, 2 or 3.

Preferred compounds of formula G are selected from the following subformulae

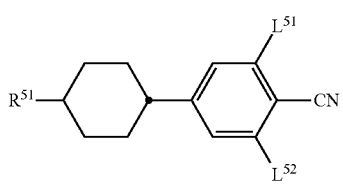  G1

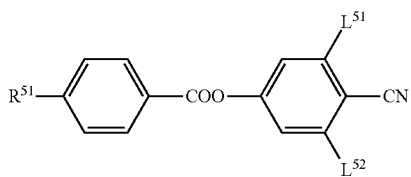  G2

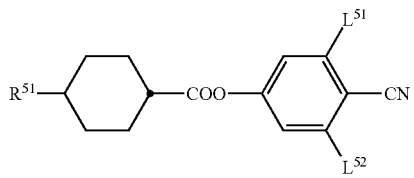  G3

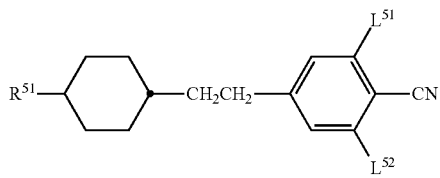  G4

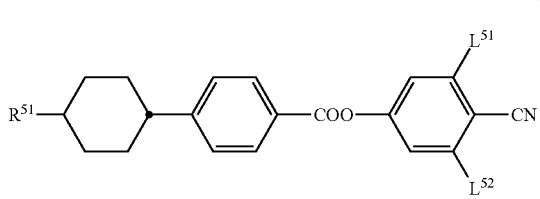  G5

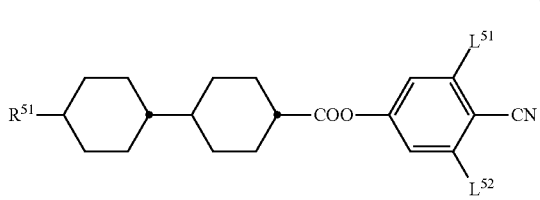  G6

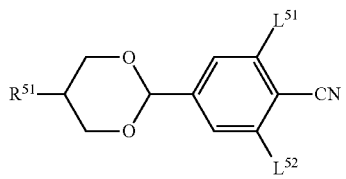  G7

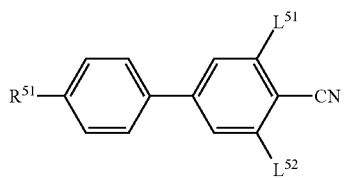  G8

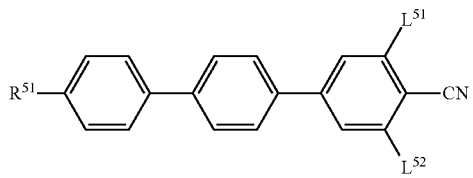  G9 in which $R^{51}$ is as defined in formula G and $L^1$ and $L^2$ are each, independently of one another, H or F.

Very preferred are compounds of formula G1, G2 and G5.

Preferred compounds of formula G1-G9 are those wherein $L^{51}$ and $L^{52}$ are F.

Further preferred compounds of formula G1-G7 are those wherein $L^{51}$ is F and $L^{52}$ is H.

Very preferred compounds of formula G are selected from the group consisting of the following subformulae:

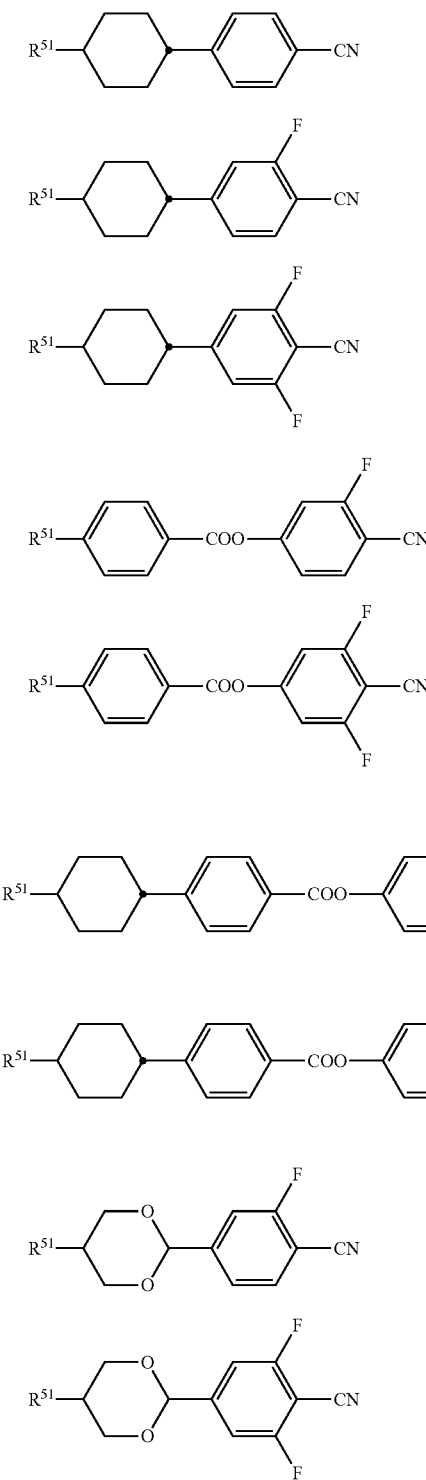

in which $R^{51}$ is as defined in formula G.

In the compounds of formula G, G1-G7 and their subformulae, $R^{51}$ is particularly preferably alkyl or alkoxy having 1 to 8 carbon atoms, or alkenyl having from 2 to 7 carbon atoms.

The concentration of the compounds of formula A and B in the LC host mixture is preferably from 2 to 60%, very preferably from 3 to 45%, most preferably from 4 to 35%.

The concentration of the compounds of formula C and D in the LC host mixture is preferably from 2 to 70%, very preferably from 5 to 65%, most preferably from 10 to 60%.

The concentration of the compounds of formula E in the LC host mixture is preferably from 5 to 50%, very preferably from 5 to 35%.

The concentration of the compounds of formula F in the LC host mixture is preferably from 2 to 30%, very preferably from 5 to 20%.

Further preferred embodiments of the present invention are listed below, including any combination thereof.

a) The LC host mixture comprises one or more compounds of formula A and/or B with high positive dielectric anisotropy, preferably with $\Delta\varepsilon > 15$.

b) The LC host mixture comprises one or more compounds selected from the group consisting of formulae A1a2, A1b1, A1d1, A1f1, A2a1, A2h1, A2l1, A2l2, A2k1, B2h3, B2l1, F1a. The proportion of these compounds in the LC host mixture is preferably from 4 to 40%, very preferably from 5 to 35%.

c) The LC host mixture comprises one or more compounds selected from the group consisting of formulae C3, C4, C5, C9 and D2. The proportion of these compounds in the LC host mixture is preferably from 8 to 70%, very preferably from 10 to 60%.

d) The LC host mixture comprises one or more compounds selected from the group consisting of formulae G1, G2 and G5, preferably G1a, G2a and G5a. The proportion of these compounds in the LC host mixture is preferably from 4 to 40%, very preferably from 5 to 35%.

e) The LC host mixture comprises one or more compounds selected from the group consisting of formulae E1, E3 and E6, preferably E1a, E3a and E6a, very preferably E1a2, E1a5, E3a1 and E6a1. The proportion of these compounds in the LC host mixture is preferably from 5 to 60%, very preferably from 10 to 50%.

In a second preferred embodiment of the present invention, the LC medium contains an component B) or LC host mixture having a negative dielectric anisotropy $\Delta\varepsilon$.

Such LC media are especially suitable for use in VA, IPS and UB-FFS displays or related modes using LC-materials with $\Delta\varepsilon < 0$.

The LC media and LC host mixtures according to this second preferred embodiment preferably have a negative dielectric anisotropy $\Delta\varepsilon$ from −0.5 to −10, very preferably from −2.5 to −7.5, at 20° C. and 1 kHz.

Particularly preferred embodiments of an LC medium according to this second preferred embodiment are those of sections a)-z2) below:

a) LC medium wherein the component B) or LC host mixture comprises one or more compounds selected from formulae CY and PY:

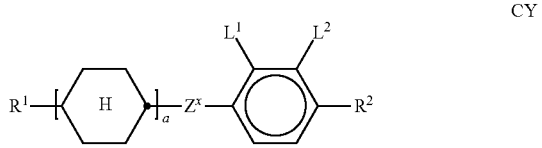

CY

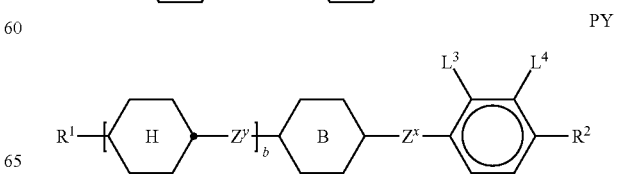

PY wherein a denotes 1 or 2, b denotes 0 or 1,

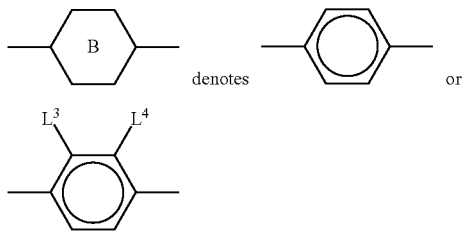

R$^1$ and R$^2$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, preferably alkyl or alkoxy having 1 to 6 C atoms, Z$^x$ and Z$^y$ each, independently of one another, denote —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond, L$^{1-4}$ each, independently of one another, denote F, Cl, OCF$_3$, CF$_3$, CH$_3$, CH$_2$F, CHF$_2$.

Preferably, both L$^1$ and L$^2$ denote F or one of L$^1$ and L$^2$ denotes F and the other denotes Cl, or both L$^3$ and L$^4$ denote F or one of L$^3$ and L$^4$ denotes F and the other denotes Cl.

The compounds of the formula CY are preferably selected from the group consisting of the following sub-formulae:

CY1
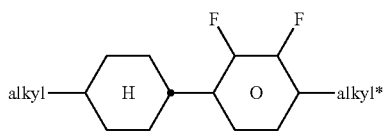

CY2
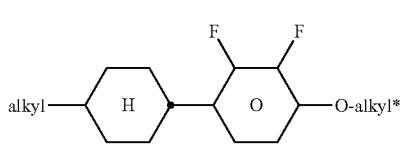

CY3
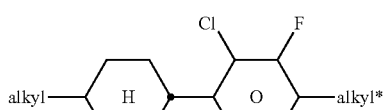

CY4
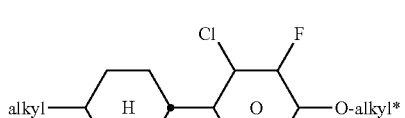

CY5
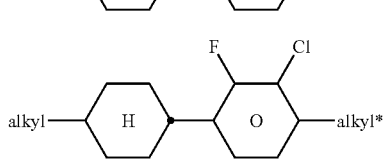

CY6
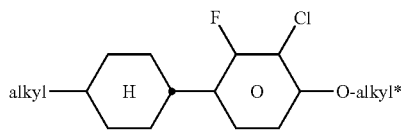

CY7
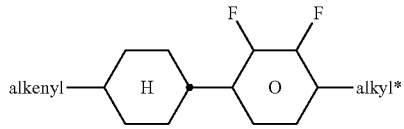

CY8
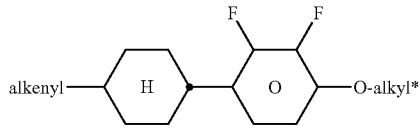

CY9
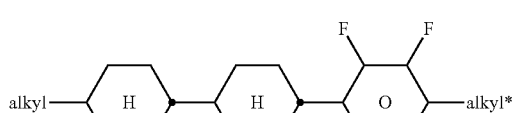

CY10
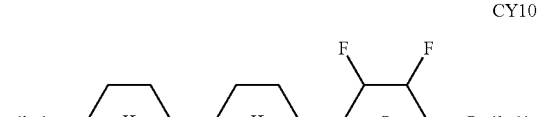

CY11
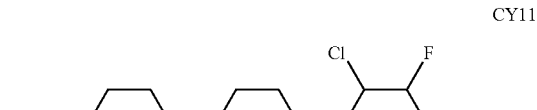

CY12
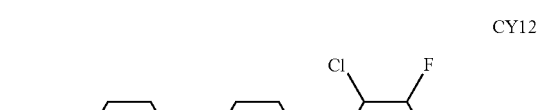

CY13
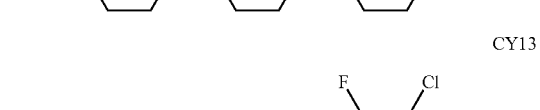

CY14
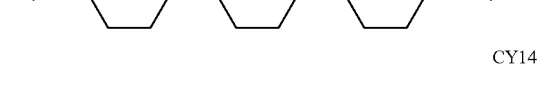

CY15
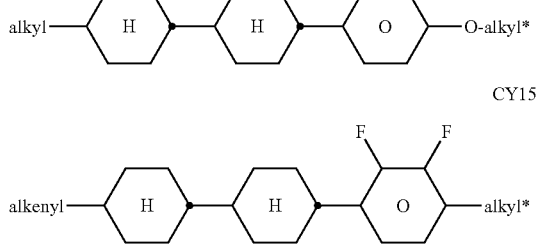

-continued

CY16
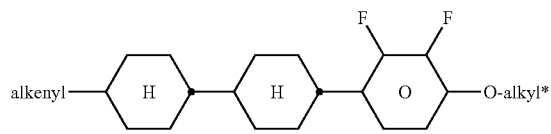

CY17
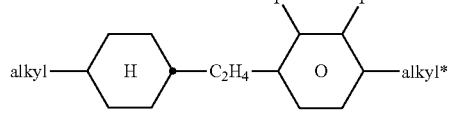

CY18
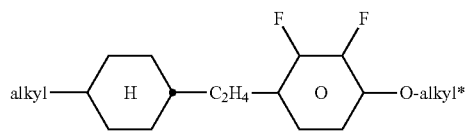

CY19
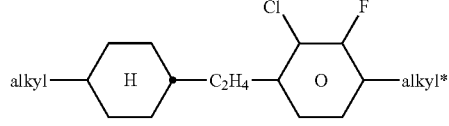

CY20
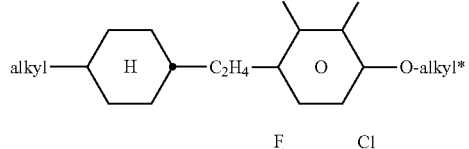

CY21
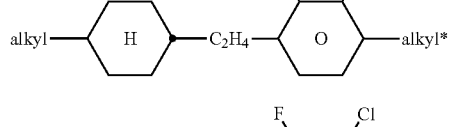

CY22
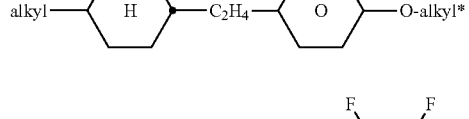

CY23
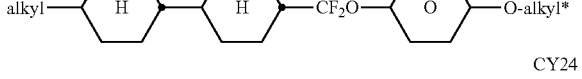

CY24
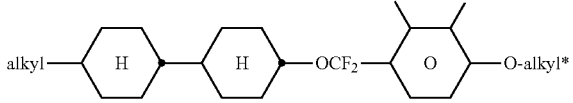

CY25
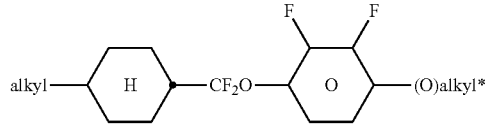

CY26
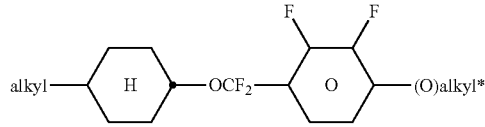

-continued

CY27
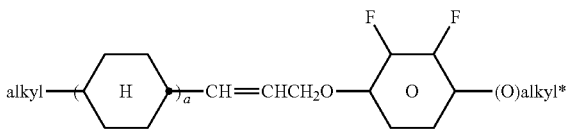

CY28

CY29
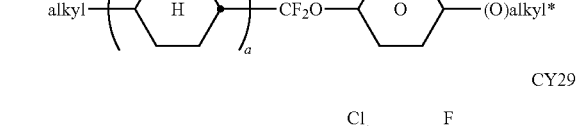

CY30
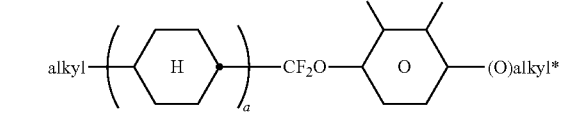

CY31
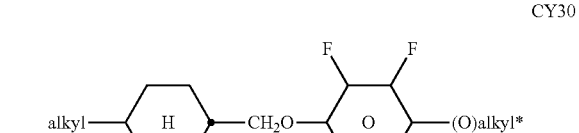

CY32
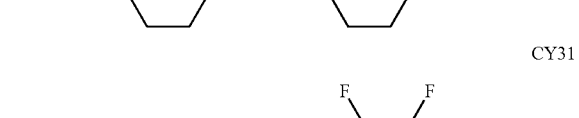

CY33
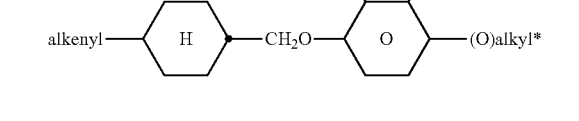

in which a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Especially preferred are compounds selected from formulae CY2, CY8, CY10 and CY16.

The compounds of the formula PY are preferably selected from the group consisting of the following sub-formulae:

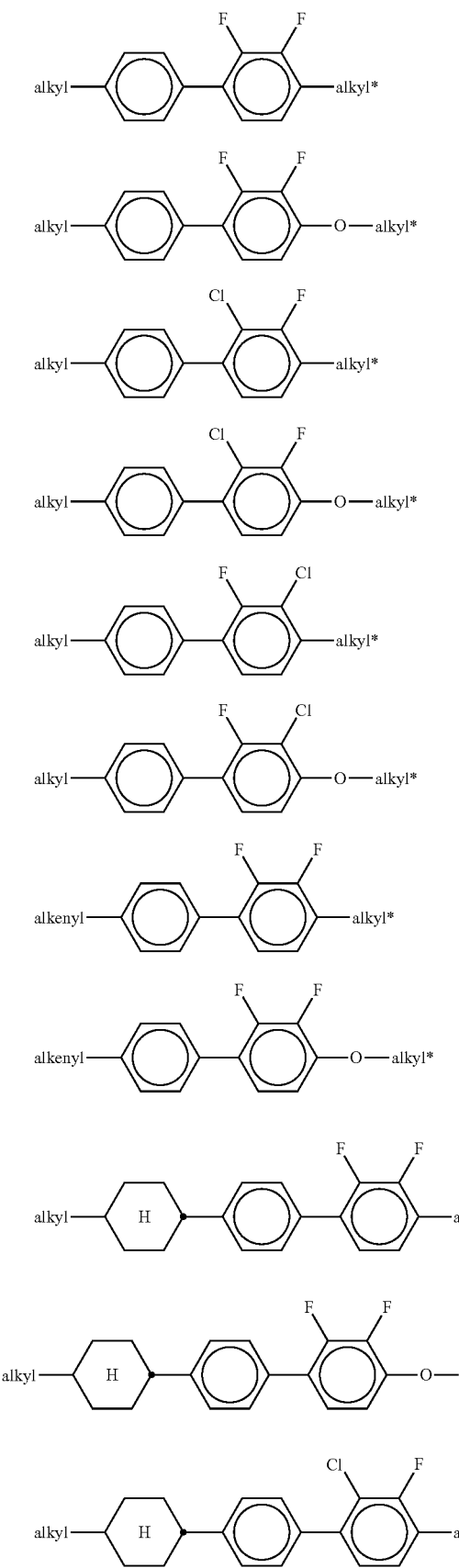
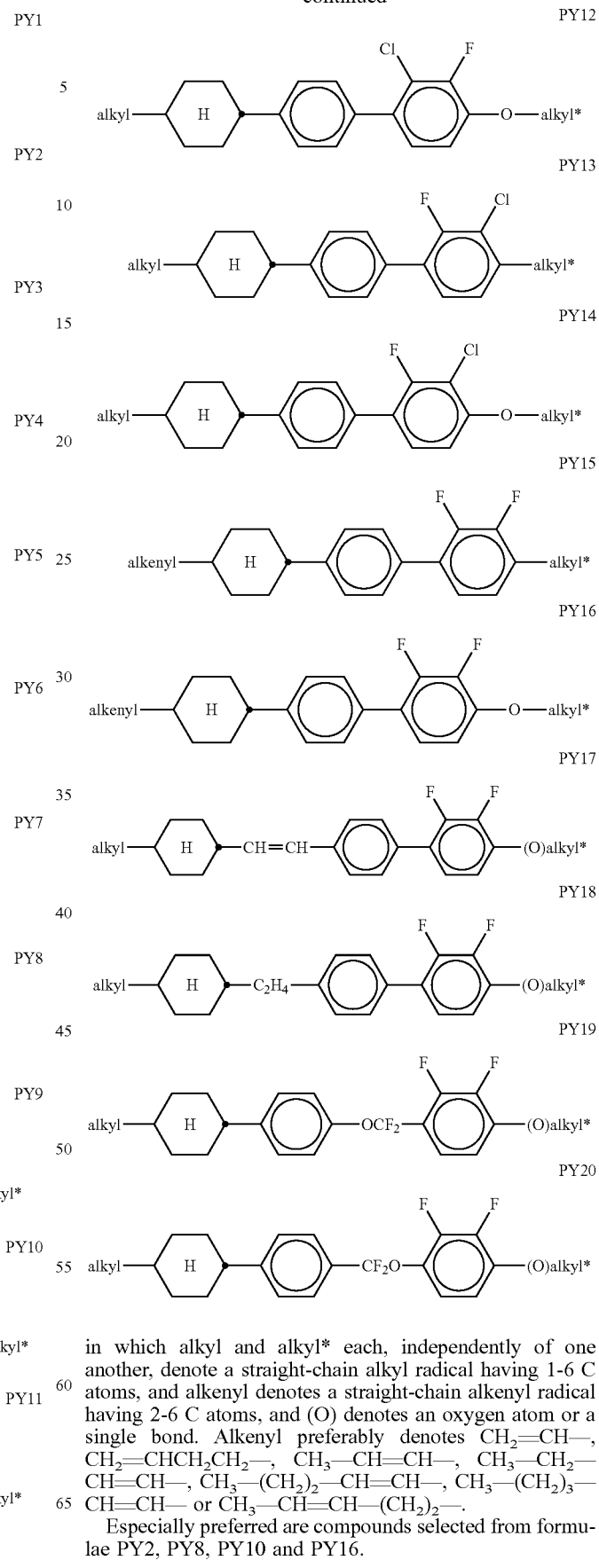

in which alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Especially preferred are compounds selected from formulae PY2, PY8, PY10 and PY16.

Preferably the concentration of the compounds of formula CY and PY and their subformulae in the LC medium is from 10 to 70% by weight, very preferably from 15 to 50% by weight.

Preferably the concentration of the compounds of formula CY and its subformulae in the LC medium is from 2 to 40% by weight, very preferably from 3 to 30% by weight.

Preferably the concentration of the compounds of formula PY and its subformulae in the LC medium is from 2 to 50% by weight, very preferably from 3 to 40% by weight.

b) LC medium wherein the component B) or LC host mixture comprises one or more mesogenic or LC compounds comprising an alkenyl group (hereinafter also referred to as "alkenyl compounds"), wherein said alkenyl group is stable to a polymerisation reaction under the conditions used for polymerisation of the polymerisable compounds contained in the LC medium.

Preferably the component B) or LC host mixture comprises one or more alkenyl compounds selected from formulae AN and AY

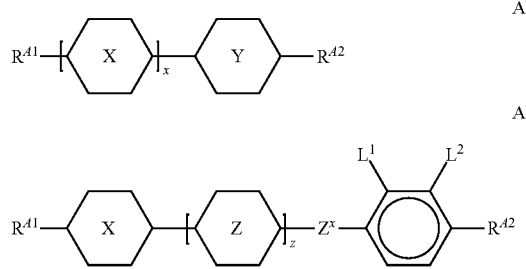

in which the individual radicals, on each occurrence identically or differently, and each, independently of one another, have the following meaning:

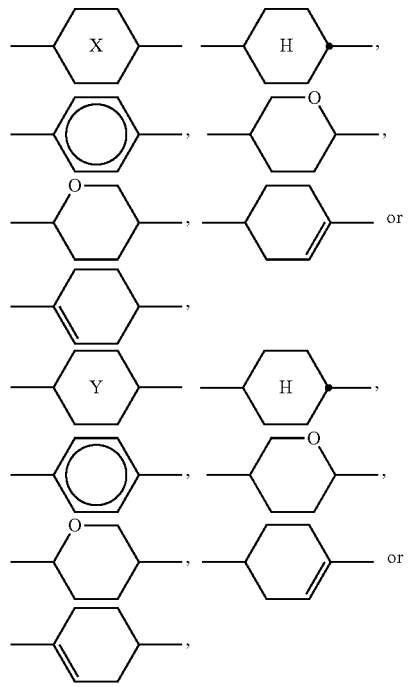

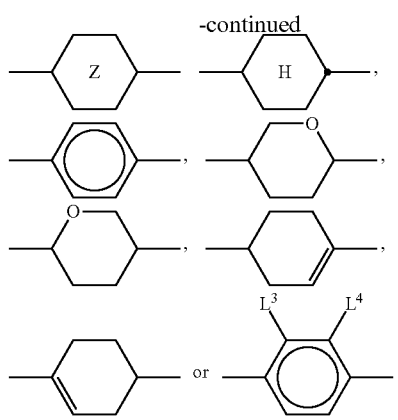

$R^{A1}$ alkenyl having 2 to 9 C atoms or, if at least one of the rings X, Y and Z denotes cyclohexenyl, also one of the meanings of $R^{A2}$, $R^{A2}$ alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another, $Z^x$ —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$—, or a single bond, preferably a single bond, $L^{1,2}$ H, F, Cl, $OCF_3$, $CF_3$, $CH_3$, $CH_2F$ or $CHF_2H$, preferably H, F or Cl, x 1 or 2, z 0 or 1.

Preferred compounds of formula AN and AY are those wherein $R^{A2}$ is selected from ethenyl, propenyl, butenyl, pentenyl, hexenyl and heptenyl.

In a preferred embodiment the component B) or LC host mixture comprises one or more compounds of formula AN selected from the following sub-formulae:

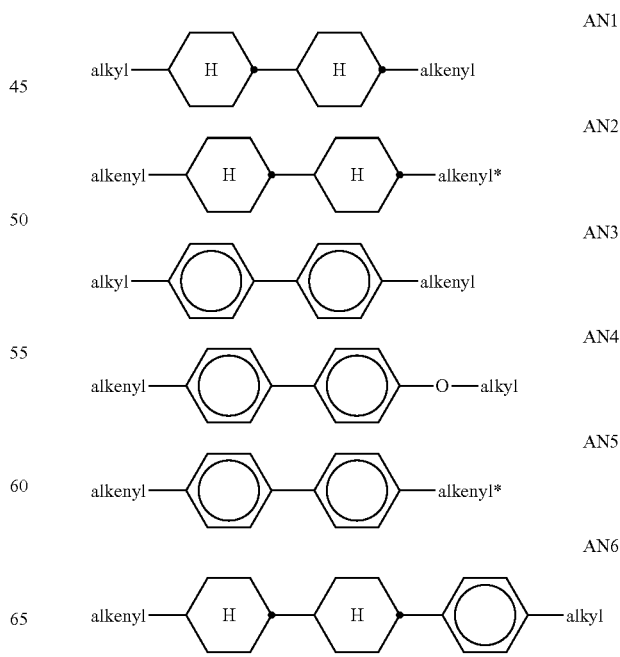

-continued

AN7
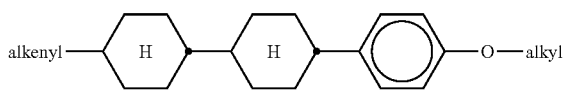

AN8
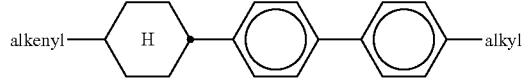

AN9
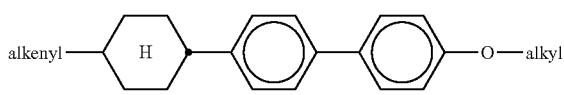

AN10

AN11
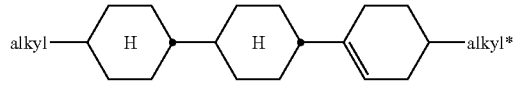

AN12
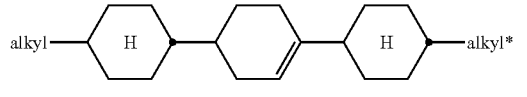

in which alkyl and alkyl* each, independently of one another, denote a straight-chain alkyl radical having 1-6 C atoms, and alkenyl and alkenyl* each, independently of one another, denote a straight-chain alkenyl radical having 2-7 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Preferably the component B) or LC host mixture comprises one or more compounds selected from formulae AN1, AN2, AN3 and AN6, very preferably one or more compounds of formula AN1.

In another preferred embodiment the component B) or LC host mixture comprises one or more compounds of formula AN selected from the following sub-formulae:

AN1a
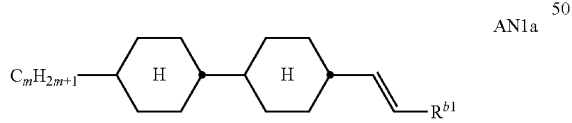

AN3a
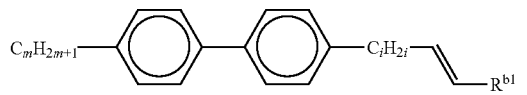

AN6a
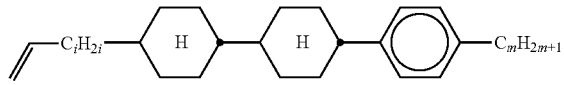

in which m denotes 1, 2, 3, 4, 5 or 6, i denotes 0, 1, 2 or 3, and $R^{b1}$ denotes H, $CH_3$ or $C_2H_5$.

In another preferred embodiment the component B) or LC host mixture comprises one or more compounds selected from the following sub-formulae:

AN1a1
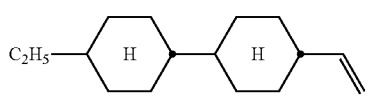

AN1a2
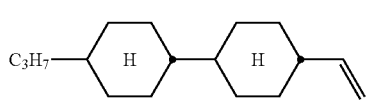

AN1a3
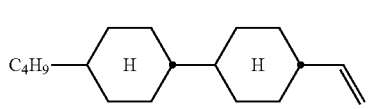

AN1a4
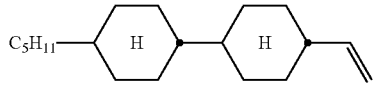

AN1a5
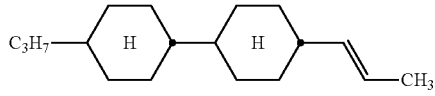

Most preferred are compounds of formula AN1a2 and AN1a5.

In another preferred embodiment the component B) or LC host mixture comprises one or more compounds of formula AY selected from the following sub-formulae:

AY1
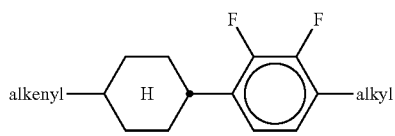

AY2
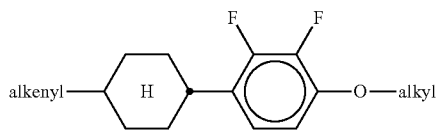

AY3
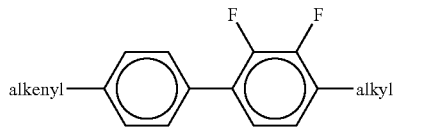

AY4
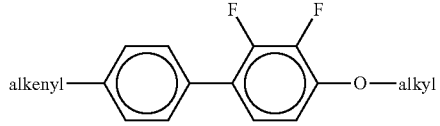

AY5
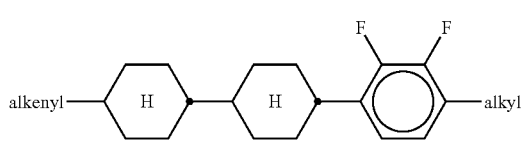

AY6 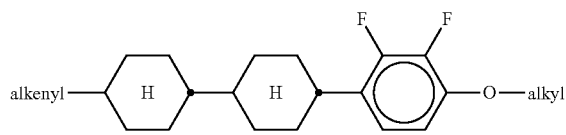
AY7 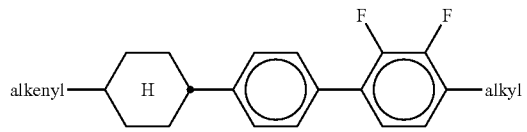
AY8 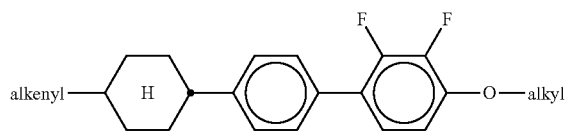
AY9 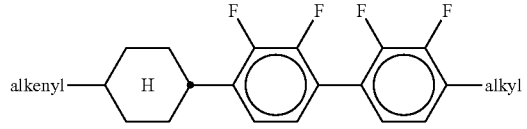
AY10 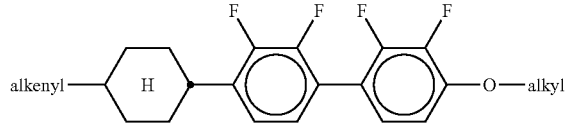
AY11 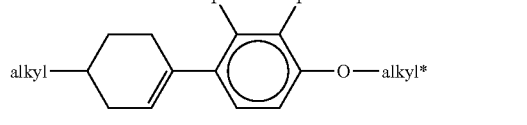
AY12 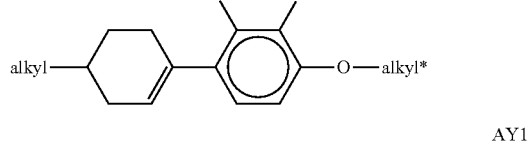
AY13 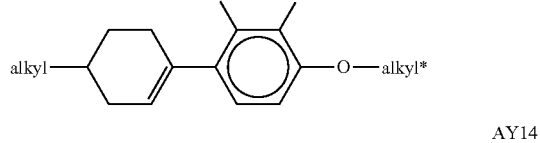
AY14 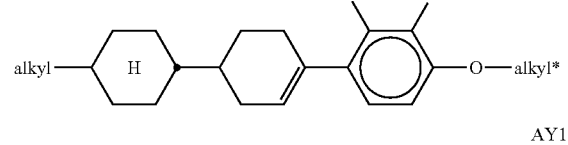
AY15 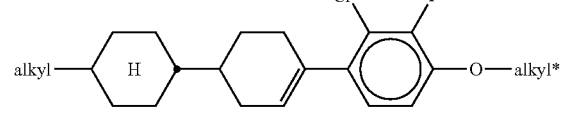
AY16 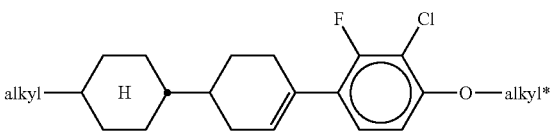
AY17 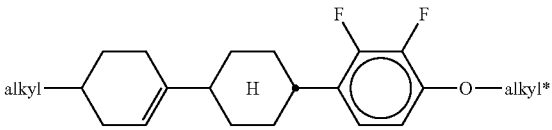
AY18 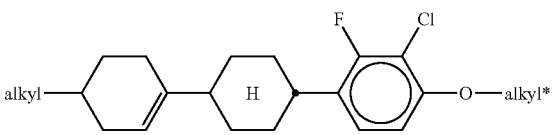
AY19 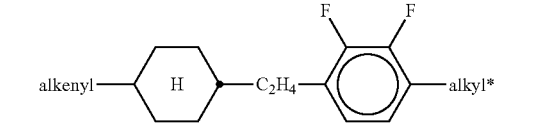
AY20 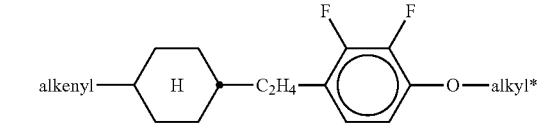
AY21 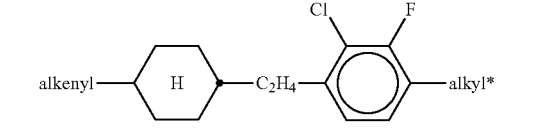
AY22 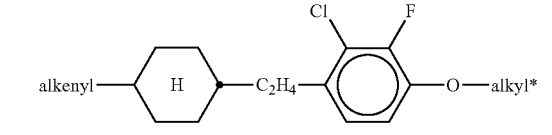
AY23 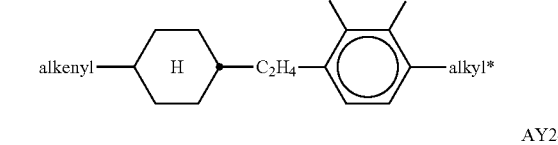
AY24 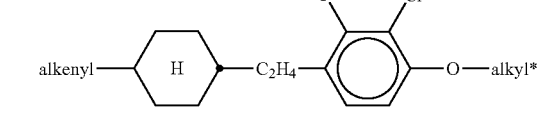
AY25 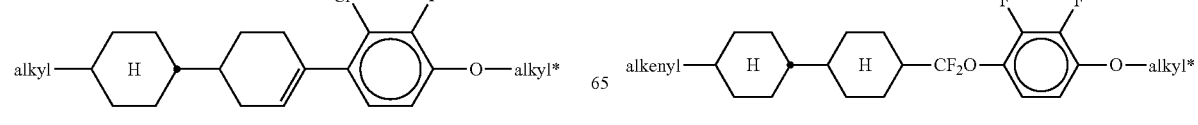

-continued

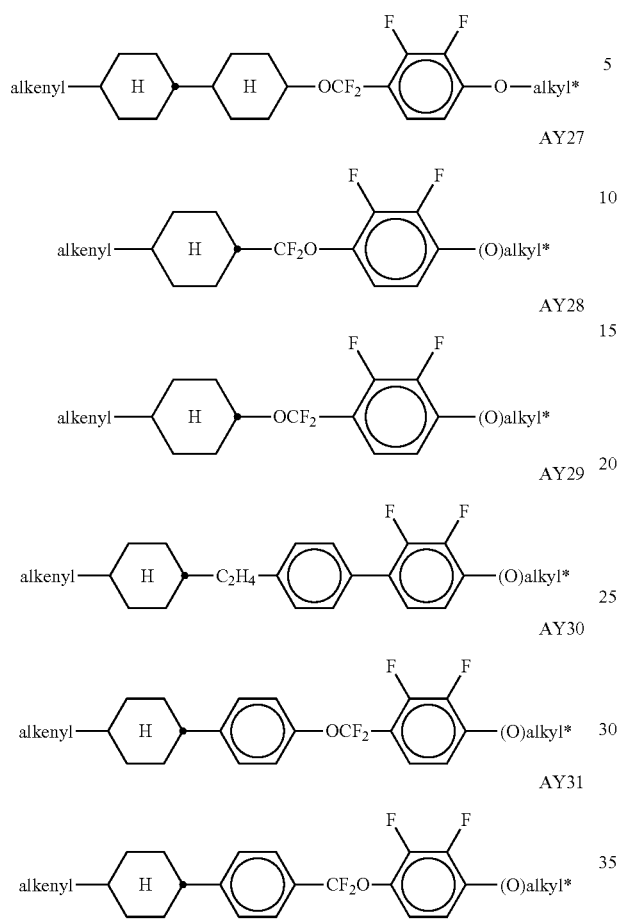

in which alkyl and alkyl* each, independently of one another, denote a straight-chain alkyl radical having 1-6 C atoms, "(O)" denotes an O-atom or a single bond, and alkenyl and alkenyl* each, independently of one another, denote a straight-chain alkenyl radical having 2-7 C atoms. Alkenyl and alkenyl* preferably denote $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—.

In another preferred embodiment the component B) or LC host mixture comprises one or more compounds of formula AY selected from the following sub-formulae:

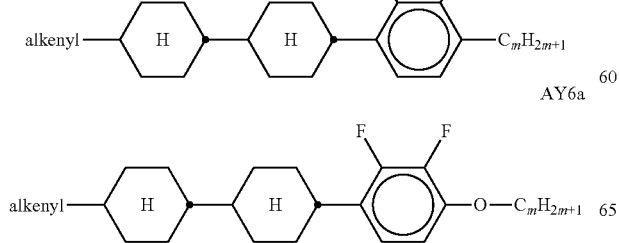

-continued

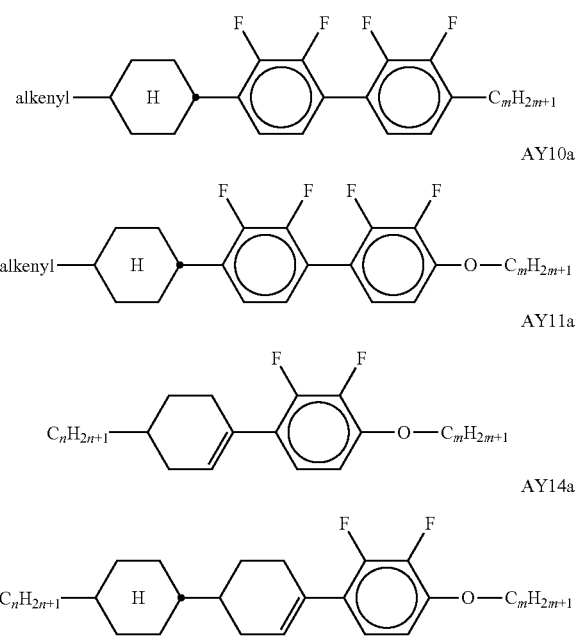

in which m and n each, independently of one another, denote 1, 2, 3, 4, 5 or 6, and alkenyl denotes $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—.

Preferably the proportion of compounds of formula AN and AY in the LC medium is from 2 to 70% by weight, very preferably from 5 to 60% by weight, most preferably from 10 to 50% by weight.

Preferably the LC medium or LC host mixture contains 1 to 5, preferably 1, 2 or 3 compounds selected from formulae AN and AY.

In another preferred embodiment of the present invention the LC medium comprises one or more compounds of formula AY14, very preferably of AY14a. The proportion of compounds of formula AY14 or AY14a in the LC medium is preferably 3 to 20% by weight.

The addition of alkenyl compounds of formula AN and/or AY enables a reduction of the viscosity and response time of the LC medium.

c) LC medium wherein the component B) or LC host mixture comprises one or more compounds of the following formula:

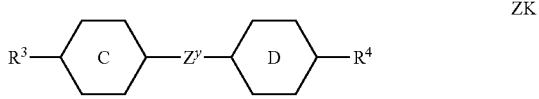

in which the individual radicals have the following meanings:

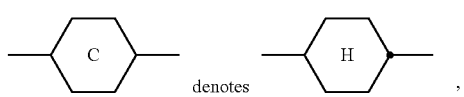

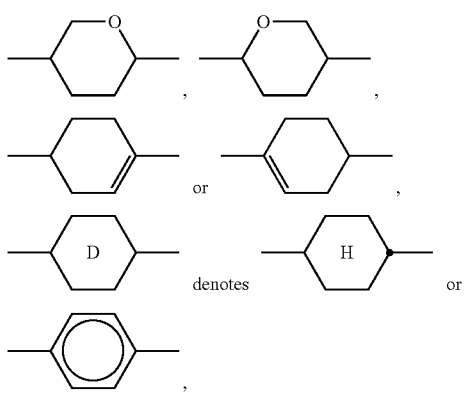

$R^3$ and $R^4$ each, independently of one another, denote alkyl having 1 to 12 C atoms, in which, in addition, one or two non-adjacent CH$_2$ groups may be replaced by —O—, —CH=CH—, —CO—, —O—CO— or —CO—O— in such a way that O atoms are not linked directly to one another, $Z^y$ denotes —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond.

The compounds of the formula ZK are preferably selected from the group consisting of the following sub-formulae:

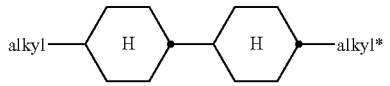

ZK1

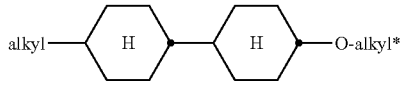

ZK2

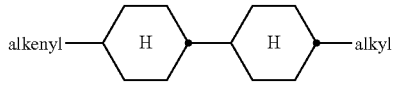

ZK3

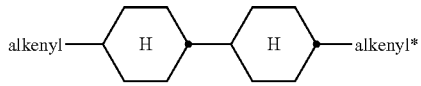

ZK4

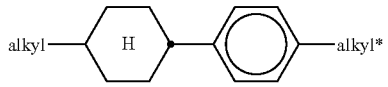

ZK5

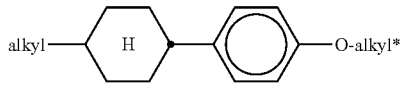

ZK6

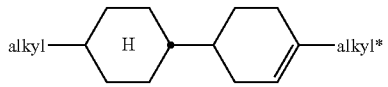

ZK7

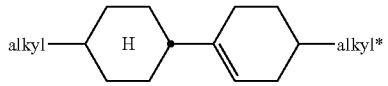

ZK8

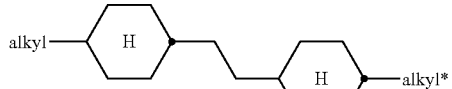

ZK9

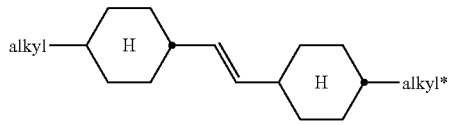

ZK10 in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Especially preferred are compounds of formula ZK1.

Particularly preferred compounds of formula ZK are selected from the following sub-formulae:

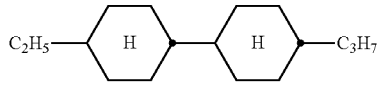

ZK1a

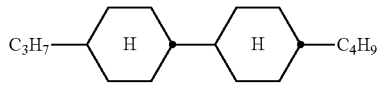

ZK1b

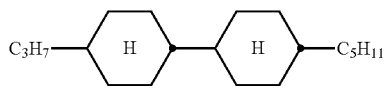

ZK1c wherein the propyl, butyl and pentyl groups are straight-chain groups.

Most preferred are compounds of formula ZK1a.

d) LC medium wherein component B) or the LC host mixture additionally comprises one or more compounds of the following formula:

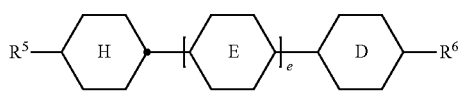

DK in which the individual radicals on each occurrence, identically or differently, have the following meanings:

$R^5$ and $R^6$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, preferably alkyl or alkoxy having 1 to 6 C atoms,

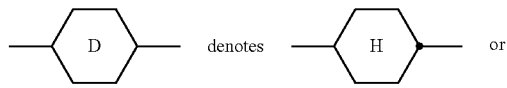

-continued

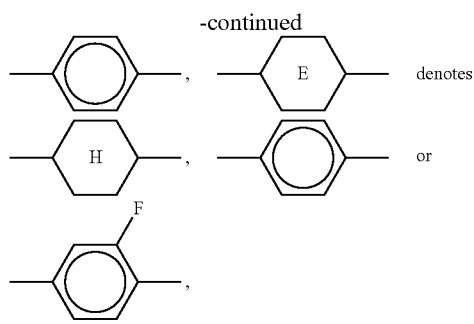

and
e denotes 1 or 2.

The compounds of the formula DK are preferably selected from the group consisting of the following sub-formulae:

DK1

DK2
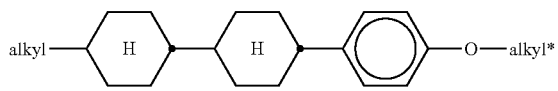

DK3
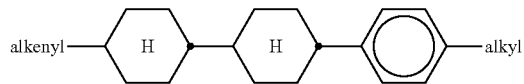

DK4
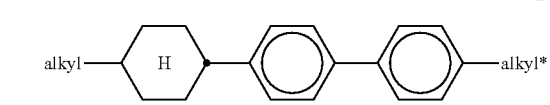

DK5
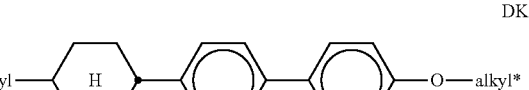

DK6
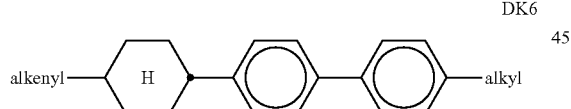

DK7
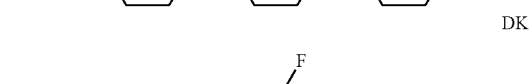

DK8
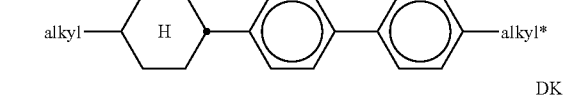

DK9
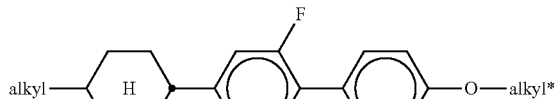

-continued

DK10
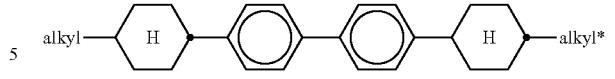

DK11
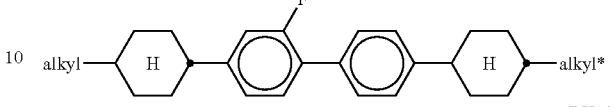

DK12
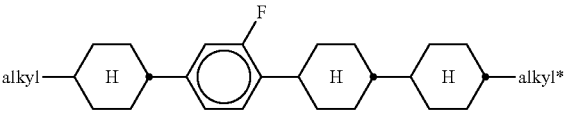

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

e) LC medium wherein component B) or the LC host mixture additionally comprises one or more compounds of the following formula:

LY
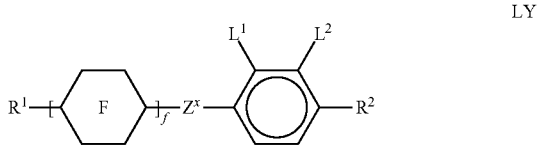

in which the individual radicals have the following meanings:

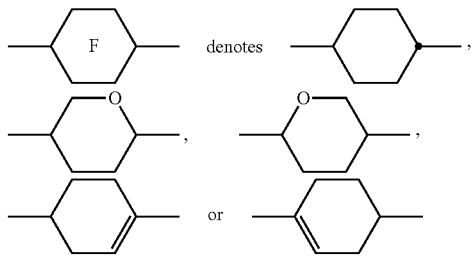

with at least one ring F being different from cyclohexylene,
f denotes 1 or 2,
$R^1$ and $R^2$ each, independently of one another, denote alkyl having 1 to 12 C atoms, where, in addition, one or two non-adjacent $CH_2$ groups may be replaced by $-O-$, $-CH=CH-$, $-CO-$, $-OCO-$ or $-COO-$ in such a way that O atoms are not linked directly to one another,
$Z^x$ denotes $-CH_2CH_2-$, $-CH=CH-$, $-CF_2O-$, $-OCF_2-$, $-CH_2O-$, $-OCH_2-$, $-CO-O-$, $-O-CO-$, $-C_2F_4-$, $-CF=CF-$, $-CH=CH-CH_2O-$ or a single bond, preferably a single bond,
$L^1$ and $L^2$ each, independently of one another, denote F, Cl, $OCF_3$, $CF_3$, $CH_3$, $CH_2F$, $CHF_2$.

Preferably, both radicals L¹ and L² denote F or one of the radicals L¹ and L² denotes F and the other denotes Cl.
The compounds of the formula LY are preferably selected from the group consisting of the following sub-formulae:
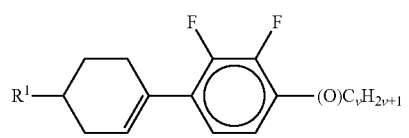
LY1
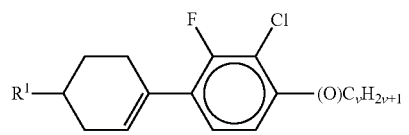
LY2
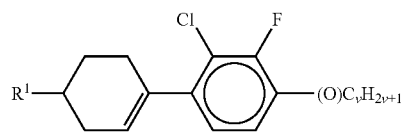
LY3
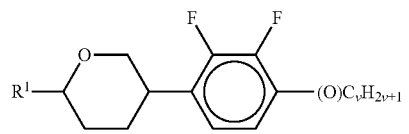
LY4
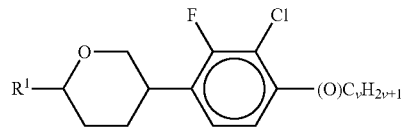
LY5
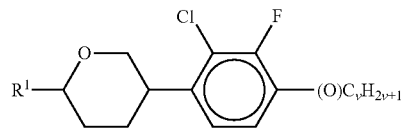
LY6
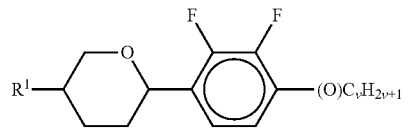
LY7
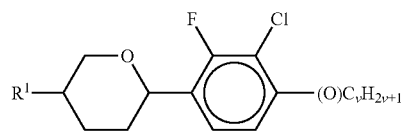
LY8
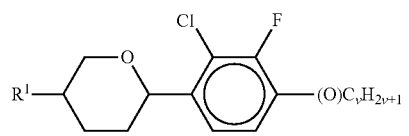
LY9
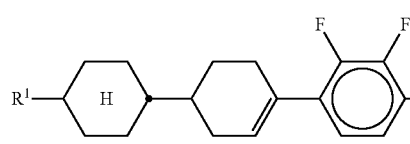
LY10
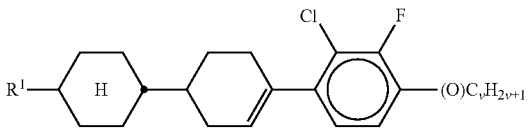
LY11
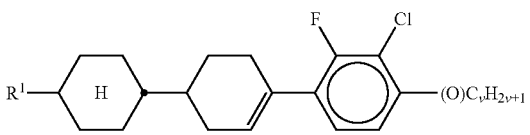
LY12
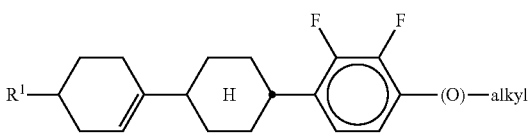
LY13
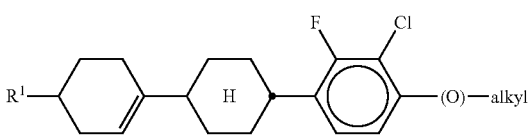
LY14
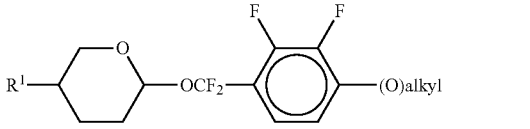
LY15
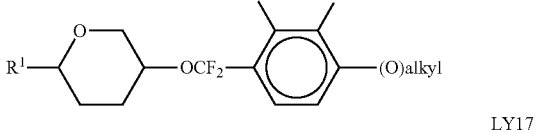
LY16
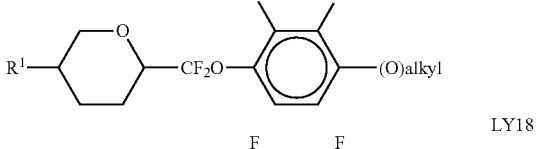
LY17
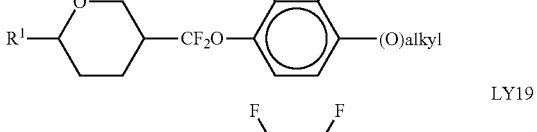
LY18
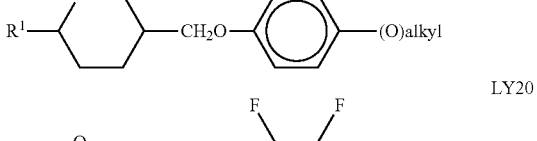
LY19
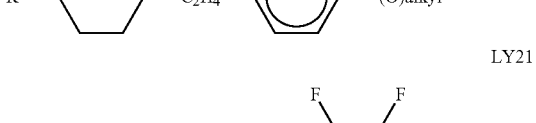
LY20
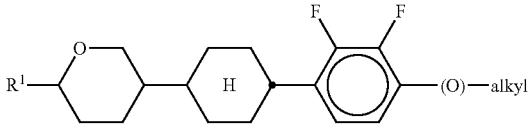
LY21

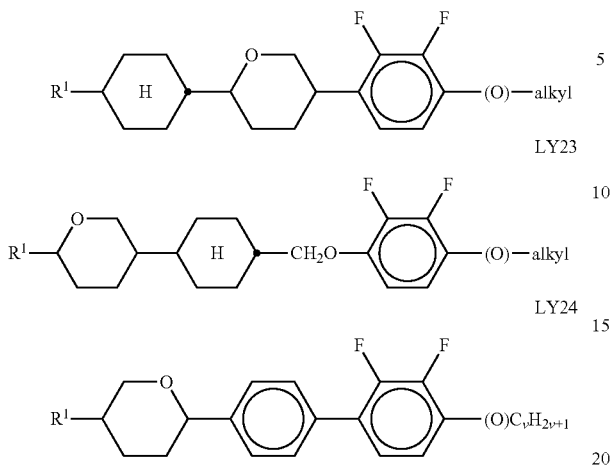

in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, $n\text{-}C_3H_7$, $n\text{-}C_4H_9$, $n\text{-}C_5H_{11}$, $CH_2\!=\!CH\!-\!$, $CH_2\!=\!CHCH_2CH_2\!-\!$, $CH_3\!-\!CH\!=\!CH\!-\!$, $CH_3\!-\!CH_2\!-\!CH\!=\!CH\!-\!$, $CH_3\!-\!(CH_2)_2\!-\!CH\!=\!CH\!-\!$, $CH_3\!-\!(CH_2)_3\!-\!CH\!=\!CH\!-\!$ or $CH_3\!-\!CH\!=\!CH\!-\!(CH_2)_2\!-\!$.

f) LC medium wherein component B) or the LC host mixture additionally comprises one or more compounds selected from the group consisting of the following formulae:

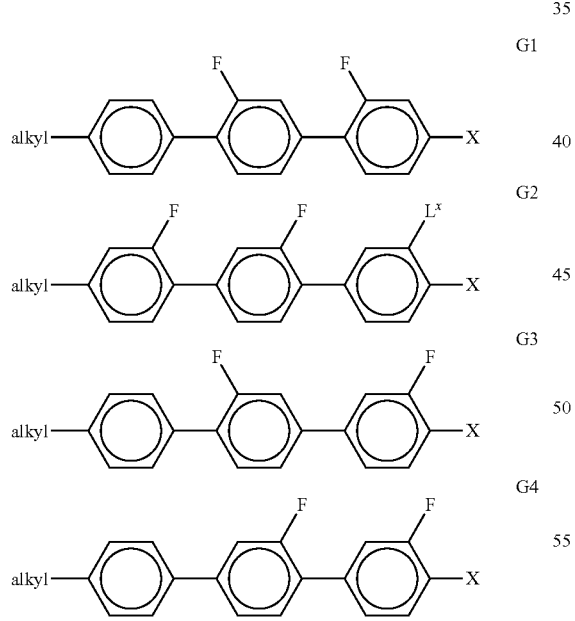

in which alkyl denotes $C_{1-6}$-alkyl, Lx denotes H or F, and X denotes F, Cl, $OCF_3$, $OCHF_2$ or $OCH\!=\!CF_2$. Particular preference is given to compounds of the formula G1 in which X denotes F.

g) LC medium wherein component B) or the LC host mixture additionally comprises one or more compounds selected from the group consisting of the following formulae:

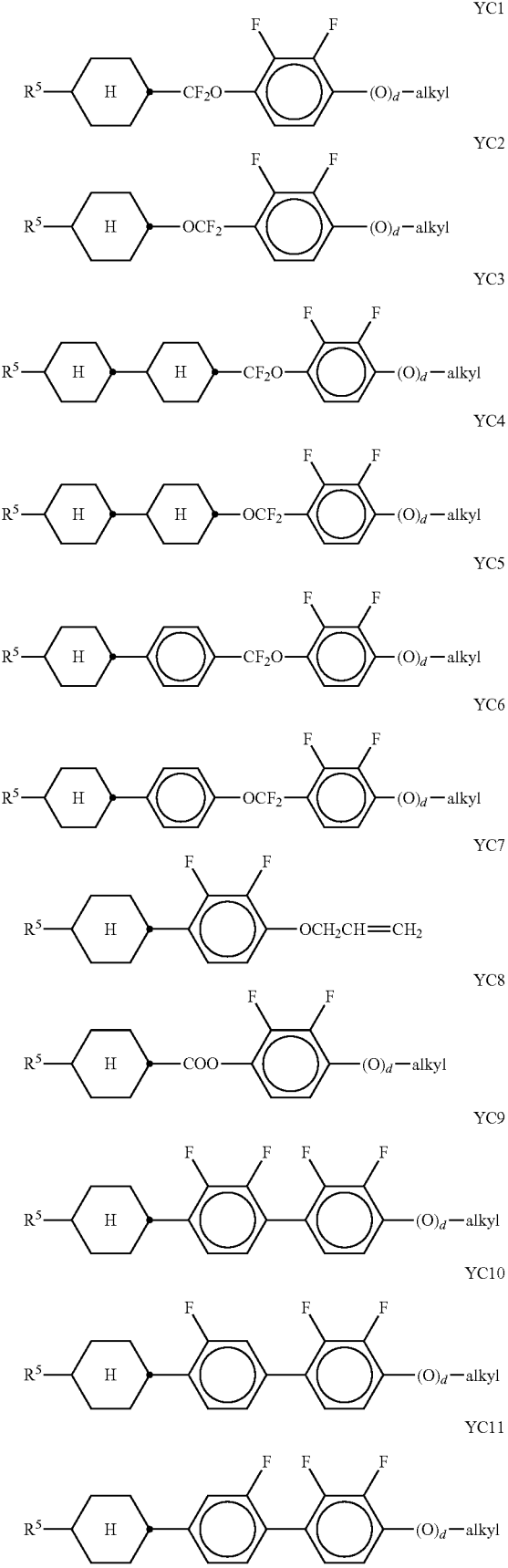

-continued

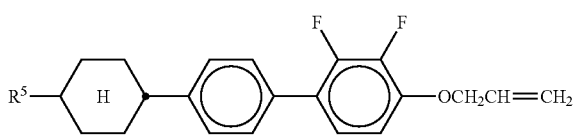

YC12

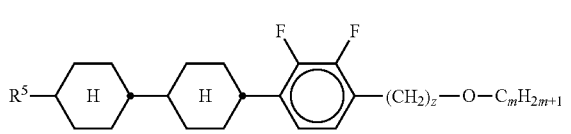

YC13

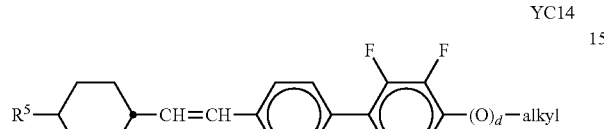

YC14

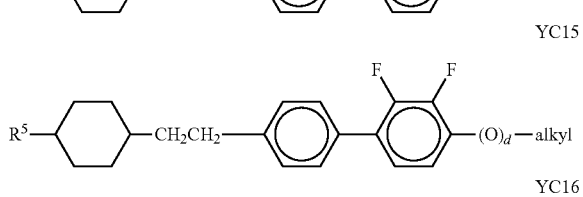

YC15

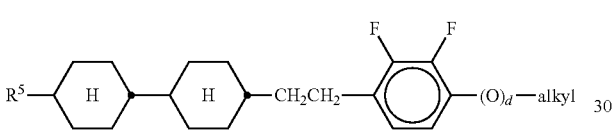

YC16

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

h) LC medium wherein component B) or the LC host mixture additionally comprises one or more biphenyl compounds selected from the group consisting of the following formulae:

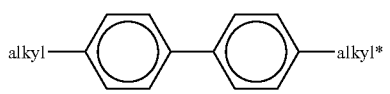

B1

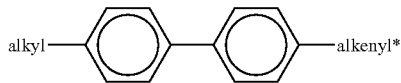

B2

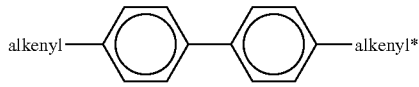

B3 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The proportion of the biphenyls of the formulae B1 to B3 in the LC host mixture is preferably at least 3% by weight, in particular 5% by weight.

The compounds of the formula B2 are particularly preferred.

The compounds of the formulae B1 to B3 are preferably selected from the group consisting of the following sub-formulae:

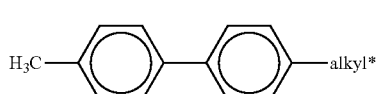

B1a

B2a

B2b

B2c in which alkyl* denotes an alkyl radical having 1-6 C atoms. The medium according to the invention particularly preferably comprises one or more compounds of the formulae B1a and/or B2c.

i) LC medium wherein component B) or the LC host mixture additionally comprises one or more terphenyl compounds of the following formula:

T in which $R^5$ and $R^6$ each, independently of one another, have one of the meanings indicated above, and

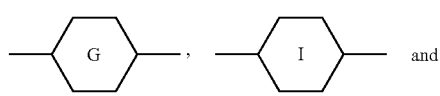

and

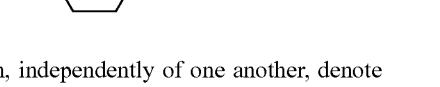

each, independently of one another, denote

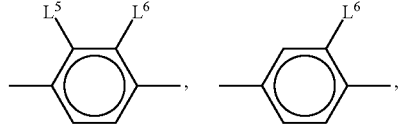

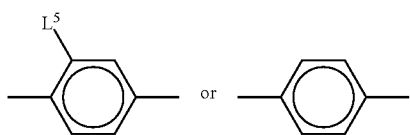
in which L$^5$ denotes F or Cl, preferably F, and L$^6$ denotes F, Cl, OCF$_3$, CF$_3$, CH$_3$, CH$_2$F or CHF$_2$, preferably F.
The compounds of the formula T are preferably selected from the group consisting of the following sub-formulae:
T1
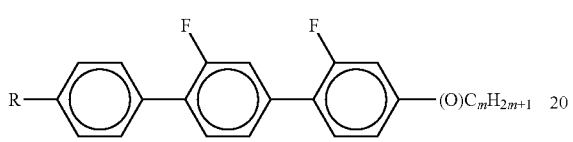
T2
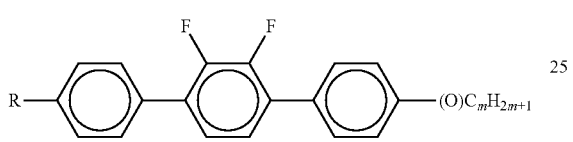
T3
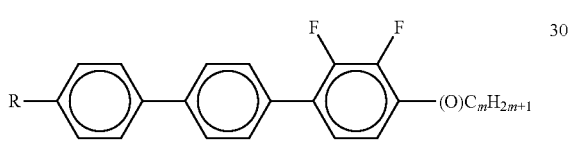
T4
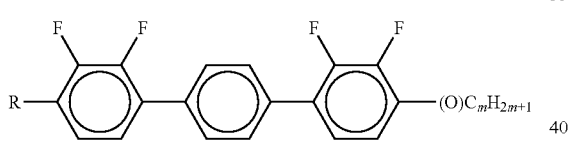
T5
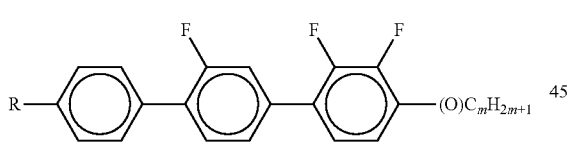
T6
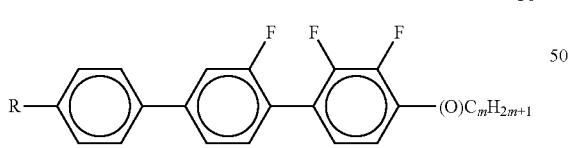
T7
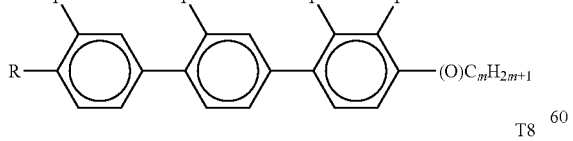
T8
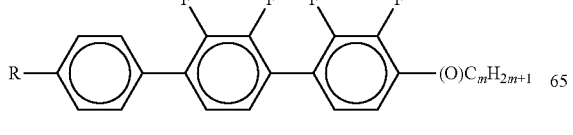
T9
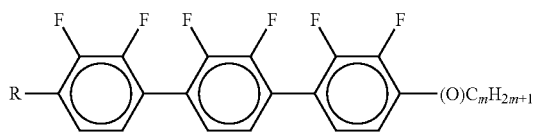
T10
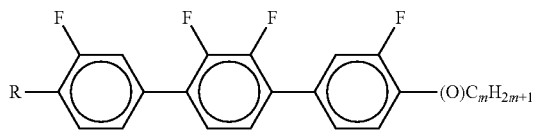
T11
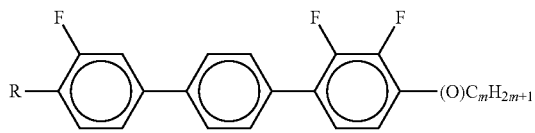
T12
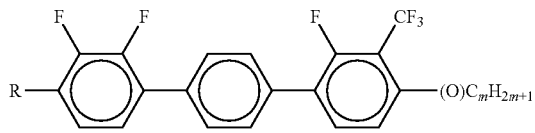
T13
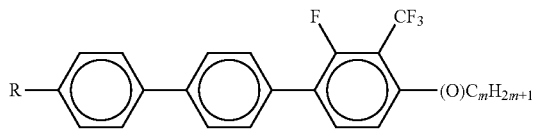
T14
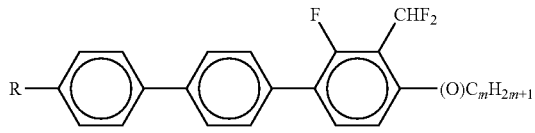
T15
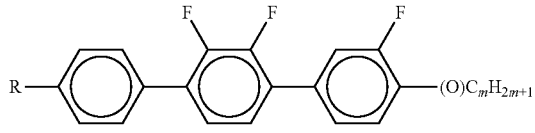
T16
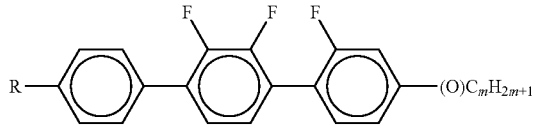
T17
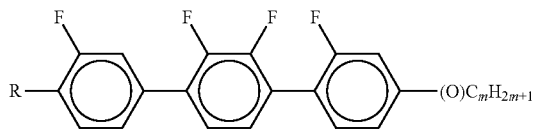
T18
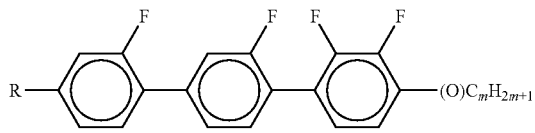

-continued

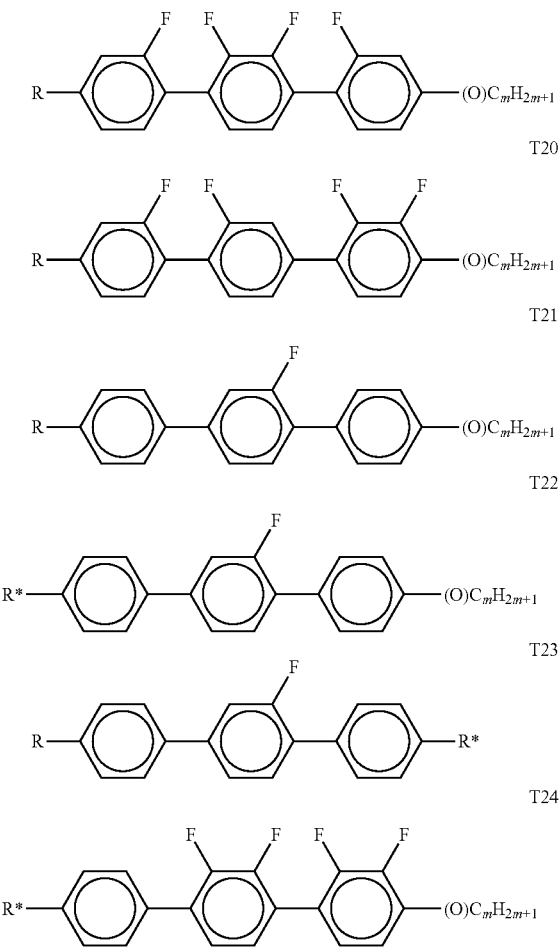

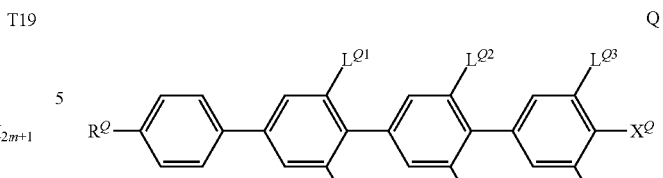

in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

R preferably denotes methyl, ethyl, propyl, butyl, pentyl, hexyl, methoxy, ethoxy, propoxy, butoxy or pentoxy.

The LC host mixture according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in LC media according to the invention if the Δn value of the mixture is to be 0.1. Preferred LC media comprise 2-20% by weight of one or more terphenyl compounds of the formula T, preferably selected from the group of compounds T1 to T22.

k) LC medium wherein component B) or the LC host mixture additionally comprises one or more quaterphenyl compounds selected from the group consisting of the following formulae:

wherein
$R^Q$ is alkyl, alkoxy, oxaalkyl or alkoxyalkyl having 1 to 9 C atoms or alkenyl or alkenyloxy having 2 to 9 C atoms, all of which are optionally fluorinated,
$X^Q$ is F, Cl, halogenated alkyl or alkoxy having 1 to 6 C atoms or halogenated alkenyl or alkenyloxy having 2 to 6 C atoms,
$L^{Q1}$ to $L^{Q6}$ independently of each other are H or F, with at least one of $L^{Q1}$ to $L^{Q6}$ being F.

Preferred compounds of formula Q are those wherein $R^Q$ denotes straight-chain alkyl with 2 to 6 C-atoms, very preferably ethyl, n-propyl or n-butyl.

Preferred compounds of formula Q are those wherein $L^{Q3}$ and $L^{Q4}$ are F. Further preferred compounds of formula Q are those wherein $L^{Q3}$, $L^{Q4}$ and one or two of $L^{Q1}$ and $L^{Q2}$ are F.

Preferred compounds of formula Q are those wherein $X^Q$ denotes F or $OCF_3$, very preferably F.

The compounds of formula Q are preferably selected from the following subformulae

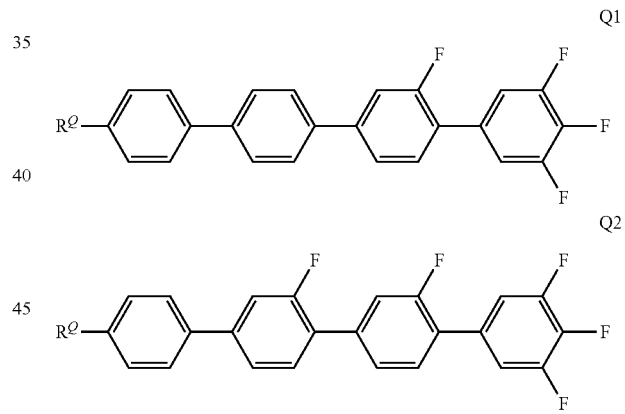

wherein $R^Q$ has one of the meanings of formula Q or one of its preferred meanings given above and below, and is preferably ethyl, n-propyl or n-butyl.

Especially preferred are compounds of formula Q1, in particular those wherein $R^Q$ is n-propyl.

Preferably the proportion of compounds of formula Q in the LC host mixture is from >0 to ≤5% by weight, very preferably from 0.1 to 2% by weight, most preferably from 0.2 to 1.5% by weight.

Preferably the LC host mixture contains 1 to 5, preferably 1 or 2 compounds of formula Q.

The addition of quaterphenyl compounds of formula Q to the LC host mixture enables to reduce ODF mura, whilst maintaining high UV absorption, enabling quick and complete polymerisation, enabling strong and quick tilt angle generation, and increasing the UV stability of the LC medium.

Besides, the addition of compounds of formula Q, which have positive dielectric anisotropy, to the LC medium with negative dielectric anisotropy allows a better control of the values of the dielectric constants $\varepsilon_\|$ and $\varepsilon_\perp$, and in particular enables to achieve a high value of the dielectric constant $\varepsilon_\|$ while keeping the dielectric anisotropy $\Delta\varepsilon$ constant, thereby reducing the kick-back voltage and reducing image sticking.

l) LC medium wherein component B) or the LC host mixture additionally comprises one or more compounds of formula CC:

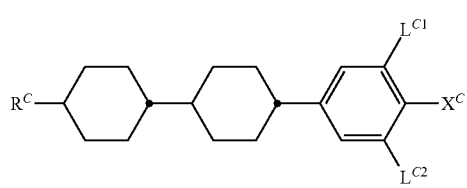

CC wherein
$R^C$ denotes alkyl, alkoxy, oxaalkyl or alkoxyalkyl having 1 to 9 C atoms or alkenyl or alkenyloxy having 2 to 9 C atoms, all of which are optionally fluorinated,
$X^C$ denotes F, Cl, halogenated alkyl or alkoxy having 1 to 6 C atoms or halogenated alkenyl or alkenyloxy having 2 to 6 C atoms,
$L^{C1}$, $L^{C2}$ independently of each other denote H or F, with at least one of $L^{C1}$ and $L^{C2}$ being F.

Preferred compounds of formula CC are those wherein $R^C$ denotes straight-chain alkyl with 2 to 6 C-atoms, very preferably ethyl, n-propyl or n-butyl.

Preferred compounds of formula CC are those wherein $L^{C1}$ and $L^{C2}$ are F.

Preferred compounds of formula CC are those wherein $X^C$ denotes F or $OCF_3$, very preferably F.

Preferred compounds of formula CC are selected from the following formula

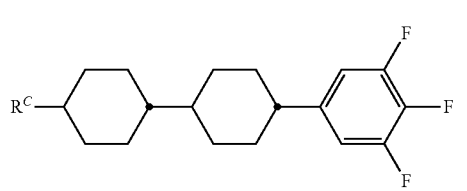

CC1 wherein $R^C$ has one of the meanings of formula CC or one of its preferred meanings given above and below, and is preferably ethyl, n-propyl or n-butyl, very preferably n-propyl.

Preferably the proportion of compounds of formula CC in the LC host mixture is from >0 to ≤10% by weight, very preferably from 0.1 to 8% by weight, most preferably from 0.2 to 5% by weight.

Preferably the LC host mixture contains 1 to 5, preferably 1, 2 or 3 compounds of formula CC.

The addition of compounds of formula CC, which have positive dielectric anisotropy, to the LC medium with negative dielectric anisotropy allows a better control of the values of the dielectric constants $\varepsilon_\|$ and $\varepsilon_\perp$, and in particular enables to achieve a high value of the dielectric constant $\varepsilon_\|$ while keeping the dielectric anisotropy $\Delta\varepsilon$ constant, thereby reducing the kick-back voltage and reducing image sticking.

Besides, the addition of compounds of formula CC enables to reduce the viscosity and the response time of the LC medium.

m) LC medium wherein component B) or the LC host mixture additionally comprises one or more compounds selected from the group consisting of the following formulae:

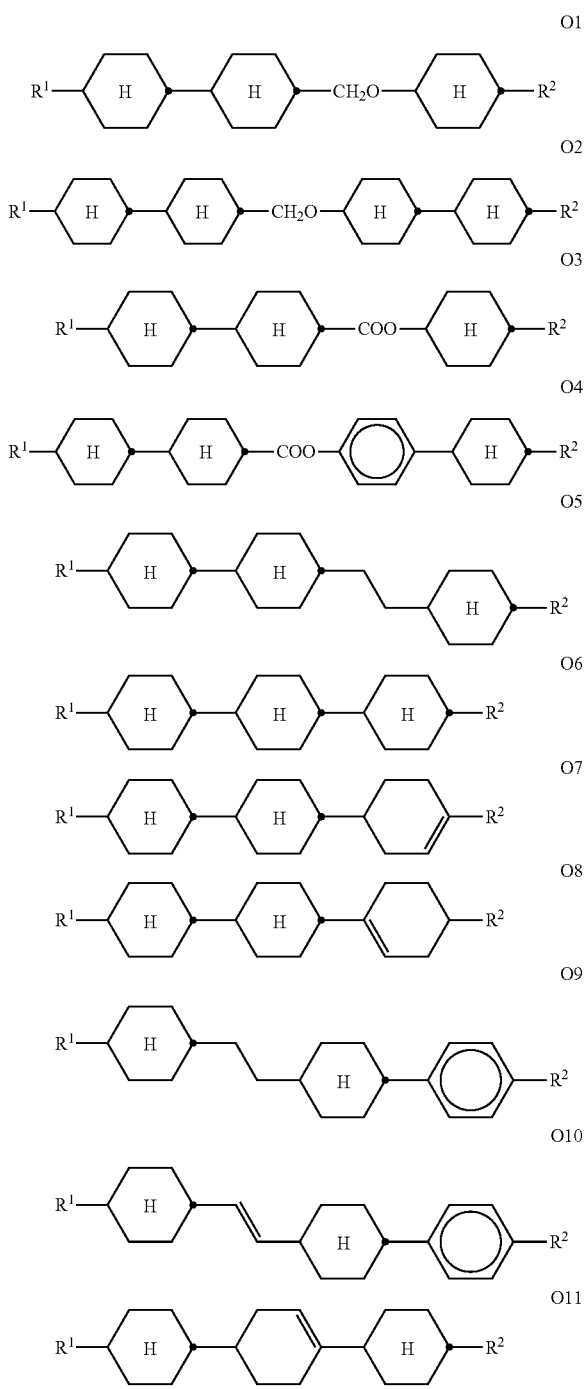

in which $R^1$ and $R^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

n) LC medium wherein component B) or the LC host mixture additionally comprises one or more compounds of the following formula:

$$R^7-[L]_q-\text{(indane with F, F, F, (F), R}^9\text{)}$$ FI in which

—[L]— denotes —[H]—,

[tetrahydropyran isomers], [tetrahydropyran isomers],

[cyclohexene isomers], [cyclohexene isomers],

[dioxane isomers], [dioxane isomers],

[dithiane isomers], [dithiane isomers],

[oxathiane], $R^9$ denotes H, $CH_3$, $C_2H_5$ or n-$C_3H_7$, (F) denotes an optional fluorine substituent, and q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula FI are selected from the group consisting of the following sub-formulae:

FI1: $R^7-[H]-$(indane with F, F, F)

FI2: $R^7-[H]-$(indane with F, F, F, F)

FI3: $R^7-[H]-[H]-$(indane with F, F, F)

FI4: $R^7-[H]-[H]-$(indane with F, F, F, F)

FI5: $R^7-[H]-$(indane with F, F, F, $R^9$)

FI6: $R^7-[H]-$(indane with F, F, F, F, $R^9$)

FI7: $R^7-[H]-[H]-$(indane with F, F, F, $R^9$)

FI8: $R^7-[H]-[H]-$(indane with F, F, F, F, $R^9$)

in which $R^7$ preferably denotes straight-chain alkyl, and $R^9$ denotes $CH_3$, $C_2H_5$ or n-$C_3H_7$. Particular preference is given to the compounds of the formulae FI1, FI2 and FI3.

o) LC medium wherein component B) or the LC host mixture additionally comprises one or more compounds selected from the group consisting of the following formulae:

VK1: $R^8-[H]-$[phenyl(F,F)]-[phenyl]-[H]-alkyl

VK2: $R^8-[H]-$[phenyl(F,F)]-[phenyl(F,F)]-[H]-alkyl

-continued

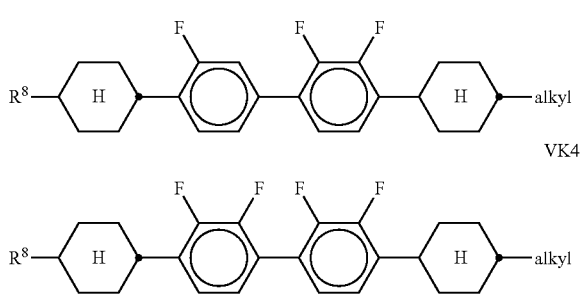

VK3

VK4 in which R⁸ has the meaning indicated for R¹, and alkyl denotes a straight-chain alkyl radical having 1-6 C atoms.

p) LC medium wherein component B) or the LC host mixture additionally comprises one or more compounds which contain a tetrahydronaphthyl or naphthyl unit, such as, for example, the compounds selected from the group consisting of the following formulae:

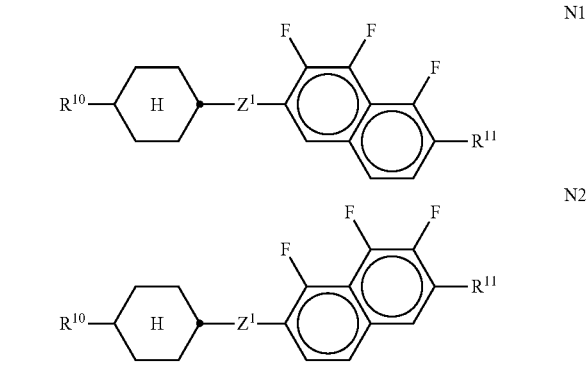

N1

N2

N3

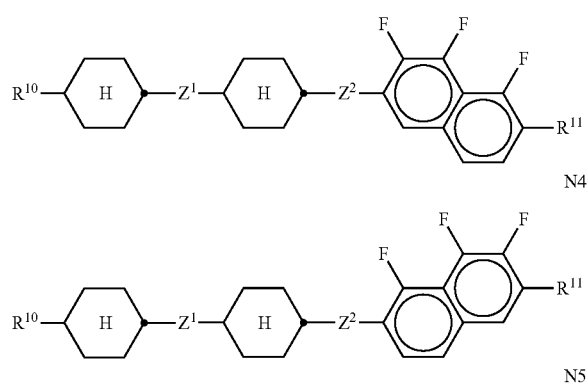

N4

N5

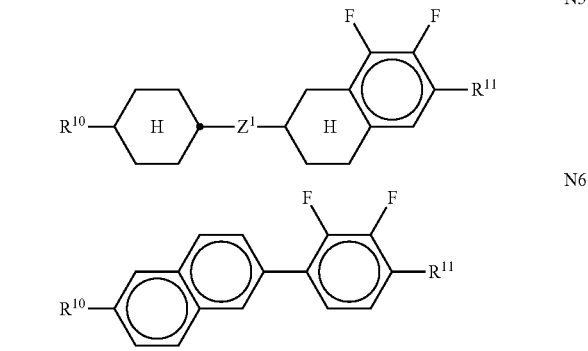

N6

-continued

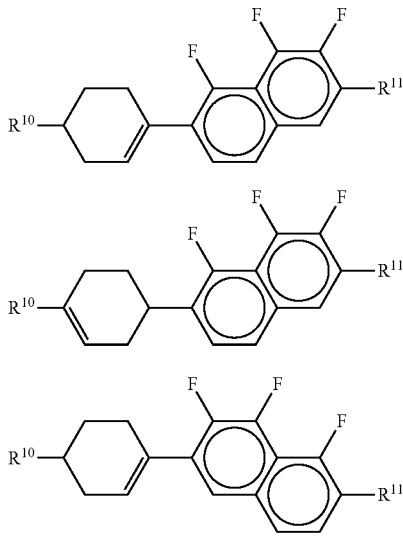

N7

N8

N9

N10 in which

R¹⁰ and R¹¹ each, independently of one another, denote alkyl having 1 to 12 C atoms, where, in addition, one or two non-adjacent CH₂ groups may be replaced by —O—, —CH=CH—, —CO—, —OCO— or —COO— in such a way that O atoms are not linked directly to one another, preferably alkyl or alkoxy having 1 to 6 C atoms, and R¹⁰ and R¹¹ preferably denote straight-chain alkyl or alkoxy having 1 to 6 C atoms or straight-chain alkenyl having 2 to 6 C atoms, and Z¹ and Z² each, independently of one another, denote —C₂H₄—, —CH=CH—, —(CH₂)₄—, —(CH₂)₃O—, —O(CH₂)₃—, —CH=CH—CH₂CH₂—, —CH₂CH₂CH=CH—, —CH₂O—, —OCH₂—, —CO—O—, —O—CO—, —C₂F₄—, —CF=CF—, —CF=CH—, —CH=CF—, —CH₂— or a single bond.

q) LC medium wherein component B) or the LC host mixture additionally comprises one or more difluorodibenzochromans and/or chromans of the following formulae:

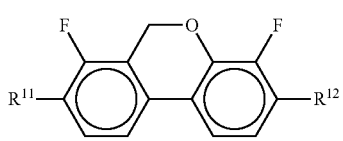

BC

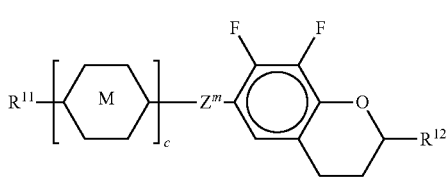

CR

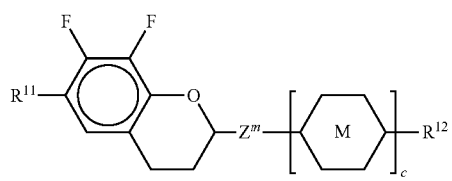
RC in which
R$^{11}$ and R$^{12}$ each, independently of one another, have one of the meanings indicated above for R$^{11}$,
ring M is trans-1,4-cyclohexylene or 1,4-phenylene,
Z$^m$ —C$_2$H$_4$—, —CH$_2$O—, —OCH$_2$—, —CO—O— or —O—CO—,
c is 0, 1 or 2,
preferably in amounts of 3 to 20% by weight, in particular in amounts of 3 to 15% by weight.

Particularly preferred compounds of the formulae BC, CR and RC are selected from the group consisting of the following sub-formulae:

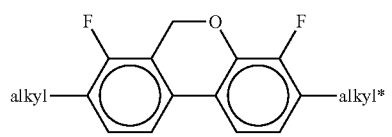
BC1

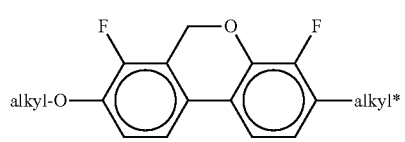
BC2

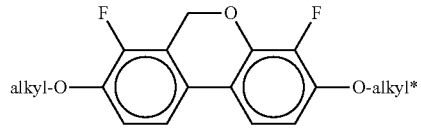
BC3

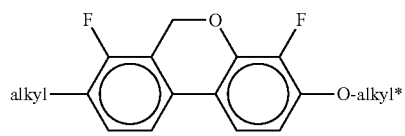
BC4

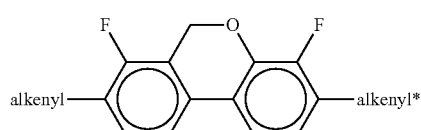
BC5

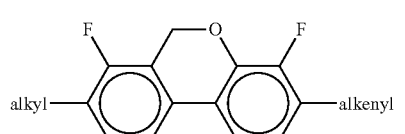
BC6

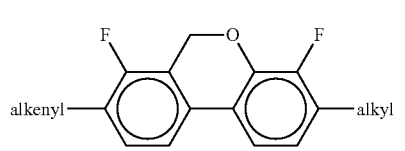
BC7

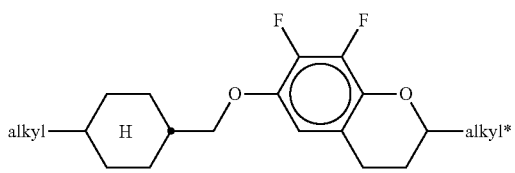
CR1

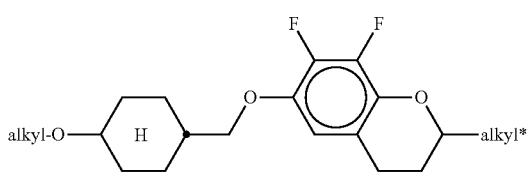
CR2

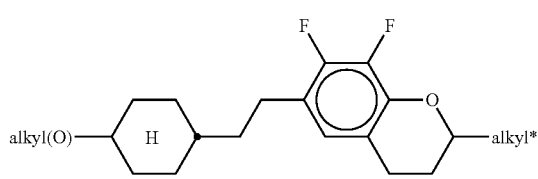
CR3

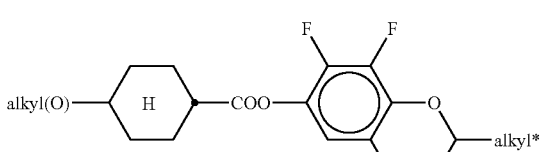
CR4

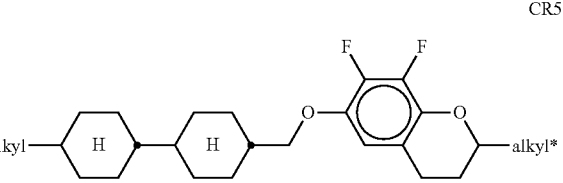
CR5

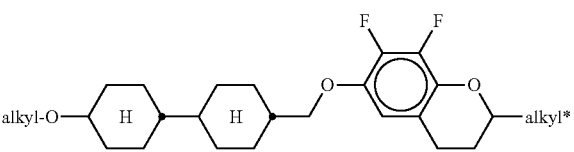
CR6

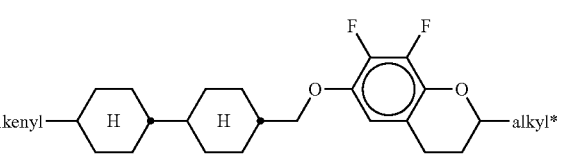
CR7

CR8

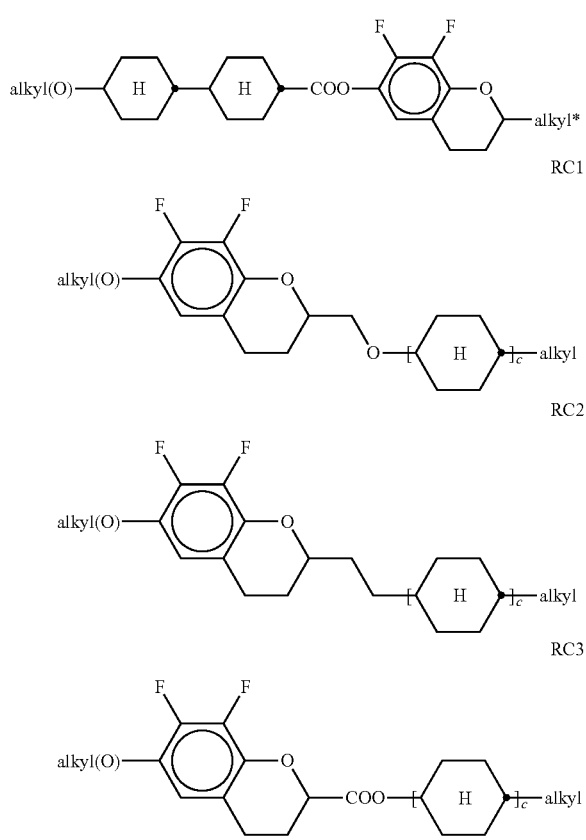

CR9

RC1

RC2

RC3 in which alkyl and alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very particular preference is given to LC host mixtures comprising one, two or three compounds of the formula BC-2.

r) LC medium wherein component B) or the LC host mixture additionally comprises one or more fluorinated phenanthrenes and/or dibenzofurans of the following formulae:

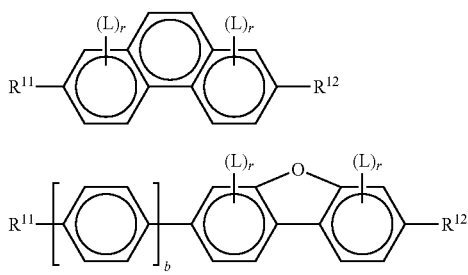

PH

BF in which $R^{11}$ and $R^{12}$ each, independently of one another, have one of the meanings indicated above for $R^{11}$, b denotes 0 or 1, L denotes F, and r denotes 1, 2 or 3.

Particularly preferred compounds of the formulae PH and BF are selected from the group consisting of the following sub-formulae:

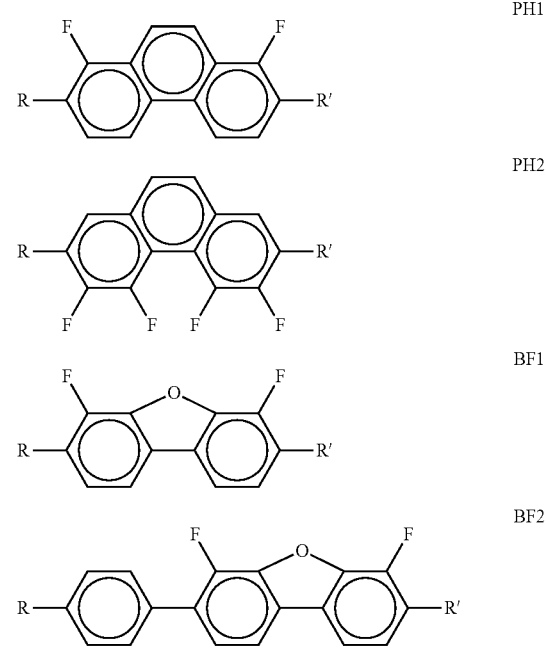

PH1

PH2

BF1

BF2 in which R and R' each, independently of one another, denote a straight-chain alkyl or alkoxy radical having 1-7 C atoms.

s) LC medium wherein component B) or the LC host mixture additionally comprises one or more monocyclic compounds of the following formula

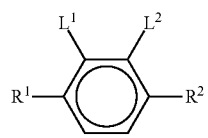

Y wherein $R^1$ and $R^2$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms, $L^1$ and $L^2$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, The compounds of the formula Y are preferably selected from the group consisting of the following sub-formulae:

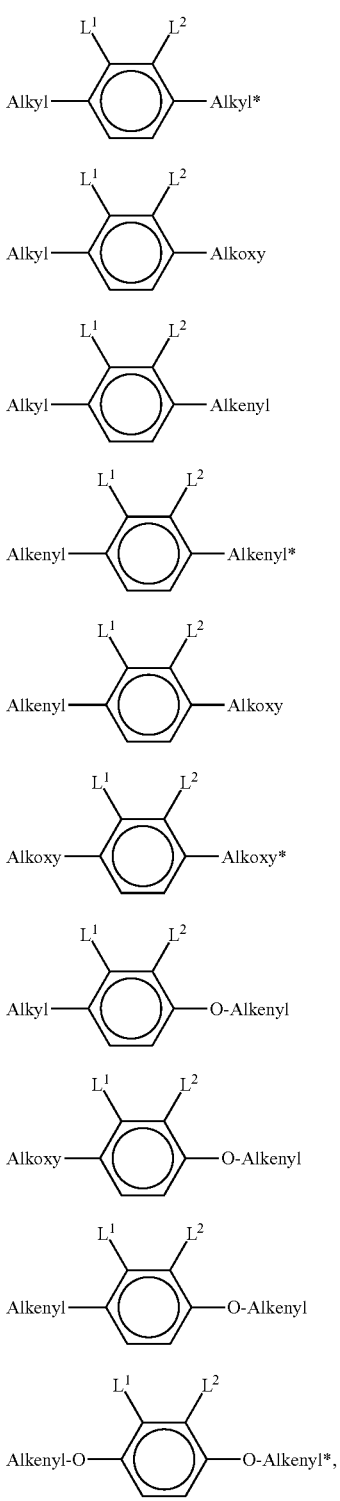

in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms. Alkenyl and Alkenyl* preferably denote $CH_2=CH-$, $CH_2=CHCH_2CH_2-$, $CH_3-CH=CH-$,

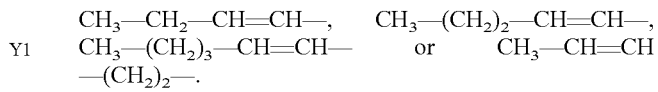

Particularly preferred compounds of the formula Y are selected from the group consisting of the following sub-formulae:

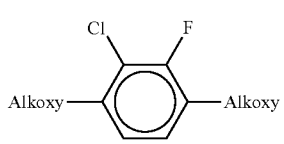

wherein Alkoxy preferably denotes straight-chain alkoxy with 3, 4, or 5 C atoms.

t) LC medium which, apart from the polymerisable compounds as described above and below, does not contain a compound which contains a terminal vinyloxy group ($-O-CH=CH_2$).

u) LC medium wherein component B) or the LC host mixture comprises 1 to 8, preferably 1 to 5, compounds of the formulae CY1, CY2, PY1 and/or PY2. The proportion of these compounds in the LC host mixture as a whole is preferably 5 to 60%, particularly preferably 10 to 35%. The content of these individual compounds is preferably in each case 2 to 20%.

v) LC medium wherein component B) or the LC host mixture comprises 1 to 8, preferably 1 to 5, compounds of the formulae CY9, CY10, PY9 and/or PY10. The proportion of these compounds in the LC host mixture as a whole is preferably 5 to 60%, particularly preferably 10 to 35%. The content of these individual compounds is preferably in each case 2 to 20%.

w) LC medium wherein component B) or the LC host mixture comprises 1 to 10, preferably 1 to 8, compounds of the formula ZK, in particular compounds of the formulae ZK1, ZK2 and/or ZK6. The proportion of these compounds in the LC host mixture as a whole is preferably 3 to 25%, particularly preferably 5 to 45%. The content of these individual compounds is preferably in each case 2 to 20%.

x) LC medium in which the proportion of compounds of the formulae CY, PY and ZK in the LC host mixture as a whole is greater than 70%, preferably greater than 80%.

y) LC medium in which the LC host mixture contains one or more compounds containing an alkenyl group, preferably selected from formulae AN and AY, very preferably selected from formulae AN1, AN3, AN6 and AY14, most preferably from formulae AN1a, AN3a, AN6a and AY14. The concentration of these compounds in the LC host mixture is preferably from 2 to 70%, very preferably from 3 to 55%.

z) LC medium wherein component B) or the LC host mixture contains one or more, preferably 1 to 5, compounds selected of formula PY1-PY8, very preferably of formula PY2. The proportion of these compounds in the LC host mixture as a whole is preferably 1 to 30%, particularly preferably 2 to 20%. The content of these individual compounds is preferably in each case 1 to 20%.

z1) LC medium wherein component B) or the LC host mixture contains one or more, preferably 1, 2 or 3, compounds selected from formulae T1, T2, T3 and T21, very preferably from formula T2. The content of these compounds in the LC host mixture as a whole is preferably 1 to 20%.

z2) LC medium in which the LC host mixture contains one or more, preferably 1, 2 or 3, compounds of formula BF1, and one or more, preferably 1, 2 or 3, compounds selected from formulae AY14, AY15 and AY16, very preferably of formula AY14. The proportion of the compounds of formula AY14-AY16 in the LC host mixture is preferably from 2 to 35%, very preferably from 3 to 30%. The proportion of the compounds of formula BF1 in the LC host mixture is preferably from 0.5 to 20%, very preferably from 1 to 15%. Further preferably the LC host mixture according to this preferred embodiment contains one or more, preferably 1, 2 or 3 compounds of formula T, preferably selected from formula T1, T2 and T3, very preferably from formula T2. The proportion of the compounds of formula T in the LC host mixture medium is preferably from 0.5 to 15%, very preferably from 1 to 10%.

In the LC medium according to the present invention, the use of an LC host mixture together with the use of a polymerisable component comprising a combination of a first, second and third polymerisable compound as described above leads to advantageous properties in LC displays. In particular, one or more of the following advantages could be achieved:

easy and quick formation of polymer walls by polymerisation-induced phase separation of the polymer formed by the first and second polymerisable compounds,
formation of polymer walls with highly defined shape and constant thickness,
constant cell gap,
high flexibility of the display cell in case plastic substrates are used,
high resistance of the display cell against mechanical pressure, and low variation of the cell gap under pressure,
good adhesion of the polymer walls to the substrates,
low number of defects,
reduced formation of domains with different electrooptical properties like response time or contrast,
high transparency,
good contrast,
fast response times.

The display manufacture process is known to the skilled person and is described in the literature, for example in U.S. Pat. No. 6,130,738 and EP2818534 A1.

The present invention also relates to a process for the production of an LC display as described above and below, comprising the steps of providing an LC medium as described above and below into the display, and polymerising the polymerisable compounds in defined regions of the display.

Preferably the polymerisable compounds are photopolymerised by exposure to UV irradiation.

Further preferably the polymerisable compounds are photopolymerised by exposure to UV irradiation through a photomask. The UV radiation can be generated by a variety of light sources which are known to the skilled person, including but not limited to arc lamps, led lights, laser light sources, or others.

The photomask is preferably designed such that it comprises regions that are transparent to the UV radiation used for photopolymerisation, and regions that are not transparent to the UV radiation used for photopolymerisation, and wherein the transparent regions form a pattern or image that corresponds to the desired shape of the polymer walls. As a result the polymerisable compounds are only polymerised in those parts of the display that are covered by the transparent regions of the photomask, thus forming polymer walls of the desired shape.

Alternatively to using a photomask, a light source can be used that emits light with an already shaped profile. Such profile can for example be generated by interference of two laser beams.

In a preferred embodiment of the present invention, the display is subjected to a second UV irradiation step, preferably without a photomask applied, after the first UV irradiation step as described above. Thereby it is possible to complete polymerisation of monomers that were not or only partially polymerised in the first step. The second UV step can have an emission spectrum and/or intensity which is the same as that of the first step, or which is different from the first step.

Alternatively two applying two separate irradiation steps, the intensity is changed during UV exposure. Preferably, the intensity is gradually increased during UV exposure.

For example, an LC display according to the present invention can be manufactured as follows. Polymerisable compounds as described above and below are combined with a suitable LC host mixture. This resulting LC medium can then be included into the display by using conventional manufacturing processes. The resulting LC medium can be filled for example using capillary forces into the cell gap formed by two substrates.

Alternatively, the LC medium can be deposited as a layer onto a substrate, and another substrate is placed on top of the LC layer under vacuum in order to prevent inclusion of air bubbles. The LC medium is in either case located in the cell gap formed by the two substrates, as exemplarily illustrated in FIG. 1a. These substrates usually are covered by an alignment layer which is in direct contact with the LC medium. The substrates itself can carry other functional components like TFTs, black matrix, colour filter, or similar.

Subsequently, polymerization induced phase separation is initiated by exposure of the LC medium, which is either in the nematic or the isotropic phase, to UV radiation with collimated light through a photomask, as exemplarily illustrated in FIG. 1b. This leads to the formation of polymer wall structures, restoration of the LC host, and alignment of the LC phase with the alignment layer, as exemplarily illustrated in FIG. 1c.

This process can advantageously utilize display manufacturing processes that are established in the industry. Thus, both the display filling process, for example by one-drop-filling (ODF), and the radiation initiated polymerization step after sealing the display, which is known for example from polymer stabilised or PS-type display modes like PS-VA, are established techniques in conventional LCD manufacturing.

A preferred LC display of the present invention comprises:
a first substrate including a pixel electrode defining pixel areas, the pixel electrode being connected to a switching element disposed in each pixel area and optionally including a micro-slit pattern, and optionally a first alignment layer disposed on the pixel electrode,
a second substrate including a common electrode layer, which may be disposed on the entire portion of the second substrate facing the first substrate, and optionally a second alignment layer, an LC layer disposed between the first and second substrates and including an LC medium comprising a polymerisable component A) and a liquid-crystalline component B) as described above and below, wherein the polymerisable component A) is polymerised.

The LC display may comprise further elements, like a colour filter, a black matrix, a passivation layer, optical retardation layers, transistor elements for addressing the individual pixels, etc., all of which are well known to the person skilled in the art and can be employed without inventive skill.

The electrode structure can be designed by the skilled person depending on the individual display type. For example for VA displays a multi-domain orientation of the LC molecules can be induced by providing electrodes having slits and/or bumps or protrusions in order to create two, four or more different tilt alignment directions.

The first and/or second alignment layer controls the alignment direction of the LC molecules of the LC layer. For example, in TN displays the alignment layer is selected such that it imparts to the LC molecules an orientation direction parallel to the surface, while in VA displays the alignment layer is selected such that it imparts to the LC molecules a homeotropic alignment, i.e. an orientation direction perpendicular to the surface. Such an alignment layer may for example comprise a polyimide, which may also be rubbed, or may be prepared by a photoalignment method.

The substrate can be a glass substrate, for example in case of a curved display. The use of an LC medium according to the present invention in an LC display with glass substrates can provide several advantages. For example, the formation of polymer wall structures in the LC medium helps to prevent the so-called "pooling effect" where pressure applied on the glass substrates causes unwanted optical defects. The stabilizing effect of the polymer wall structures also allows to further minimize the panel thickness. Moreover, in bent panels with glass substrates the polymer wall structures enable a smaller radius of curvature.

For flexible LC displays preferably plastic substrates are used. These plastic substrates preferably have a low birefringence. Examples are polycarbonate (PC), polyethersulfone (PES), polycyclic olefine (PCO), polyarylate (PAR), polyetheretherketone (PEEK), or colourless polyimide (CPI) substrates.

The LC layer with the LC medium can be deposited between the substrates of the display by methods that are conventionally used by display manufacturers, for example the one-drop-filling (ODF) method. The polymerisable component of the LC medium is then polymerised for example by UV photopolymerisation.

In case the polymerisable compounds are used as a replacement for spacer particles, the display manufacturing process preferably comprises the following steps:

In a first step, the LC medium containing the LC host and monomer precursor is applied to one of the two substrates, preferably by using one of the following deposition methods: one drop filling, ink jet printing, spin coating, slit coating, flexo printing, or a comparable method. The substrate in that instance may carry a colour filter, TFT devices, a black matrix, a polyimide coating, or other components typically found on a display substrate. The applied LC medium forms a thin, uniform film with the thickness of the targeted cell gap of the final device.

In a second step, the applied film is subjected to UV radiation having an intensity profile. This profile is generated for example by irradiating through a photomask, using laser interference, direct laser writing, or a comparable method. Irradiation of the film can either occur from either side of the substrate. In case of using a photomask, the mask can either placed on the substrate and the LC film is cured by the light passing through the substrate, or the mask is directly brought in close proximity to the LC film and the LC medium is cured directly.

In this second step, polymer wall structures are created that function as spacer.

Subsequently, the second substrate, which may also carry colour filter, TFT devices, a black matrix, a polyimide coating, or other components typically found on a display substrate, is place on top of the first substrate so that the LC film comes to rest in between the two substrates.

A further irradiation is now optionally possible to convert unreacted monomers, generate adhesion between the two substrates, and/or seal the edges of the display.

The polymerisation of the polymerisable compounds can be carried out in one step or in two or more steps. It is also possible to carry out the polymerisation in a sequence of several UV irradiation and/or heating or cooling steps. For example, a display manufacturing process may include a first UV irradiation step at room temperature to produce a pretilt angle, and subsequently, in a second polymerisation step to polymerise or crosslink the compounds which have not reacted in the first step ("end curing").

Upon polymerisation the polymerisable compounds react with each other to a polymer which undergoes macroscopical phase-separation from the LC host mixture and forms polymer walls in the LC medium.

Suitable and preferred polymerisation methods are, for example, thermal or photopolymerisation, preferably photopolymerisation, in particular UV induced photopolymerisation, which can be achieved by exposure of the polymerisable compounds to UV radiation.

Optionally one or more polymerisation initiators are added to the LC medium. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If a polymerisation initiator is employed, its proportion is preferably 0.001 to 5% by weight, particularly preferably 0.001 to 1% by weight.

The polymerisable compounds according to the invention are also suitable for polymerisation without an initiator, which is accompanied by considerable advantages, such, for example, lower material costs and in particular less contamination of the LC medium by possible residual amounts of the initiator or degradation products thereof. The polymerisation can thus also be carried out without the addition of an initiator. In a preferred embodiment, the LC medium contains a polymerisation initiator.

The LC medium may also comprise one or more stabilisers or inhibitors in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of RMs or the polymerisable component (component A), is preferably 10-500,000 ppm, particularly preferably 50-50,000 ppm.

Preferably the LC medium according to the present invention does essentially consist of a polymerisable component A) and an LC component B) (or LC host mixture) as described above and below. However, the LC medium may additionally comprise one or more further components or additives.

The LC media according to the invention may also comprise further additives which are known to the person skilled in the art and are described in the literature, such as, for example, polymerisation initiators, inhibitors, stabilisers, surface-active substances or chiral dopants. These may be polymerisable or non-polymerisable. Polymerisable additives are accordingly ascribed to the polymerisable component or component A). Non-polymerisable additives are accordingly ascribed to the non-polymerisable component or component B).

Preferred additives are selected from the list including but not limited to co-monomers, chiral dopants, polymerisation initiators, inhibitors, stabilizers, surfactants, wetting agents, lubricating agents, dispersing agents, hydrophobing agents, adhesive agents, flow improvers, defoaming agents, deaerators, diluents, reactive diluents, auxiliaries, colourants, dyes, pigments and nanoparticles.

In a preferred embodiment the LC media contain one or more chiral dopants, preferably in a concentration from 0.01 to 1% by weight, very preferably from 0.05 to 0.5% by weight. The chiral dopants are preferably selected from the group consisting of compounds from Table B below, very preferably from the group consisting of R- or S-1011, R- or S-2011, R- or S-3011, R- or S-4011, and R- or S-5011.

In another preferred embodiment the LC media contain a racemate of one or more chiral dopants, which are preferably selected from the chiral dopants mentioned in the previous paragraph.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutyl-ammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The LC media which can be used in accordance with the invention are prepared in a manner conventional per se, for example by mixing one or more of the above-mentioned compounds with one or more polymerisable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

Throughout the patent application and in the working examples, the structures of the liquid-crystal compounds are indicated by means of acronyms. Unless indicated otherwise, the transformation into chemical formulae takes place in accordance with Tables I-III. All radicals $C_nH_{2n+1}$, $C_mH_{2m+1}$, $C_nH_{2n}$, $C_mH_{2m}$ and $C_kH_{2k}$ are straight-chain alkyl radicals or alkenyl radicals respectively, in each case having n, m or k C atoms; n and m each, independently of one another, denote 1, 2, 3, 4, 5, 6, 7, 8, 9, 10, 11 or 12, preferably 1, 2, 3, 4, 5 or 6, and k is 0, 1, 2, 3, 4, 5 or 6. In Table I the ring elements of the respective compound are coded, in Table II the bridging members are listed and in Table III the meanings of the symbols for the left-hand and right-hand side chains of the compounds are indicated.

TABLE I

Ring elements

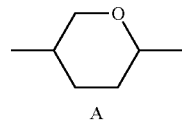

A

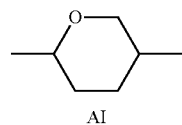

AI

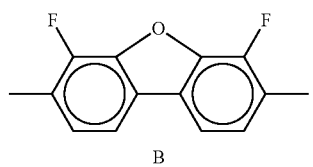

B

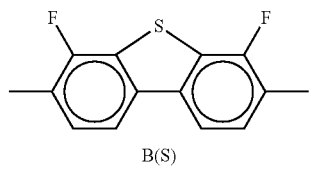

B(S)

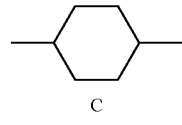

C

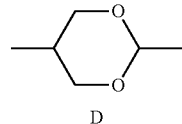

D

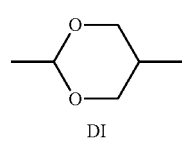

DI

TABLE I-continued
Ring elements
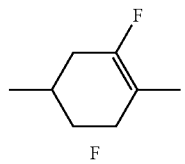
F
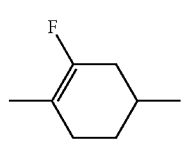
FI
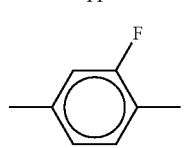
G
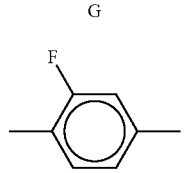
GI
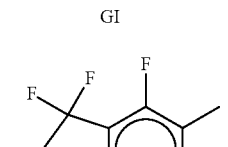
K
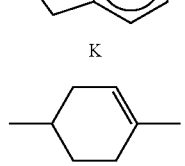
L
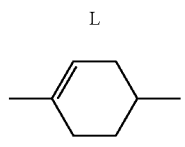
LI
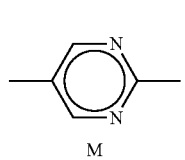
M
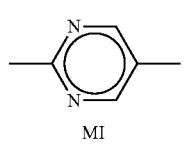
MI
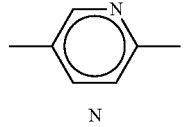
N
TABLE I-continued
Ring elements
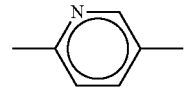
NI
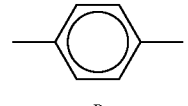
P
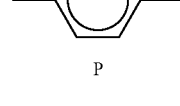
S
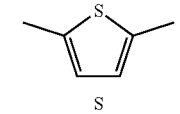
U
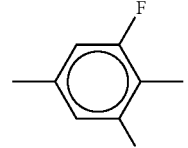
UI
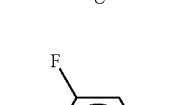
Y
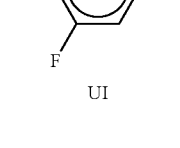
Y(F, Cl)
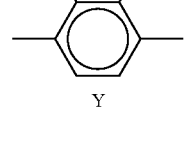
Y(Cl, F)

TABLE II

| | Bridging members | |
|---|---|---|
| E | —CH$_2$CH$_2$— | |
| V | —CH=CH— | |
| T | —C≡C— | |
| W | —CF$_2$CF$_2$— | |
| Z | —COO— | |
| ZI | —OCO— | |
| O | —CH$_2$O— | |
| OI | —OCH$_2$— | |
| Q | —CF$_2$O— | |
| QI | —OCF$_2$— |

TABLE III

| Side chains | | | |
|---|---|---|---|
| Left-hand side chain | | Right-hand side chain | |
| n- | C$_n$H$_{2n+1}$— | -n | —C$_n$H$_{2n+1}$ |
| nO- | C$_n$H$_{2n+1}$—O— | -On | —O—C$_n$H$_{2n+1}$ |
| V— | CH$_2$=CH— | —V | —CH=CH$_2$ |
| nV- | C$_n$H$_{2n+1}$—CH=CH— | -nV | —C$_n$H$_{2n}$—CH=CH$_2$ |
| Vn- | CH$_2$=CH—C$_n$H$_{2n}$— | -Vn | —CH=CH—C$_n$H$_{2n+1}$ |
| nVm- | C$_n$H$_{2n+1}$—CH=CH—C$_m$H$_{2m}$— | -nVm | —C$_n$H$_{2n}$—CH=CH—C$_m$H$_{2m+1}$ |
| N— | N≡C— | —N | —C≡N |
| F— | F— | —F | —F |
| Cl— | Cl— | —Cl | —Cl |
| M- | CFH$_2$— | -M | —CFH$_2$ |
| D- | CF$_2$H— | -D | —CF$_2$H |
| T- | CF$_3$— | -T | —CF$_3$ |
| MO- | CFH$_2$O— | -OM | —OCFH$_2$ |
| DO- | CF$_2$HO— | -OD | —OCF$_2$H |
| TO- | CF$_3$O— | -OT | —OCF$_3$ |
| T- | CF$_3$— | -T | —CF$_3$ |
| A- | H—C≡C— | -A | —C≡C—H |
| FXO- | CF$_2$=CHO— | -OXF | —OCH=CF$_2$ |

Preferred mixture components are shown in Tables A1 and A2 below. The compounds shown in Table A1 are especially suitable for use in LC mixtures with positive dielectric anisotropy. The compounds shown in Table A2 are especially suitable for use in LC mixtures with negative dielectric anisotropy.

TABLE A1

In Table A1, R$^{1*}$ denotes a group selected from the left-hand side chains and R$^{2*}$ denotes a group selected from the right-hand side chains listed in Table III, L$^{1*}$ and L$^{2*}$ are independently of each other H or F, m and n are independently of each other an integer from 1 to 12, preferably 1, 2, 3, 4, or 6, k is 0, 1, 2, 3, 4, 5 or 6, and (O)C$_m$H$_{2m+1}$ means C$_m$H$_{2m+1}$ or OC$_m$H$_{2m+1}$.

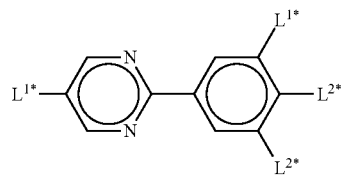

PYP

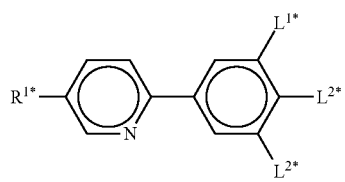

PYRP

TABLE A1-continued

In Table A1, $R^{1*}$ denotes a group selected from the left-hand side chains and $R^{2*}$ denotes a group selected from the right-hand side chains listed in Table III, $L^{1*}$ and $L^{2*}$ are independently of each other H or F, m and n are independently of each other an integer from 1 to 12, preferably 1, 2, 3, 4, or 6, k is 0, 1, 2, 3, 4, 5 or 6, and $(O)C_mH_{2m+1}$ means $C_mH_{2m+1}$ or $OC_mH_{2m+1}$.

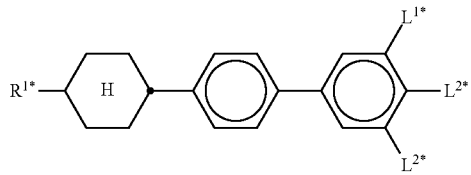

BCH

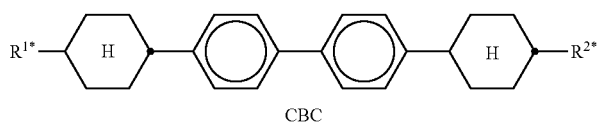

CBC

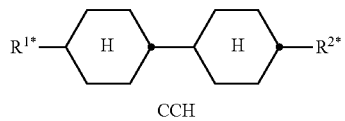

CCH

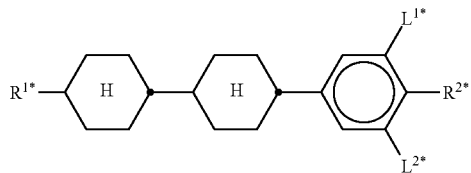

CCP

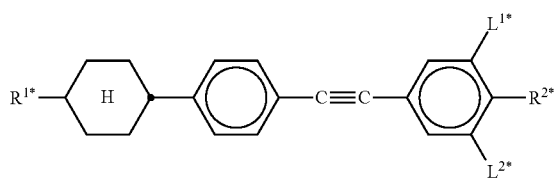

CPTP

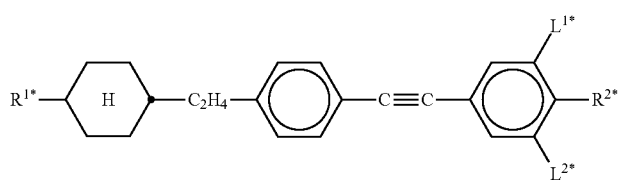

CEPTP

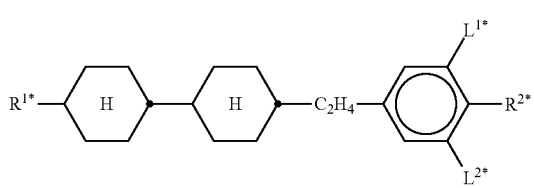

ECCP

TABLE A1-continued

In Table A1, $R^{1*}$ denotes a group selected from the left-hand side chains and $R^{2*}$ denotes a group selected from the right-hand side chains listed in Table III, $L^{1*}$ and $L^{2*}$ are independently of each other H or F, m and n are independently of each other an integer from 1 to 12, preferably 1, 2, 3, 4, or 6, k is 0, 1, 2, 3, 4, 5 or 6, and $(O)C_mH_{2m+1}$ means $C_mH_{2m+1}$ or $OC_mH_{2m+1}$.

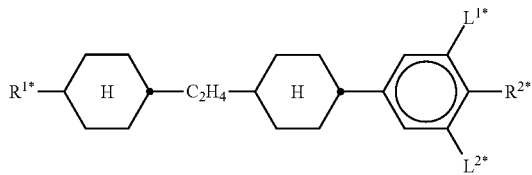

CECP

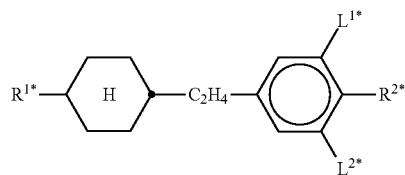

EPCH

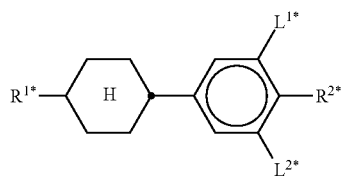

PCH

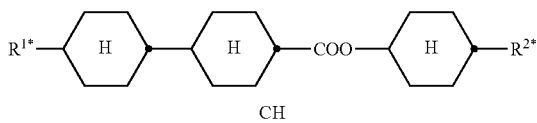

CH

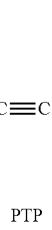

PTP

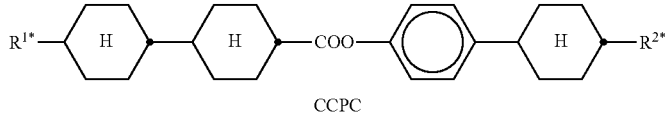

CCPC

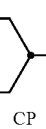

CP

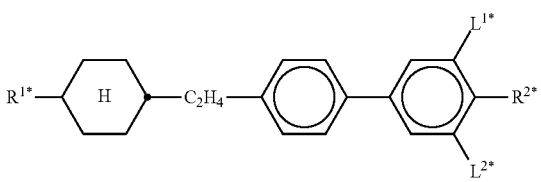

BECH

TABLE A1-continued

In Table A1, $R^{1*}$ denotes a group selected from the left-hand side chains and $R^{2*}$ denotes a group selected from the right-hand side chains listed in Table III, $L^{1*}$ and $L^{2*}$ are independently of each other H or F, m and n are independently of each other an integer from 1 to 12, preferably 1, 2, 3, 4, or 6, k is 0, 1, 2, 3, 4, 5 or 6, and $(O)C_mH_{2m+1}$ means $C_mH_{2m+1}$ or $OC_mH_{2m+1}$.

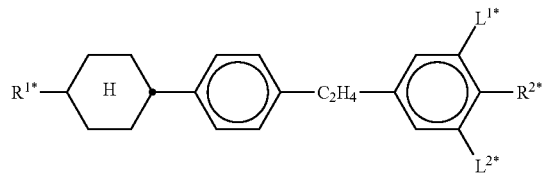

EBCH

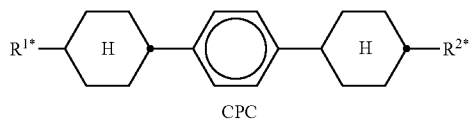

CPC

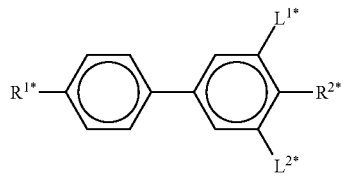

B

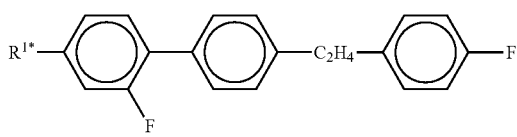

FET-nF

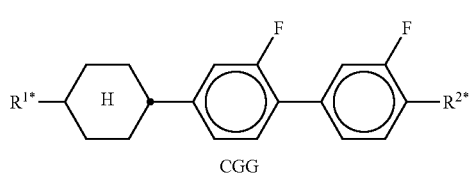

CGG

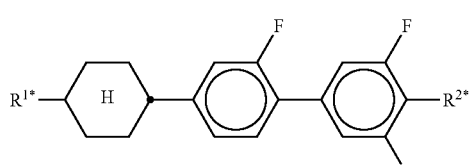

CGU

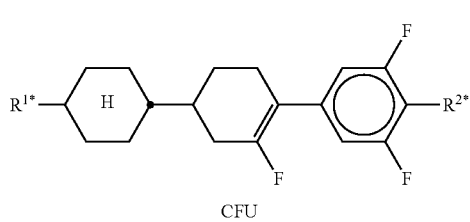

CFU

TABLE A1-continued

In Table A1, $R^{1*}$ denotes a group selected from the left-hand side chains and $R^{2*}$ denotes a group selected from the right-hand side chains listed in Table III, $L^{1*}$ and $L^{2*}$ are independently of each other H or F, m and n are independently of each other an integer from 1 to 12, preferably 1, 2, 3, 4, or 6, k is 0, 1, 2, 3, 4, 5 or 6, and $(O)C_mH_{2m+1}$ means $C_mH_{2m+1}$ or $OC_mH_{2m+1}$.

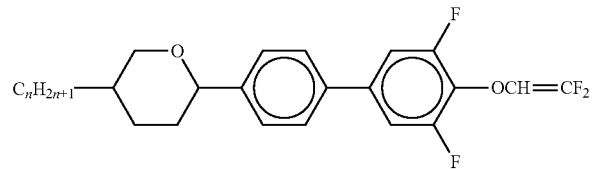

APU-n-OXF

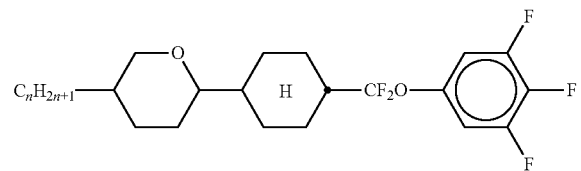

ACQU-n-F

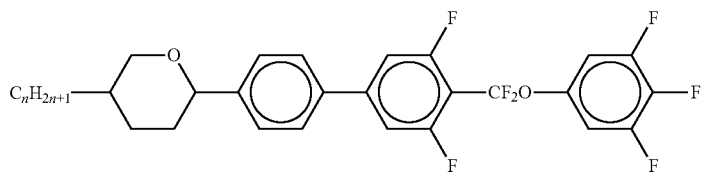

APUQU-n-OXF

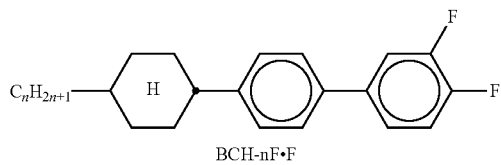

BCH-nF•F

BCH-nF•F•F

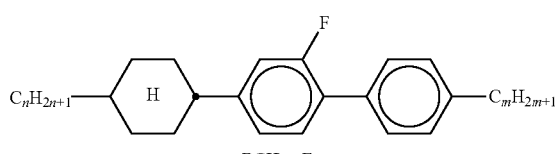

BCH-n•Fm

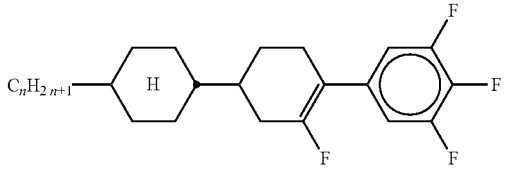

CFU-n-F

TABLE A1-continued
In Table A1, $R^{1*}$ denotes a group selected from the left-hand side chains and $R^{2*}$ denotes a group selected from the right-hand side chains listed in Table III, $L^{1*}$ and $L^{2*}$ are independently of each other H or F, m and n are independently of each other an integer from 1 to 12, preferably 1, 2, 3, 4, or 6, k is 0, 1, 2, 3, 4, 5 or 6, and $(O)C_mH_{2m+1}$ means $C_mH_{2m+1}$ or $OC_mH_{2m+1}$.
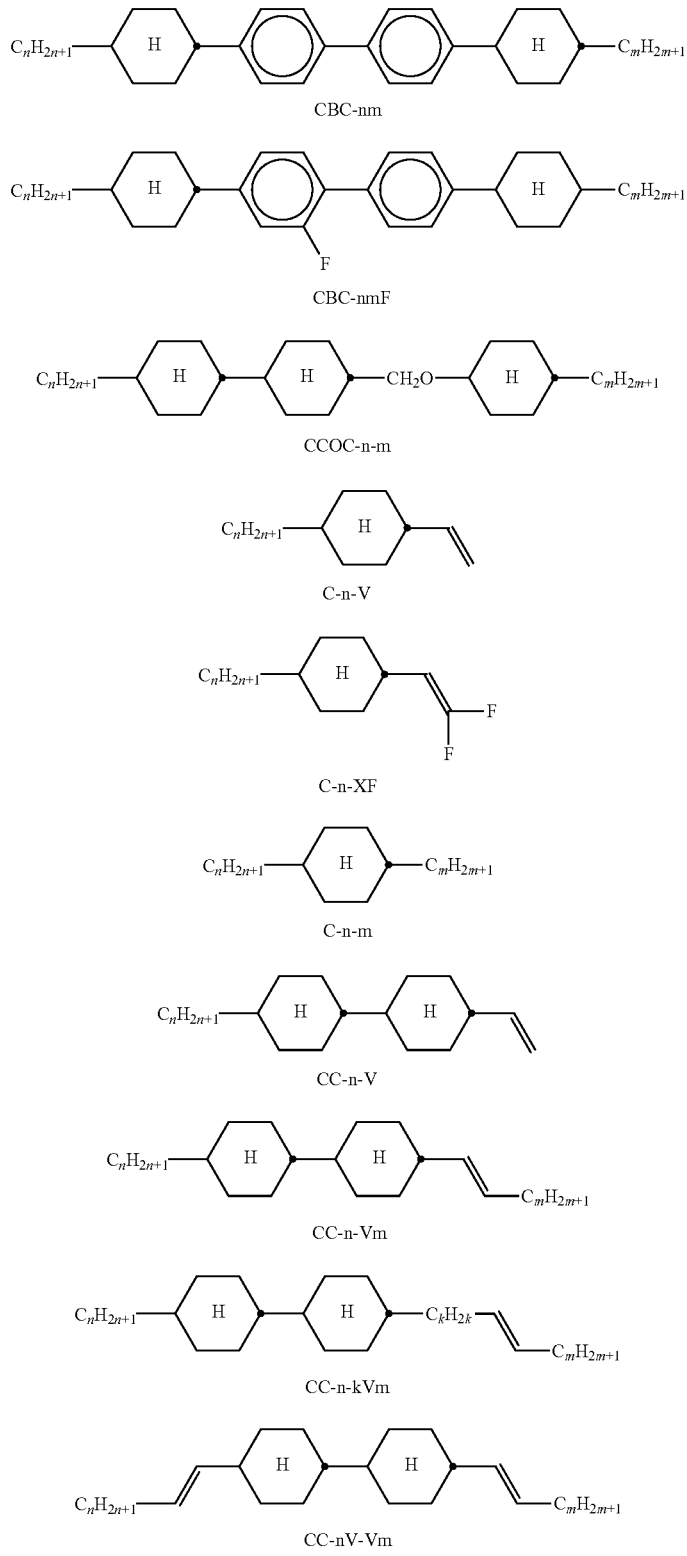

TABLE A1-continued

In Table A1, $R^{1*}$ denotes a group selected from the left-hand side chains and $R^{2*}$ denotes a group selected from the right-hand side chains listed in Table III, $L^{1*}$ and $L^{2*}$ are independently of each other H or F, m and n are independently of each other an integer from 1 to 12, preferably 1, 2, 3, 4, or 6, k is 0, 1, 2, 3, 4, 5 or 6, and $(O)C_mH_{2m+1}$ means $C_mH_{2m+1}$ or $OC_mH_{2m+1}$.

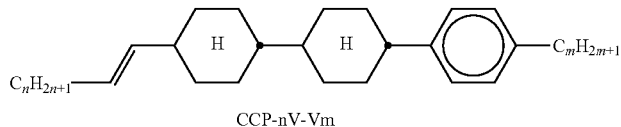

CCP-nV-Vm

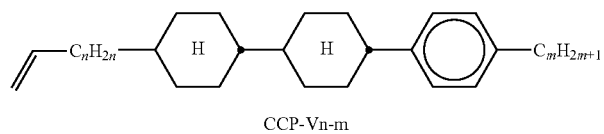

CCP-Vn-m

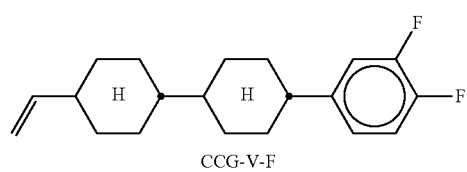

CCG-V-F

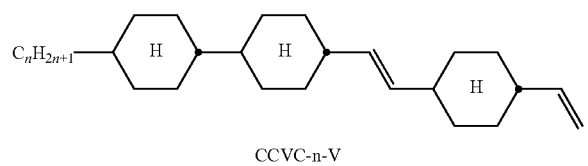

CCVC-n-V

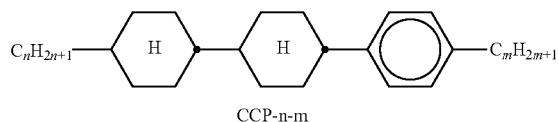

CCP-n-m

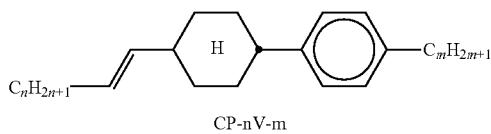

CP-nV-m

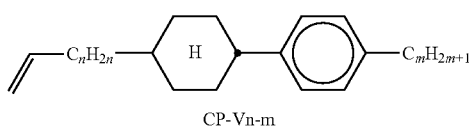

CP-Vn-m

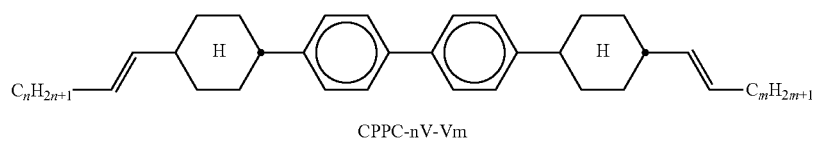

CPPC-nV-Vm

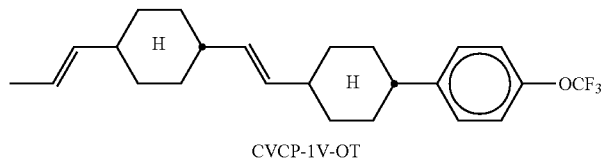

CVCP-1V-OT

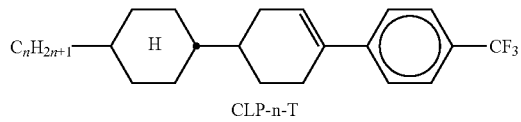

CLP-n-T

TABLE A1-continued
In Table A1, $R^{1*}$ denotes a group selected from the left-hand side chains and $R^{2*}$ denotes a group selected from the right-hand side chains listed in Table III, $L^{1*}$ and $L^{2*}$ are independently of each other H or F, m and n are independently of each other an integer from 1 to 12, preferably 1, 2, 3, 4, or 6, k is 0, 1, 2, 3, 4, 5 or 6, and $(O)C_mH_{2m+1}$ means $C_mH_{2m+1}$ or $OC_mH_{2m+1}$.
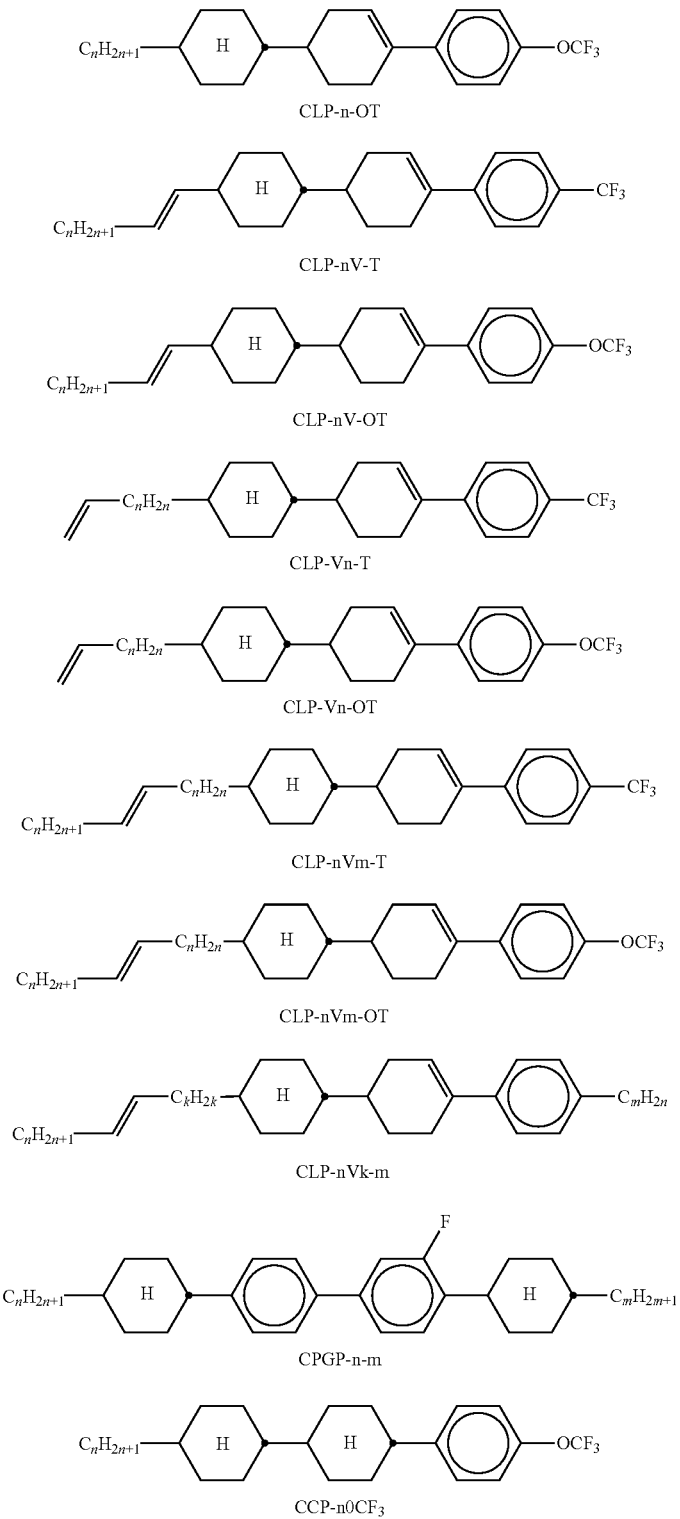

TABLE A1-continued

In Table A1, $R^{1*}$ denotes a group selected from the left-hand side chains and $R^{2*}$ denotes a group selected from the right-hand side chains listed in Table III, $L^{1*}$ and $L^{2*}$ are independently of each other H or F, m and n are independently of each other an integer from 1 to 12, preferably 1, 2, 3, 4, or 6, k is 0, 1, 2, 3, 4, 5 or 6, and $(O)C_mH_{2m+1}$ means $C_mH_{2m+1}$ or $OC_mH_{2m+1}$.

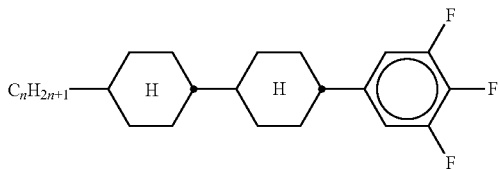

CCP-nF•F•F

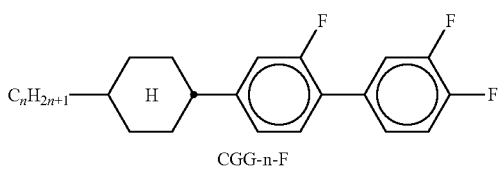

CGG-n-F

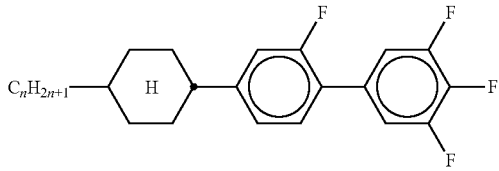

CGU-n-F

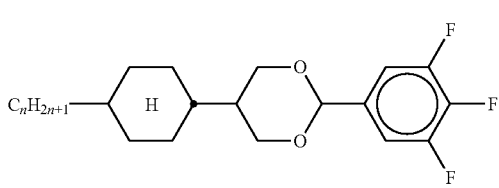

CDU-n-F

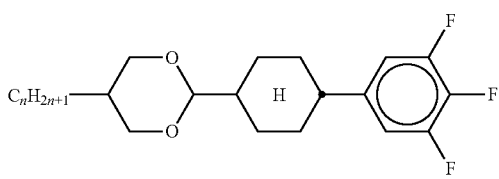

DCU-n-F

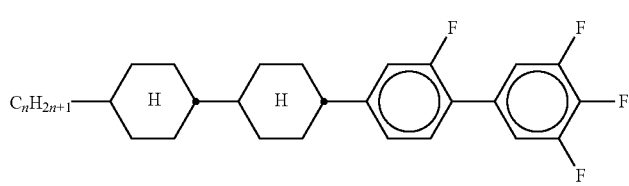

CCGU-n-F

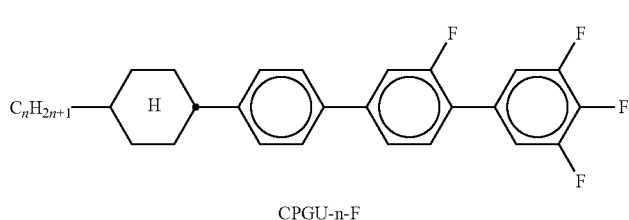

CPGU-n-F

TABLE A1-continued

In Table A1, $R^{1*}$ denotes a group selected from the left-hand side chains and $R^{2*}$ denotes a group selected from the right-hand side chains listed in Table III, $L^{1*}$ and $L^{2*}$ are independently of each other H or F, m and n are independently of each other an integer from 1 to 12, preferably 1, 2, 3, 4, or 6, k is 0, 1, 2, 3, 4, 5 or 6, and $(O)C_nH_{2m+1}$ means $C_mH_{2m+1}$ or $OC_mH_{2m+1}$.

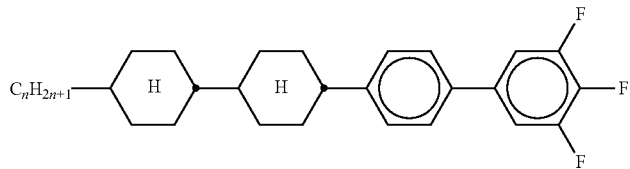

CCPU-n-F

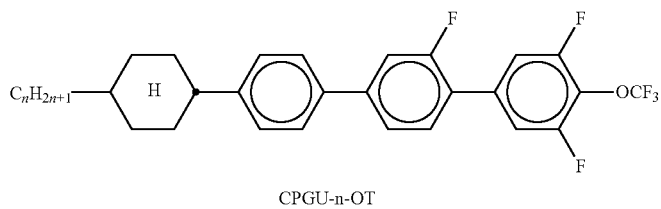

CPGU-n-OT

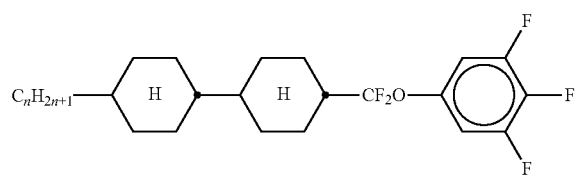

CCQU-n-F

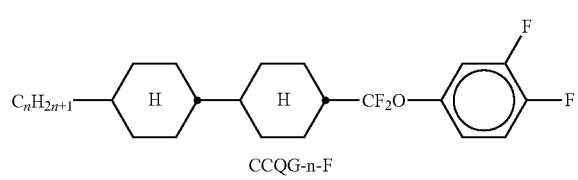

CCQG-n-F

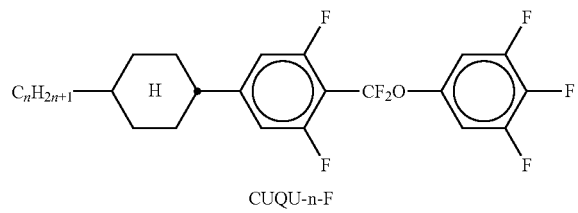

CUQU-n-F

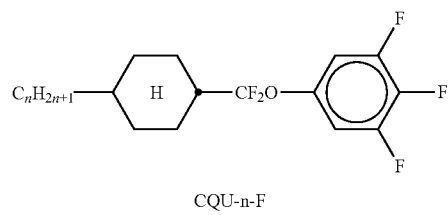

CQU-n-F

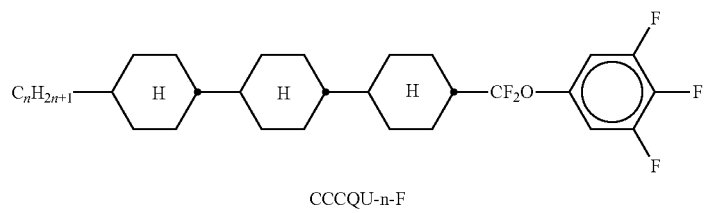

CCCQU-n-F

TABLE A1-continued

In Table A1, $R^{1*}$ denotes a group selected from the left-hand side chains and $R^{2*}$ denotes a group selected from the right-hand side chains listed in Table III, $L^{1*}$ and $L^{2*}$ are independently of each other H or F, m and n are independently of each other an integer from 1 to 12, preferably 1, 2, 3, 4, or 6, k is 0, 1, 2, 3, 4, 5 or 6, and $(O)C_mH_{2m+1}$ means $C_mH_{2m+1}$ or $OC_mH_{2m+1}$.

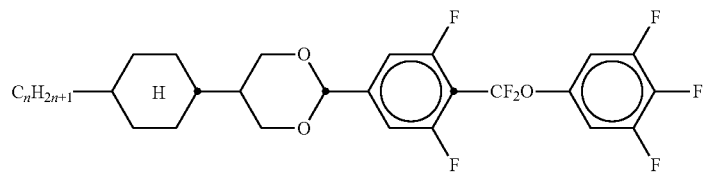

CDUQU-n-F

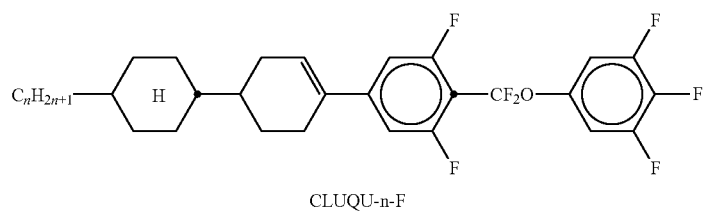

CLUQU-n-F

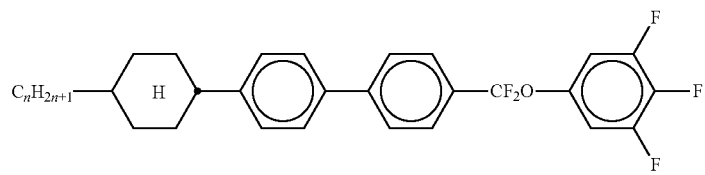

CPPQU-n-F

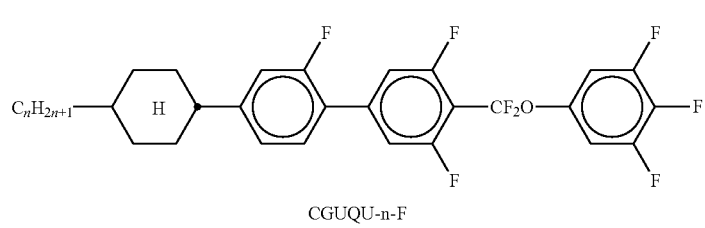

CGUQU-n-F

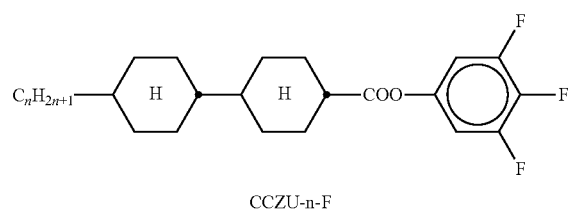

CCZU-n-F

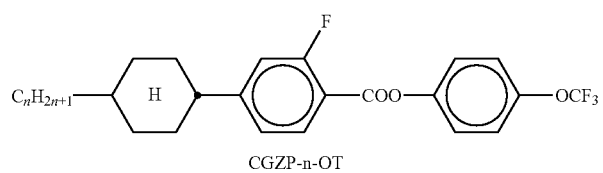

CGZP-n-OT

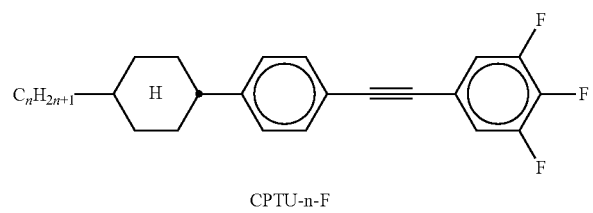

CPTU-n-F

TABLE A1-continued

In Table A1, $R^{1*}$ denotes a group selected from the left-hand side chains and $R^{2*}$ denotes a group selected from the right-hand side chains listed in Table III, $L^{1*}$ and $L^{2*}$ are independently of each other H or F, m and n are independently of each other an integer from 1 to 12, preferably 1, 2, 3, 4, or 6, k is 0, 1, 2, 3, 4, 5 or 6, and $(O)C_mH_{2m+1}$ means $C_mH_{2m+1}$ or $OC_mH_{2m+1}$.

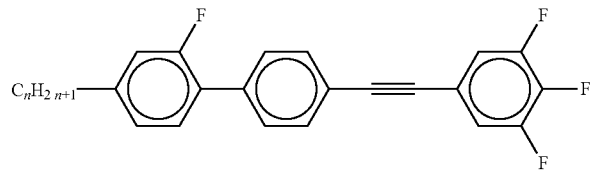

GPTU-n-F

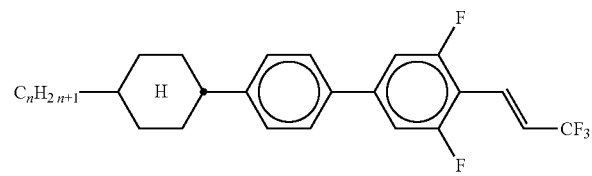

CPU-n-VT

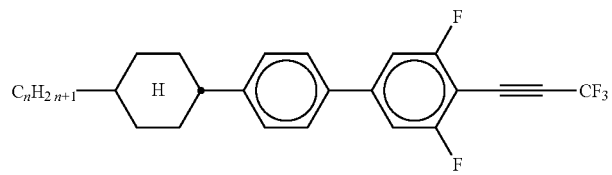

CPU-n-AT

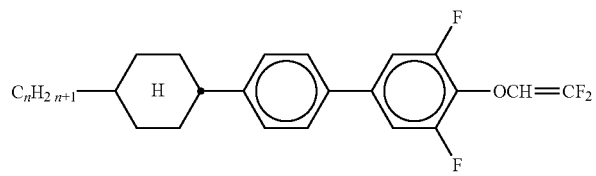

CPU-n-OXF

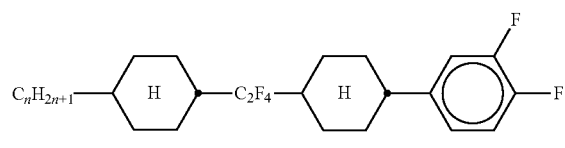

CWCG-n-F

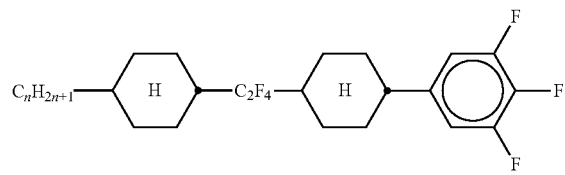

CWCU-n-F

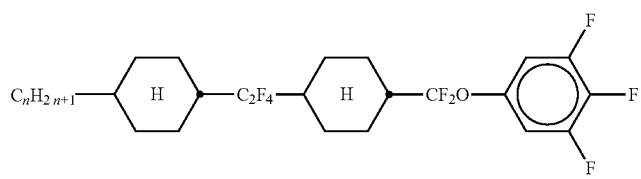

CWCQU-n-F

TABLE A1-continued

In Table A1, $R^{1*}$ denotes a group selected from the left-hand side chains and $R^{2*}$ denotes a group selected from the right-hand side chains listed in Table III, $L^{1*}$ and $L^{2*}$ are independently of each other H or F, m and n are independently of each other an integer from 1 to 12, preferably 1, 2, 3, 4, or 6, k is 0, 1, 2, 3, 4, 5 or 6, and $(O)C_mH_{2m+1}$ means $C_mH_{2m+1}$ or $OC_mH_{2m+1}$.

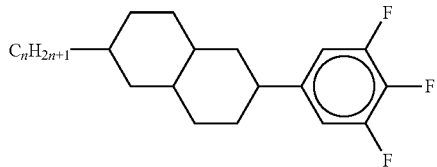

Dec-U-n-F

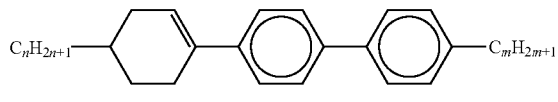

LPP-n-m

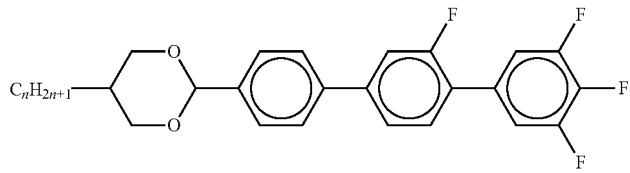

DPGU-n-F

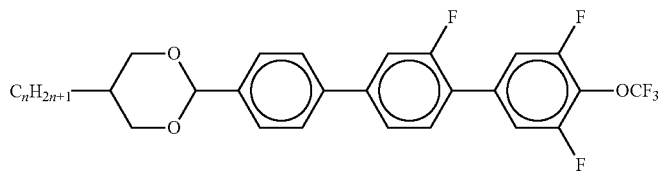

DPGU-n-OT

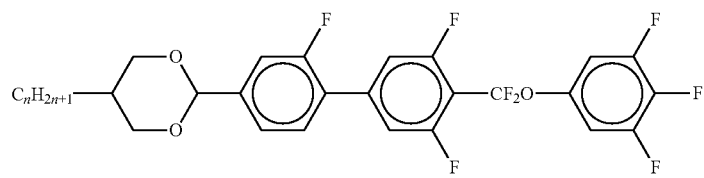

DGUQU-n-F

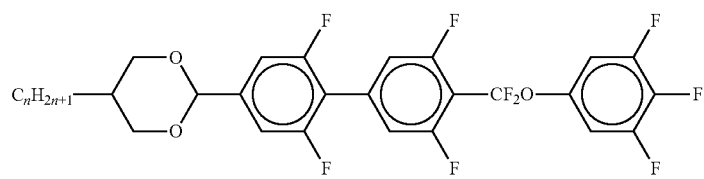

DUUQU-n-F

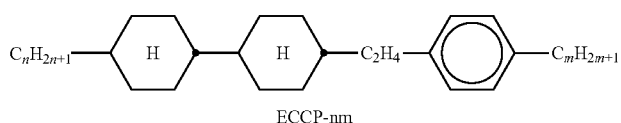

ECCP-nm

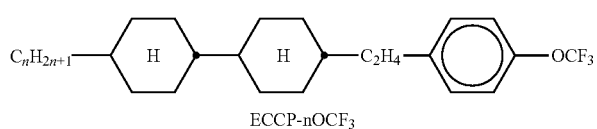

ECCP-nOCF$_3$

TABLE A1-continued

In Table A1, $R^{1*}$ denotes a group selected from the left-hand side chains and $R^{2*}$ denotes a group selected from the right-hand side chains listed in Table III, $L^{1*}$ and $L^{2*}$ are independently of each other H or F, m and n are independently of each other an integer from 1 to 12, preferably 1, 2, 3, 4, or 6, k is 0, 1, 2, 3, 4, 5 or 6, and $(O)C_mH_{2m+1}$ means $C_mH_{2m+1}$ or $OC_mH_{2m+1}$.

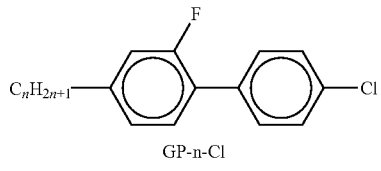

GP-n-Cl

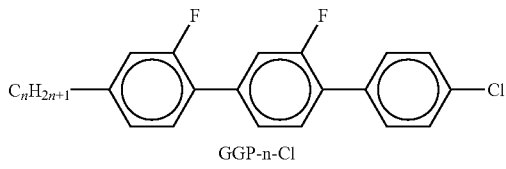

GGP-n-Cl

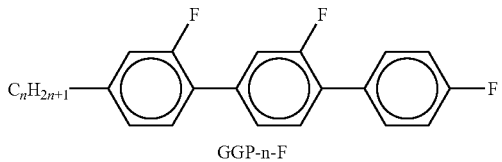

GGP-n-F

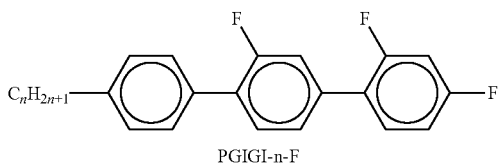

PGIGI-n-F

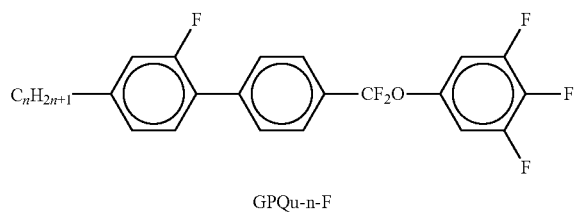

GPQu-n-F

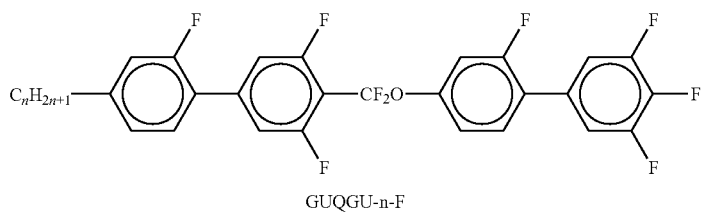

GUQGU-n-F

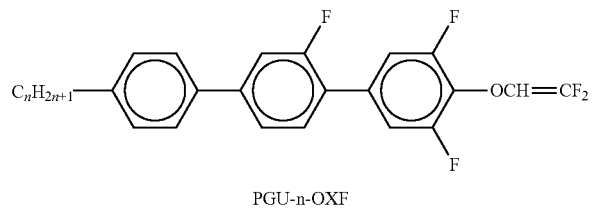

PGU-n-OXF

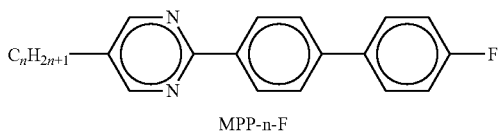

MPP-n-F

TABLE A1-continued

In Table A1, $R^{1*}$ denotes a group selected from the left-hand side chains and $R^{2*}$ denotes a group selected from the right-hand side chains listed in Table III, $L^{1*}$ and $L^{2*}$ are independently of each other H or F, m and n are independently of each other an integer from 1 to 12, preferably 1, 2, 3, 4, or 6, k is 0, 1, 2, 3, 4, 5 or 6, and $(O)C_mH_{2m+1}$ means $C_mH_{2m+1}$ or $OC_mH_{2m+1}$.

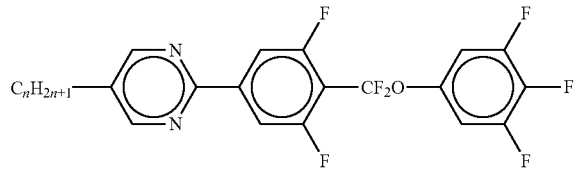

MUQU-n-F

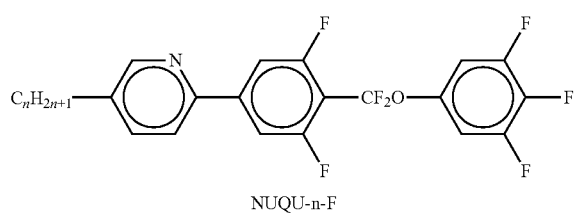

NUQU-n-F

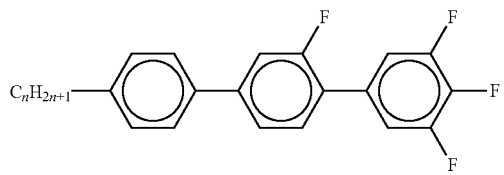

PGU-n-F

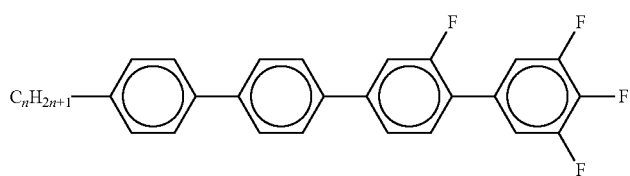

PPGU-n-F

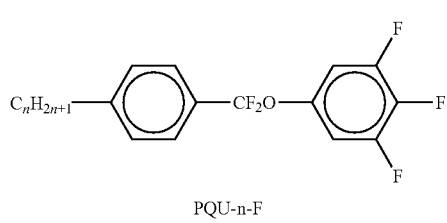

PQU-n-F

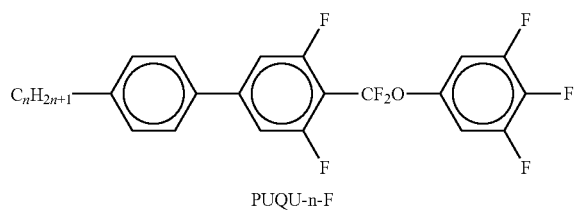

PUQU-n-F

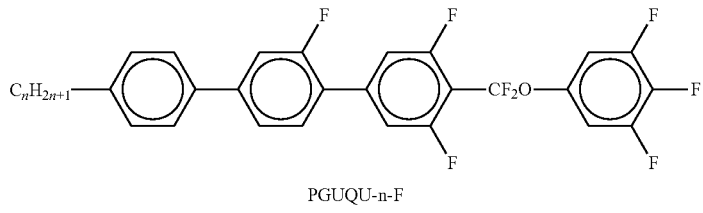

PGUQU-n-F

TABLE A1-continued

In Table A1, $R^{1*}$ denotes a group selected from the left-hand side chains and $R^{2*}$ denotes a group selected from the right-hand side chains listed in Table III, $L^{1*}$ and $L^{2*}$ are independently of each other H or F, m and n are independently of each other an integer from 1 to 12, preferably 1, 2, 3, 4, or 6, k is 0, 1, 2, 3, 4, 5 or 6, and $(O)C_mH_{2m+1}$ means $C_mH_{2m+1}$ or $OC_mH_{2m+1}$.

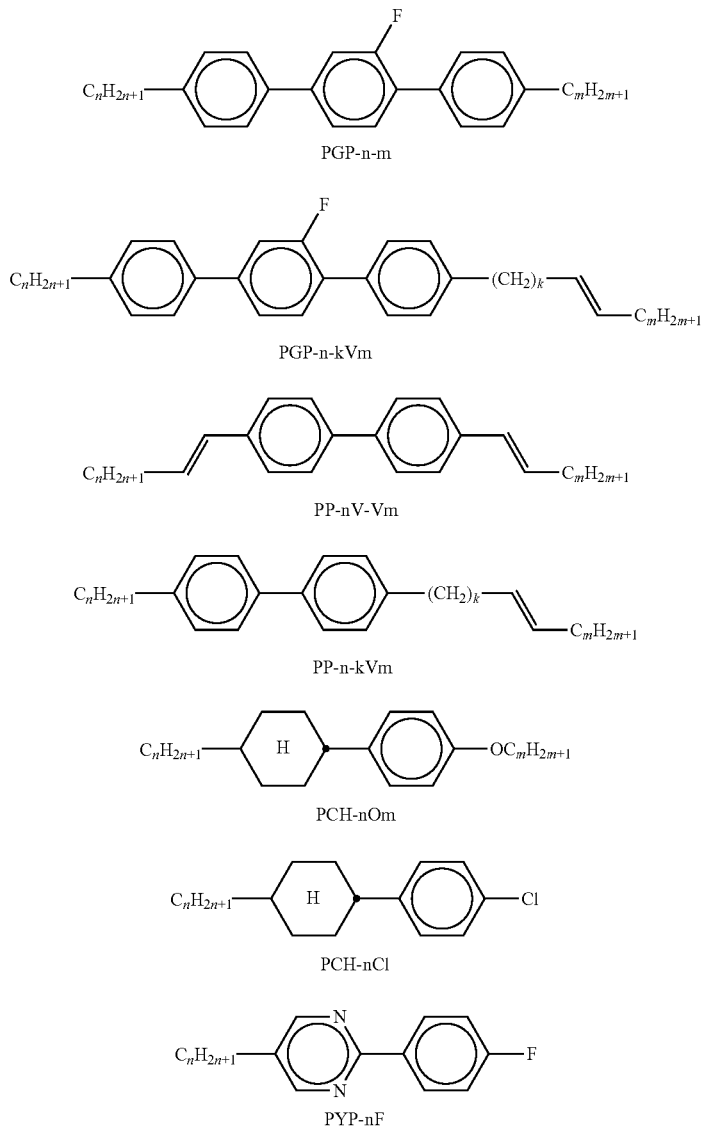

TABLE A2

In the formulae below m and n are independently of each other an integer from 1 to 12, preferably 1, 2, 3, 4, 5 or 6, k is 0, 1, 2, 3, 4, 5 or 6 and $(O)C_mH_{2m+1}$ means $C_mH_{2m+1}$ or $OC_mH_{2m+1}$.

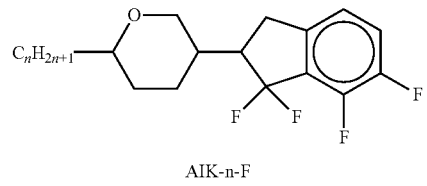

AIK-n-F

TABLE A2-continued
In the formulae below m and n are independently of each other an integer from 1 to 12, preferably 1, 2, 3, 4, 5 or 6, k is 0, 1, 2, 3, 4, 5 or 6 and $(O)C_mH_{2m+1}$ means $C_mH_{2m+1}$ or $OC_mH_{2m+1}$.
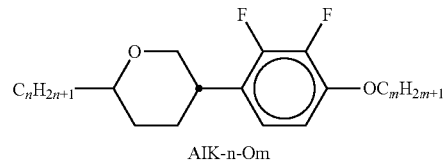
AIK-n-Om
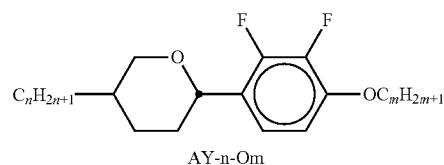
AY-n-Om
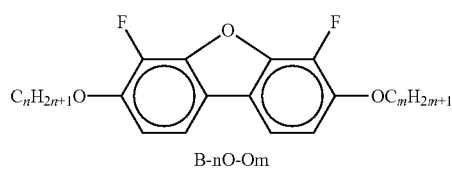
B-nO-Om
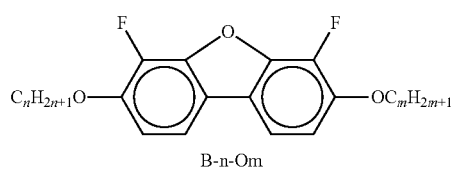
B-n-Om
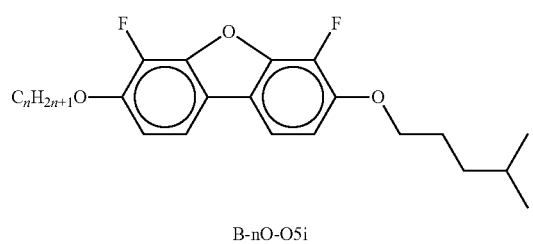
B-nO-O5i
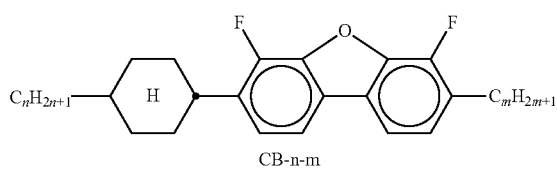
CB-n-m
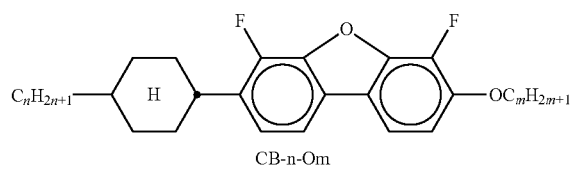
CB-n-Om
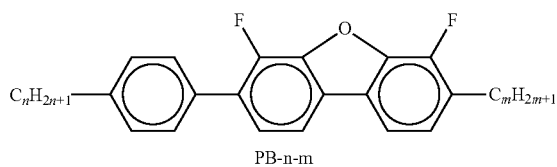
PB-n-m TABLE A2-continued
In the formulae below m and n are independently of each other an integer from 1 to 12, preferably 1, 2, 3, 4, 5 or 6, k is 0, 1, 2, 3, 4, 5 or 6 and $(O)C_mH_{2m+1}$ means $C_mH_{2m+1}$ or $OC_mH_{2m+1}$.
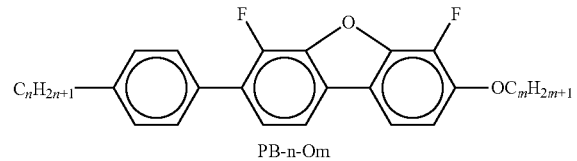
PB-n-Om
BCH-nm
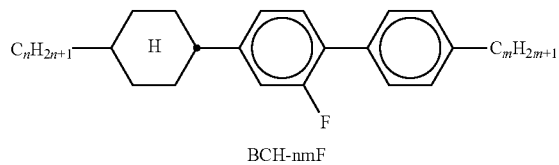
BCH-nmF
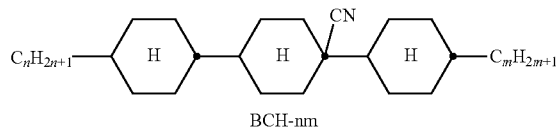
BCH-nm
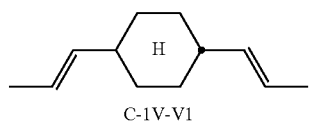
C-1V-V1
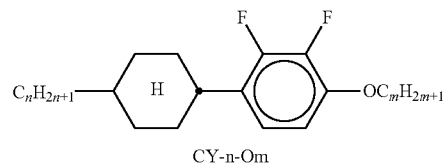
CY-n-Om
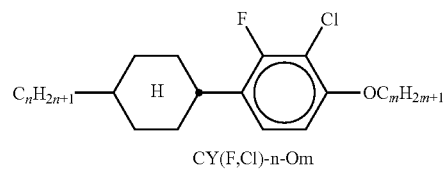
CY(F,Cl)-n-Om
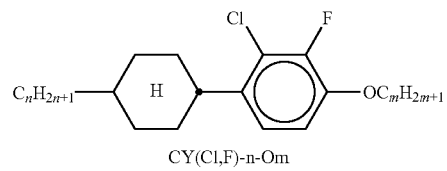
CY(Cl,F)-n-Om
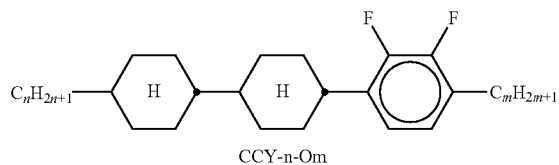
CCY-n-Om TABLE A2-continued
In the formulae below m and n are independently of each other an integer from 1 to 12, preferably 1, 2, 3, 4, 5 or 6, k is 0, 1, 2, 3, 4, 5 or 6 and $(O)C_mH_{2m+1}$ means $C_mH_{2m+1}$ or $OC_mH_{2m+1}$.
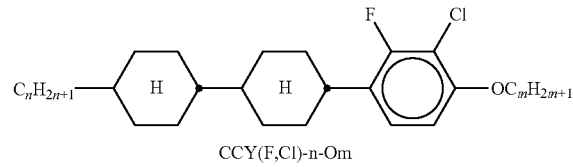
CCY(F,Cl)-n-Om
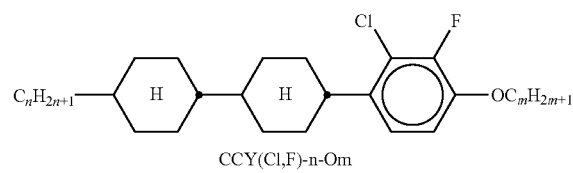
CCY(Cl,F)-n-Om
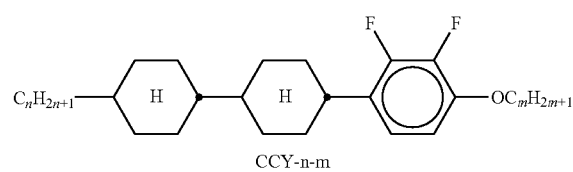
CCY-n-m
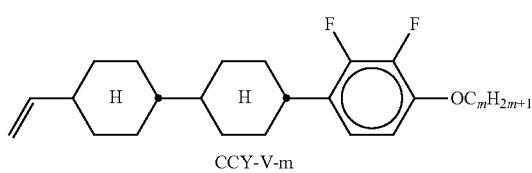
CCY-V-m
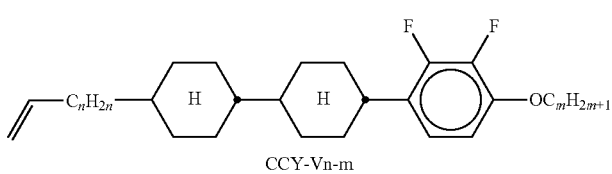
CCY-Vn-m
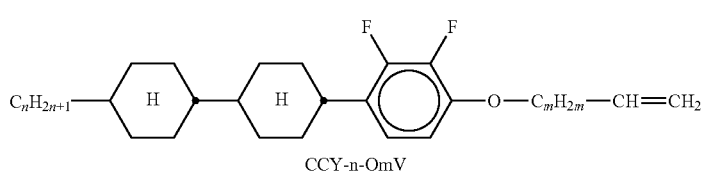
CCY-n-OmV
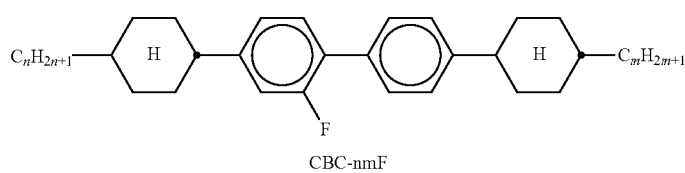
CBC-nmF
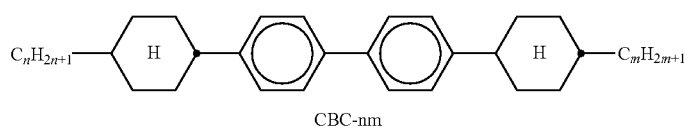
CBC-nm
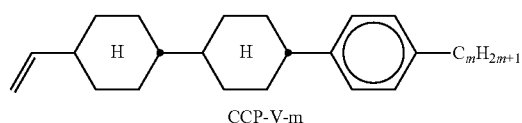
CCP-V-m TABLE A2-continued
In the formulae below m and n are independently of each other an integer from 1 to 12, preferably 1, 2, 3, 4, 5 or 6, k is 0, 1, 2, 3, 4, 5 or 6 and $(O)C_mH_{2m+1}$ means $C_mH_{2m+1}$ or $OC_mH_{2m+1}$.
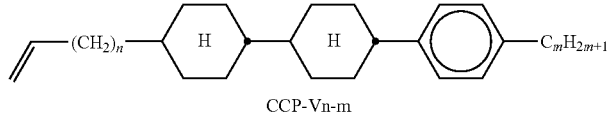
CCP-Vn-m
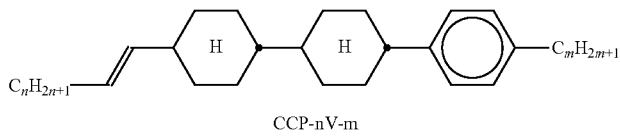
CCP-nV-m
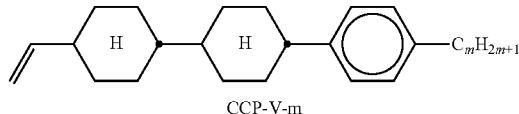
CCP-V-m
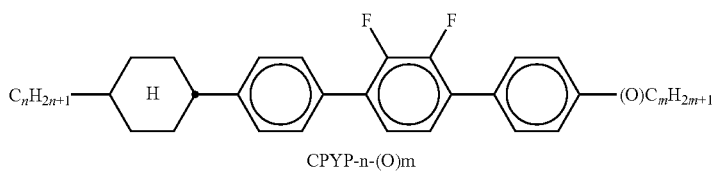
CPYP-n-(O)m
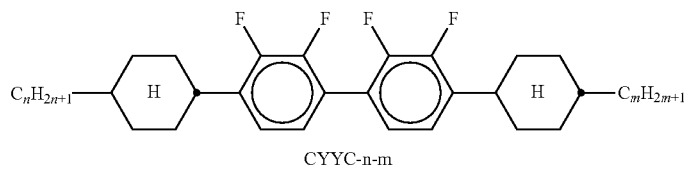
CYYC-n-m
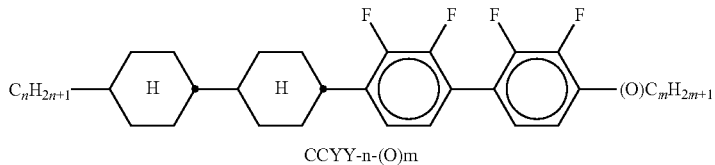
CCYY-n-(O)m
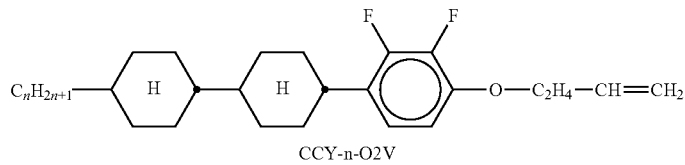
CCY-n-O2V
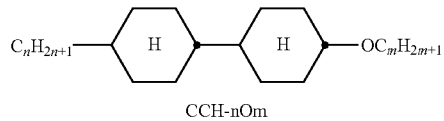
CCH-nOm
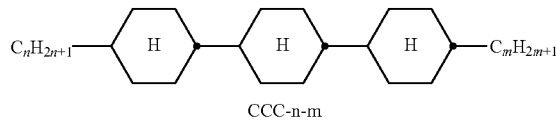
CCC-n-m
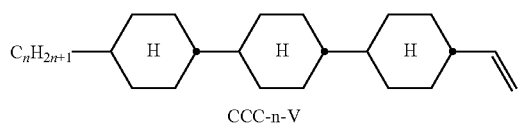
CCC-n-V TABLE A2-continued
In the formulae below m and n are independently of each other an integer from 1 to 12, preferably 1, 2, 3, 4, 5 or 6, k is 0, 1, 2, 3, 4, 5 or 6 and $(O)C_mH_{2m+1}$ means $C_mH_{2m+1}$ or $OC_mH_{2m+1}$.
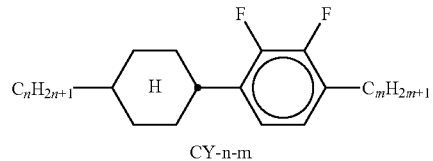
CY-n-m
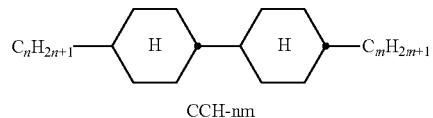
CCH-nm
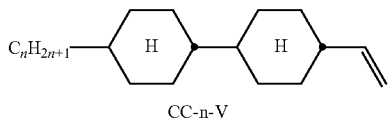
CC-n-V
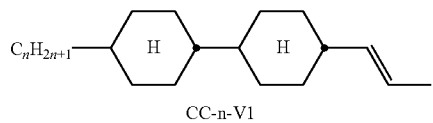
CC-n-V1
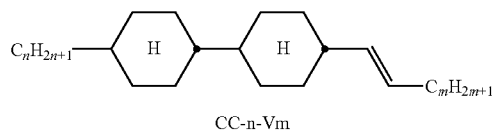
CC-n-Vm
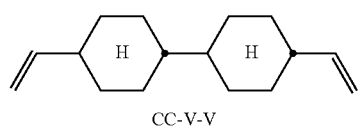
CC-V-V
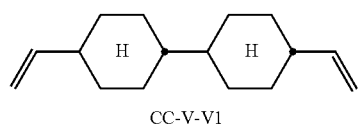
CC-V-V1
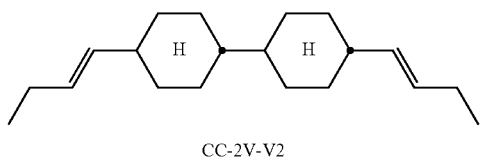
CC-2V-V2
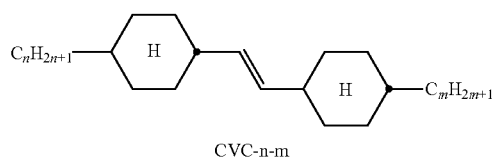
CVC-n-m
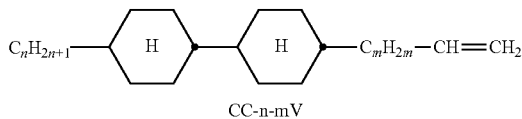
CC-n-mV TABLE A2-continued
In the formulae below m and n are independently of each other an integer from 1 to 12, preferably 1, 2, 3, 4, 5 or 6, k is 0, 1, 2, 3, 4, 5 or 6 and $(O)C_mH_{2m+1}$ means $C_mH_{2m+1}$ or $OC_mH_{2m+1}$.
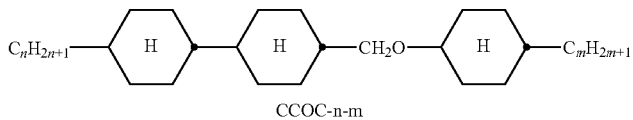
CCOC-n-m
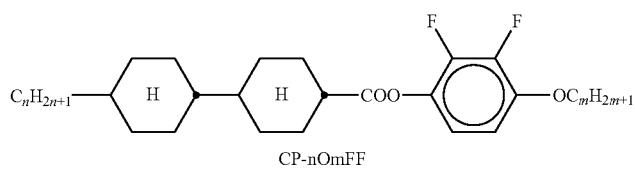
CP-nOmFF
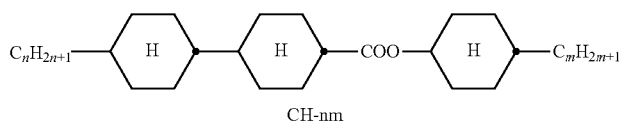
CH-nm
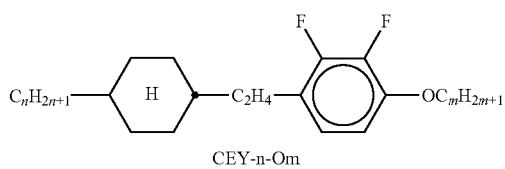
CEY-n-Om
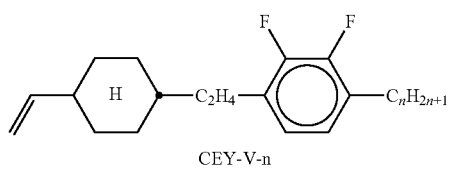
CEY-V-n
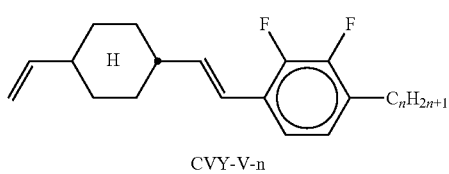
CVY-V-n
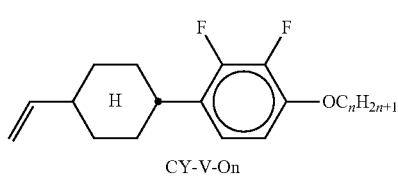
CY-V-On
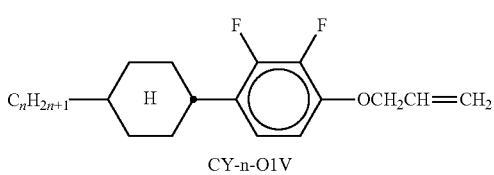
CY-n-O1V
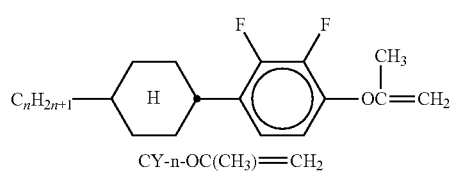
CY-n-OC(CH₃)=CH₂

TABLE A2-continued
In the formulae below m and n are independently of each other an integer from 1 to 12, preferably 1, 2, 3, 4, 5 or 6, k is 0, 1, 2, 3, 4, 5 or 6 and $(O)C_mH_{2m+1}$ means $C_mH_{2m+1}$ or $OC_mH_{2m+1}$.
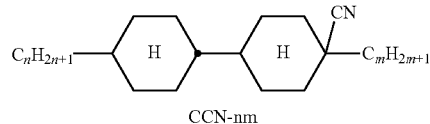
CCN-nm
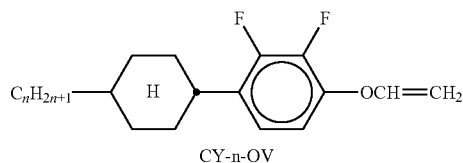
CY-n-OV
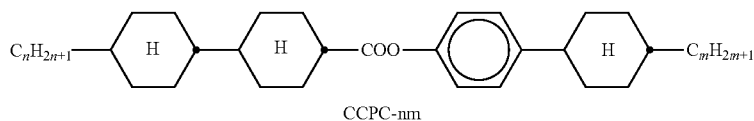
CCPC-nm
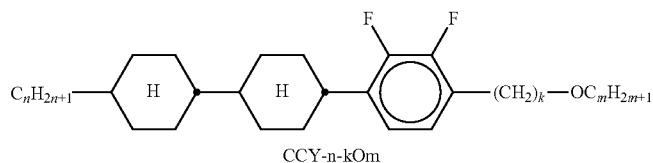
CCY-n-kOm
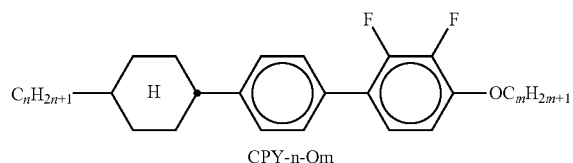
CPY-n-Om
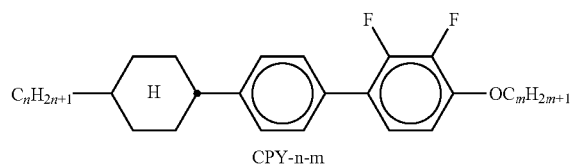
CPY-n-m
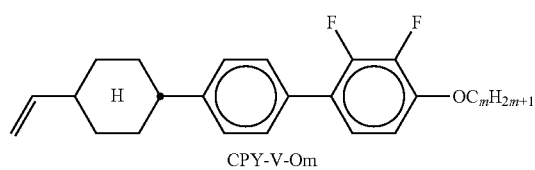
CPY-V-Om
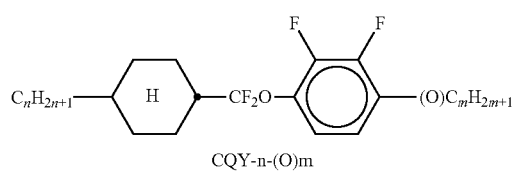
CQY-n-(O)m
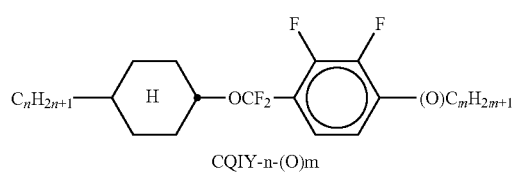
CQIY-n-(O)m TABLE A2-continued
In the formulae below m and n are independently of each other an integer from 1 to 12, preferably 1, 2, 3, 4, 5 or 6, k is 0, 1, 2, 3, 4, 5 or 6 and $(O)C_mH_{2m+1}$ means $C_mH_{2m+1}$ or $OC_mH_{2m+1}$.
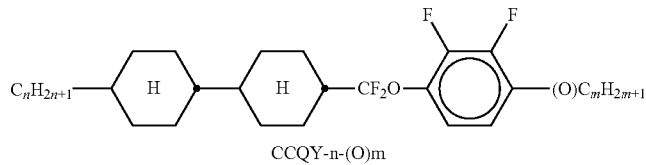
CCQY-n-(O)m
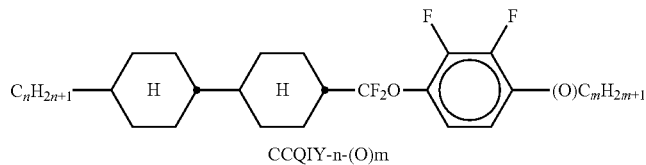
CCQIY-n-(O)m
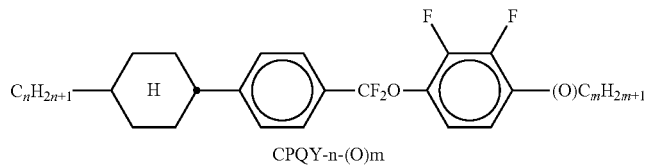
CPQY-n-(O)m
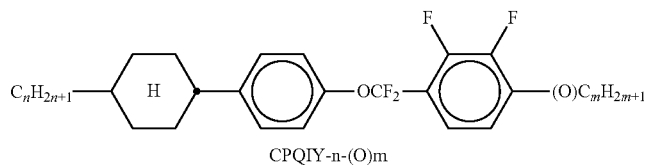
CPQIY-n-(O)m
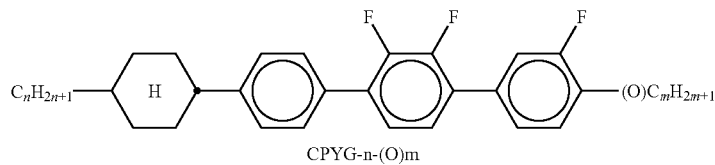
CPYG-n-(O)m
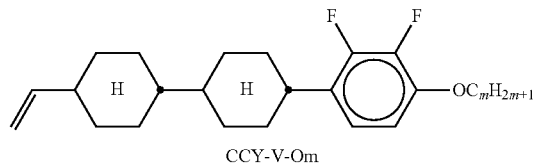
CCY-V-Om
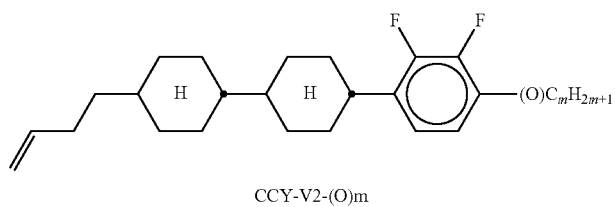
CCY-V2-(O)m
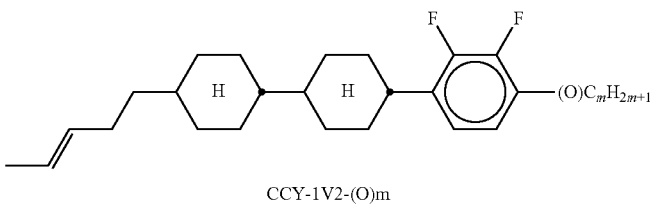
CCY-1V2-(O)m TABLE A2-continued
In the formulae below m and n are independently of each other an integer from 1 to 12, preferably 1, 2, 3, 4, 5 or 6, k is 0, 1, 2, 3, 4, 5 or 6 and $(O)C_mH_{2m+1}$ means $C_mH_{2m+1}$ or $OC_mH_{2m+1}$.
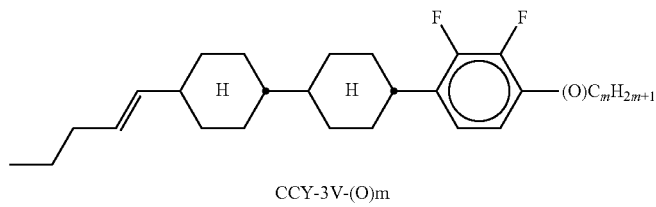
CCY-3V-(O)m
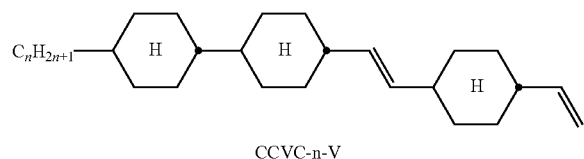
CCVC-n-V
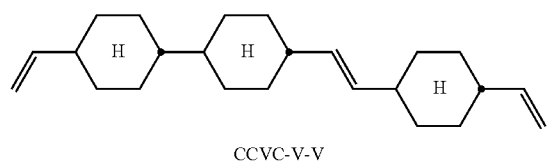
CCVC-V-V
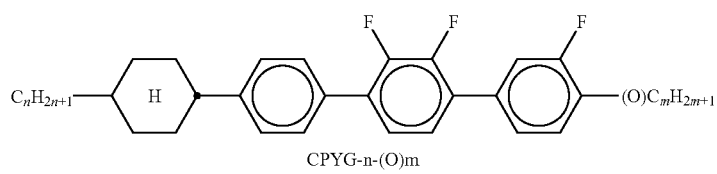
CPYG-n-(O)m
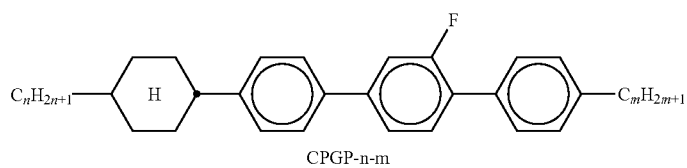
CPGP-n-m
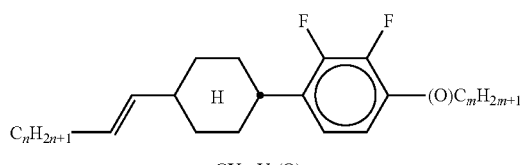
CY-nV-(O)m
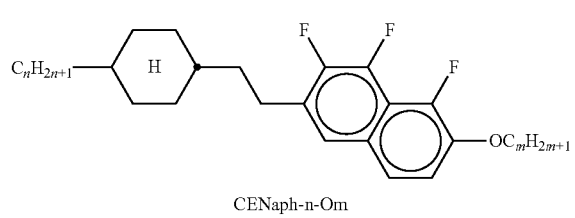
CENaph-n-Om
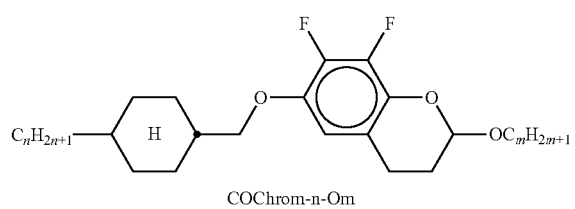
COChrom-n-Om TABLE A2-continued
In the formulae below m and n are independently of each other an integer from 1 to 12, preferably 1, 2, 3, 4, 5 or 6, k is 0, 1, 2, 3, 4, 5 or 6 and $(O)C_mH_{2m+1}$ means $C_mH_{2m+1}$ or $OC_mH_{2m+1}$.
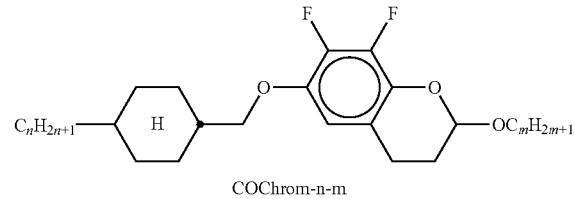
COChrom-n-m
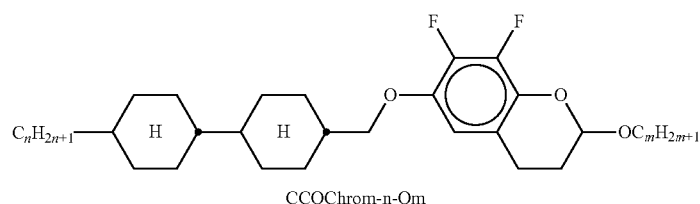
CCOChrom-n-Om
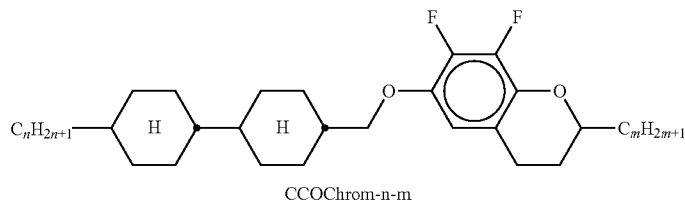
CCOChrom-n-m
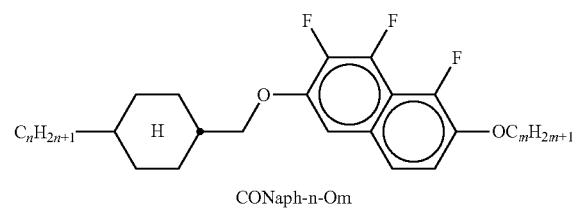
CONaph-n-Om
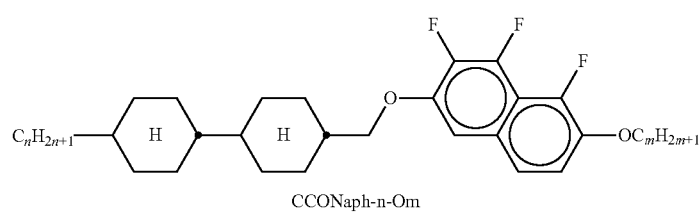
CCONaph-n-Om
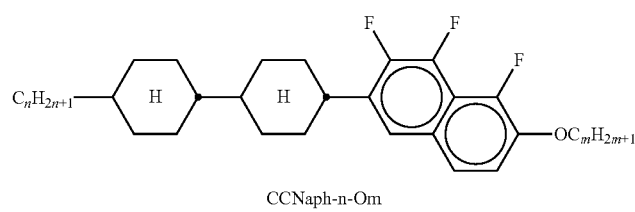
CCNaph-n-Om
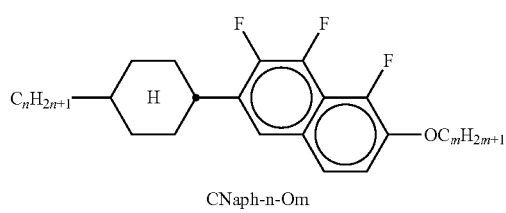
CNaph-n-Om TABLE A2-continued
In the formulae below m and n are independently of each other an integer from 1 to 12, preferably 1, 2, 3, 4, 5 or 6, k is 0, 1, 2, 3, 4, 5 or 6 and $(O)C_mH_{2m+1}$ means $C_mH_{2m+1}$ or $OC_mH_{2m+1}$.
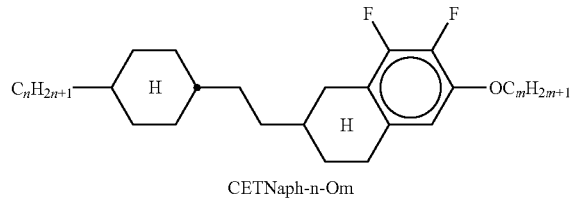
CETNaph-n-Om
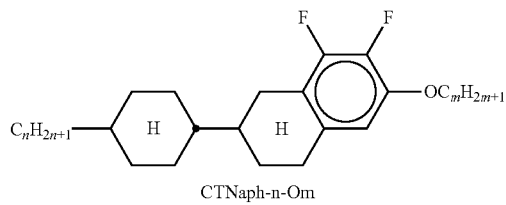
CTNaph-n-Om
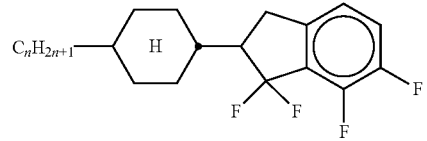
CK-n-F
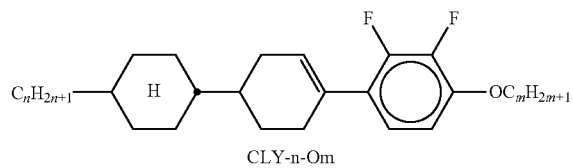
CLY-n-Om
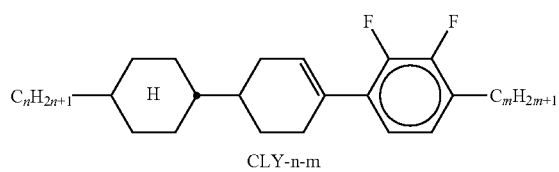
CLY-n-m
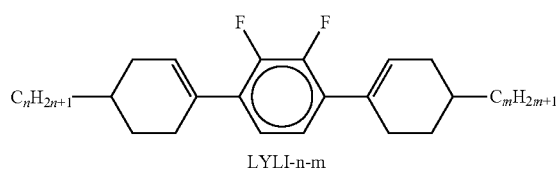
LYLI-n-m
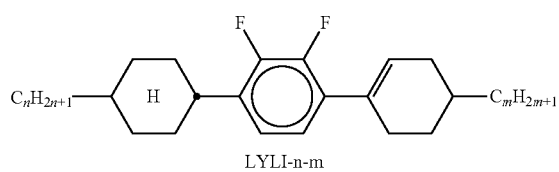
LYLI-n-m
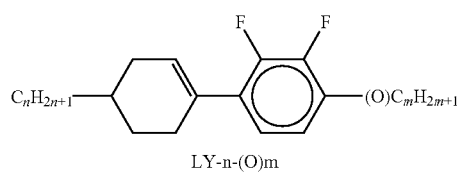
LY-n-(O)m TABLE A2-continued
In the formulae below m and n are independently of each other an integer from 1 to 12, preferably 1, 2, 3, 4, 5 or 6, k is 0, 1, 2, 3, 4, 5 or 6 and $(O)C_mH_{2m+1}$ means $C_mH_{2m+1}$ or $OC_mH_{2m+1}$.
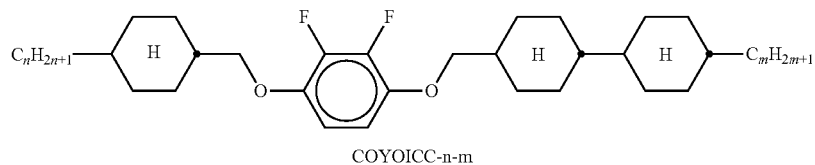
COYOICC-n-m
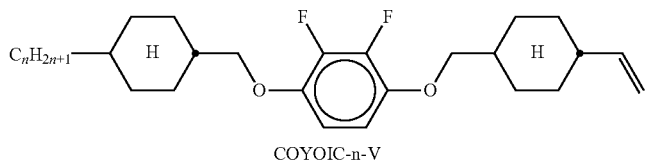
COYOIC-n-V
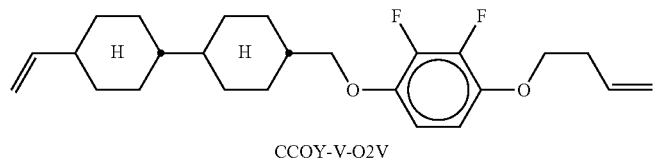
CCOY-V-O2V
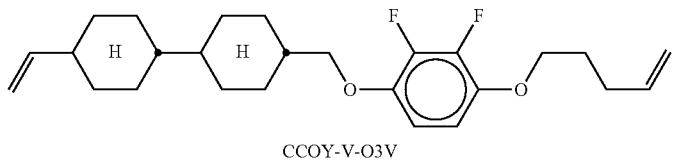
CCOY-V-O3V
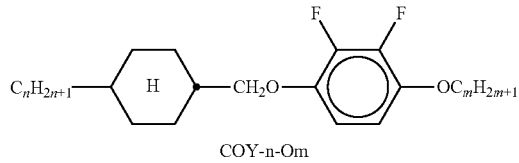
COY-n-Om
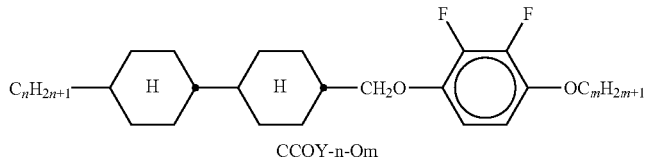
CCOY-n-Om
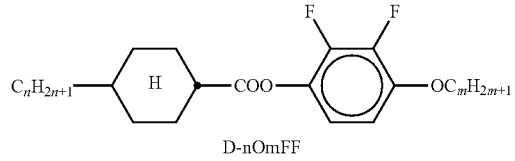
D-nOmFF
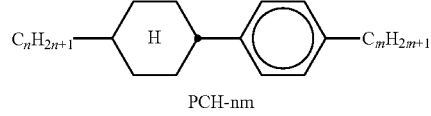
PCH-nm
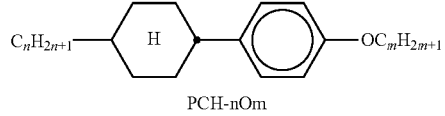
PCH-nOm TABLE A2-continued
In the formulae below m and n are independently of each other an integer from 1 to 12, preferably 1, 2, 3, 4, 5 or 6, k is 0, 1, 2, 3, 4, 5 or 6 and $(O)C_mH_{2m+1}$ means $C_mH_{2m+1}$ or $OC_mH_{2m+1}$.
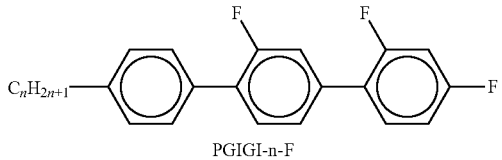
PGIGI-n-F
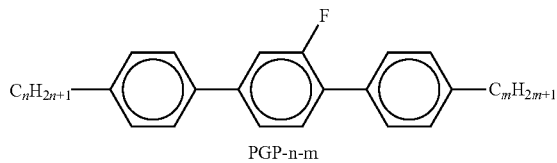
PGP-n-m
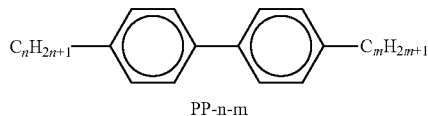
PP-n-m
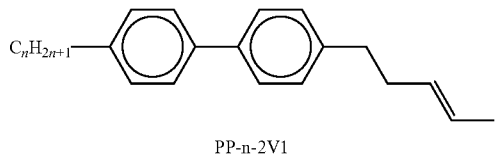
PP-n-2V1
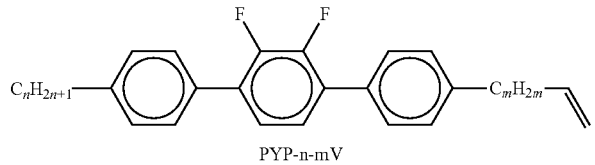
PYP-n-mV
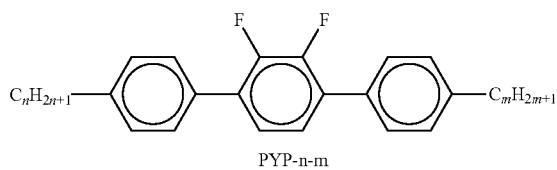
PYP-n-m
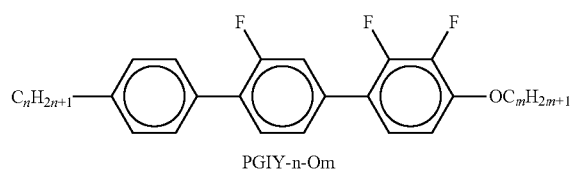
PGIY-n-Om
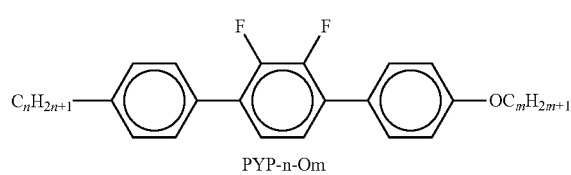
PYP-n-Om
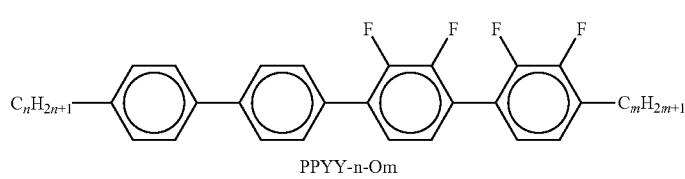
PPYY-n-Om TABLE A2-continued
In the formulae below m and n are independently of each other an integer from 1 to 12, preferably 1, 2, 3, 4, 5 or 6, k is 0, 1, 2, 3, 4, 5 or 6 and $(O)C_mH_{2m+1}$ means $C_mH_{2m+1}$ or $OC_mH_{2m+1}$.
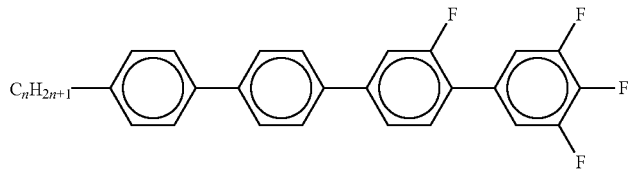
PPGU-n-F
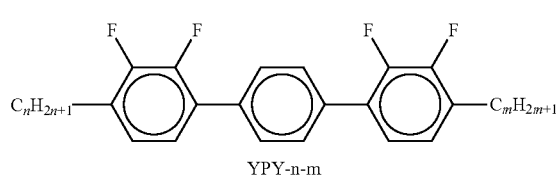
YPY-n-m
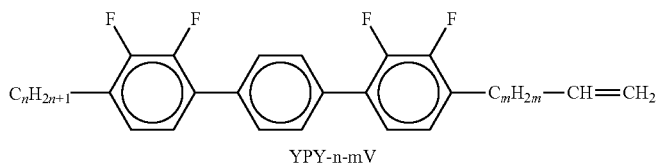
YPY-n-mV
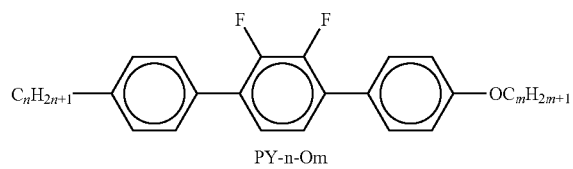
PY-n-Om
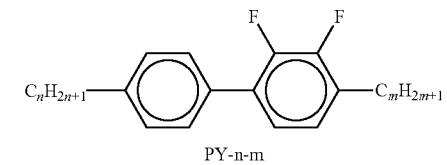
PY-n-m
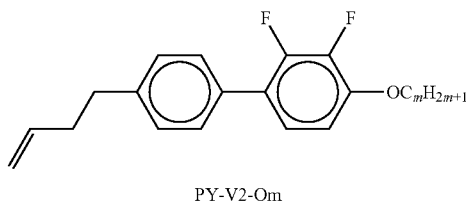
PY-V2-Om
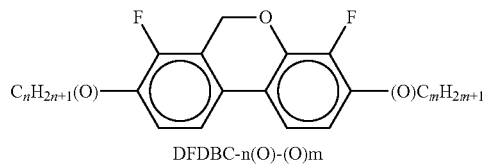
DFDBC-n(O)-(O)m
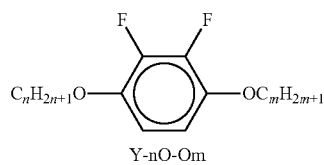
Y-nO-Om TABLE A2-continued In the formulae below m and n are independently of each other an integer from 1 to 12, preferably 1, 2, 3, 4, 5 or 6, k is 0, 1, 2, 3, 4, 5 or 6 and $(O)C_mH_{2m+1}$ means $C_mH_{2m+1}$ or $OC_mH_{2m+1}$.

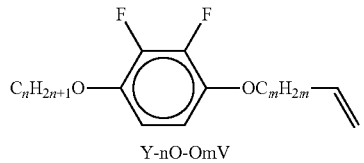

Y-nO-OmV

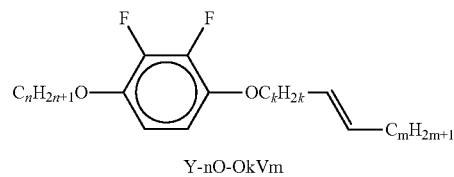

Y-nO-OkVm

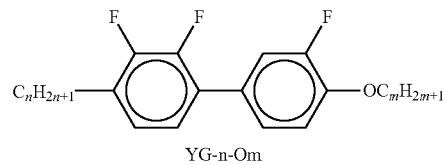

YG-n-Om

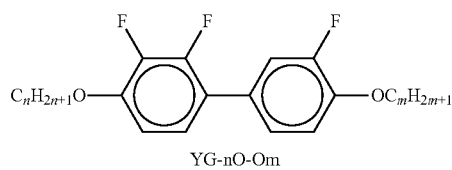

YG-nO-Om

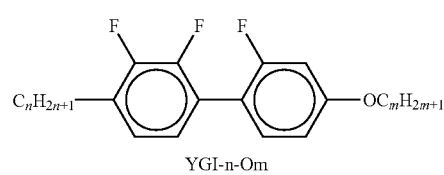

YGI-n-Om

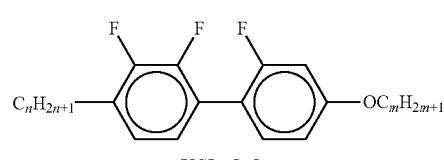

YGI-nO-Om

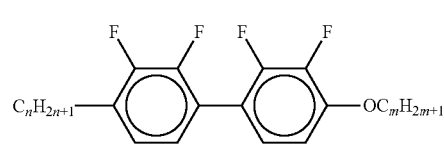

YY-n-Om

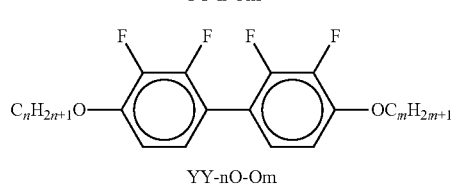

YY-nO-Om

In a first preferred embodiment of the present invention, the LC media according to the invention, especially those with positive dielectric anisotropy, comprise one or more compounds selected from the group consisting of compounds from Table A1.

In a second preferred embodiment of the present invention, the LC media according to the invention, especially those with negative dielectric anisotropy, comprise one or more compounds selected from the group consisting of compounds from Table A2.

TABLE B
Table B shows possible chiral dopants which can be added to the LC media according to the invention.
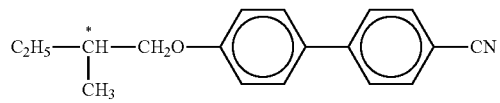
C 15
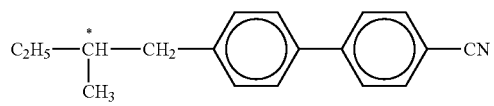
CB 15
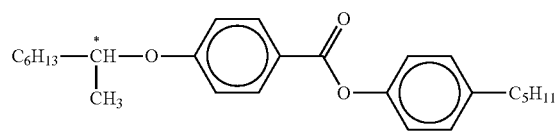
CM 21
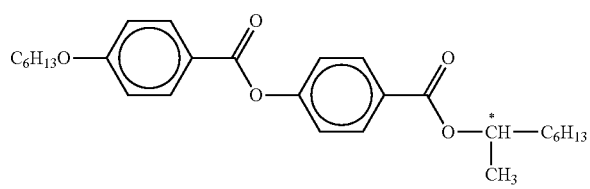
R/S-811
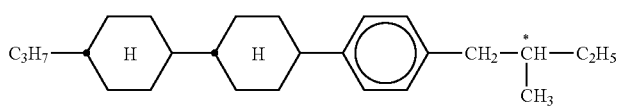
CM 44
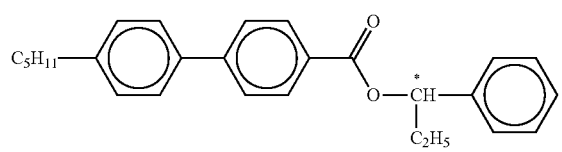
CM 45
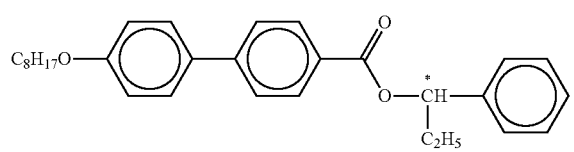
CM 47
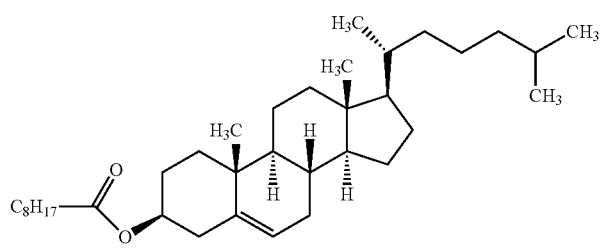
CN

TABLE B-continued
Table B shows possible chiral dopants which can be added to the LC media according to the invention.
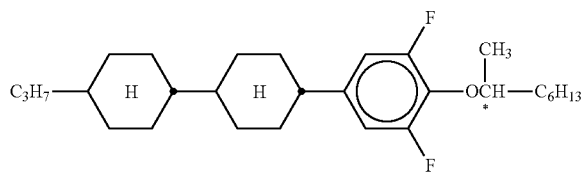
R/S-2011
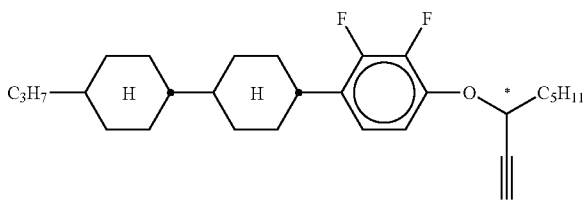
R/S-3011
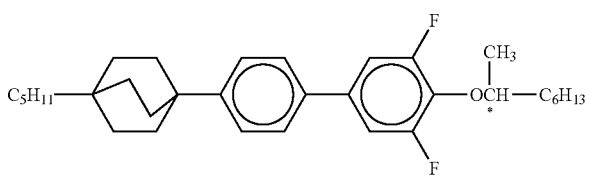
R/S-4011
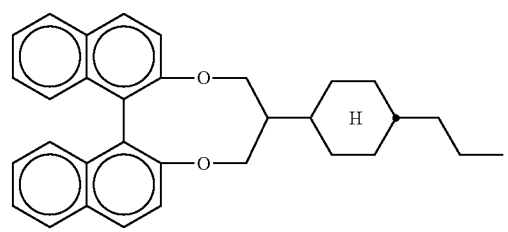
R/S-5011
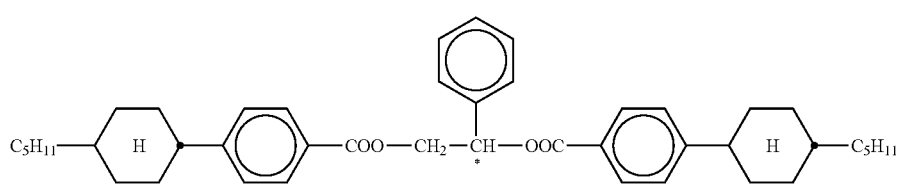
R/S-1011

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE C

Table C shows possible stabilisers which can be added to the LC media according to the invention. Therein n denotes an integer from 1 to 12, preferably 1, 2, 3, 4, 5, 6, 7 or 8, and terminal methyl groups are not shown.

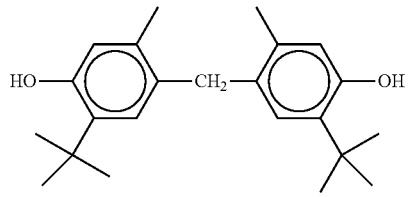

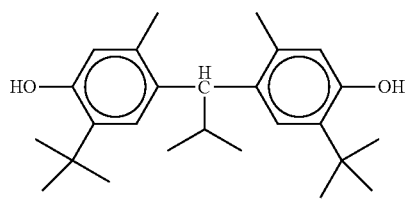

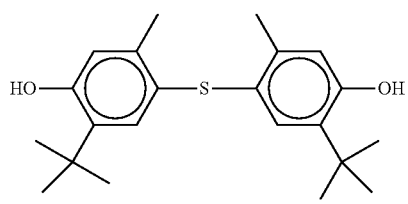

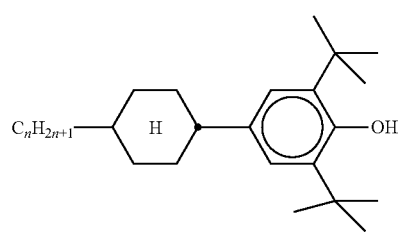

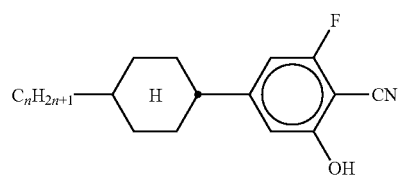

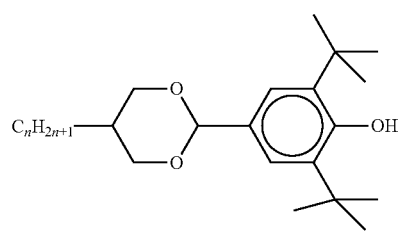

TABLE C-continued
Table C shows possible stabilisers which can be added to the LC media according to the invention. Therein n denotes an integer from 1 to 12, preferably 1, 2, 3, 4, 5, 6, 7 or 8, and terminal methyl groups are not shown.
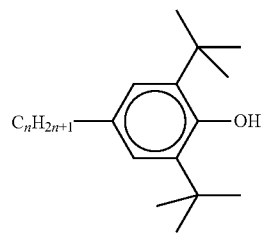
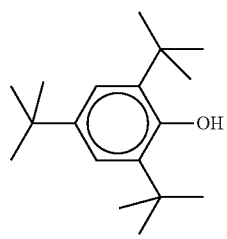
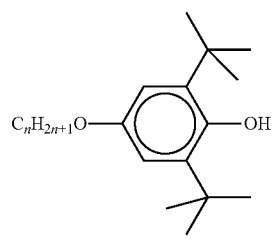
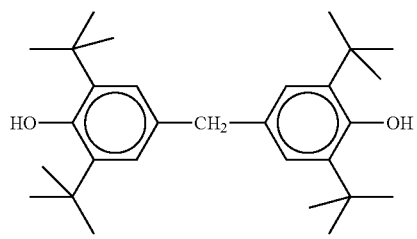
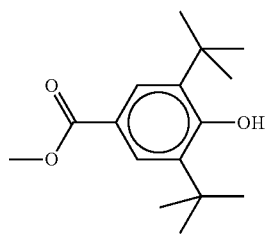
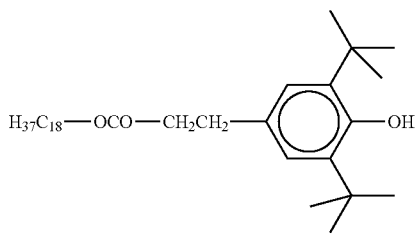

TABLE C-continued
Table C shows possible stabilisers which can be added to the LC media according to the invention. Therein n denotes an integer from 1 to 12, preferably 1, 2, 3, 4, 5, 6, 7 or 8, and terminal methyl groups are not shown.
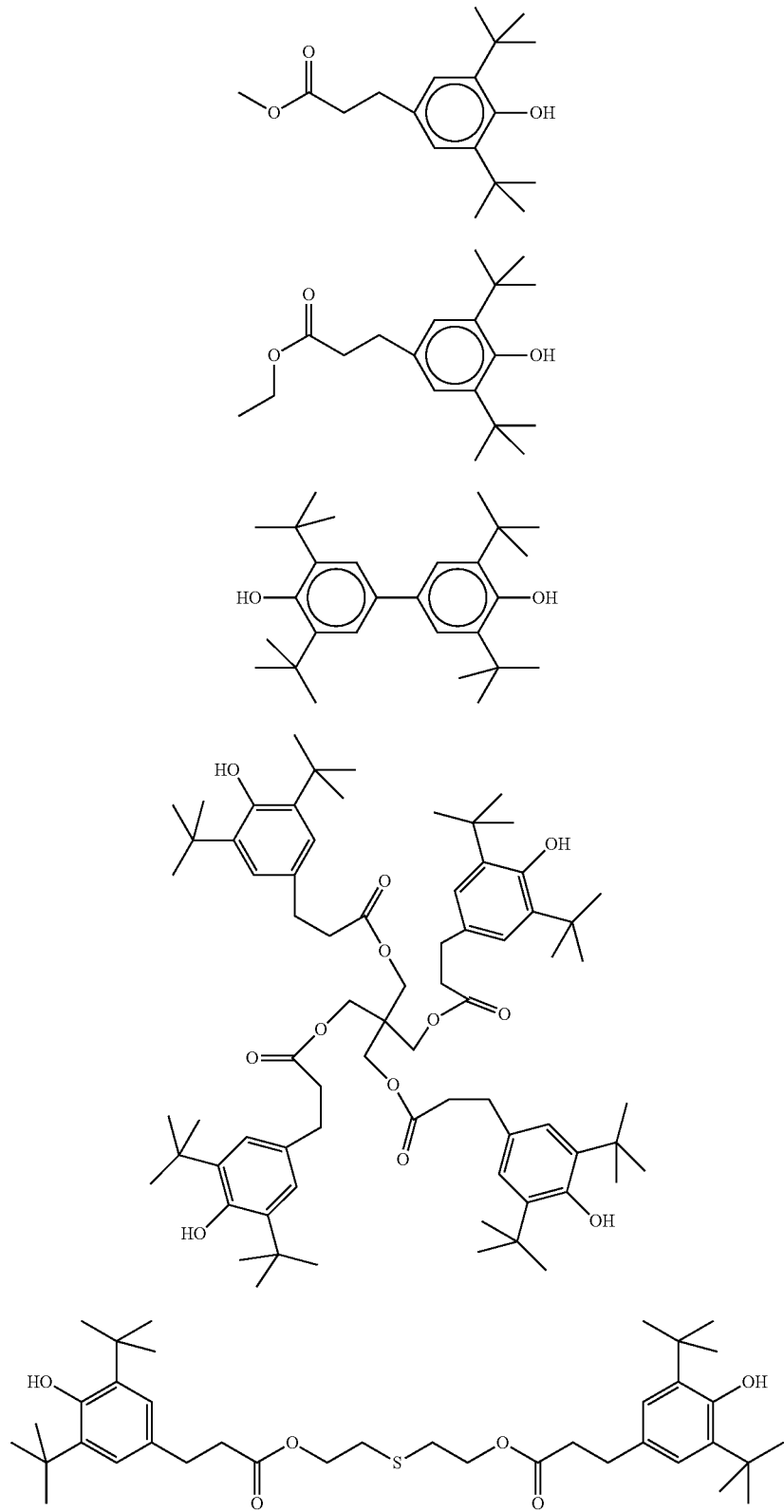

TABLE C-continued
Table C shows possible stabilisers which can be added to the LC media according to the invention.
Therein n denotes an integer from 1 to 12, preferably 1, 2, 3, 4, 5, 6, 7 or 8, and
terminal methyl groups are not shown.
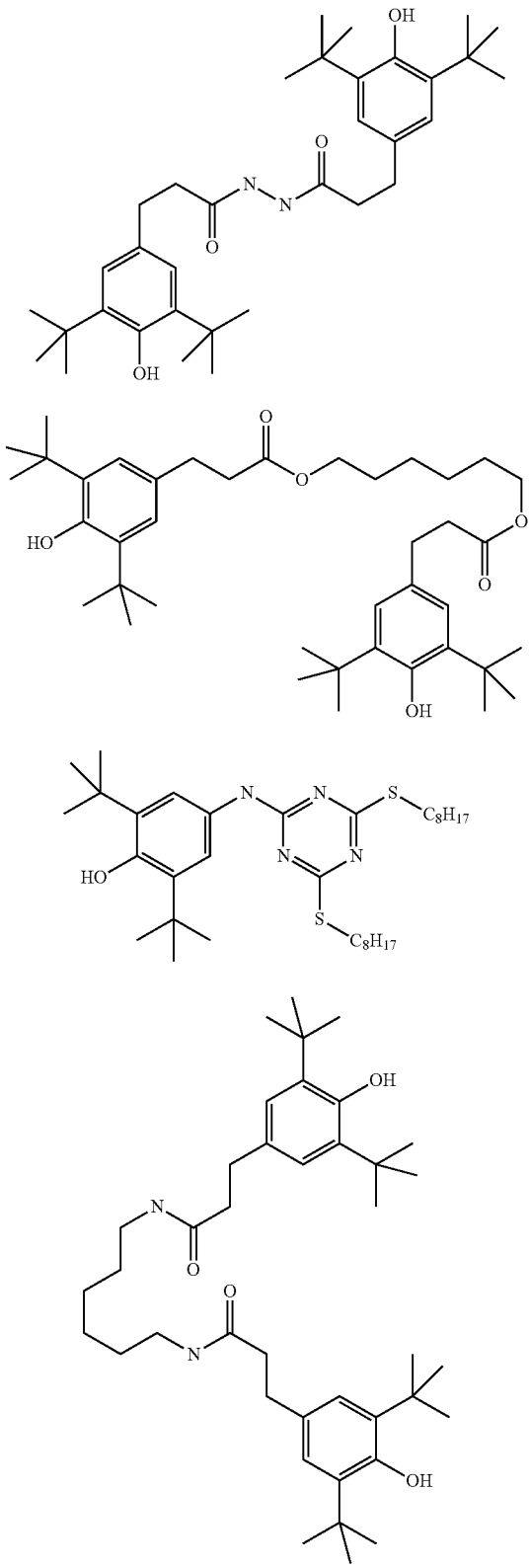

TABLE C-continued
Table C shows possible stabilisers which can be added to the LC media according to the invention.
Therein n denotes an integer from 1 to 12, preferably 1, 2, 3, 4, 5, 6, 7 or 8, and
terminal methyl groups are not shown.
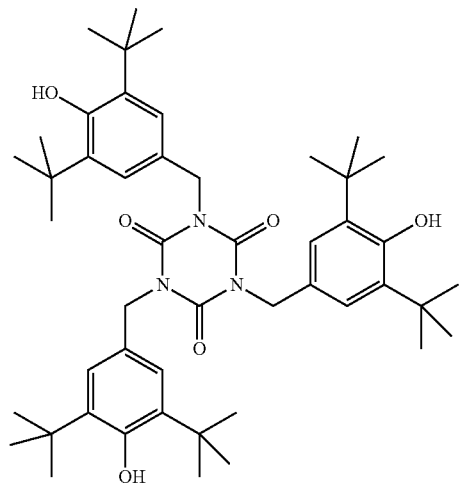 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
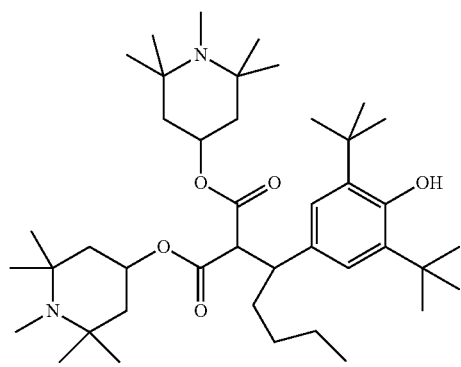 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
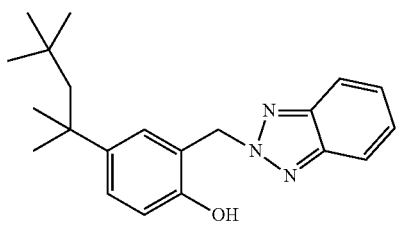 [SMILES: CC(C)(C)CC(C)(C)c1ccc(O)c(Cn2nc3ccccc3n2)c1]
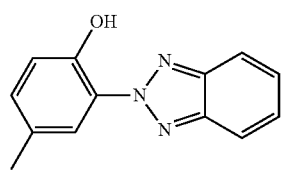 [SMILES: Cc1ccc(O)c(-n2nc3ccccc3n2)c1]
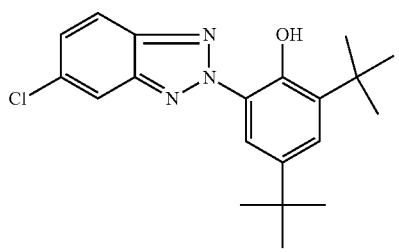 [SMILES: CC(C)(C)c1cc(-n2nc3ccc(Cl)cc3n2)c(O)c(C(C)(C)C)c1]

TABLE C-continued
Table C shows possible stabilisers which can be added to the LC media according to the invention.
Therein n denotes an integer from 1 to 12, preferably 1, 2, 3, 4, 5, 6, 7 or 8, and
terminal methyl groups are not shown.
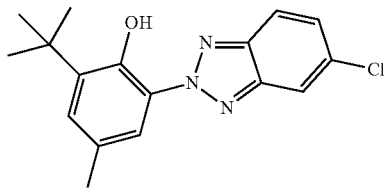 [SMILES: Cc1cc(-n2nc3ccc(Cl)cc3n2)c(O)c(C(C)(C)C)c1]
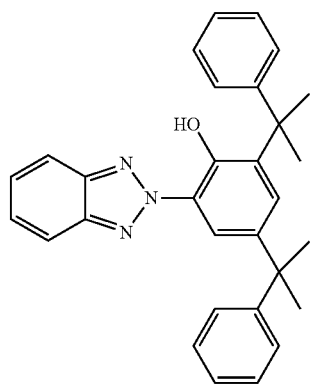 [SMILES: CC(C)(c1ccccc1)c1cc(-n2nc3ccccc3n2)c(O)c(C(C)(C)c2ccccc2)c1]
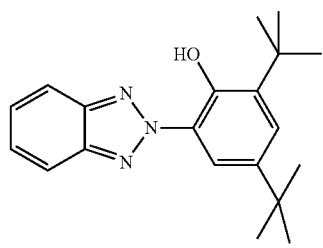 [SMILES: CC(C)(C)c1cc(-n2nc3ccccc3n2)c(O)c(C(C)(C)C)c1]
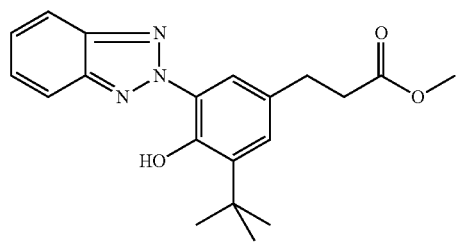 [SMILES: COC(=O)CCc1cc(-n2nc3ccccc3n2)c(O)c(C(C)(C)C)c1]
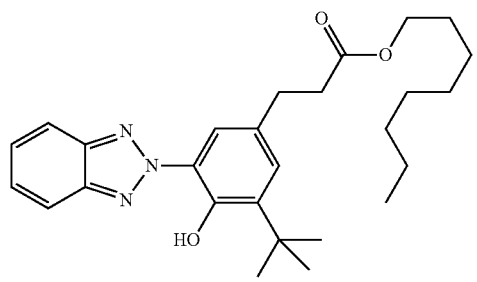 [SMILES: CCCCCCCCOC(=O)CCc1cc(-n2nc3ccccc3n2)c(O)c(C(C)(C)C)c1]

TABLE C-continued
Table C shows possible stabilisers which can be added to the LC media according to the invention. Therein n denotes an integer from 1 to 12, preferably 1, 2, 3, 4, 5, 6, 7 or 8, and terminal methyl groups are not shown.
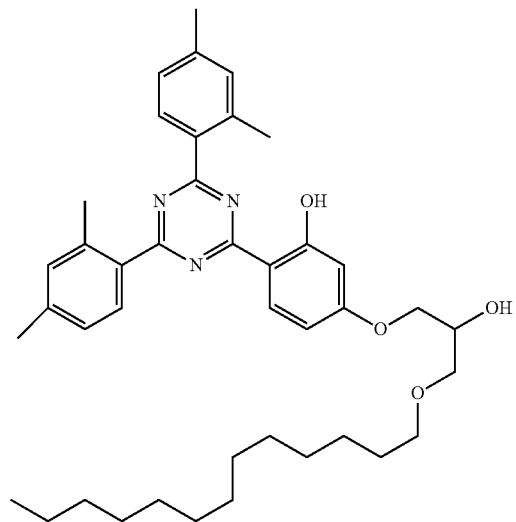 [SMILES: CCCCCCCCCCCCCOCC(O)COc1ccc(-c2nc(-c3ccc(C)cc3C)nc(-c3ccc(C)cc3C)n2)c(O)c1]
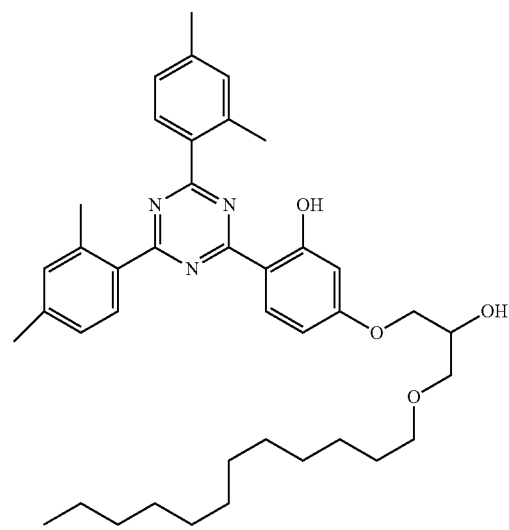 [SMILES: CCCCCCCCCCCCOCC(O)COc1ccc(-c2nc(-c3ccc(C)cc3C)nc(-c3ccc(C)cc3C)n2)c(O)c1]
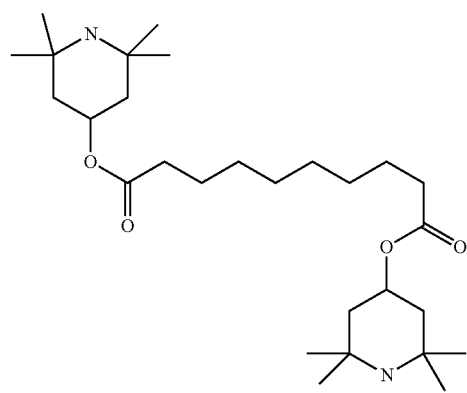

TABLE C-continued
Table C shows possible stabilisers which can be added to the LC media according to the invention. Therein n denotes an integer from 1 to 12, preferably 1, 2, 3, 4, 5, 6, 7 or 8, and terminal methyl groups are not shown.
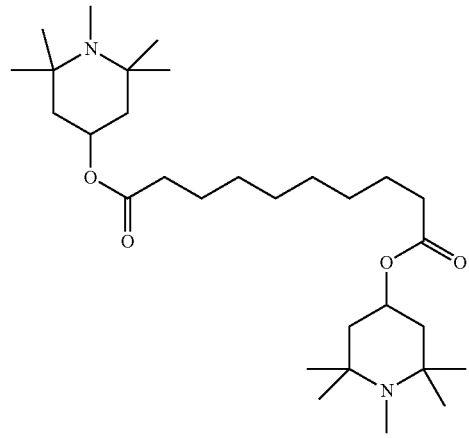
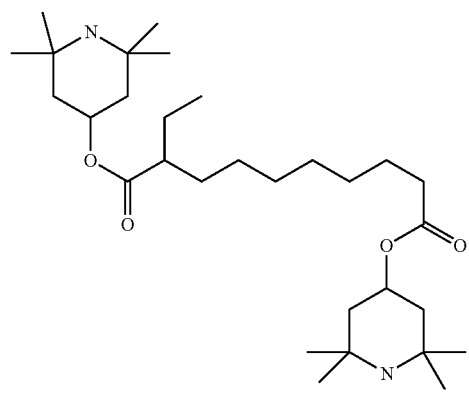
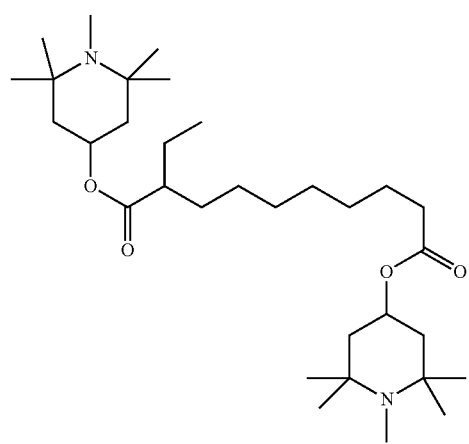

TABLE C-continued
Table C shows possible stabilisers which can be added to the LC media according to the invention.
Therein n denotes an integer from 1 to 12, preferably 1, 2, 3, 4, 5, 6, 7 or 8, and
terminal methyl groups are not shown.
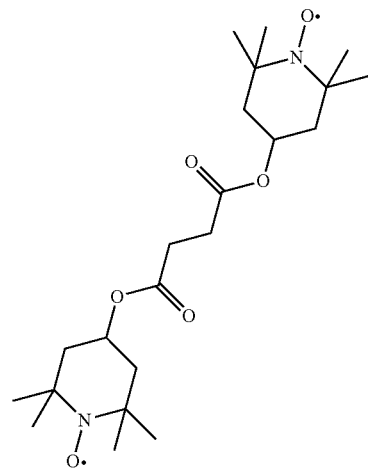
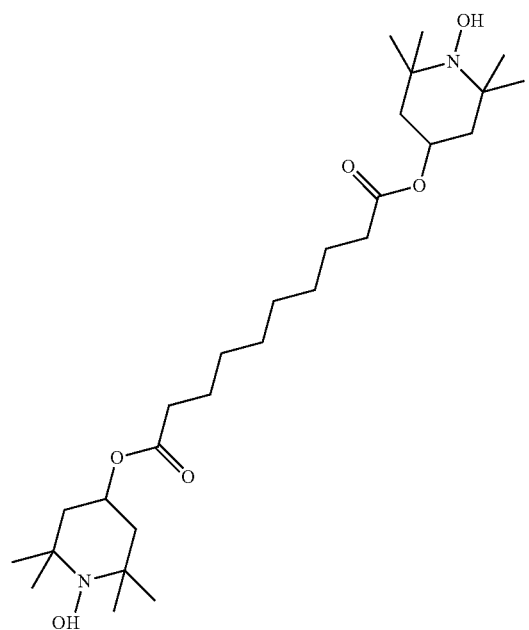
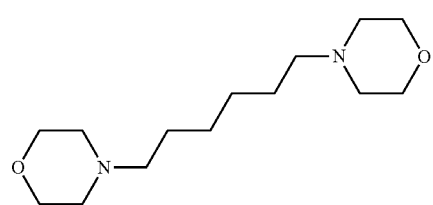 [SMILES: C(CCCN1CCOCC1)CCN1CCOCC1]

TABLE C-continued
Table C shows possible stabilisers which can be added to the LC media according to the invention.
Therein n denotes an integer from 1 to 12, preferably 1, 2, 3, 4, 5, 6, 7 or 8, and
terminal methyl groups are not shown.
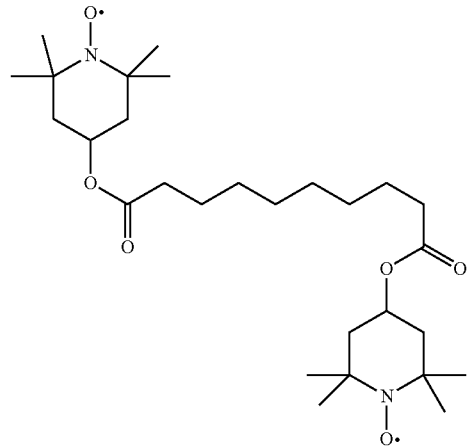
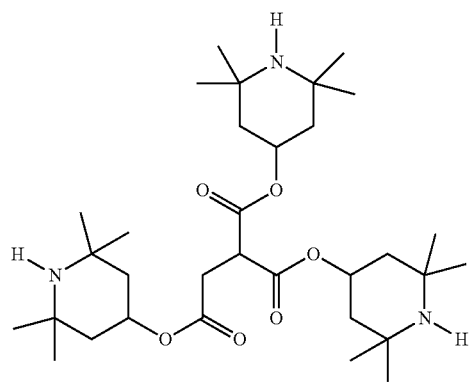
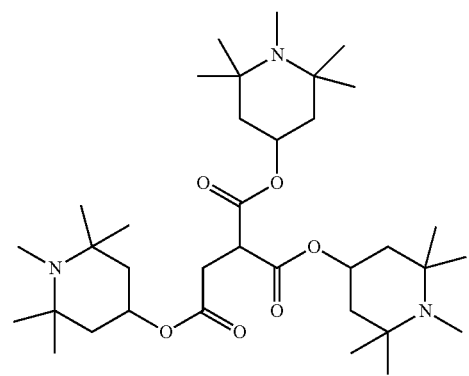

TABLE C-continued
Table C shows possible stabilisers which can be added to the LC media according to the invention.
Therein n denotes an integer from 1 to 12, preferably 1, 2, 3, 4, 5, 6, 7 or 8, and
terminal methyl groups are not shown.
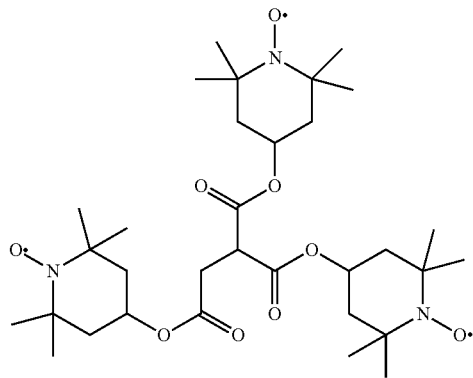
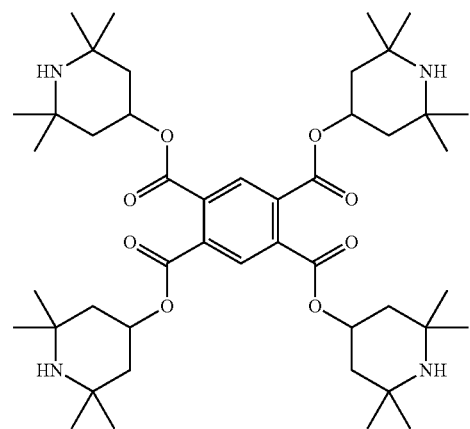
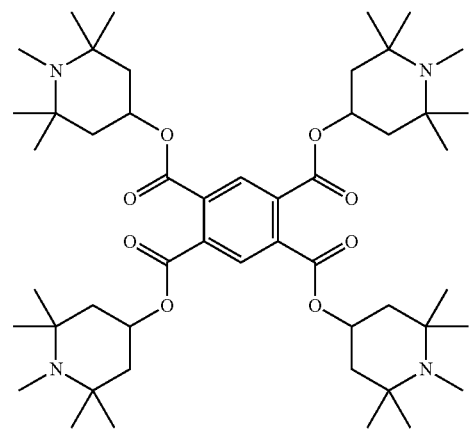

TABLE C-continued

Table C shows possible stabilisers which can be added to the LC media according to the invention.
Therein n denotes an integer from 1 to 12, preferably 1, 2, 3, 4, 5, 6, 7 or 8, and
terminal methyl groups are not shown.

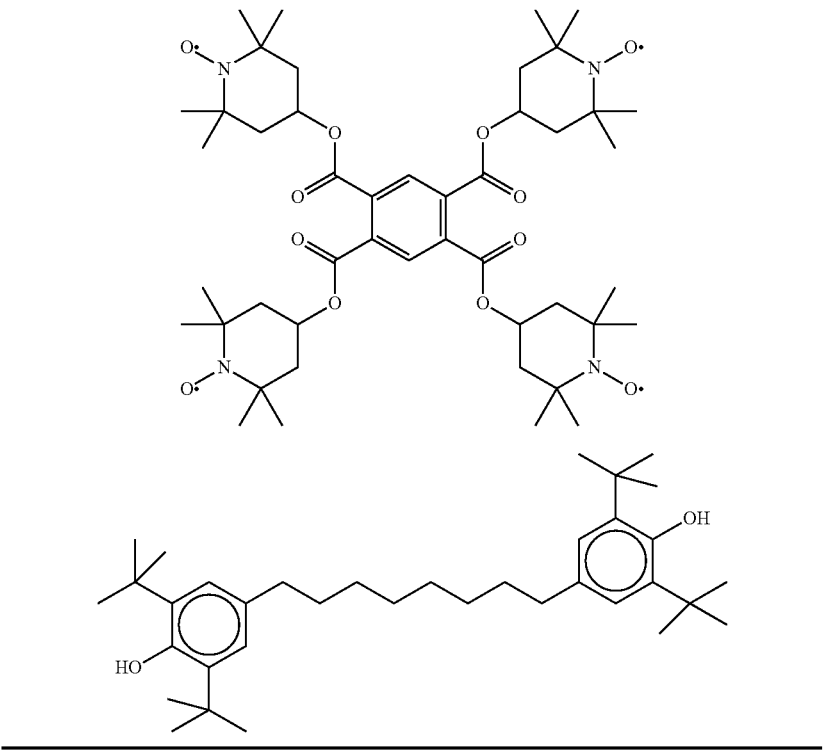

The LC media preferably comprise 0 to 10% by weight, in particular 1 ppm to 5% by weight, particularly preferably 1 ppm to 1% by weight, of stabilisers.

The LC media preferably comprise one or more stabilisers selected from the group consisting of compounds from Table C.

In addition, the following abbreviations and symbols are used:
$V_0$ threshold voltage, capacitive [V] at 20° C.,
$n_e$ extraordinary refractive index at 20° C. and 589 nm,
$n_o$ ordinary refractive index at 20° C. and 589 nm,
Δn optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
Δε dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations and ratios in the present application are quoted in percent by weight, and preferably relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δε at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Example 1

The nematic LC host mixture N1 is formulated as follows.

| | | | |
|---|---|---|---|
| APUQU-2-F | 6.00% | cl.p. | 79.5° C. |
| APUQU-3-F | 6.00% | Δn | 0.1086 |
| CC-3-V | 44.50% | Δε | 9.6 |
| CC-3-V1 | 4.00% | $\varepsilon_\parallel$ | 12.9 |
| CCP-30CF3 | 7.00% | $\gamma_1$ | 67 mPa·s |
| CCP-V-1 | 5.00% | | |
| CPGU-3-OT | 3.00% | | |
| PGP-2-V | 5.50% | | |
| PGUQU-3-F | 3.00% | | |
| PGUQU-4-F | 7.00% | | |
| PGUQU-5-F | 3.00% | | |
| PUQU-3-F | 6.00% | | |

Example 2

The nematic LC host mixture N2 is formulated as follows.

| | | | |
|---|---|---|---|
| PUQU-3-F | 5.50 | cl.p. | 80.1° C. |
| CC-3-V | 40.00 | Δn | 0.1095 |
| CC-3-V1 | 10.00 | Δε | 9.1 |
| CCP-V1 | 10.00 | $\varepsilon_\parallel$ | 12.4 |
| APUQU-2-F | 5.00 | $\gamma_1$ | 65 mPa·s |
| APUQU-3-F | 10.50 | | |
| PGUQU-3-F | 3.50 | | |
| PGUQU-4-F | 8.00 | | |
| PGP-2-2V | 7.50 | | |

Example 3

The nematic LC host mixture N3 is formulated as follows.

| | | | |
|---|---|---|---|
| CC-3-V | 40.00 | cl.p. | 81.5° C. |
| CC-3-V1 | 8.00 | Δn | 0.0827 |
| PUQU-2-F | 3.00 | Δε | 9.4 |
| PUQU-3-F | 8.00 | $\varepsilon_\parallel$ | 12.8 |
| APUQU-2-F | 7.00 | $\gamma_1$ | 75 mPa·s |
| APUQU-3-F | 7.00 | | |
| CCP-3-1 | 7.00 | | |
| CCOC-3-3 | 5.00 | | |
| CCOC-4-3 | 5.00 | | |
| CDUQU-3-F | 10.00 | | |

Polymerisable Mixture Examples

Polymerisable Mixture Preparation:

Polymerisable LC media for polymer wall formation are prepared by mixing LC host, monomer and photoinitiator and then homogenizing the resulting mixture by heating above the clearing point.

The structures of the monomer (including its formula and name in the composition table) are listed below.

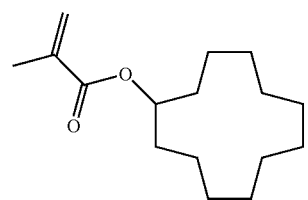

I2a

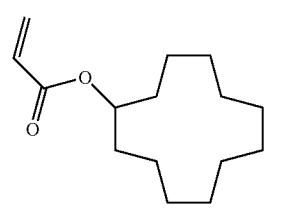

I2b

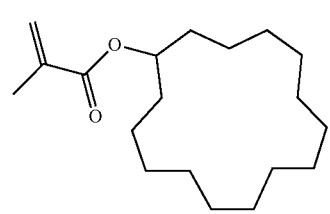

I3a

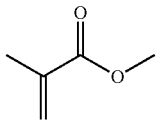

III a1

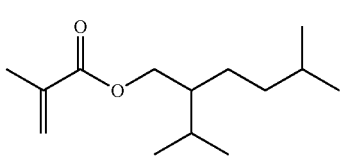

III a7

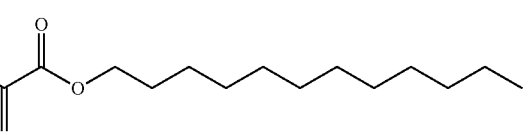

III a13

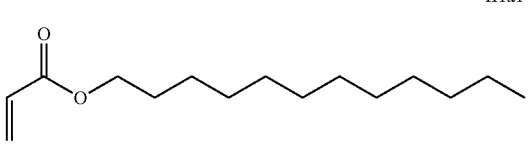

III a14

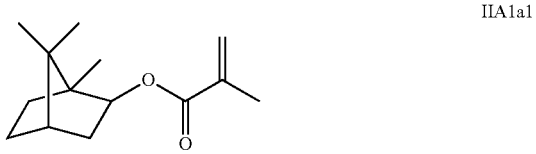

IIA1a1

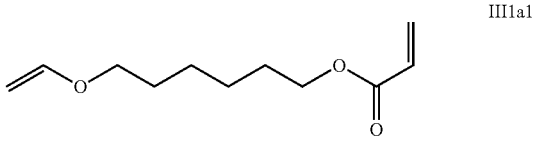

III1a1

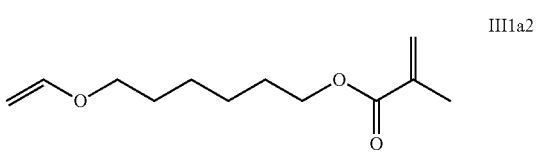

III1a2

III1a8

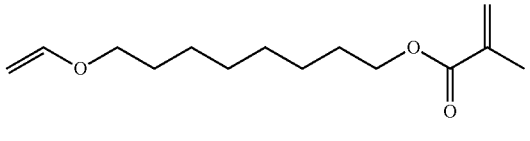

III1a20

-continued

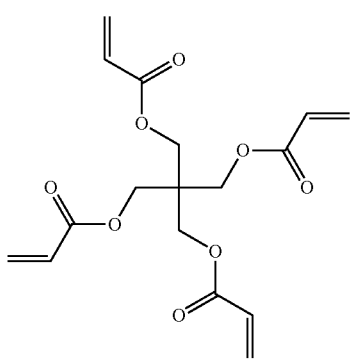

III4b1

The mixture compositions are shown in Table 1 below.

TABLE 1

Polymerisable Mixture Compositions

| No. | Host | [Host] (%) | Monomer 1 | [Monomer 1] (%) | Monomer 2 | [Monomer 2] (%) | Monomer 3/4 | [Monomer 3/4] (%) | IRG-651 [%] |
|---|---|---|---|---|---|---|---|---|---|
| 1 | N1 | 87.88 | I2a | 3.60 | II1a1 | 8.00 | III4b1<br>III1a2 | 0.20<br>0.20 | 0.12 |
| 2 | N1 | 87.88 | I2a | 8.00 | II1a1 | 3.60 | III4b1<br>III1a2 | 0.20<br>0.20 | 0.12 |
| 3 | N1 | 87.88 | I2a | 1.60 | II1a1 | 10.00 | III4b1<br>III1a2 | 0.20<br>0.20 | 0.12 |
| 4 | N1 | 87.88 | I2a | 1.60 | II1a14 | 10.00 | III4b1<br>III1a2 | 0.20<br>0.20 | 0.12 |
| 5 | N1 | 87.88 | I2a | 3.60 | II1a14 | 8.00 | III4b1<br>III1a2 | 0.20<br>0.20 | 0.12 |
| 6 | N1 | 87.88 | I2a | 8.00 | II1a14 | 3.60 | III4b1<br>III1a2 | 0.20<br>0.20 | 0.12 |
| 7 | N1 | 87.88 | I2b | 3.60 | II1a13 | 8.00 | III4b1<br>III1a2 | 0.20<br>0.20 | 0.12 |
| 8 | N1 | 87.88 | I2a | 3.60 | II1a13 | 8.00 | III4b1<br>III1a2 | 0.20<br>0.20 | 0.12 |
| 9 | N2 | 86.87 | I3a | 6.00 | II1a7 | 6.00 | III4b1 | 1.00 | 0.13 |
| 10 | N2 | 86.87 | I3a | 6.00 | II1a1 | 6.00 | III4b1 | 1.00 | 0.13 |
| 11 | N2 | 86.87 | I3a | 6.00 | II1a1 | 6.00 | III1a1 | 1.00 | 0.13 |
| 12 | N2 | 86.87 | I3a | 6.00 | II1a1 | 6.00 | III1a2 | 1.00 | 0.13 |
| 13 | N3 | 86.87 | I3a | 6.00 | II1a7 | 6.00 | III1a1 | 1.00 | 0.13 |
| 14 | N3 | 84.85 | I2a | 15.00 | — | — | — | — | 0.15 |
| 15 | N3 | 84.85 | I2a | 14.00 | — | — | III1a8 | 1.00 | 0.15 |
| 16 | N2 | 86.87 | I3a | 6.00 | IIA1a1 | 6.00 | III1a20 | 1.00 | 0.13 |
| 17 | N2 | 86.87 | I3a | 6.00 | IIA1a1 | 6.00 | III1a1 | 1.00 | 0.13 |

Polymerisable mixtures 1-17 according to the invention contain host mixture N1, N2 or N3 having positive dielectric anisotropy, and further contain a monoreactive first monomer of formula I, optionally a monoreactive second monomer of formula II or IIA, and optionally one or two di- or multireactive third monomers of formula III, respectively.

Test Cells:

The test cells comprise two glass substrates coated with ITO, which are kept apart by spacer particles or foils at a layer thickness of 3-4 microns and glued together by an adhesive (usually Norland, NEA 123). On top of the electrode layers polyimide alignment layers (Nissan SE-6514 or SE2414) are applied which are rubbed parallel or antiparallel.

Wall Formation:

The test cells are filled with the LC medium and placed on a black, non-reflecting surface. A photomask is placed on top of the test cells and the sample is subjected for 30 min to UV radiation (Hg/Xe arch lamp, LOT QuantumDesign Europe, LS0205, intensity at sample 4 mW/cm$^2$ measured at 365+/− 10 nm FWHM). Radiation of the emission spectrum below 320 nm is removed by a dichroic mirror. The photomask usually has a pattern of equidistant lines of the same thickness. Typical line thickness is 10 microns, typical distance between the lines is 100 microns.

Characterization:

Samples are analyzed under a polarization microscope. The isotropic polymer walls can clearly be distinguished from areas containing birefringend LC. The width of the walls and inclusions of LC into the polymer walls, and defects in the pixel area caused by contamination of polymer, or misalignment of the LC caused by the wall formation process can be observed.

Mechanical Stress Test:

Test cells are subjected to a mechanical stress by applying pressure to the top substrate by a 0.5 mm$^2$ tip with a force of 10N for 10 s. Damages to the polymer wall structure are evaluated with the polarization microscope.

It was observed that the polymer wall structure did not show significant damages caused by mechanical stress.

Electron Micrographs:

The structure of the polymer walls and contamination of the pixel area by polymer are investigated by taking electron micrographs. The samples are prepared by either lifting off the top substrate for top-view images, or breaking the glass slides in half for viewing the cross section of the walls. The LC is removed by flushing the sample with ethanol, subsequently the substrates is dried in an air flow and sputter coated with a conductive layer (gold).

Electro-Optical Characterization:

The electro-optical properties of the liquid crystal host are characterized by applying an electrical potential between 0 and 10V in steps of 0.05V. The resulting response is recorded by measuring the transmission change of the sample in between crossed polarizers (DMS 301 equipped with integration sphere).

It was observed that the electrooptical properties of the liquid crystal host were not significantly affected by the polymer wall structures.

Device Examples

Polymerisable LC mixtures 1-17 are each filled into a test cell and subjected to UV irradiation under a photomask as described above. FIG. 2-10 show polarization microscope images of the test cells prepared from polymerisable mixtures 1-8, respectively, after polymerization. The formed polymer walls can be seen as dark lines.

FIG. 10-18 show polarization microscope images of test cells prepared from polymerisable mixtures 9-17, respectively, after polymerization (a), after mechanical stress test (b) and after thermal stress test (c). The formed polymer walls can be seen as dark lines.

The invention claimed is:

1. A liquid crystal medium comprising
   a polymerizable component A) which comprises one or more polymerizable compounds, and
   a liquid-crystalline component B) which comprises one or more mesogenic or liquid-crystalline compounds,
   wherein polymerizable component A) comprises one or more first polymerizable compounds comprising a monocyclic hydrocarbon group having from 8 to 24 ring atoms, and attached thereto one polymerizable group.

2. The liquid crystal medium of claim 1, wherein component A) additionally comprises one or more second polymerizable compounds comprising a straight-chain or branched hydrocarbon group having from 1 to 30 C atoms, or a monocyclic hydrocarbon group having from 3 to 7 ring atoms, or a bi- or polycyclic hydrocarbon group having from 4 to 30 ring atoms, and attached thereto one polymerizable group.

3. The liquid crystal medium of claim 1, wherein component A) additionally comprises one or more third polymerizable compounds comprising a straight-chain, branched or cyclic hydrocarbon group having from 1 to 30 C atoms and attached thereto two or more polymerizable groups.

4. The liquid crystal medium according to claim 1, wherein component A) comprises one or more first polymerizable compounds selected from formula I P-Sp-G¹     I wherein
P is a polymerizable group,
Sp is a spacer group or a single bond,
G¹ is a monocyclic hydrocarbon group having 8 to 24 C atoms, which is optionally substituted by one or more groups L,
L is F, Cl, —CN, —NO₂, —NCO, —NCS, —OCN, —SCN, —C(=O)N(Rˣ)₂, —C(=O)Y¹, —C(=O)Rˣ, —N(Rˣ)₂, optionally substituted silyl, optionally substituted aryl or heteroaryl having 5 to 20 ring atoms, or straight-chain or branched alkyl having 1 to 25 C atoms in which, in addition, one or more non-adjacent CH₂ groups may each be replaced, independently of of one another, by —C(R⁰)=C(R⁰⁰)—, —C≡C—, —N(R⁰)—, —O—, —S—, —CO—, —CO—O—, —O—CO—, or —O—CO—O— in such a way that O and/or S atoms are not linked directly to one another, and in which, in addition, one or more H atoms may each be replaced by F, Cl, or —CN,
Rˣ is H, F, Cl, CN, or straight chain, branched or cyclic alkyl having 1 to 25 C atoms, wherein one or more non-adjacent CH₂-groups are each optionally replaced by —O—, —S—, —CO—, —CO—O—, —O—CO—, or —O—CO—O— in such a manner that O- and/or S-atoms are not directly connected with each other, and wherein one or more H atoms are each optionally replaced by F or Cl,
R⁰, R⁰⁰ are H or alkyl having 1 to 20 C atoms, and
Y¹ is halogen.

5. The liquid crystal medium according to claim 4, wherein component A) comprises one or more first polymerizable compounds selected from the following formulae

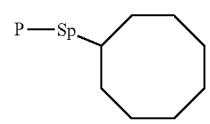

I1

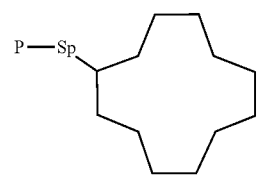

I2

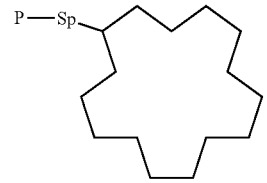

I3

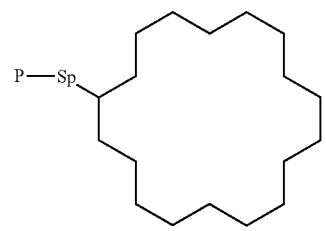

I4 wherein P and Sp have the meanings given in claim 4.

6. The liquid crystal medium according to claim 1,
wherein component A) comprises one or more first polymerizable compounds selected from the following formulae

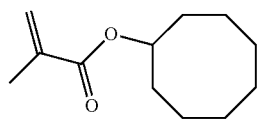

I1a

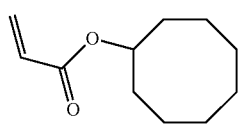

I1b

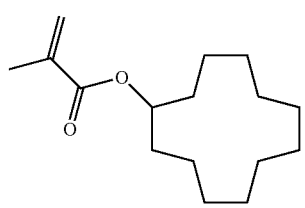

I2a

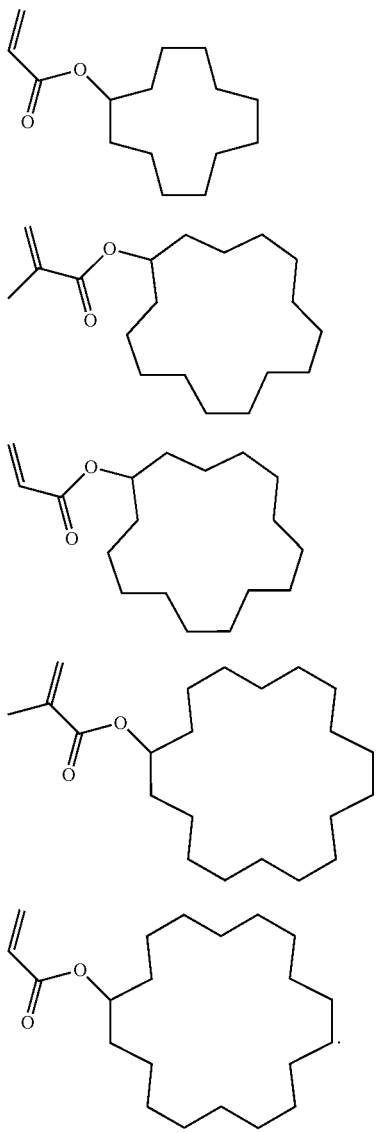

7. The liquid crystal medium according to claim 4, wherein component A) comprises one or more second polymerizable compounds selected from formula II P-Sp-G²      II wherein P and Sp have the meanings given in claim 4, and G² is a straight-chain or branched alkyl group with 1 to 20 C atoms, or a monocyclic alkyl group with 3 to 7 C atoms, that is optionally mono-, poly- or perfluorinated and is optionally substituted by one or more groups L as defined in claim 4, and wherein one or more $CH_2$- groups are each optionally replaced by —O—, —CO—, —O—CO— or —CO—O— such that O-atoms are not directly adjacent to one another.

8. The liquid crystal medium according to claim 4, wherein component A) comprises one or more second polymerizable compounds selected from the following formulae

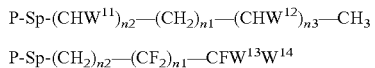     II1

P-Sp-$(CHW^{11})_{n2}$—$(CH_2)_{n1}$—$(CHW^{12})_{n3}$—$CH_3$

P-Sp-$(CH_2)_{n2}$—$(CF_2)_{n1}$—$CFW^{13}W^{14}$     II2

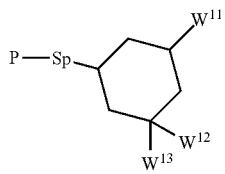     II3

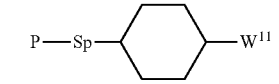     II4 wherein the individual radicals, independently of each other and on each occurrence identically or differently, have the following meanings P, Sp have the meanings given in claim 4, $W^{11}$, $W^{12}$ are H, F or straight-chain or branched $C_1$-$C_{12}$-alkyl, $W^{13}$, $W^{14}$ are H or F, n1 is an integer from 2 to 15, and n2, n3 are 0 or an integer from 1 to 3.

9. The liquid crystal medium according to claim 1, wherein component A) comprises one or more second polymerizable compounds selected from the following formulae

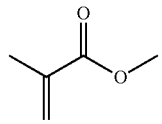     III a1

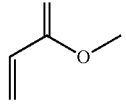     III a2

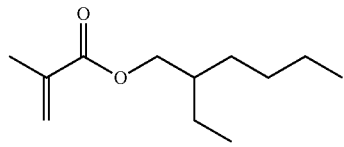     III a3

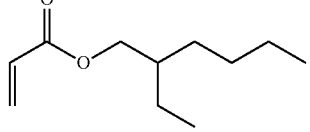     III a4

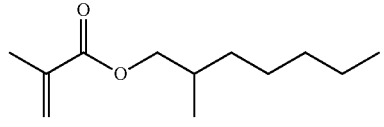     III a5

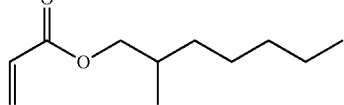     III a6

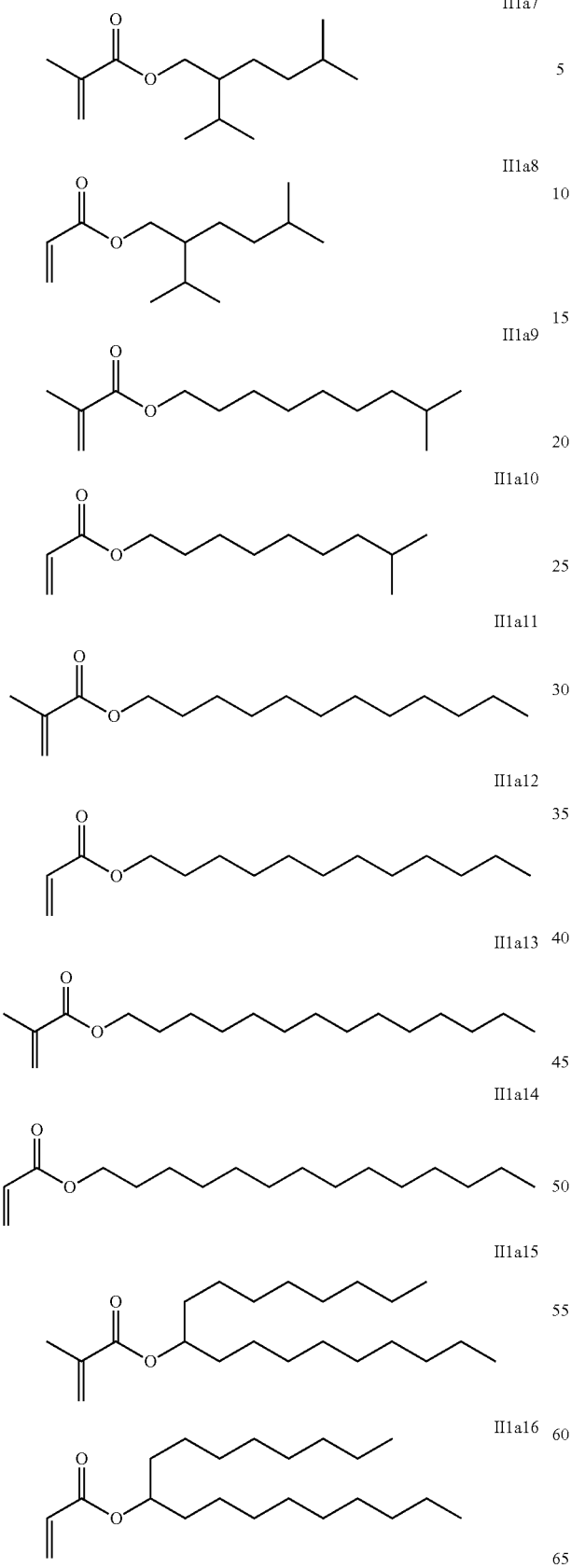
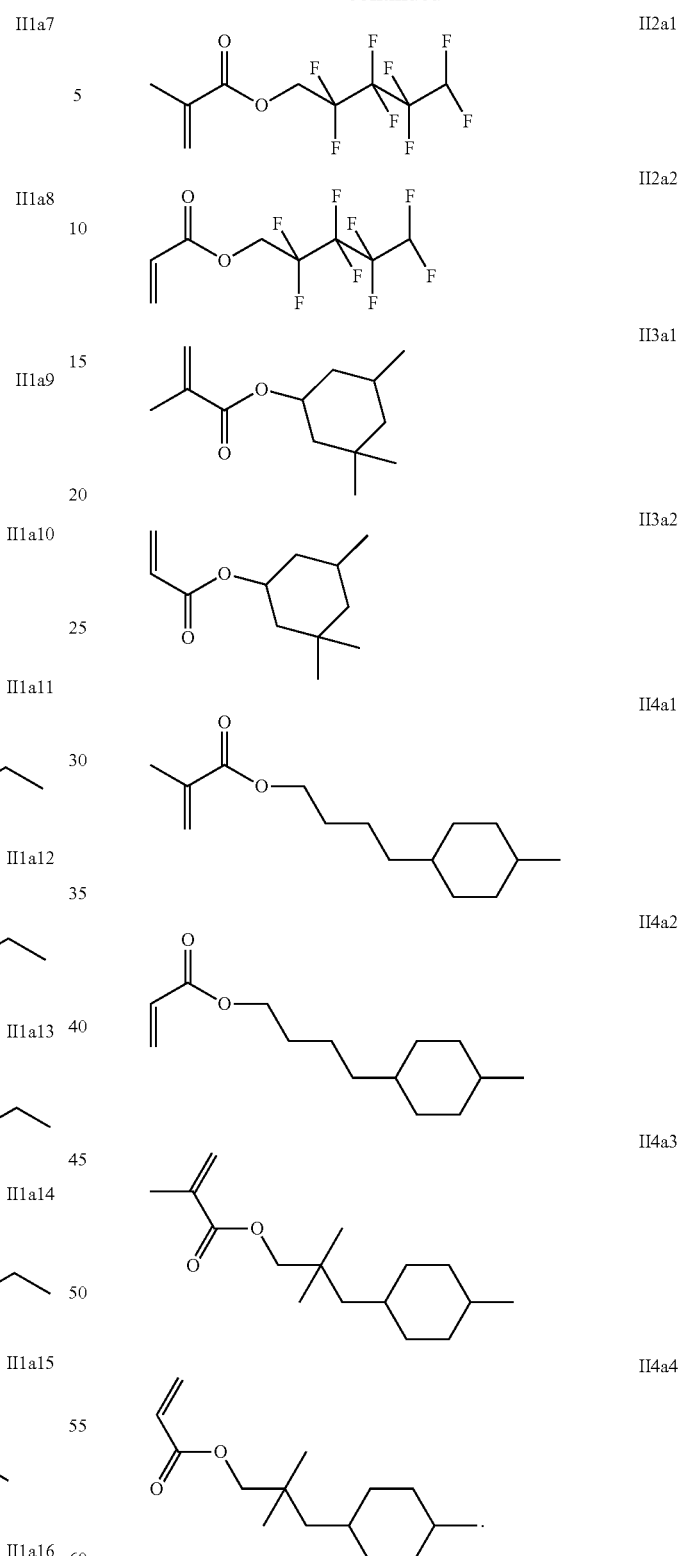
10. The liquid crystal medium according to claim 1, wherein component A) comprises one or more second polymerizable compounds comprising a bi- or polycyclic hydrocarbon group having from 4 to 30 ring atoms, and attached thereto a polymerizable group.

11. The liquid crystal medium according to claim 1, wherein component A) comprises one or more second polymerizable compounds selected from formula IIA P-Sp-G$^{2A}$   IIA wherein P is a polymerizable group, Sp is a spacer group or a single bond, G$^{2A}$ is a bi- or polycyclic hydrocarbon group having 4 to 30 ring atoms, which is optionally substituted by one or more groups L, and L is F, Cl, —CN, —NO$_2$, —NCO, —NCS, —OCN, —SCN, —C(=O)N(R$^x$)$_2$, —C(=O)Y', —C(=O)R$^x$, —N(R$^x$)$_2$, optionally substituted silyl, optionally substituted aryl or heteroaryl having 5 to 20 ring atoms, or straight-chain or branched alkyl having 1 to 25 C atoms in which, in addition, one or more non-adjacent CH$_2$ groups may each be replaced, independently of one another, by —C(R$^0$)=C(R$^{00}$)—, —C≡C—, —N(R$^0$)—, —O—, —S—, —CO—, —CO—O—, —O—CO—, or —O—CO—O— in such a way that O and/or S atoms are not linked directly to one another, and in which, in addition, one or more H atoms may each be replaced by F, Cl, or —CN.

12. The liquid crystal medium according to claim 4, wherein component A) comprises one or more second polymerizable compounds selected from the following formulae

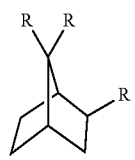   IIAA

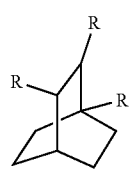   IIAB

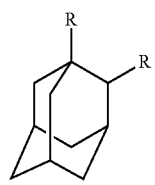   IIAC wherein

R on each occurrence identically or differently denotes P-Sp- or has one of the meanings given for R$^x$ in claim 4, and at least one of the groups R in each of formulae IIAA-IIAC denotes P-Sp-.

13. The liquid crystal medium according to claim 4, wherein component A) comprises one or more second polymerizable compounds selected from the following formulae

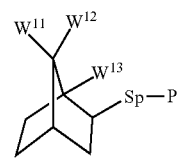   IIA1

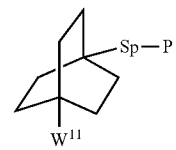   IIA2

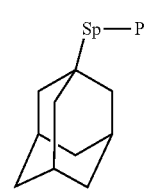   IIA3

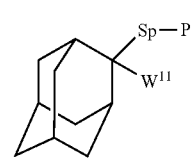   IIA4 wherein

P and Sp have the meanings given in claim 4,

W$^{11}$, W$^{12}$ and W$^{13}$ are independently of each other H, F or C$_1$-C$_{12}$-alkyl, and the cycloalkyl groups are optionally substituted with one or more groups L as defined in claim 4.

14. The liquid crystal medium according to claim 1, wherein component A) comprises one or more second polymerizable compounds selected from the following formulae

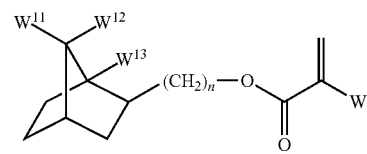   IIA1a

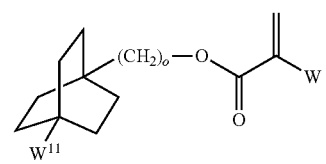   IIA2a

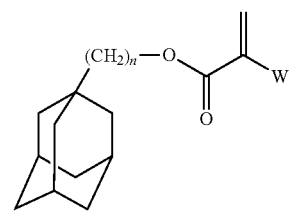   IIA3a

-continued

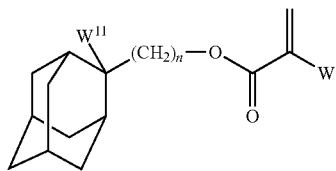
IIA4a wherein
n is 0 or an integer from 1 to 8,
W is H, CH$_3$ or C$_2$H$_5$, and
W$^{11}$, W$^{12}$ and W$^{13}$ are H, F or C$_1$-C$_{12}$-alkyl.

15. The liquid crystal medium according to claim 1, wherein component A) comprises one or more second polymerizable compounds selected from the following formulae

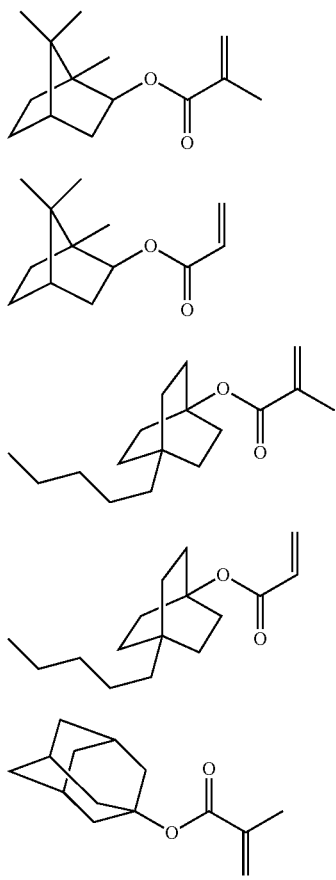

-continued

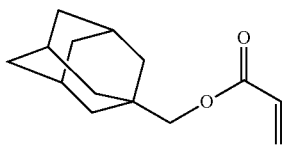
IIA3a4

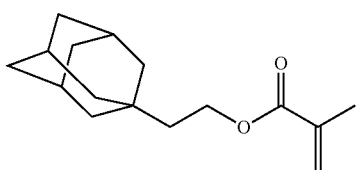
IIA3a5

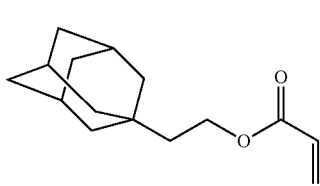
IIA3a6

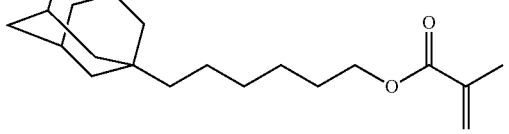
IIA3a7

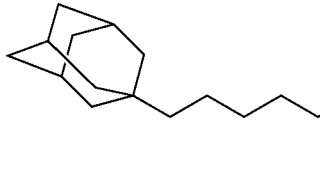
IIA3a8

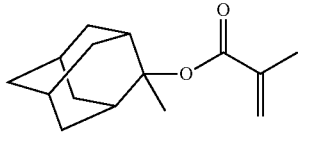
IIA4a1

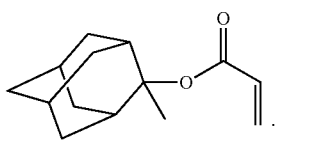
IIA4a2

16. The liquid crystal medium according to claim 4, wherein component A) comprises one or more third polymerizable compounds selected of formula III $$P^1\text{-}Sp^1\text{-}G^3\text{-}Sp^2\text{-}P^2 \qquad III$$

wherein
P$^1$ and P$^2$ independently of each other and on each occurrence identically or differently denote a polymerizable group,
Sp$^1$, Sp$^2$ denote independently of each other identical or different spacer groups or a single bond, and
G$^3$ is a straight-chain, branched or cyclic alkyl group with 1 to 20 C atoms that is optionally mono-, poly- or perfluorinated and is optionally substituted by one or more groups L as defined in claim 4, and wherein one or more CH$_2$-groups are each optionally replaced by —O—, —CO—, —O—CO— or —CO—O— such that O-atoms are not directly adjacent to one another.

17. The liquid crystal medium according to claim 16, wherein component A) comprises one or more third polymerizable compounds selected from the following formulae $$P^1\text{-}Sp^1\text{-}(CHW^{11})_{n2}\text{---}(CH_2)_{n1}\text{---}(CHW^{12})_{n3}\text{-}Sp^2\text{-}P^2 \quad \text{III1}$$

III2

$$P^1\text{---}(CH_2)_{n2}\text{---}(CF_2)_{n1}\text{---}(CH_2)_{n3}\text{---}P^2 \quad \text{III3}$$

$$(P^1\text{-}Sp^1\text{-}(CH_2)_{n4})_{n5}CH_{4\text{-}n5} \quad \text{III4}$$

wherein
$P^1$, $P^2$, $Sp^1$, $Sp^2$ are as defined in claim 16,
$W^{11}$ is, on each occurrence identically or differently, H, F or $C_1$-$C_{12}$-alkyl,
n1 is an integer from 2 to 15,
n2, n3 are independently of each other 0 or an integer from 1 to 3,
n4 is 0 or an integer from 1 to 15,
n5 is 3 or 4, and
the cyclohexylene ring in formula III2 is optionally substituted by one or more identical or different groups $W^{11}$.

18. The liquid crystal medium according to claim 17, wherein component A) comprises one or more third polymerizable compounds selected from the following formulae $$CH_2\!=\!CW\!-\!CO\!-\!O\!-\!(CHW^{11})_{n4}\!-\!(CH_2)_{n1}\!-\!O\!-\!CH\!=\!CH_2 \quad \text{III1a}$$

$$CH_2\!=\!CH\!-\!O\!-\!(CHW^1)_{n4}\!-\!(CH_2)_{n1}\!-\!O\!-\!CO\!-\!CH\!=\!CH_2 \quad \text{III1b}$$

$$CH_2\!=\!CW\!-\!CO\!-\!O\!-\!(CHW^{11})_{n2}\!-\!(CH_2)_{n1}\!-\!(CHW^{12})_{n3}\!-\!O\!-\!CO\!-\!CW\!=\!CH_2 \quad \text{III1c}$$

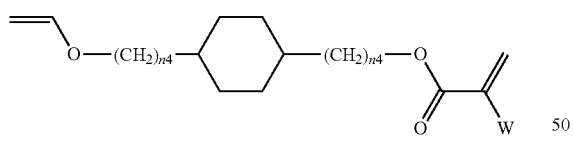
III2a

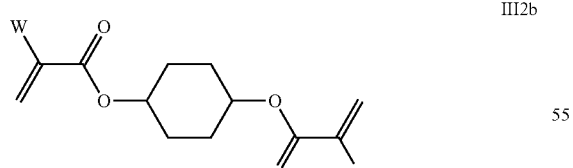
III2b

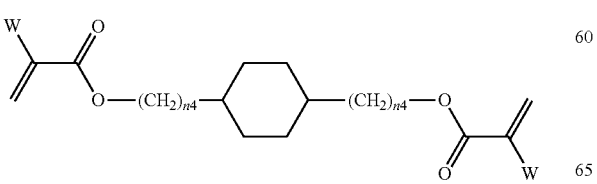
III2c $$CH_2\!=\!CW\!-\!CO\!-\!O\!-\!(CH_2)_{n2}\!-\!(CF_2)_{n1}\!-\!(CH_2)_{n3}\!-\!O\!-\!CH\!=\!CH_2 \quad \text{III3a}$$

$$CH_2\!=\!CW\!-\!CO\!-\!O\!-\!(CH_2)_{n2}\!-\!(CF_2)_{n1}\!-\!(CH_2)_{n3}\!-\!O\!-\!CO\!-\!CW\!=\!CH_2 \quad \text{III3b}$$

$$(CH_2\!=\!CW\!-\!CO\!-\!O\!-\!(CH_2)_{n2})_3CH \quad \text{III4a}$$

$$(CH_2\!=\!CW\!-\!CO\!-\!O\!-\!(CH_2)_{n2})_4C \quad \text{III4b}$$

wherein
W is H, $CH_3$ or $C_2H_5$,
$W^{11}$, n1, n2 and n4 are as defined in claim 17, and
the cyclohexylene ring in formula III2a-c is optionally substituted by one or more identical or different groups $W^{11}$.

19. The liquid crystal medium according to claim 1, characterized in that component A) comprises one or more third polymerizable compounds selected from the following formulae

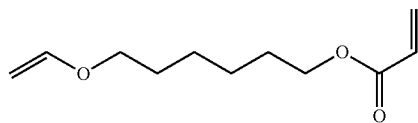
III1a1

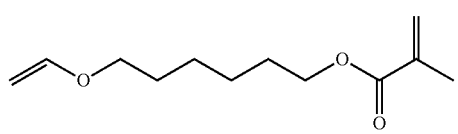
III1a2

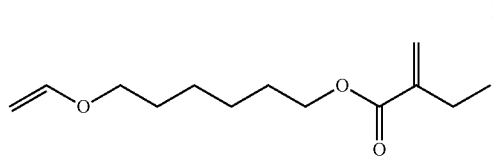
III1a3

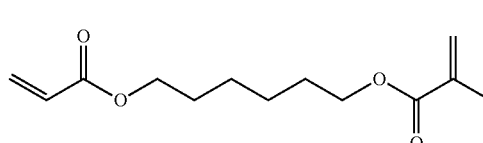
III1a4

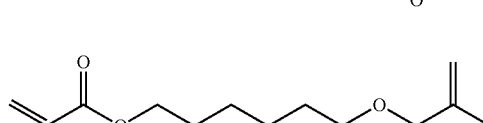
III1a5

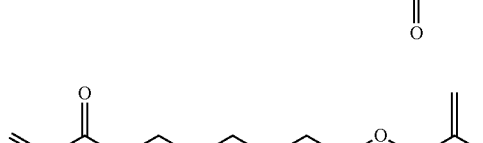
III1a6

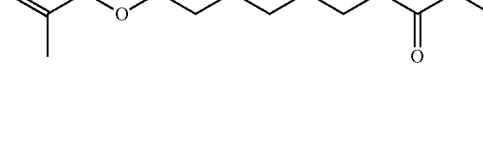
III1a7

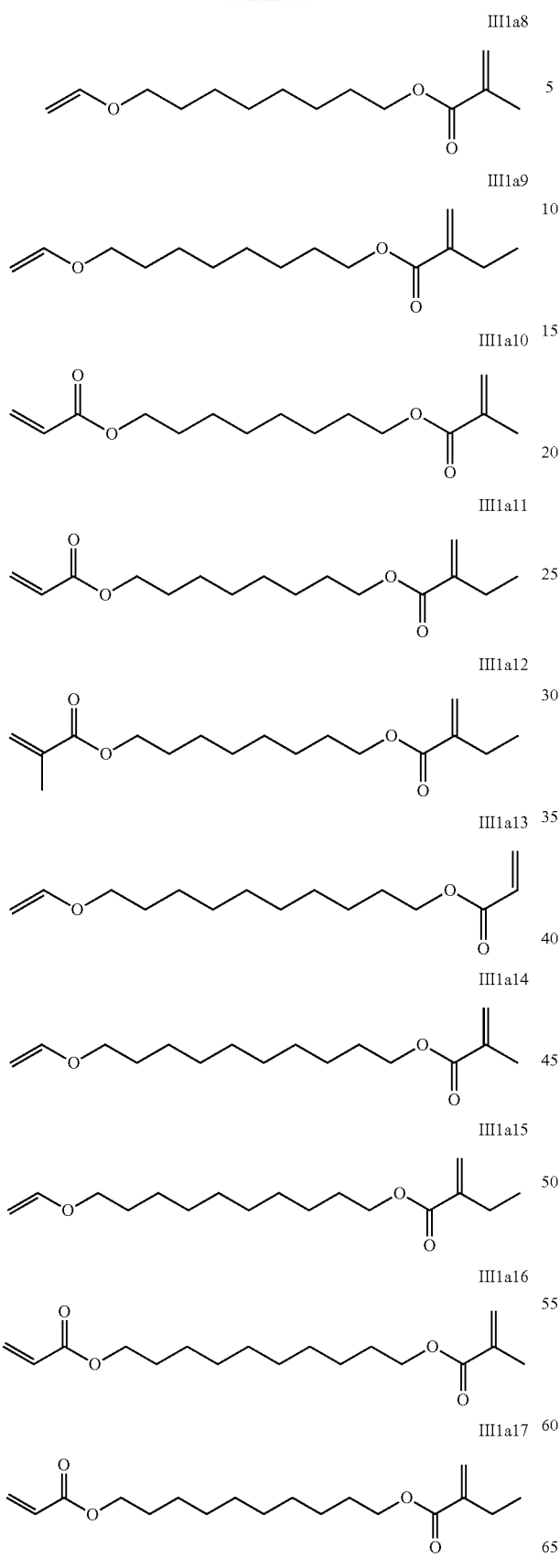

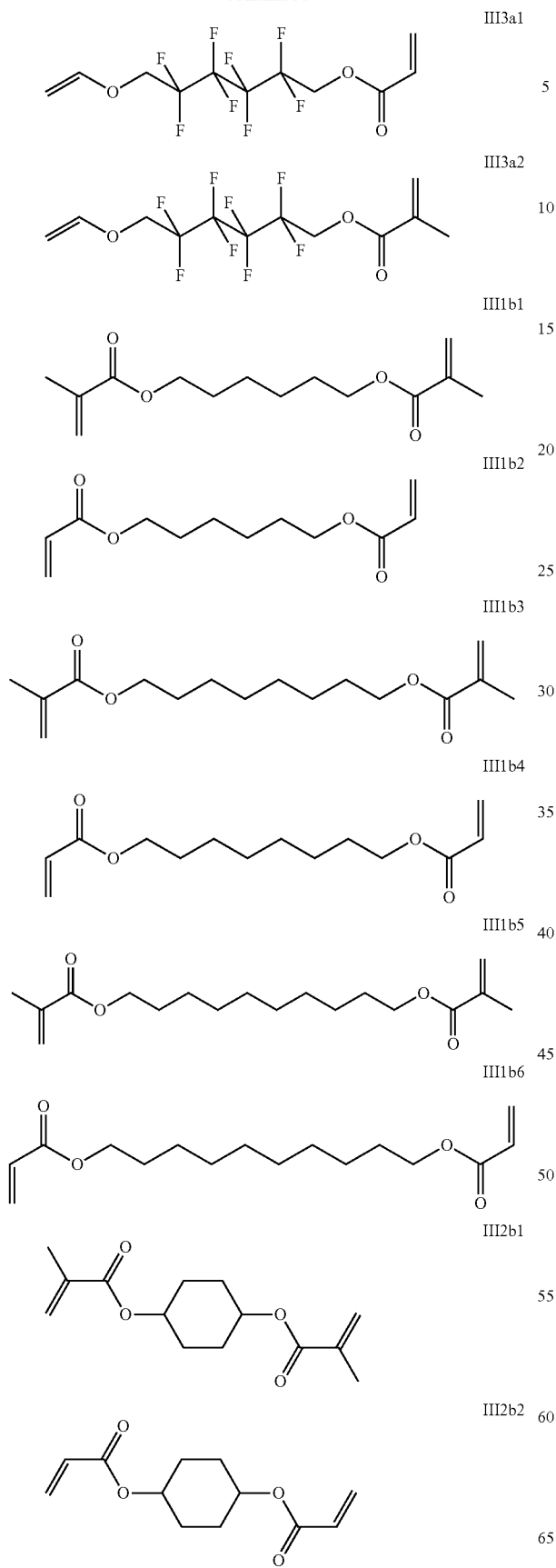
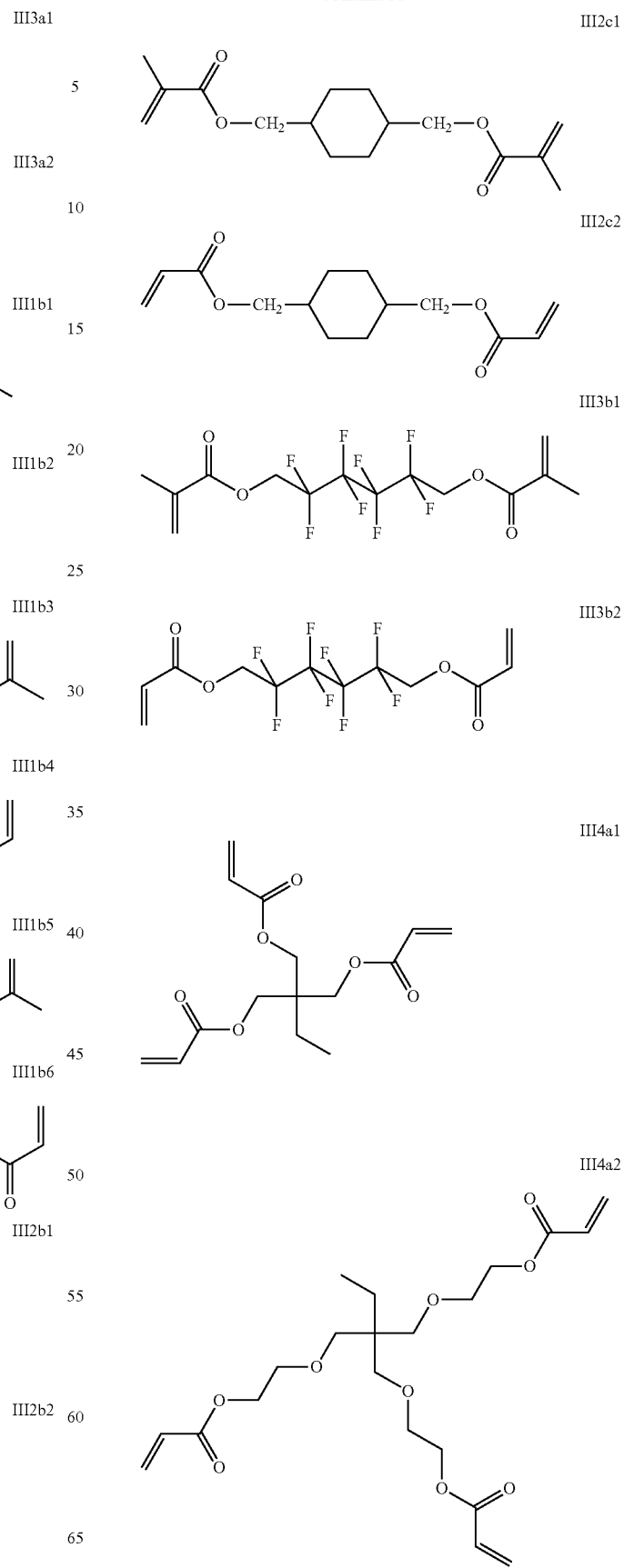

-continued

III4b1

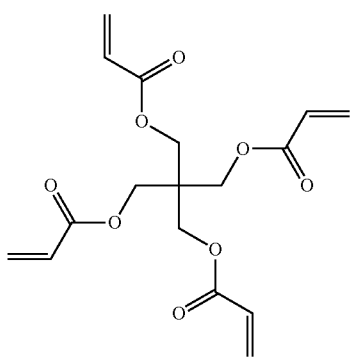

III5a1

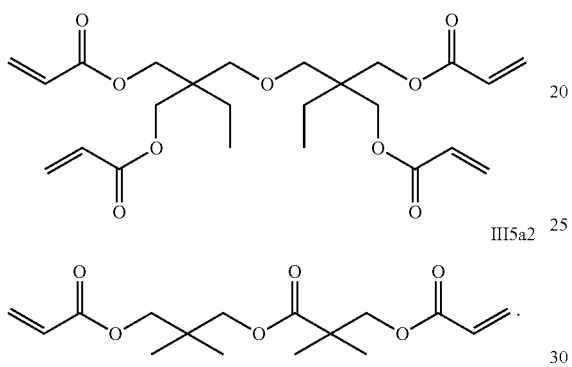

III5a2

20. The liquid crystal medium according to claim 1, wherein component A) comprises one or more fourth polymerizable compounds comprising a ring system containing one or more aromatic or heteroaromatic rings or condensed aromatic or heteroaromatic rings, and attached thereto two polymerizable groups that are different from each other.

21. The liquid crystal medium according to claim 1, wherein component A) comprises one or more fourth polymerizable compounds selected from the following formula $$P^1-Sp^1-B^1-(Z^b-B^2)_m-Sp^2-P^2 \quad \text{IV}$$

$P^1$ and $P^2$ independently of each other and on each occurrence identically or differently denote a polymerizable group, $Sp^1$, $Sp^2$ denote independently of each other identical or different spacer groups or a single bond, $B^1$ and $B^2$ are independently of each other, and on each occurrence identically or differently, an aromatic, heteroaromatic, alicyclic or heterocyclic group having 4 to 25 ring atoms, which may also contain fused rings, and which is unsubstituted, or mono- or polysubstituted by L as defined in claim 4, wherein at least one of $B^1$ and $B^2$ denotes an aromatic or heteroaromatic group, L is F, Cl, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl or heteroaryl having 5 to 20 ring atoms, or straight-chain or branched alkyl having 1 to 25 C atoms in which, in addition, one or more non-adjacent CH$_2$ groups may each be replaced, independently of one another, by —C(R$^0$)=C(R$^{00}$)—, —C≡C—, —N(R$^0$)—, —O—, —S—, —CO—, —CO—O—, —O—CO—, —O—CO—O— in such a way that O and/or S atoms are not linked directly to one another, and in which, in addition, one or more H atoms may each be replaced by F, Cl, or —CN, $Z^b$ is, on each occurrence identically or differently, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n11}$—, —CH=CH—, —CF=CF—, —C≡C—, —CH=CH—COO—, —OCO—CH=CH—, CR$^0$R$^{00}$ or a single bond, R$^0$ and R$^{00}$ each, independently of one another, denote H or alkyl having 1 to 12 C atoms, m denotes 0, 1, 2, 3 or 4, and n11 denotes 1, 2, 3 or 4.

22. The liquid crystal medium according to claim 16, wherein component A) comprises one or more fourth polymerizable compounds selected from the following formulae

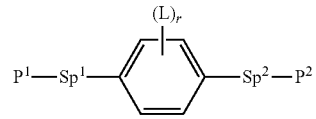

IV1

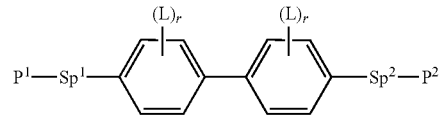

IV2

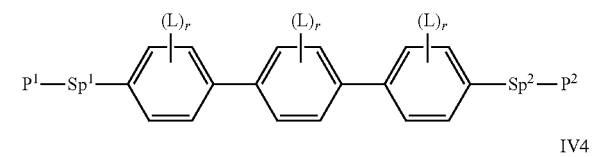

IV3

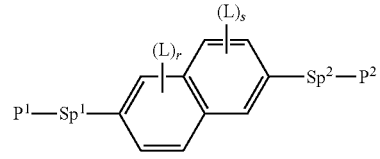

IV4

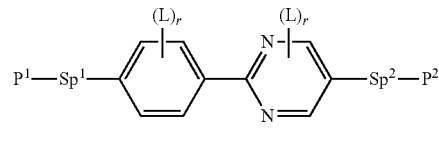

IV5

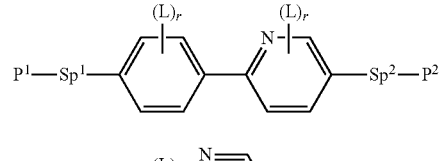

IV6

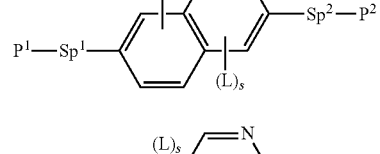

IV7

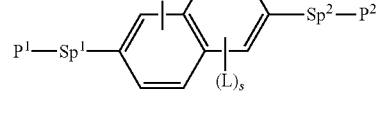

IV8

-continued

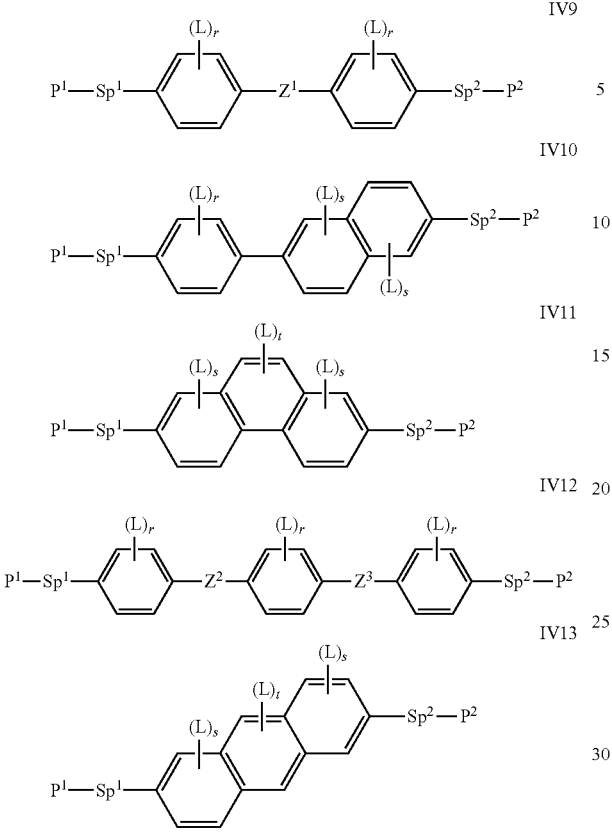

in which
P¹, P², Sp¹, Sp² and L are as defined in claim 16,
Z¹ is —O—, —CO—, —C(R^yR^z)— or —CF₂CF₂—,
Z², Z³ are independently of each other —CO—O—, —O—CO—, —CH₂O—, —OCH₂-, —CF₂O—, —OCF₂— or —(CH₂)$_{n11}$—, where n11 is 2, 3 or 4,
r is 0, 1, 2, 3 or 4,
s is 0, 1, 2 or 3, and
t is 0, 1 or 2.

23. The liquid crystal medium according to claim 1, wherein the total concentration of the first, second, third and fourth polymerizable compounds in the liquid crystal medium is from 1 to 30% by weight.

24. The liquid crystal medium according to claim 1, wherein the ratio of first polymerizable compounds relative to the second polymerizable compounds in the liquid crystal medium is from 10:1 to 1:10.

25. The liquid crystal medium according to claim 1, wherein component B) comprises one or more compounds selected from formulae A and B A
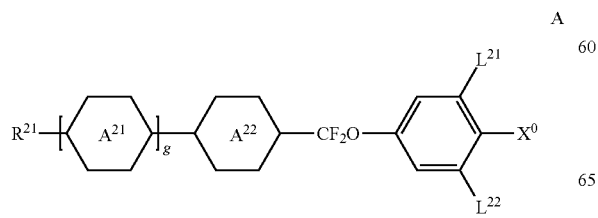

-continued

B
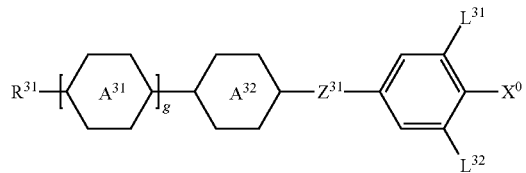

in which the individual radicals have, independently of each other and on each occurrence identically or differently, the following meanings:

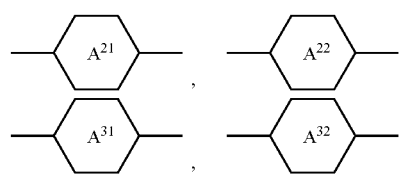

each, independently of one another, and on each occurrence, identically or differently

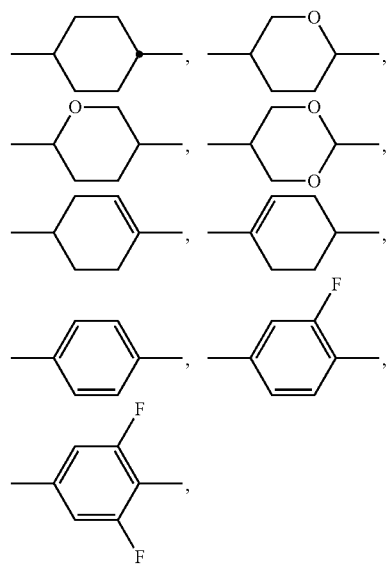

R²¹, R³¹ each, independently of one another, alkyl, alkoxy, oxaalkyl or alkoxyalkyl having 1 to 9 C atoms or alkenyl or alkenyloxy having 2 to 9 C atoms, all of which are optionally fluorinated,
X⁰ F, Cl, halogenated alkyl or alkoxy having 1 to 6 C atoms or halogenated alkenyl or alkenyloxy having 2 to 6 C atoms,
Z³¹ —CH₂CH₂—, —CF₂CF₂—, —COO—, trans-CH=CH—, trans-CF=CF—, —CH₂O- or a single bond,
L²¹, L²², L³¹, L³² each, independently of one another, H or F, and
g 0, 1, 2 or 3.

26. The liquid crystal medium according to claim 25, wherein component B) comprises, in addition to the compounds of formula A and/or B, one or more compounds of formula E containing an alkenyl group

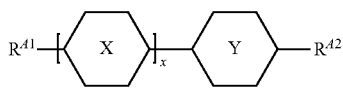

in which the individual radicals, on each occurrence identically or differently, each, independently of one another, have the following meaning:

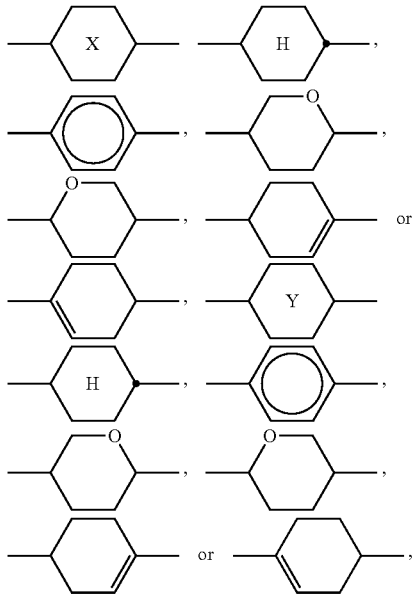

$R^{A1}$ alkenyl having 2 to 9 C atoms or, if at least one of the rings X, Y and Z denotes cyclohexenyl, also one of the meanings of $R^{A2}$, $R^{A2}$ alkyl having 1 to 12 C atoms, in which, in addition, one or two non-adjacent $CH_2$ groups may each be replaced by —O—, —CH=CH—, —CO—, —OCO— or —COO— in such a way that O atoms are not linked directly to one another, and x 1 or 2.

27. The liquid crystal medium according to claim 1, wherein component B) comprises one or more compounds selected from formulae CY and PY:

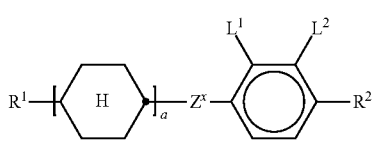

CY

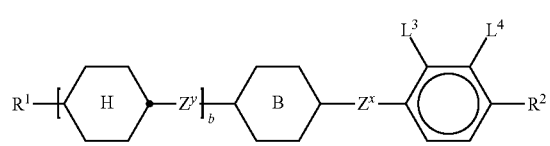

PY wherein
a denotes 1 or 2,
b denotes 0 or 1,

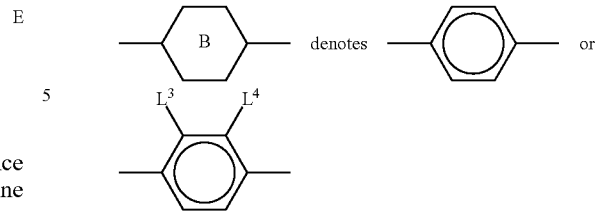

$R^1$ and $R^2$ each, independently of one another, denote alkyl having 1 to 12 C atoms, where, in addition, one or two non-adjacent $CH_2$ groups may each be replaced by —O—, —CH=CH—, —CO—, —COO— or —COO— in such a way that O atoms are not linked directly to one another, $Z^x$ and $Z^y$ each, independently of one another, denote —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, and $L^{1-4}$ each, independently of one another, denote F, Cl, $OCF_3$, $CF_3$, $CH_3$, $CH_2F$, or $CHF_2$.

28. The liquid crystal medium according to claim 27, wherein component B) comprises one or more alkenyl compounds selected from formulae AN and AY

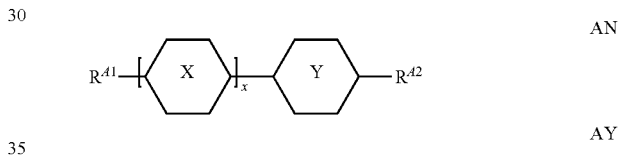

AN

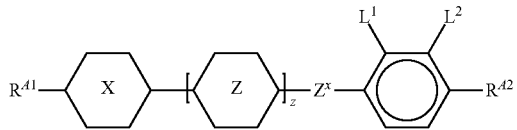

AY in which the individual radicals, on each occurrence identically or differently, and each, independently of one another, have the following meaning:

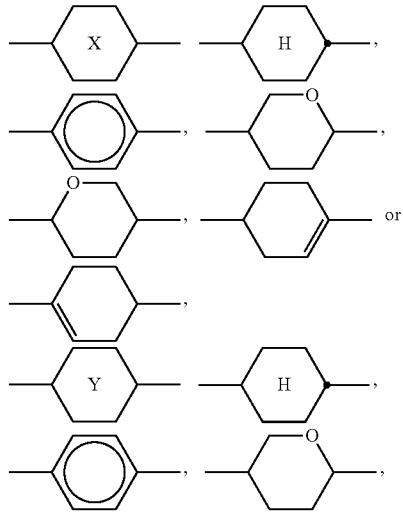

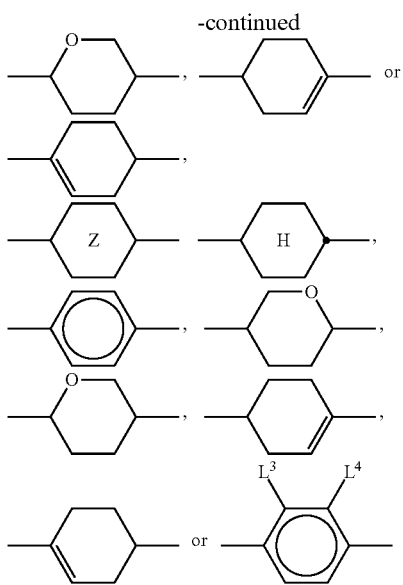

$R^{41}$ alkenyl having 2 to 9 C atoms or, if at least one of the rings X, Y and Z denotes cyclohexenyl, also one of the meanings of $R^{42}$, $R^{42}$ alkyl having 1 to 12 C atoms, in which, in addition, one or two non-adjacent CH$_2$ groups may each be replaced by —O—, —CH=CH—, —CO—, —OCO— or —COO— in such a way that O atoms are not linked directly to one another, $Z^x$ —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, $L^{1,2}$ H, F, Cl, OCF$_3$, CF$_3$, CH$_3$, CH$_2$F or CHF$_2$H, x 1 or 2, and z 0 or 1.

29. The liquid crystal medium according to claim 1 wherein the polymerizable compounds are polymerized polymerised.

30. A liquid crystal display comprising a liquid crystal an LC medium according to claim 1.

31. The liquid crystal display of claim 30, which is a flexible or curved display.

32. The liquid crystal display of claim 30, which is a TN, OCB, IPS, FFS, posi-VA, VA or UB-FFS display.

33. A process for the production of a liquid crystal an LC display, comprising providing an LC medium as defined in claim 1 into the display, and polymerising the polymerizable compounds in defined regions of the display.

34. The process of claim 33, wherein the polymerizable compounds are photopolymerised by exposure to UV irradiation.

35. The process of claim 34, wherein the polymerizable compounds are photopolymerised by exposure to UV irradiation through a photomask.

36. A process of preparing an LC medium comprising of mixing a liquid-crystalline component B) as defined in claim 1, with one or more polymerizable compounds, or with component A), as defined in claim 1, and optionally with further LC compounds and/or additives.

* * * * *